United States Patent
Zhu et al.

(10) Patent No.: US 7,611,064 B2
(45) Date of Patent: *Nov. 3, 2009

(54) DIGITAL IMAGE CAPTURE AND PROCESSING SYSTEM HAVING AUTOMATIC ILLUMINATION MEASUREMENT AND CONTROL CAPABILITIES REALIZED USING A PHOTODETECTOR OPERATING INDEPENDENTLY OF THE IMAGE SENSING ARRAY, AND AN IMAGE-PROCESSING BASED ILLUMINATION METERING PROGRAM FOR AUTOMATICALLY ADJUSTING THE ILLUMINATION DURATION OF THE SYSTEM DURING OBJECT ILLUMINATION AND IMAGING OPERATIONS

(75) Inventors: Xiaoxun Zhu, Marlton, NJ (US); Yong Liu, Suzhou (CN); Ka Man Au, Philadelphia, PA (US); Rui Hou, Suzhou (CN); Hongpeng Yu, Tianjin (CN); Xi Tao, Suzhou (CN); Liang Liu, Suzhou (CN); Wenhua Zhang, Suzhou (CN); Anatoly Kotlarsky, Holland, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/607,115

(22) Filed: Nov. 30, 2006

(65) Prior Publication Data

US 2007/0176002 A1 Aug. 2, 2007

Related U.S. Application Data

(63) Continuation of application No. 10/989,220, filed on Nov. 15, 2004, now Pat. No. 7,490,774, which is a continuation-in-part of application No. 10/712,787, (Continued)

(51) Int. Cl.
*G06K 7/10* (2006.01)

(52) U.S. Cl. .............................. 235/472.01; 235/462.41; 235/462.42

(58) Field of Classification Search ............ 235/472.01, 235/462.45, 462.41, 462.42
See application file for complete search history.

(56) References Cited

U.S. PATENT DOCUMENTS 4,045,813 A 8/1977 Jones (Continued)

OTHER PUBLICATIONS

Product brochure for the LMC555 CMOS Timer by National Semiconductor Corporation, Mar. 2002, pp. 1-10.

(Continued)

*Primary Examiner*—Ahshik Kim
(74) *Attorney, Agent, or Firm*—Thomas J. Perkowski, Esq., P.C.

(57) ABSTRACT

A digital-imaging based code symbol reading system comprising an image sensing array with a field of view (FOV), an illumination subsystem with an LED illumination array, an automatic illumination measurement subsystem, an illumination control subsystem, and programmed imager processor supporting an image-processing based illumination metering program. The automatic illumination measurement subsystem, employing a photodetector operating independently from the image sensing array, is used to automatically measure the illumination level at a particular region of the FOV and determine the illumination duration necessary to achieve a desired spatial intensity in the detected digital image. The illumination metering program automatically analyzes and measures, in real-time, the spatial intensity distribution of the digital image and determines whether or not a corrected illumination duration is required or desired when detecting the next or subsequent digital images, during the current or subsequent object illumination and imaging cycle. The previously determined illumination duration is over-written with the corrected illumination duration, which is used to drive the illumination subsystem and form and detect subsequent digital images of the illuminated object.

15 Claims, 127 Drawing Sheets

Related U.S. Application Data

(63) filed on Nov. 11, 2003, now Pat. No. 7,128,266, and a continuation-in-part of application No. 10/893,800, filed on Jul. 16, 2004, now Pat. No. 7,273,180, and a continuation-in-part of application No. 10/893,797, filed on Jul. 16, 2004, now Pat. No. 7,188,770, and a continuation-in-part of application No. 10/893,798, filed on Jul. 16, 2004, now Pat. No. 7,185,817, and a continuation-in-part of application No. 10/894,476, filed on Jul. 16, 2004, now Pat. No. 7,178,733, and a continuation-in-part of application No. 10/894,478, filed on Jul. 19, 2004, now Pat. No. 7,357,325, and a continuation-in-part of application No. 10/894,412, filed on Jul. 19, 2004, now Pat. No. 7,213,762, and a continuation-in-part of application No. 10/894,477, filed on Jul. 19, 2004, now Pat. No. 7,360,706, and a continuation-in-part of application No. 10/895,271, filed on Jul. 20, 2004, now Pat. No. 7,216,810, and a continuation-in-part of application No. 10/895,811, filed on Jul. 20, 2004, now Pat. No. 7,255,988, and a continuation-in-part of application No. 10/897,390, filed on Jul. 22, 2004, now Pat. No. 7,237,722, and a continuation-in-part of application No. 10/897,389, filed on Jul. 22, 2004, now Pat. No. 7,225,989, and a continuation-in-part of application No. 10/901,463, filed on Jul. 27, 2004, now Pat. No. 7,086,595, and a continuation-in-part of application No. 10/901,426, filed on Jul. 27, 2004, now Pat. No. 7,278,575, and a continuation-in-part of application No. 10/901,446, filed on Jul. 27, 2004, and a continuation-in-part of application No. 10/901,461, filed on Jul. 28, 2004, now Pat. No. 7,320,431, and a continuation-in-part of application No. 10/901,429, filed on Jul. 28, 2004, now Pat. No. 7,243,847, and a continuation-in-part of application No. 10/901,427, filed on Jul. 28, 2004, now Pat. No. 7,267,282, and a continuation-in-part of application No. 10/901,445, filed on Jul. 28, 2004, now Pat. No. 7,240,844, and a continuation-in-part of application No. 10/901,428, filed on Jul. 28, 2004, now Pat. No. 7,293,714, and a continuation-in-part of application No. 10/902,709, filed on Jul. 29, 2004, now Pat. No. 7,270,272, and a continuation-in-part of application No. 10/901,914, filed on Jul. 29, 2004, now Pat. No. 7,325,738, and a continuation-in-part of application No. 10/902,710, filed on Jul. 29, 2004, now Pat. No. 7,281,661, and a continuation-in-part of application No. 10/909,270, filed on Jul. 30, 2004, now Pat. No. 7,284,705, and a continuation-in-part of application No. 10/909,255, filed on Jul. 30, 2004, now Pat. No. 7,299,986, and a continuation-in-part of application No. 10/903,904, filed on Jul. 30, 2004, now Pat. No. 7,255,279.

(56) References Cited

U.S. PATENT DOCUMENTS

| | | |
|---|---|---|
| 4,291,338 A | 9/1981 | Thomas |
| 4,317,622 A | 3/1982 | Metzger |
| 4,338,514 A | 7/1982 | Bixby |
| 4,471,228 A | 9/1984 | Nishizawa et al. |
| 4,528,444 A | 7/1985 | Hara et al. |
| 4,535,758 A | 8/1985 | Longacre, Jr. |
| 4,538,060 A | 8/1985 | Sakai et al. |
| 4,613,402 A | 9/1986 | Losee et al. |
| 4,632,542 A | 12/1986 | Whiteside |
| 4,703,344 A | 10/1987 | Hisano et al. |
| D297,432 S | 8/1988 | Stant et al. |
| 4,766,300 A | 8/1988 | Chadima, Jr. et al. |
| 4,805,026 A | 2/1989 | Oda |
| 4,816,916 A | 3/1989 | Akiyama |
| 4,818,847 A | 4/1989 | Hara et al. |
| 4,819,070 A | 4/1989 | Hynecek |
| 4,835,615 A | 5/1989 | Taniguchi et al. |
| D304,026 S | 10/1989 | Goodner et al. |
| 4,877,949 A | 10/1989 | Danielson et al. |
| 4,894,523 A | 1/1990 | Chadima, Jr. et al. |
| D308,865 S | 6/1990 | Weaver et al. |
| 4,952,966 A | 8/1990 | Ishida et al. |
| 4,972,224 A | 11/1990 | Thompson |
| 4,978,981 A | 12/1990 | Satoh et al. |
| 4,996,413 A | 2/1991 | McDaniel et al. |
| 5,019,699 A | 5/1991 | Koenck |
| 5,025,319 A | 6/1991 | Mutoh et al. |
| 5,034,619 A | 7/1991 | Hammond, Jr. |
| 5,063,462 A | 11/1991 | Nakagawa et al. |
| 5,111,263 A | 5/1992 | Stevens |
| 5,124,537 A | 6/1992 | Chandler et al. |
| 5,142,684 A | 8/1992 | Perry et al. |
| 5,144,119 A | 9/1992 | Chadima, Jr. et al. |
| 5,170,205 A | 12/1992 | Satoh et al. |
| 5,202,907 A | 4/1993 | Yonemoto |
| 5,231,293 A | 7/1993 | Longacre, Jr. |
| 5,233,169 A | 8/1993 | Longacre, Jr. |
| 5,235,198 A | 8/1993 | Stevens et al. |
| 5,235,416 A | 8/1993 | Stanhope |
| 5,262,871 A | 11/1993 | Wilder et al. |
| 5,270,802 A | 12/1993 | Takagi et al. |
| 5,272,538 A | 12/1993 | Homma et al. |
| 5,281,800 A | 1/1994 | Pelton et al. |
| 5,286,960 A | 2/1994 | Longacre, Jr. et al. |
| 5,288,985 A | 2/1994 | Chadima, Jr. et al. |
| 5,291,008 A | 3/1994 | Havens et al. |
| 5,291,009 A | 3/1994 | Roustaei |
| 5,294,783 A | 3/1994 | Hammond, Jr. et al. |
| 5,296,689 A | 3/1994 | Reddersen et al. |
| D346,162 S | 4/1994 | Bennett et al. |
| 5,304,786 A | 4/1994 | Pavlidis et al. |
| 5,304,787 A | 4/1994 | Wang |
| 5,308,962 A | 5/1994 | Havens et al. |
| 5,309,243 A | 5/1994 | Tsai |
| 5,319,181 A | 6/1994 | Shellhammer et al. |
| 5,319,182 A | 6/1994 | Havens et al. |
| 5,340,973 A | 8/1994 | Knowles et al. |
| 5,345,266 A | 9/1994 | Denyer |
| 5,349,172 A | 9/1994 | Roustaei |
| 5,352,884 A | 10/1994 | Petrick et al. |
| 5,354,977 A | 10/1994 | Roustaei |
| 5,378,883 A | 1/1995 | Batterman et al. |
| 5,396,054 A | 3/1995 | Krichever et al. |
| 5,399,846 A | 3/1995 | Pavlidis et al. |
| 5,410,141 A | 4/1995 | Kkoenck et al. |
| 5,410,348 A | 4/1995 | Hamasaki |
| 5,418,357 A | 5/1995 | Inoue et al. |
| 5,420,409 A | 5/1995 | Longacre, Jr. et al. |
| 5,430,285 A | 7/1995 | Karpen et al. |
| 5,430,286 A | 7/1995 | Hammond, Jr. et al. |
| 5,457,309 A | 10/1995 | Pelton |
| 5,463,214 A | 10/1995 | Longacre, Jr. et al. |
| 5,468,951 A | 11/1995 | Knowles et al. |
| 5,479,515 A | 12/1995 | Longacre, Jr. |
| 5,484,994 A | 1/1996 | Roustaei |
| 5,489,771 A | 2/1996 | Beach et al. |
| 5,495,097 A | 2/1996 | Katz et al. |
| 5,519,496 A | 5/1996 | Borgert et al. |
| 5,521,366 A | 5/1996 | Wang et al. |
| 5,532,467 A | 7/1996 | Rousatei |
| 5,541,419 A | 7/1996 | Arakellian |
| 5,550,366 A | 8/1996 | Roustaei |
| 5,572,006 A | 11/1996 | Wang et al. |

| | | | | | |
|---|---|---|---|---|---|
| 5,572,007 A | 11/1996 | Aragon et al. | 6,097,839 A | 8/2000 | Liu |
| 5,591,952 A | 1/1997 | Krichever et al. | 6,097,856 A | 8/2000 | Hammon, Jr. |
| 5,610,654 A | 3/1997 | Parulski et al. | 6,098,887 A | 8/2000 | Figarella et al. |
| 5,621,203 A | 4/1997 | Swartz et al. | 6,109,526 A | 8/2000 | Ohanian et al. |
| 5,623,137 A | 4/1997 | Powers et al. | 6,119,941 A | 9/2000 | Katsandres et al. |
| 5,635,697 A | 6/1997 | Shellhammer et al. | 6,123,261 A | 9/2000 | Roustaei |
| 5,637,851 A | 6/1997 | Swartz et al. | 6,123,263 A | 9/2000 | Feng |
| 5,646,390 A | 7/1997 | Wang et al. | 6,128,414 A | 10/2000 | Liu |
| 5,659,167 A | 8/1997 | Wang et al. | 6,141,046 A | 10/2000 | Roth et al. |
| 5,659,761 A | 8/1997 | DeArras et al. | 6,149,063 A | 11/2000 | Reynolds et al. |
| 5,661,291 A | 8/1997 | Ahearn et al. | 6,152,371 A | 11/2000 | Schwartz et al. |
| 5,677,522 A | 10/1997 | Rice et al. | 6,158,661 A | 12/2000 | Chadima, Jr. et al. |
| 5,702,059 A | 12/1997 | Chu et al. | 6,161,760 A | 12/2000 | Marrs et al. |
| 5,710,417 A | 1/1998 | Joseph et al. | 6,164,544 A | 12/2000 | Schwartz et al. |
| 5,717,195 A | 2/1998 | Feng et al. | 6,173,893 B1 | 1/2001 | Maltsev et al. |
| 5,717,221 A | 2/1998 | Li et al. | 6,177,926 B1 | 1/2001 | Kunert |
| 5,719,384 A | 2/1998 | Ju et al. | 6,179,208 B1 | 1/2001 | Feng |
| 5,723,853 A | 3/1998 | Longacre, Jr. et al. | 6,209,789 B1 | 4/2001 | Amundsen et al. |
| 5,723,868 A | 3/1998 | Hammond, Jr. et al. | D442,152 S | 5/2001 | Roustaei |
| 5,736,724 A | 4/1998 | Ju et al. | 6,223,986 B1 | 5/2001 | Bobba et al. |
| 5,739,518 A | 4/1998 | Wang | 6,223,988 B1 | 5/2001 | Batterman et al. |
| 5,756,981 A | 5/1998 | Roustaei et al. | 6,234,395 B1 | 5/2001 | Chadima et al. |
| 5,773,806 A | 6/1998 | Longacre, Jr. et al. | 6,244,512 B1 | 6/2001 | Koenck et al. |
| 5,773,810 A | 6/1998 | Hussey et al. | 6,250,551 B1 | 6/2001 | He et al. |
| D396,033 S | 7/1998 | Ahearn et al. | 6,254,003 B1 | 7/2001 | Pettinelli et al. |
| 5,777,314 A | 7/1998 | Roustaei | 6,264,105 B1 | 7/2001 | Longacre, Jr. et al. |
| 5,780,834 A | 7/1998 | Havens et al. | 6,266,685 B1 | 7/2001 | Danielson et al. |
| 5,783,811 A | 7/1998 | Feng et al. | 6,275,388 B1 | 8/2001 | Hennick et al. |
| 5,784,102 A | 7/1998 | Hussey et al. | 6,298,175 B1 | 10/2001 | Longacre, Jr. et al. |
| 5,786,582 A | 7/1998 | Roustaei et al. | 6,298,176 B2 | 10/2001 | Longacre, Jr. et al. |
| 5,786,583 A | 7/1998 | Maltsev | 6,330,974 B1 | 12/2001 | Ackley |
| 5,786,586 A | 7/1998 | Pidhirny et al. | 6,336,587 B1 | 1/2002 | He et al. |
| 5,793,033 A | 8/1998 | Feng et al. | 6,340,114 B1 | 1/2002 | Correa et al. |
| 5,793,967 A | 8/1998 | Simciak et al. | 6,345,765 B1 | 2/2002 | Wiklof |
| 5,811,774 A | 9/1998 | Ju et al. | 6,347,163 B2 | 2/2002 | Roustaei |
| 5,811,784 A | 9/1998 | Tausch et al. | 6,357,659 B1 | 3/2002 | Kelly et al. |
| 5,815,200 A | 9/1998 | Ju et al. | 6,367,699 B2 | 4/2002 | Ackley |
| 5,821,518 A | 10/1998 | Sussmeier et al. | 6,370,003 B1 | 4/2002 | Hennick |
| 5,825,006 A | 10/1998 | Longacre, Jr. et al. | 6,371,374 B1 | 4/2002 | Schwartz et al. |
| 5,831,254 A | 11/1998 | Karpen et al. | 6,373,579 B1 | 4/2002 | Ober et al. |
| 5,831,674 A | 11/1998 | Ju et al. | 6,385,352 B1 | 5/2002 | Roustaei |
| 5,834,754 A | 11/1998 | Feng et al. | 6,390,625 B1 | 5/2002 | Slawson et al. |
| 5,837,985 A | 11/1998 | Karpen | D458,265 S | 6/2002 | Fitch |
| 5,838,495 A | 11/1998 | Hennick | 6,398,112 B1 | 6/2002 | Li et al. |
| 5,841,121 A | 11/1998 | Koenck | D459,728 S | 7/2002 | Roberts et al. |
| 5,867,594 A | 2/1999 | Cymbalski | 6,419,157 B1 | 7/2002 | Ehrhart et al. |
| 5,883,375 A | 3/1999 | Knowles et al. | 6,431,452 B2 | 8/2002 | Feng |
| 5,900,613 A | 5/1999 | Koziol et al. | 6,435,411 B1 | 8/2002 | Massieu et al. |
| 5,914,476 A | 6/1999 | Gerst, III et al. | 6,469,289 B1 | 10/2002 | Scott-Thomas et al. |
| 5,920,061 A | 7/1999 | Feng | 6,473,126 B1 | 10/2002 | Higashihara et al. |
| 5,929,418 A | 7/1999 | Ehrhart et al. | 6,473,519 B1 | 10/2002 | Pidhirny et al. |
| 5,932,862 A | 8/1999 | Hussey et al. | 6,478,223 B1 | 11/2002 | Ackley |
| 5,942,741 A | 8/1999 | Longacre, Jr. et al. | D467,918 S | 12/2002 | Fitch et al. |
| 5,949,052 A | 9/1999 | Longacre, Jr. et al. | 6,489,798 B1 | 12/2002 | Scott-Thomas et al. |
| 5,949,054 A | 9/1999 | Karpen et al. | 6,491,223 B1 | 12/2002 | Longacre, Jr. et al. |
| 5,949,057 A | 9/1999 | Feng | 6,497,368 B1 | 12/2002 | Friend et al. |
| 5,965,863 A | 10/1999 | Parker et al. | 6,499,664 B2 | 12/2002 | Knowles et al. |
| 5,978,610 A | 11/1999 | Aoki | 6,527,182 B1 | 3/2003 | Chiba et al. |
| 5,979,763 A | 11/1999 | Wang et al. | 6,547,139 B1 | 4/2003 | Havens et al. |
| 5,986,705 A | 11/1999 | Shiboya et al. | 6,550,679 B2 | 4/2003 | Hennick et al. |
| 5,992,744 A | 11/1999 | Smith et al. | 6,561,428 B2 | 5/2003 | Meier et al. |
| 5,992,750 A | 11/1999 | Chadima, Jr. et al. | 6,565,003 B1 | 5/2003 | Ma et al. |
| 6,000,612 A | 12/1999 | Xu | 6,575,367 B1 | 6/2003 | Longacre et al. |
| RE36,528 E | 1/2000 | Roustaei | 6,575,369 B1 | 6/2003 | Knowles et al. |
| 6,015,088 A | 1/2000 | Parker et al. | 6,578,766 B1 | 6/2003 | Parker et al. |
| 6,016,135 A | 1/2000 | Biss et al. | 6,585,159 B1 | 7/2003 | Meier et al. |
| 6,019,286 A | 2/2000 | Li et al. | 6,601,768 B2 | 8/2003 | McCall et al. |
| 6,044,231 A | 3/2000 | Soshi et al. | 6,603,508 B1 | 8/2003 | Hata |
| 6,045,047 A | 4/2000 | Pidhirny et al. | 6,607,128 B1 | 8/2003 | Schwartz et al. |
| 6,060,722 A | 5/2000 | Havens et al. | 6,616,046 B1 | 9/2003 | Barkan et al. |
| 6,062,475 A | 5/2000 | Feng | 6,619,547 B2 | 9/2003 | Crowther et al. |
| 6,064,763 A | 5/2000 | Maltsev | 6,637,655 B1 | 10/2003 | Hudrick et al. |
| 6,095,422 A | 8/2000 | Ogami | 6,637,658 B2 | 10/2003 | Barber et al. |

| | | |
|---|---|---|
| 6,655,595 B1 | 12/2003 | Longacre, Jr. et al. |
| 6,659,350 B2 | 12/2003 | Schwartz et al. |
| 6,669,093 B1 | 12/2003 | Meyerson et al. |
| 6,681,994 B1 | 1/2004 | Koenck |
| 6,685,095 B2 | 2/2004 | Roustaei et al. |
| 6,689,998 B1 | 2/2004 | Bremer |
| 6,695,209 B1 | 2/2004 | La |
| 6,698,656 B2 | 3/2004 | Parker et al. |
| 6,708,883 B2 | 3/2004 | Krichever |
| 6,722,569 B2 | 4/2004 | Ehrhart et al. |
| 6,729,546 B2 | 5/2004 | Roustaei |
| 6,736,320 B1 | 5/2004 | Crowther et al. |
| 6,752,319 B2 | 6/2004 | Ehrhart et al. |
| 6,758,403 B1 | 7/2004 | Keys et al. |
| 6,778,210 B1 | 8/2004 | Sugahara et al. |
| 6,809,766 B1 | 10/2004 | Krymski et al. |
| 6,814,290 B2 | 11/2004 | Longacre |
| 6,831,690 B1 | 12/2004 | John et al. |
| 6,832,725 B2 | 12/2004 | Gardiner et al. |
| 6,834,807 B2 | 12/2004 | Ehrhart et al. |
| 6,863,217 B2 | 3/2005 | Hudrick et al. |
| D505,423 S | 5/2005 | Ahearn et al. |
| 6,899,273 B2 | 5/2005 | Hussey et al. |
| 6,942,151 B2 | 9/2005 | Ehrhart |
| 6,947,612 B2 | 9/2005 | Helms et al. |
| 6,959,865 B2 | 11/2005 | Walczyk et al. |
| 6,969,003 B2 | 11/2005 | Havens et al. |
| 7,055,747 B2 | 6/2006 | Havens et al. |
| 7,059,525 B2 | 6/2006 | Longacre, Jr. et al. |
| 7,077,317 B2 | 7/2006 | Longacre, Jr. et al. |
| 7,077,321 B2 | 7/2006 | Longacre, Jr. et al. |
| 7,077,327 B1 | 7/2006 | Knowles et al. |
| 7,080,786 B2 | 7/2006 | Longacre, Jr. et al. |
| 7,086,596 B2 | 8/2006 | Meier et al. |
| 7,110,028 B1 | 9/2006 | Merrill |
| 7,148,923 B2 | 12/2006 | Harper et al. |
| 7,221,394 B2 | 5/2007 | Enomoto |
| 7,273,298 B2 | 9/2007 | Laschke et al. |
| 7,317,447 B2 | 1/2008 | Tan et al. |
| 2002/0008968 A1 | 1/2002 | Hennick et al. |
| 2002/0096566 A1 | 7/2002 | Schwartz et al |
| 2002/0150309 A1 | 10/2002 | Hepworth et al. |
| 2002/0170970 A1 | 11/2002 | Ehrhart |
| 2002/0171745 A1 | 11/2002 | Ehrhart |
| 2002/0179713 A1 | 12/2002 | Pettinelli et al. |
| 2002/0191830 A1 | 12/2002 | Pidhirny |
| 2003/0062418 A1 | 4/2003 | Barber et al. |
| 2003/0062419 A1 | 4/2003 | Ehrhart et al. |
| 2003/0085282 A1 | 5/2003 | Parker et al. |
| 2003/0197063 A1 | 10/2003 | Longacre, Jr. |
| 2003/0209603 A1 | 11/2003 | Schwartz et al. |
| 2003/0213847 A1 | 11/2003 | McCall et al. |
| 2003/0218069 A1 | 11/2003 | Meier et al. |
| 2004/0000592 A1 | 1/2004 | Schwartz et al. |
| 2004/0004125 A1 | 1/2004 | Havens et al. |
| 2004/0021783 A1 | 2/2004 | Mihara |
| 2004/0094627 A1 | 5/2004 | Parker et al. |
| 2004/0195328 A1 | 10/2004 | Barber et al. |
| 2006/0180670 A1 | 8/2006 | Acosta et al. |

OTHER PUBLICATIONS

Code Reader 2.0 (CR2)—promotional pages, Apr. 20-21, 2004 from www.codecorp.com.
Code Corporation's New Imager Offers Revolutionary Performance and Bluetooth Radio, Feb. 19, 2003, by Benjamin M. Miller, Codex Corporation, 11814 South Election Road, Suite 200, Draper UT 84020.
National Semiconductor's brochure entitled "LM9638 Monochrome CMOS Image Sensor SXGA 18 FPS", 2000, www.national.com.
Web-based article from Dr. Dobb's Portal entitled "The SPARK Real-Time Kernel" by Anatoly Kotlarsky, www.ddj.com, May 1, 1999, pp. 1-6.
The Customer's Guide to SwiftDecoder™ for Fixed Station Scanners by Omniplanar, Inc., Princeton, New Jersey, Jul. 1, 2008, 136 pages.
Product brochure for the 1/4-Inch SOC VGA CMOS Digital Image Sensor by Micron Technology, Inc., 2006, pp. 1-14.
Thesis entitled 'Low-Power Architectures for Single-Chip Digital Image Sensors' by Steve Tanner, Nov. 2000, pp. 1-171.
Product presentation entitled '2D Barcodes and Imaging Scanner Technology' by Bradley S. Carlson for Symbol Technology, Inc. pp. 1-46.
Thesis entitled 'Applications and Implementations Of Centroiding Using CMOS Image Sensors' by Joey Shah of the University of Waterloo, 2002, pp. 1-98.

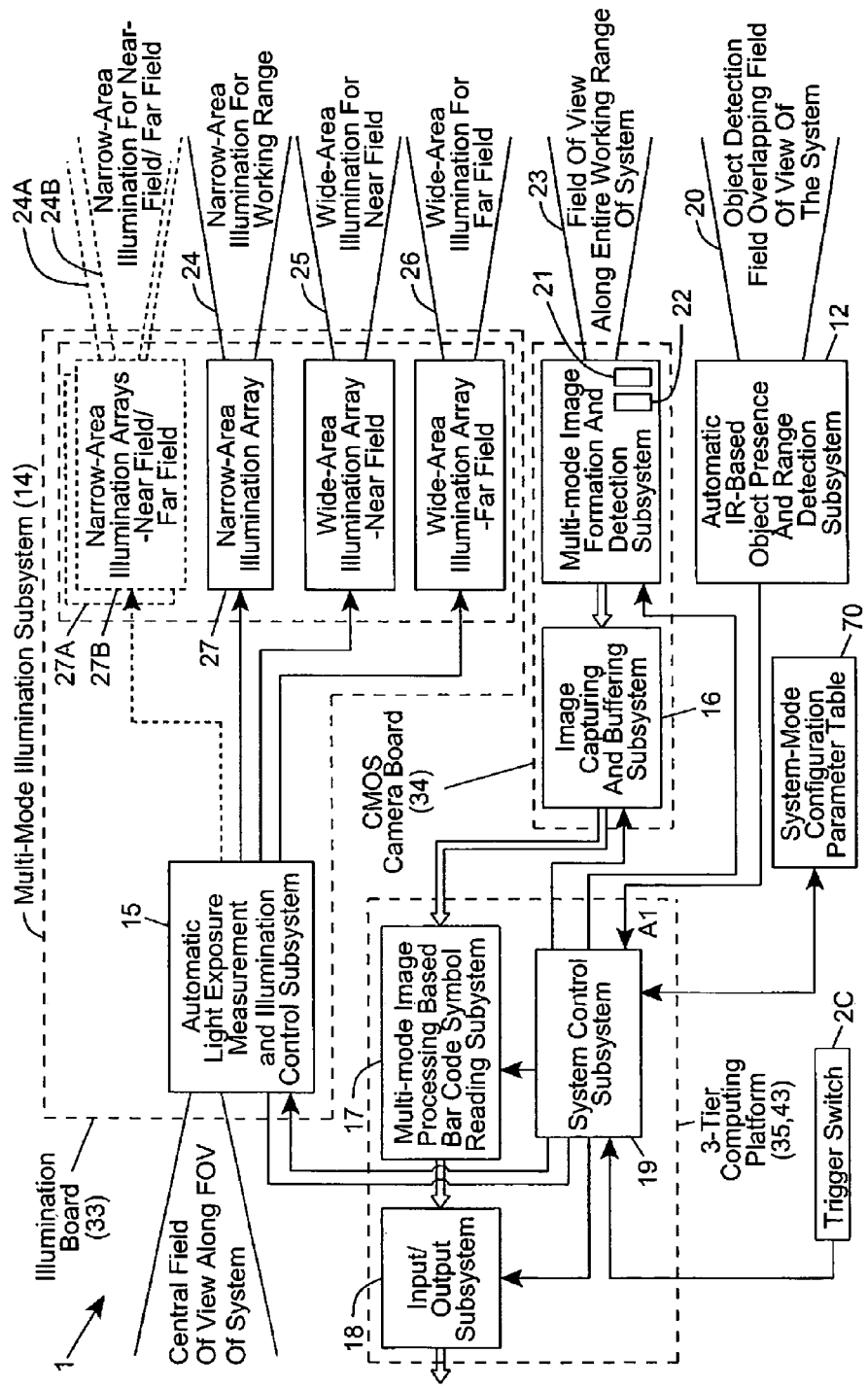
FIG. 2A1

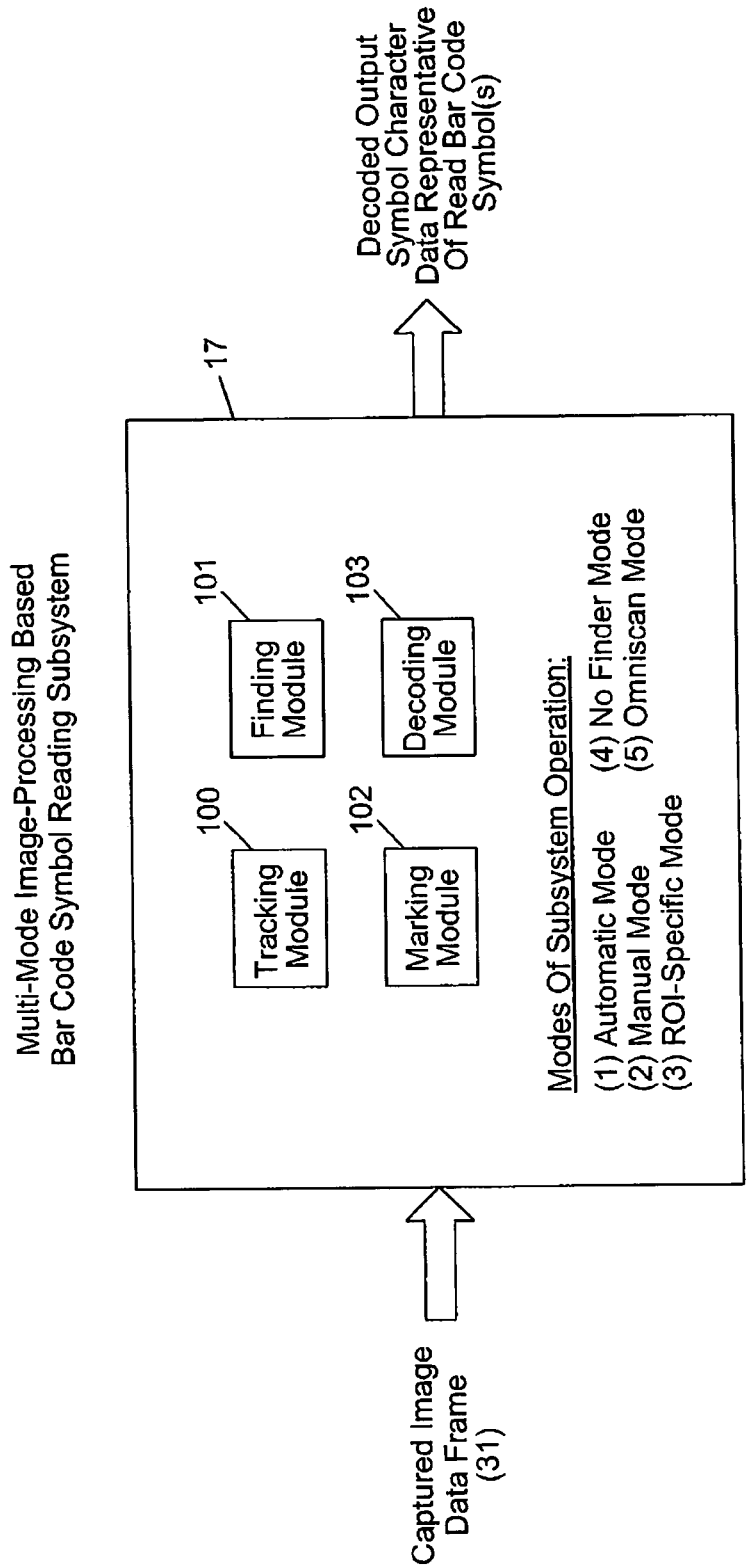
FIG. 2A2

- Barrel Hold Lens Elements
- Base Hold Sensors
- Barrel Slides In Base To Focus

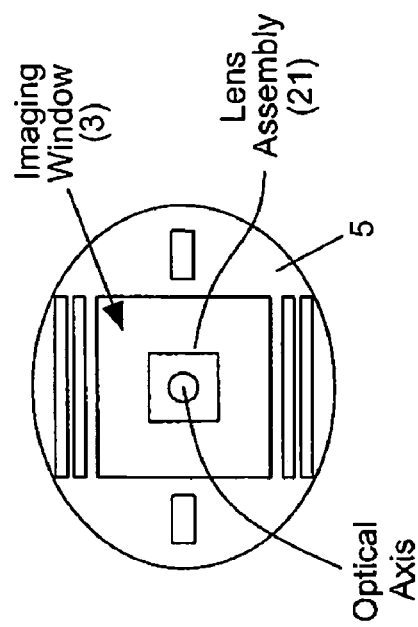
FIG. 3F2
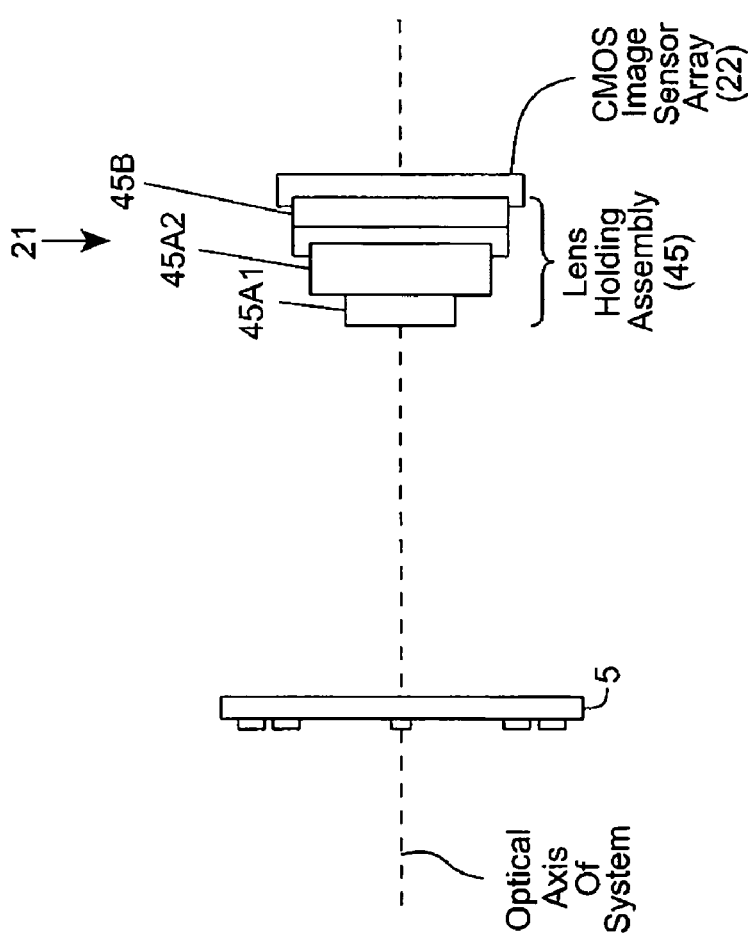
FIG. 3F1

DOF Determination Of Image Formation Optics

- At each distance, find frequency where MTF drops to 0.3
  - Rule of thumb for bar code decoding
  - Depends on code, speed, etc, etc - must test

- BUT: limited by sampling requirement
  - Software needs ~1.6 pixels on narrow code element
  - Limits decode ability regardless of optics
  - Exact value is rule of thumb and flexible (1.4 – 1.6)

Depth Of Field

- Face To 8" For 13.5 Mil
- Optics Resolve 4 Mil Somewhere
- Decodes 5 Mil Somewhere
- No Moving Elements

```
                        DOF_PMAG.zpl
        graphics
        xmx=xmax()
        xmn=xmin()
        ymx=ymax()
        ymn=ymin()
        xwidth=xmx-xmn
        ywidth=ymx-ymn
        xleft=xmn+(0.1*xwidth)
        xrigh=xmn+(0.95*xwidth)
        ytopp=ymn+(0.05*ywidth)
        ybott=ymn+(0.7*ywidth)

line xleft,ytopp,xrigh,ytopp
        line xrigh,ytopp,xrigh,ybott
        line xrigh,ybott,xleft,ybott
        line xleft,ybott,xleft,ytopp format 4.3
        settextsize 140,80
        gtext 0.68*xwidth,(0.85)*ywidth,0,"Wav : "
        gtext 0.68*xwidth, (0.88)*ywidth,0, "WGT : "
        for i=l,nwav(),1
        gtext (0.68+I*0.05)*xwidth,0.85*ywidth,0,$str(wavl(i))
        gtext (0.68+i*0.05)*xwidth,0.88*ywidth,0,$str(wwgt(i))
        next
        gtext 0.68*xwidth,(0.91)*ywidth,0,"Relative illumination: "
        gtext 0.9*xwidth,(0.91)*ywidth,0,$str(reli(nfld()))
        settextsize 90,50
        input "Please input startpoint (mm):",start
        if (start<=0) then input "Please input startpoint (mm):", start
        input "Please input pixel size (um):",pix
        if (pix<=0) then input "Please input pixel size (um):",pix
        for i=start,start+150,10
        xpos=xleft+(i-start)/150*0.85*xwidth
        line xpos,ytopp,xpos,ybott
        format3.0
        gtext xleft*0.85+(i-start)/150*0.85*xwidth,0.72*ywidth,0,$str(i)
        next
        settextsize 70,40
        for i=1,14,1
        ypos=ytopp+i/14*.65*ywidth
        line xleft,ypos,xrigh,ypos
        format 3.0
        gtext 0.05*xwidth,ytopp*0.9+(j-1)/14*.65*ywidth,0,$str(14-i+1)
        next gtitle "The DOF and PMAG curve of current design"
        gdate format 12.6
        oldthic=thic(0)

getsystemdata 2
        settextsize 120,40
        j=1
        gtext xwidth*0.018,0.85*ywidth,0,"centering "
        for i=1,nsur()-2,1
                if (gind(i)!=0.0)
                        format 2.0
                        gtext xwidth*0.10+(j-1)*0.07*xwidth,0.85*ywidth ,0,$str(j)+":"
                        gtext xwidth*0.12+(j-1)*0.07*xwidth,0.85*ywidth ,0,":"
                        format 4.2
```

FIG. 4I1

DOF_PMAG.zpl
```
                if(curv(i)*curv(i+1)<0) then
centering=abso((sdia(i)*curv(i)+sdia(i+1)*curv(i+1)))
                if(curv(i)*curv(i+1)>0) then
centering=abso((sdia(i)*curv(i)-sdia(i+1)*curv(i+1)))
                    gtext xwidth*0.13+(j-1)*0.07*xwidth,0.85ywidth,0,$str(centering)
                    j=j+1
            endif
next
format 4.2
settextsize 70,40
gtext xwidth*0.018,0.91*ywidth,0,"image space f/# : "+$str(vec2(8))
gtext xwidth*0.018,0.94*ywidth,0,"effective focal length: "+ $str(vec2(7))
!color (3)
gtextcent ymn+(0.77*ywidth),"distance (mm)"
gtext xleft*0.32,0.5*ywidth,90,"bar width (mil)"

format 12.6
settextsize 100,40
minmtf=1
maxfreq=0
thic 0=start
update all
for k=0,200,0.2
        !i=nfld()
        for i=1,nfld(),1
                getmtf k,0,i,2,1,1
                !print vec1(0)
                !print vec1(1)
                if (vec1(0)<minmtf) then minmtf=vec1(0)
                if (vec1(1)<minmtf) then minmtf=vec1(1)
                if (minmtf<=0.3)
                        maxfreq=k
                        goto 1
                endif
        next
next
label 1
!color (1)

!output "1.txt" append oldxpos=xleft+0/150*0.85*xwidth
oldypos=ytopp+(14-(1/(maxfreq/(sdia(0)/sdia(nsur()))))*0.5/25.4*1000))/14*0.65*ywidth
switch=0
m=0
for j=start,start+150,3
        thic 0=j
        update all
        minmtf= 1
        for k=m,200,0.3
                !i=nfld()
                for i=1,nfld(),1
                getmtf k,0,i,2,1,1
                if (vec1(0)<minmtf) then minmtf=vec1(0)
                if (vec1(1)<minmtf) then minmtf=vec1(1)
                if (minmtf<=0.3)
                        maxfreq=k
                        goto 2
                endif
                next
        next
        label 2
        if (maxfreq-5)>0
```

FIG. 412

DOF_PMAG.zpl

```
                        rn=maxfreq-10
              else
                        rn=0
              endif
              !print j,sdia(0),sdia(nsur()),maxfreq
              if ((switch==0) & (1/(maxfreq/(sdia(0)/sdia(nsur())))*0.5/25.4*1000<=13))
                        !color (0)
                        format 5.2
                        a$="FOV for 10 mil: "+$str(2*sdia(0)) + " at "+$str(j-2)+ mm ; "
                        gtext xwidth*0.018,0.97*ywidth,0,a$
                        switch=1
                        format 12.6
                        !color(1)
              else
                        if ((switch==1) &
(1/(maxfreq/(sdia(0)/sdia(nsur()))))*0.5/25.4*1000>=13))
                                  !color(0)
                                  format 5.2
                                  a$=$str(2*sdia(0))+" at "+$str(j-2)+" mm"
                                  gtext xwidth*0.44,0.97*ywidth,0,a$
                                  switch=0
                                  format 12.6
                                  goto 3
                                  !color(1)
                        endif
              endif
              newxpos=      xleft+(j-start)/150*0.85*xwidth newypos=ytopp+(14-(1/(maxfreq/(sdia(0)/sdia(nsur()))))*0.5/25.4*1000))/14*0.65*ywidth
              if ((14-14*(oldypos-ytopp)/0.65/ywidth)<14) then line
oldxpos,oldypos,newxpos,newypos
              oldxpos=newxpos
              oldypos=newypos
next
label 3
thic 0=start
update all
oldxpos=xleft+0/150*0.85*xwidth
oldxpos1=xleft+0/150*0.85*xwidth
oldypos=ytopp+(14-(0.5/((0.5/1.6/pix*1000)/(sdia(0)/sdia(nsur())))/25.4*1000))/14*0.
65*ywidth
oldypos1=ytopp+(14-(0.5/((0.5/1.4/pix*1000)/(sdia(0)/sdia(nsur())))/25.4*1000))/14*0
.65*ywidth
for j=start,start+150,4
              thic 0=j
              update all
              newxpos=xleft+(j-start)/150*0.85*xwidth
              newxpos1=xleft+(j-start)/150*0.85*xwidth newypos=ytopp+(14-(0.5/((0.5/1.6/pix*1000)/(sdia(0)/sdia(nsur())))/25.4*1000))/14*0.
65*ywidth newypos1=ytopp+(14-(0.5/((0.5/1.4/pix*1000)/(sdia(0)/sdia(nsur())))/25.4*1000))/14*0
.65*ywidth
              line oldxpos, oldypos,newxpos, newypos
              line oldxpos1,oldypos1,newxpos1,newypos1
              oldxpos=newxpos
              oldypos=newypos
              oldxpos1=newxpos1
              oldypos1=newypos1
next
thic 0=oldthic
```

FIG. 413

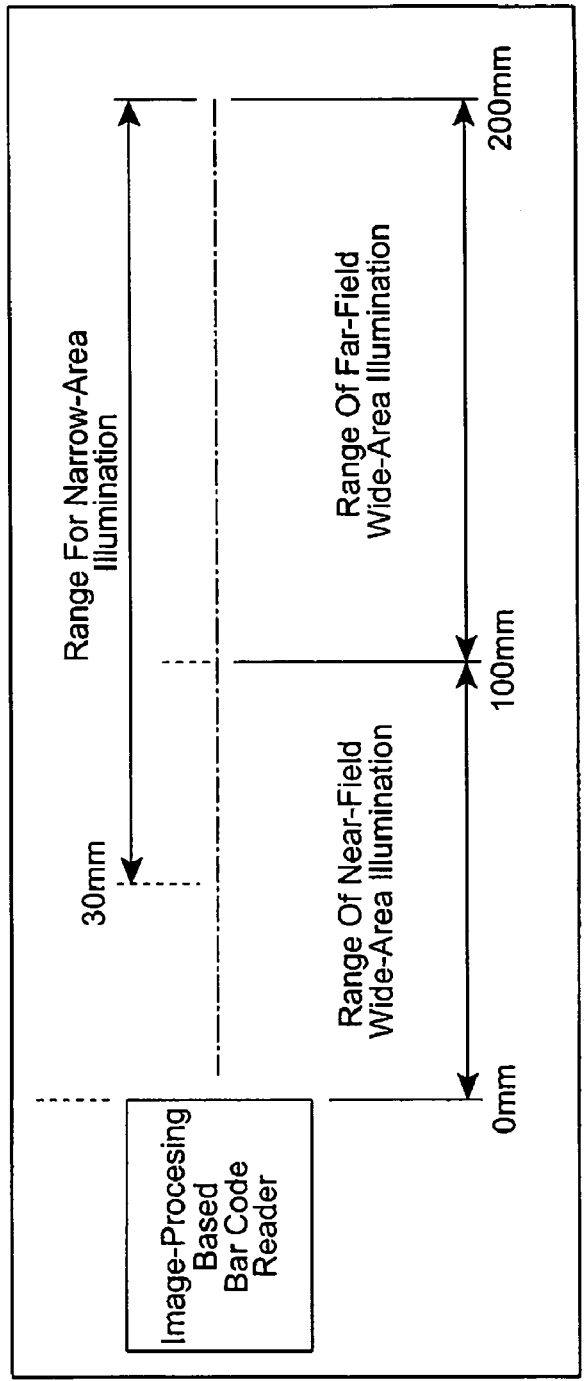
FIG. 5A1

Illumination Design Goals For First Illustrative Embodiment

- Wide-Area Illumination Modes
  - Match FOV and DOF (45°, 200mm)
  - Sufficient power density on target
    - Pixel value > 80 DN at far field center
  - Achieve sufficient uniformity (center:edge = 2:1 max)
  - Use as few LEDs as possible

- Narrow-Area Illumination Mode
  - Line usable beginning 40 mm from window
  - Match FOV and DOF
  - Sufficient power density on target
  - Sufficiently thin line
    - Height < 10 mm at far field

FIG. 5A2

LEDs For Narrow-Area Illumination
• Linear Illumination: Osram LS E655
 - 633 nm InGaAlP
 - 60° Lambertian Emittance
 - 6.75 mW Total Output Power (Typical Conditions)
 - $0.18 Each In 50k
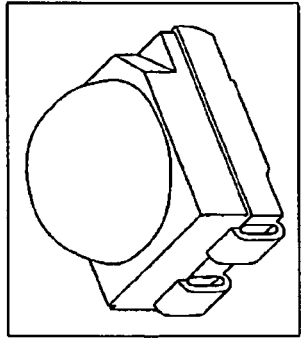
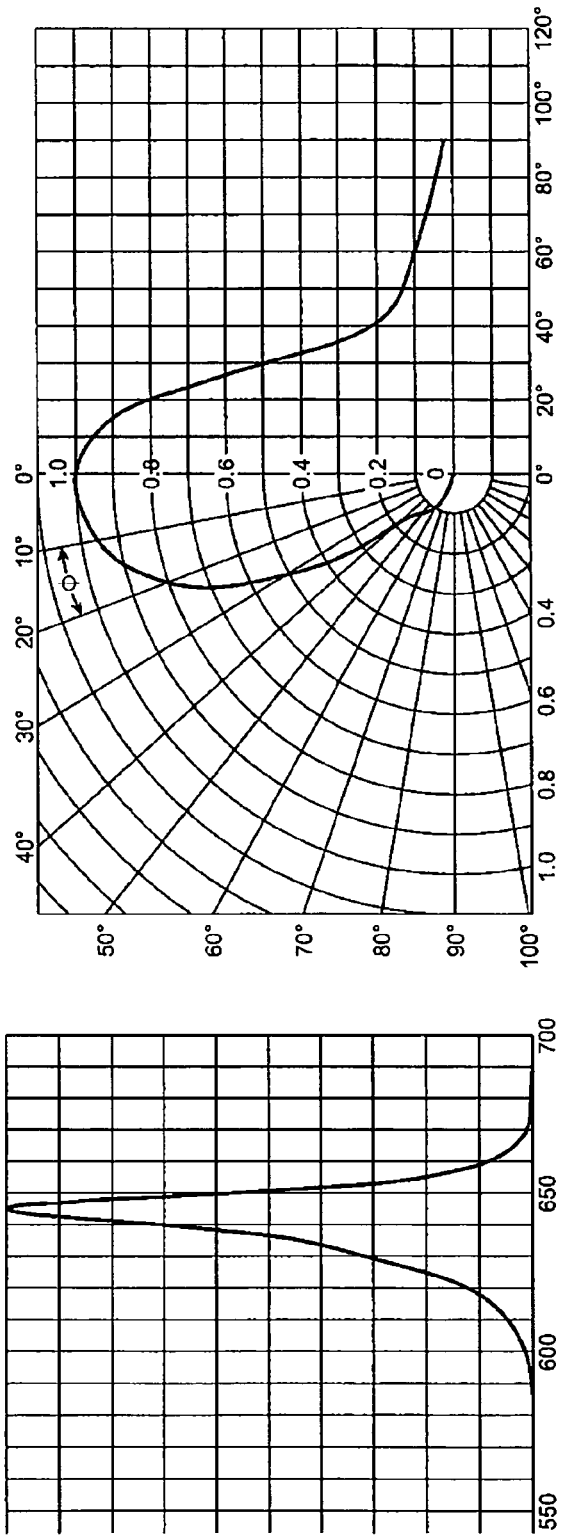
FIG. 5C2
FIG. 5C1

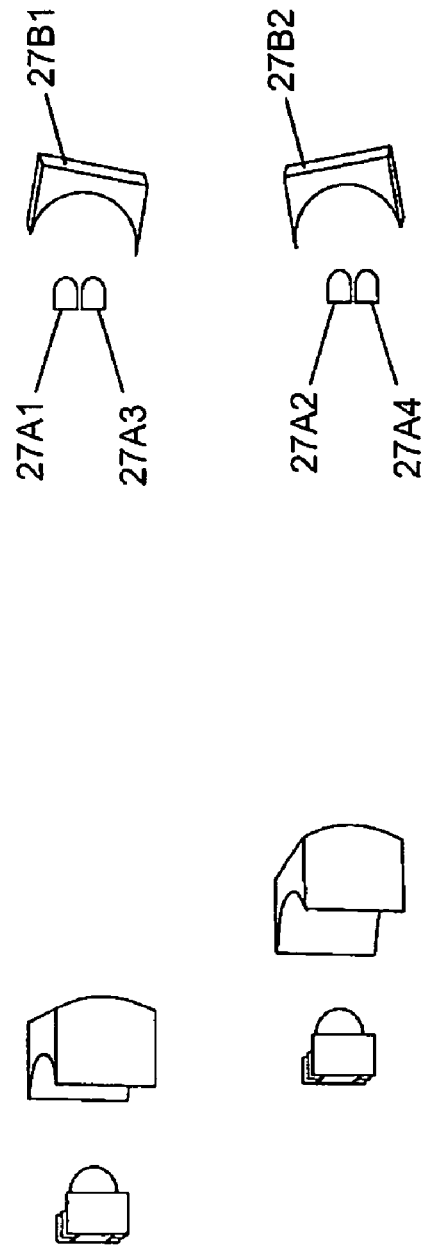
Cylindrical Lenses For Narrow-Area Illumination Array
- First Surface Curved Vertically To Create Line
- Second Surface Curved Horizontally To Control Line Height
FIG. 5C3
FIG. 5C4

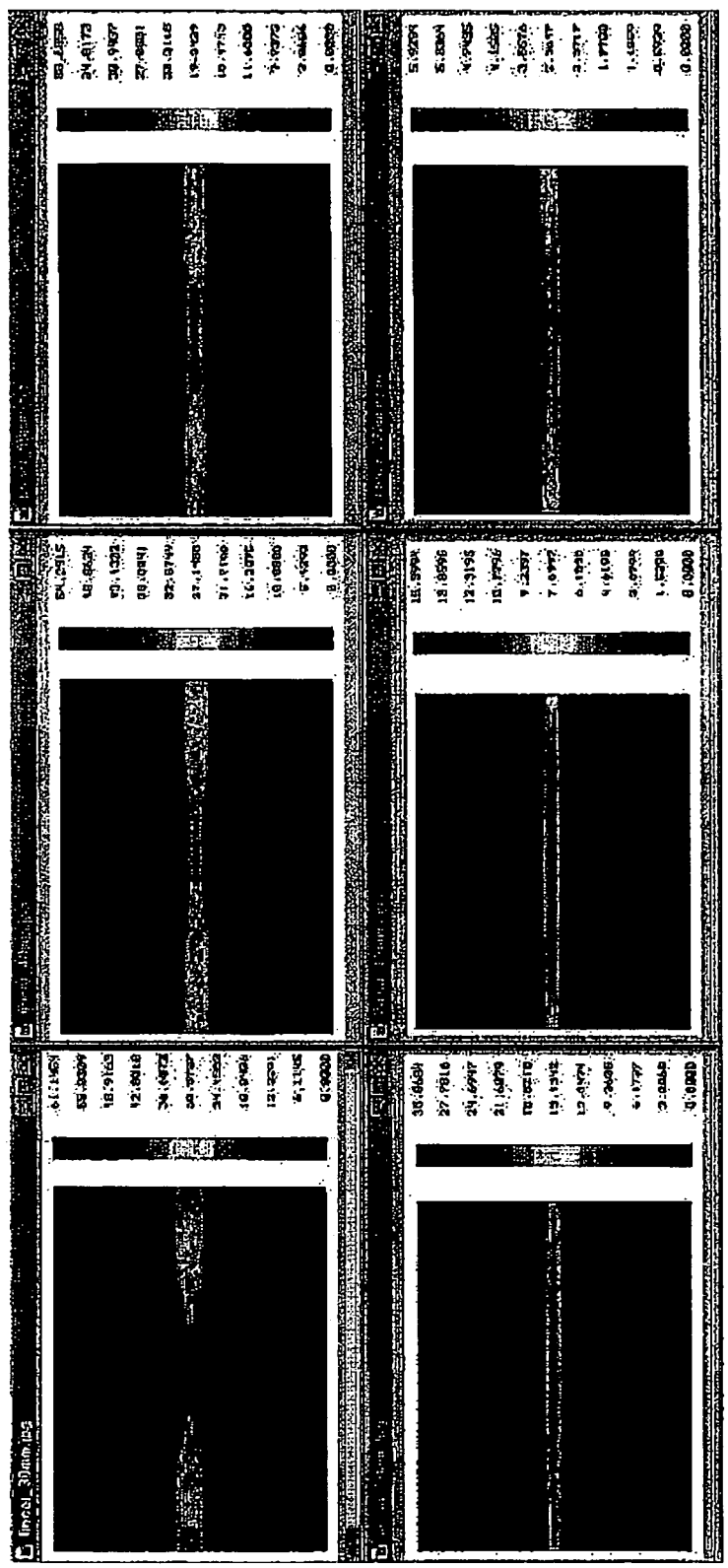
Linear Illumination Profiles
FIG. 5C5

Area LEDs
- Area Illumination: Osram LS E67B
  - 633 nm InGaAlP
  - 120° Lambertian Emittance
  - 11.7 mW Total Output Power (Typical Conditions)
  - $0.18 each In 50k
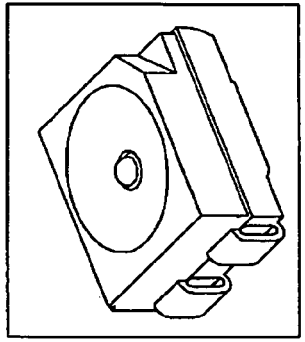
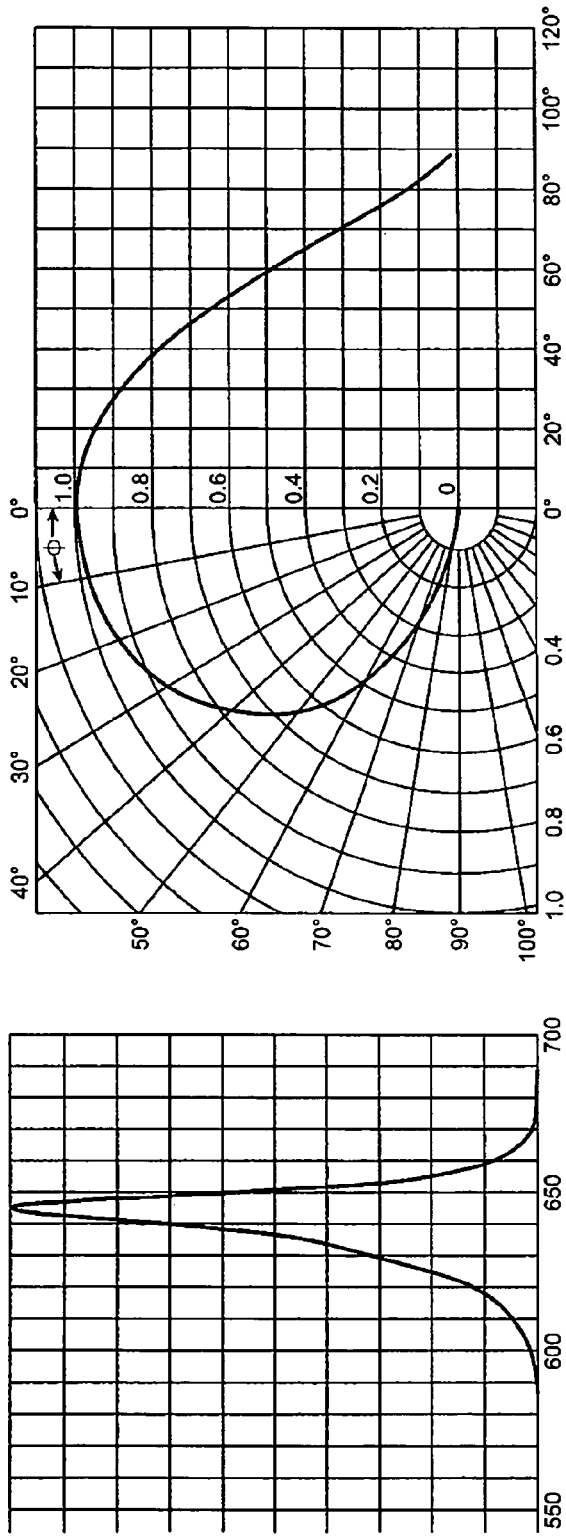
FIG. 5D2
FIG. 5D1

Far Area Lenses
- Plano Convex Lenses In Front Of Far Field LEDs
- Light Aimed By Angling Lenses
  - Even Out Distribution Across FOV Throughout DOF
  - Satisfy Center: Edge = 2:1 Max Criterion
  - Allows LEDs To Be Mounted Flat
- All Lenses CNCed In Single Piece Of Plastic
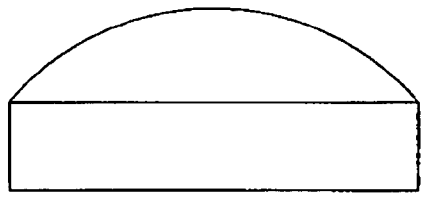
FIG. 5D3
FIG. 5D4

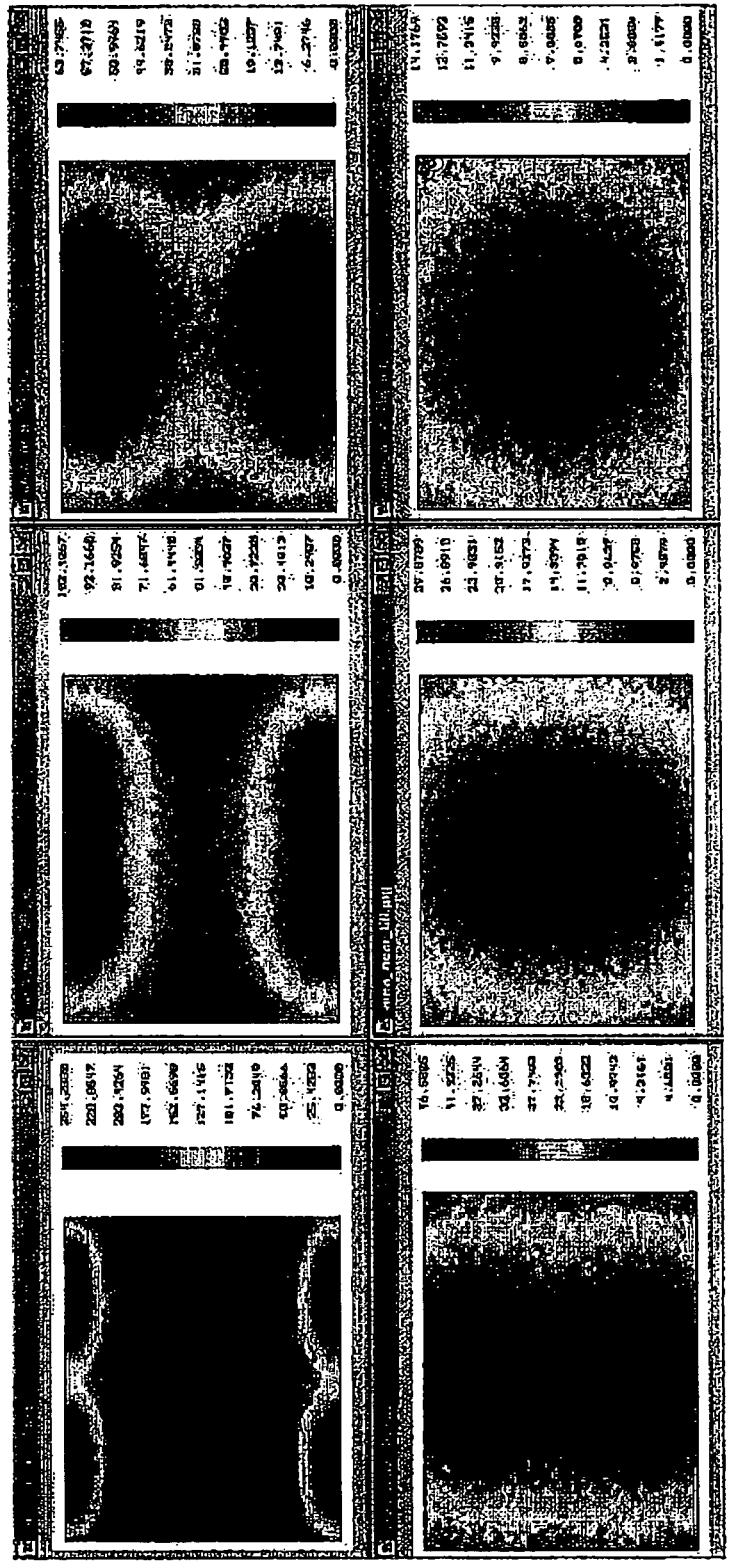
FIG. 5D5

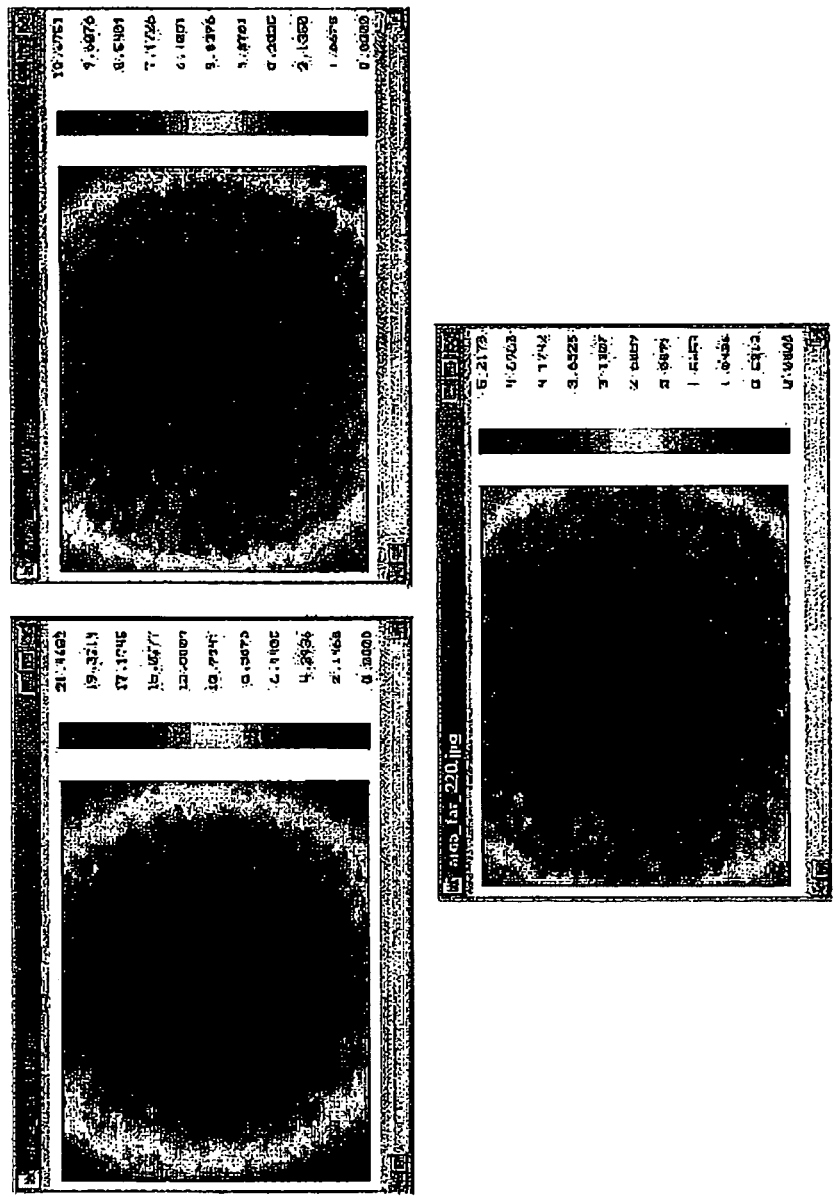
FIG. 5D6
Wide-Area Illumination Profiles (Far)

Pixel Value Calculation

- Pixel Value Calculation For Center Of Far-Field Shows Sufficient Signal (> 80DN)

| | Description | Value | Unit |
|---|---|---|---|
| Sensor Power Density | Target Power Density | 4 | µW/mm² |
| | Surface Reflection | 0.6 | |
| | Optical Transmittance | 0.9 | # |
| | F-Number | 9 | |
| | Pixel Power Density | 0.007 | µW/mm² |
| Signal | CMOS Internal Gain | 4.5 | # |
| | Amplification Gain | 20 | dB |
| | Integration Gain | 5 | ms |
| | Sensor Responsivity | 1.8 | V / (lx s) |
| | Wavelength | 633 | nm |
| | Photopic Luminous Efficiency | 0.238 | lm / W |
| | Signal Out Of Sensor | 0.439 | V |
| Pixel Value | A/D Range Max | 1.3 | V |
| | A/D Range Min | 0.0 | V |
| | Pixel Value (0-255) | 86 | DN |

FIG. 5D7

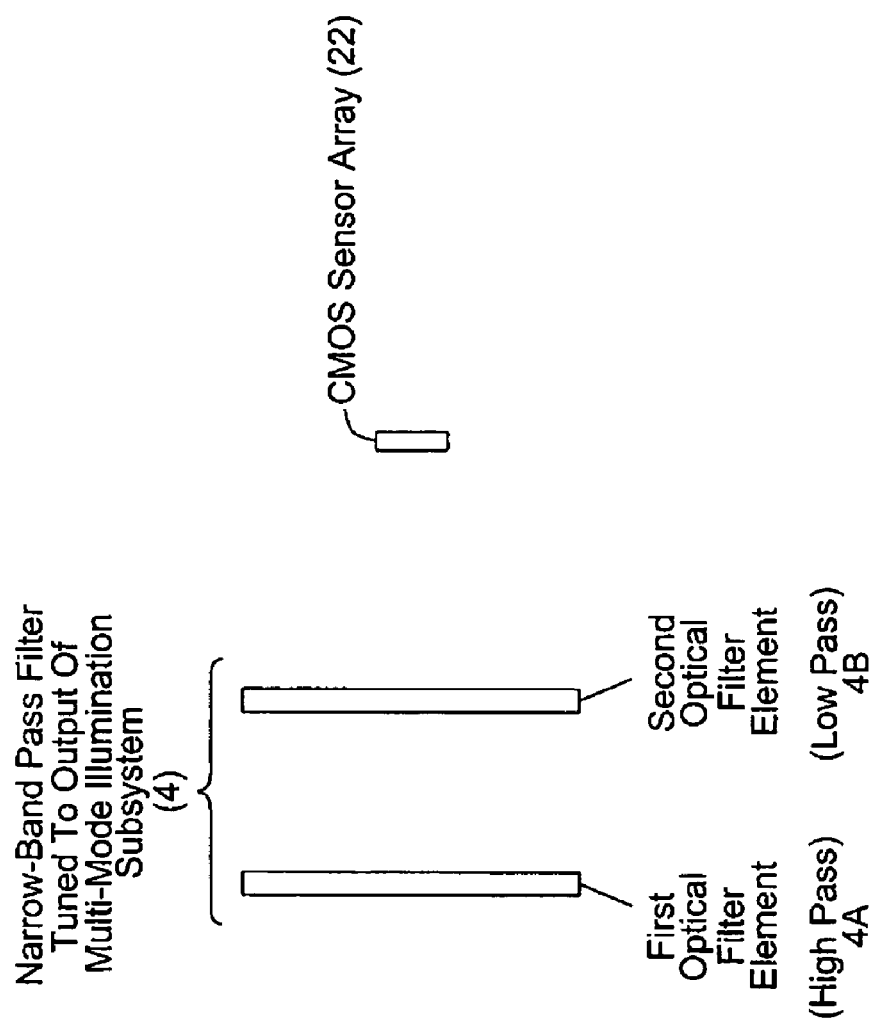
FIG. 6A1

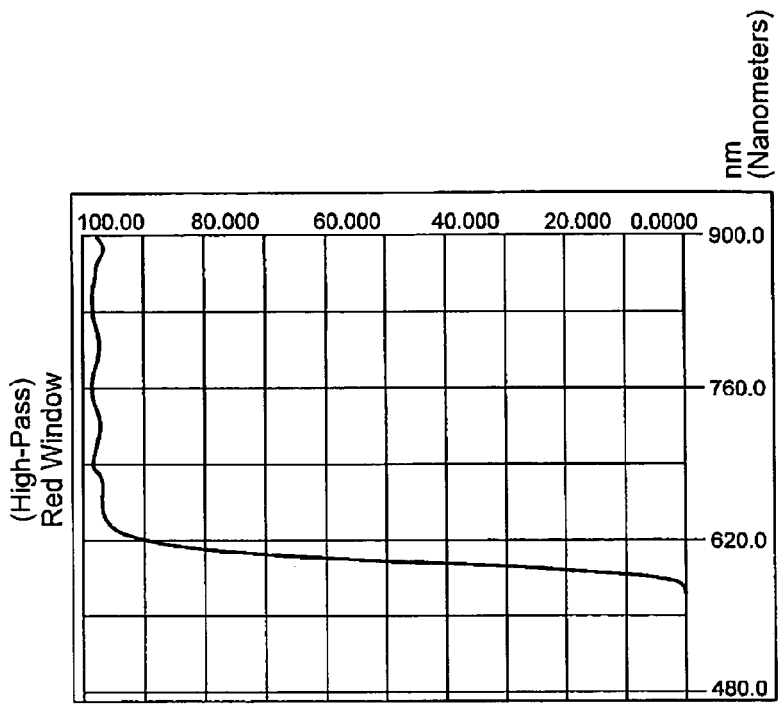
FIG. 6A3
Red Window And Low-Pass Filter Characteristics
• Must Bandpass Return Light Against Ambient
 - Red Window + Low Pass Filter
 - Restricts Range To 620nm – 700nm
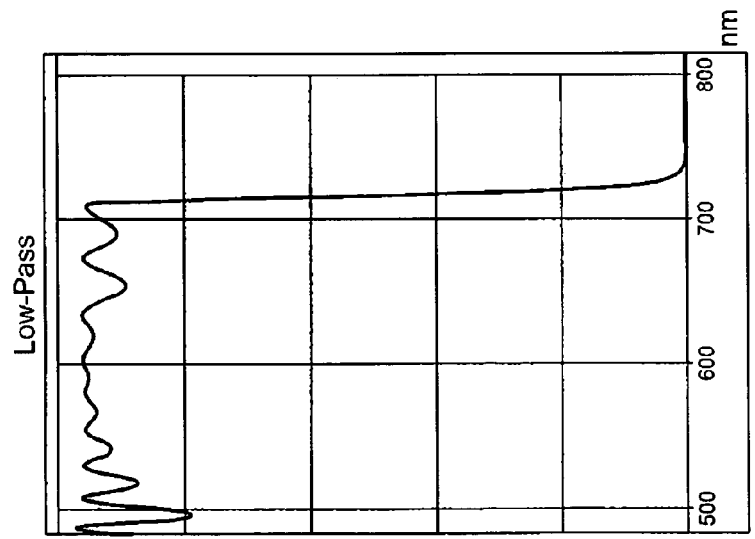
FIG. 6A2

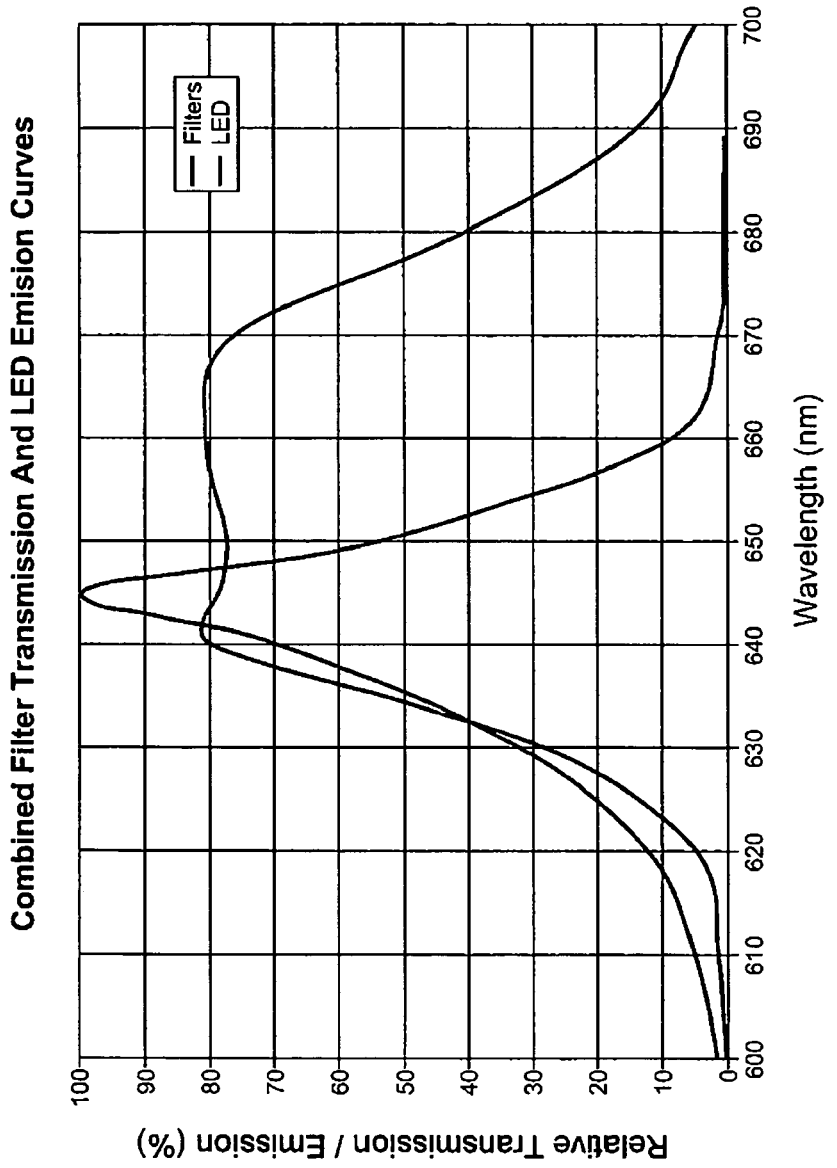
FIG. 6A4

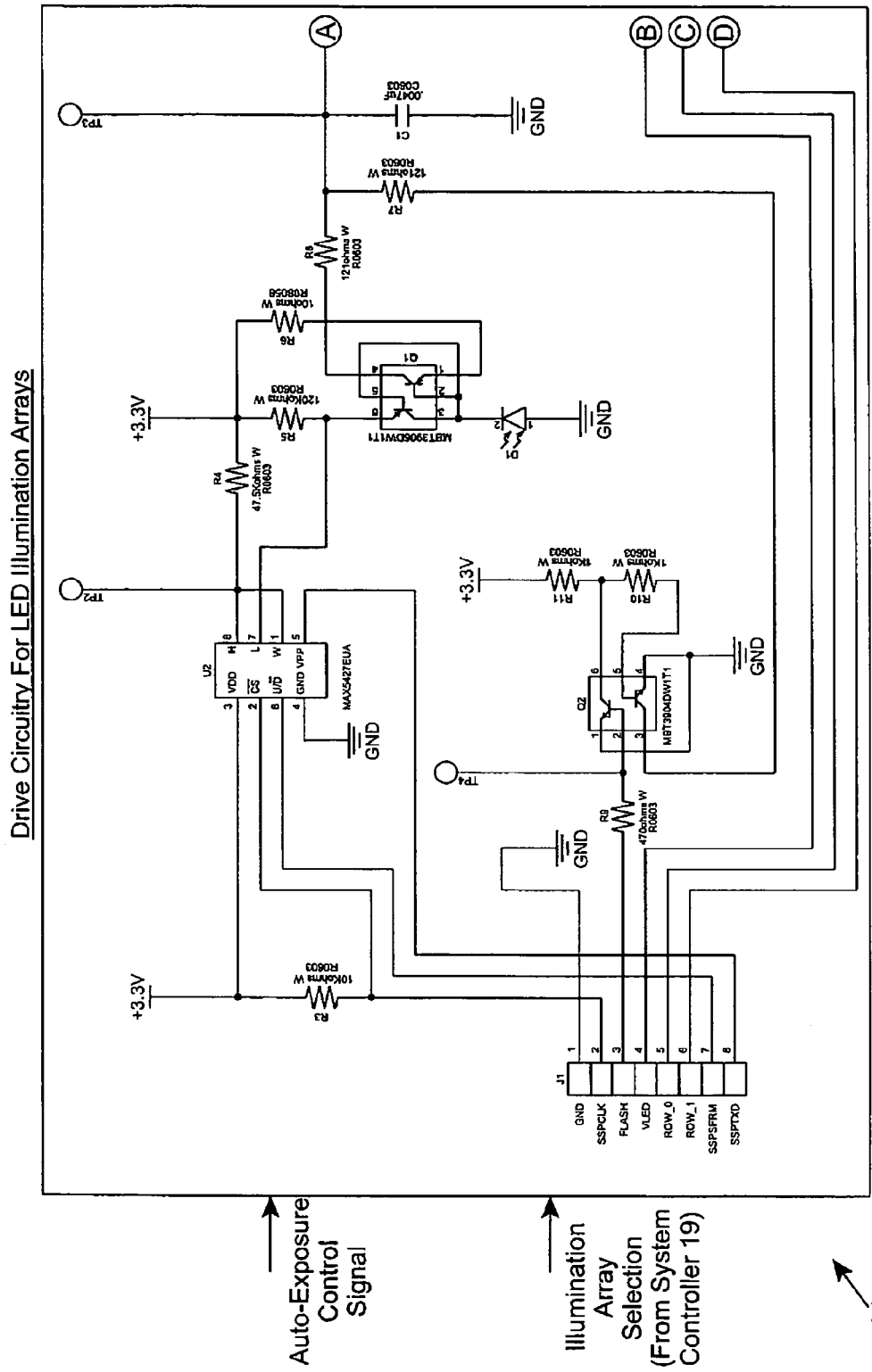
FIG. 7C1

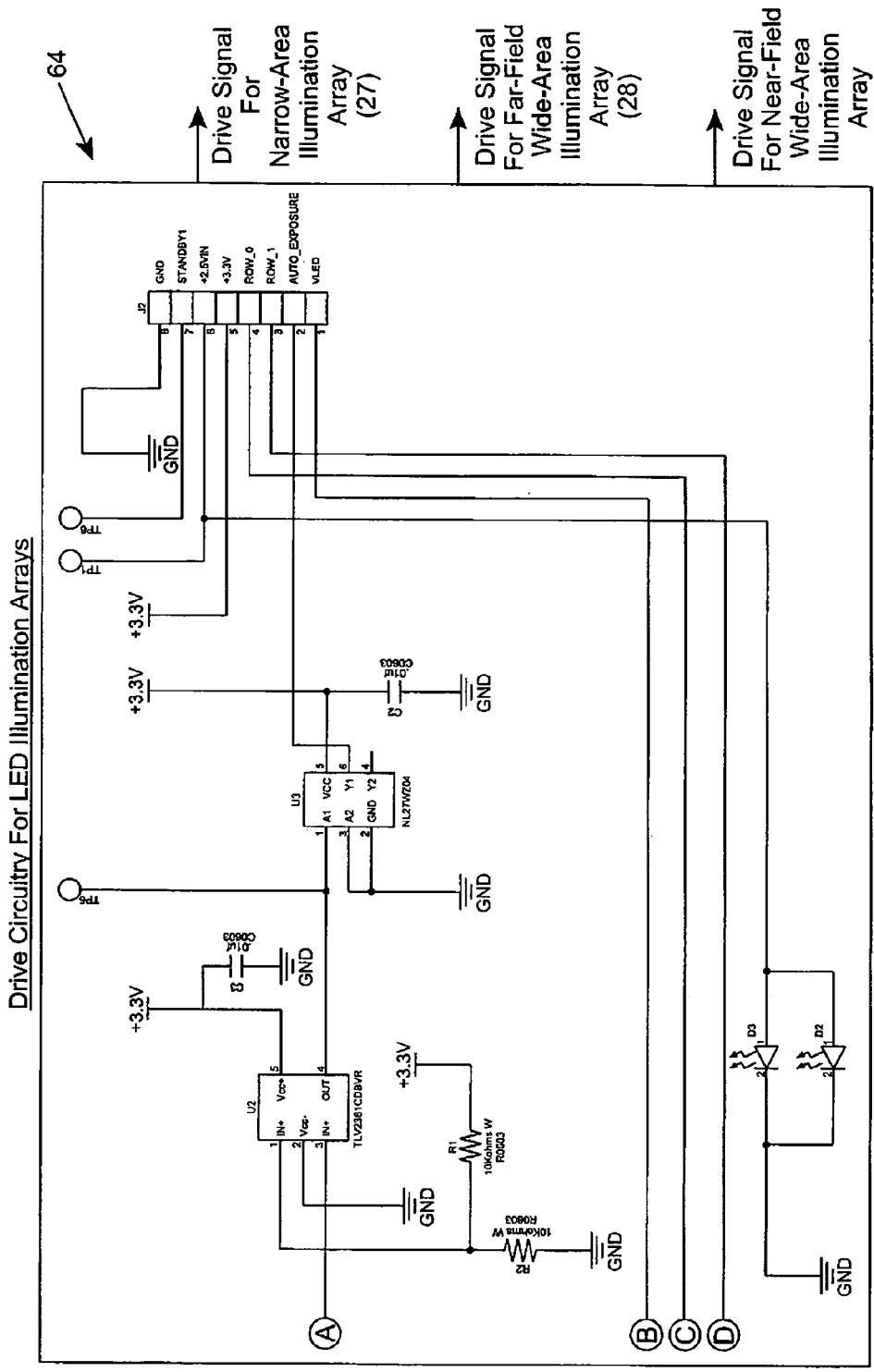
FIG. 7C2

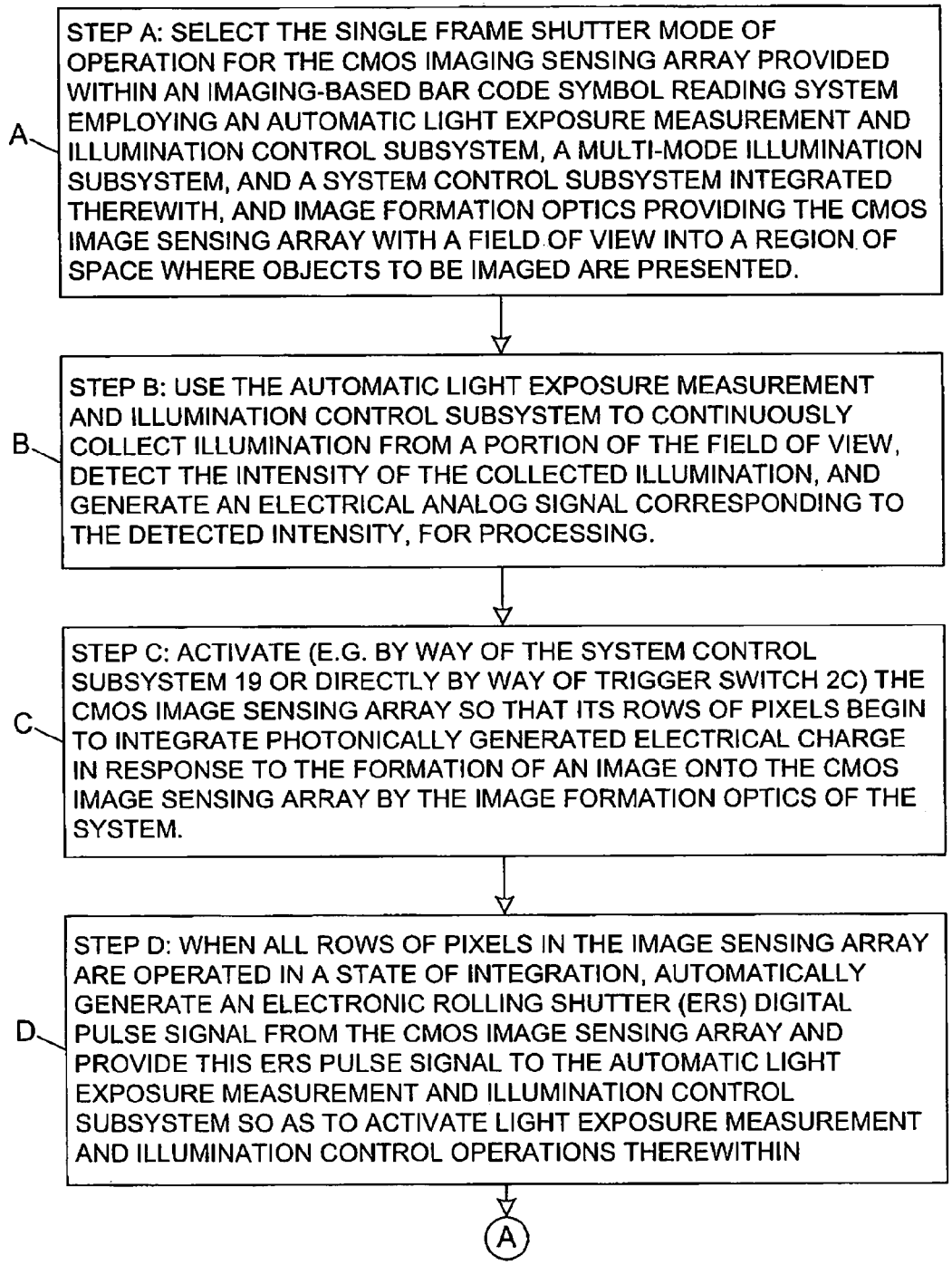
FIG. 7E1

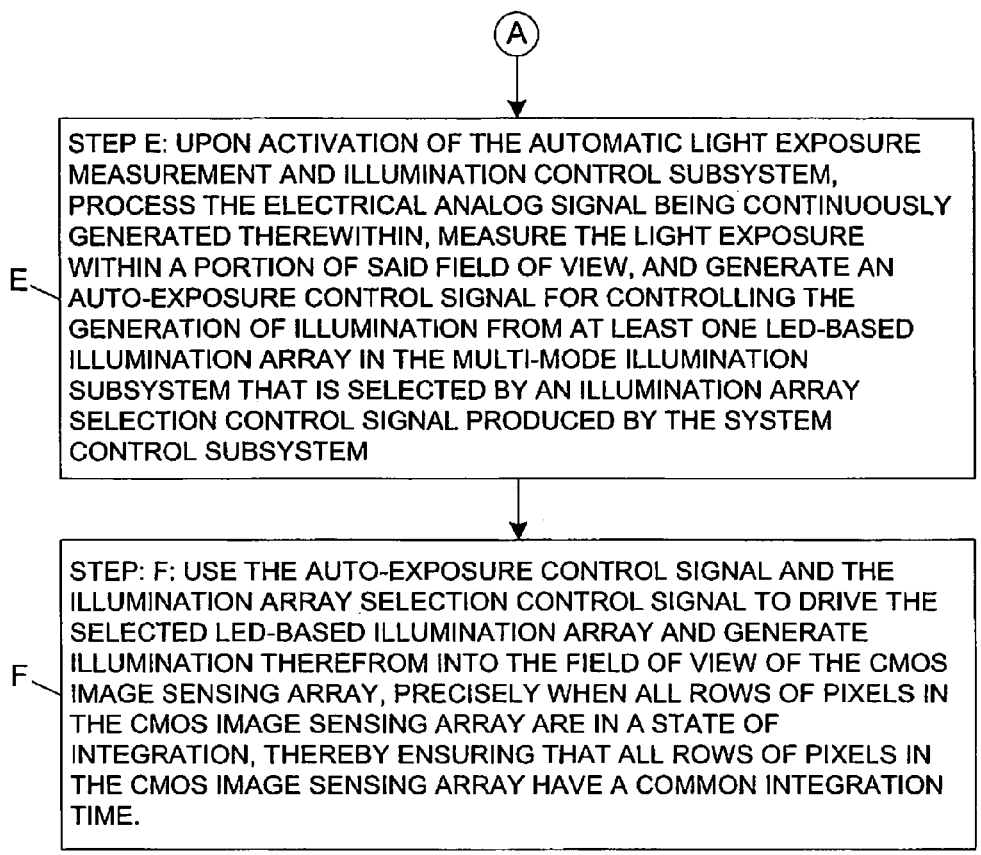
FIG. 7E2

Events Dispatcher

Provides a means of signaling and delivering events to the App Events Manager (pointer to App Events Manager is provided at the SCORE initialization)

```
int
ScoreSignalEvent(int event_id,        /* Input: event id */
        void * p_par);    /* Input pointer to the event's parameters */
```

App Events Manager is responsible for processing the event: It can start a new task, or stop currently running task, or do something or nothing and simply ignore the event.

FIG. 12A

Examples of System-Defined Events

SCORE_EVENT_POWER_UP
   Signals the completion of the system start-up. No parameters.

SCORE_EVENT_TIMEOUT
   Signals the timeout of the logical timer. Parameter: pointer to timer id.

SCORE_EVENT_UNEXPECTED_INPUT
   Signals that the unexpected input data is available. Parameter: pointer to connection id.

SCORE_EVENT_TRIG_ON
   Signals that the user pulled the trigger. No parameters.

SCORE_EVENT_TRIG_OFF
   Signals that the user released the trigger. No parameters.

SCORE_EVENT_OBJECT_DETECT_ON
   Signals that the object is positioned under the camera. No parameters.

SCORE_EVENT_OBJECT_DETECT_OFF
   Signals that the object is removed from the field-of view of the camera. No parameters.

SCORE_EVENT_EXIT_TASK and SCORE_EVENT_ABORT_TASK
   Signal the end of the task execution. Parameter: pointer to the UTID.

FIG. 12B

Tasks Manager

Provides a means of executing and stopping application specific tasks (threads)

```
typedef void *                          /* Return: pointer to the set of returned parameters */
(*TASK_FUNC)(void *params);             /* Input:  set of input parameters */ int
ScoreStartTask(TASK_FUNC task_func, /* Return: 0 if successful, otherwise error code */
                                    /* Input: pointer to the task's main function */
    int task_id,                    /* Input: id assigned to the task by application */
    void *task_params,              /* Input: parameters passed to the task's main function */
    int task_owner,                 /* Input: connection id of the task's owner */
    int task_priority,              /* Input: task's priority (must be 0 for now) */
    size_t stacksize,               /* Input: size of the stack, or 0 for default size */
    size_t heapsize,                /* Input: size of the heap, or 0 for default size */
    UTID *p_utid);                  /* Output: unique task identifier */

BOOL    /* Return: TRUE if it kills the task, or FALSE if the task was not found */
ScoreKillTask(UTID pthread_id)      /* Input: unique task identifier */
```

FIG. 12C

Input / Output Manager

- High priority thread running in the background and monitoring activities of the external devices and user connections
- Signals appropriate events to the application when such activities are detected

FIG. 12D

Input / Output Subsystem

Provides a means of creating and deleting input/output connections...

```
int                              /* Return: connection id if successful, otherwise (-1) */
ScoreIomngrCreateConnection(int conn_type,    /* Input:  connection type */
    int fd,              /* Input:  file descriptor of a device or a socket */
    int conn_state,      /* Input:  initial state of the connection, the value controlled by application */
    void *properties);   /* Input:  pointer to the connection properties */ int                              /* Return: connection id if successful, otherwise (-1) */
ScoreInitRS232(char *full_name,  /* Input:  full name of the device, such as "/dev/ttyS0" */
    RS232_PROP *rs232_prop);     /* Input: RS232 parameters */
```

FIG. 12E1

Input / Output Subsystem

...and communicating with the outside world

```
int
ScoreIomngrGetData(int connection_id,   /* Input: connection id, or -1 for the task owner */
                   char *input_buffer,  /* Input: pointer to the input buffer */
                   int min_len,         /* Input: minimum number of bytes to receive */
                   int max_len,         /* Input: maximum number of bytes to receive */
                   BOOL echo,           /* Input: TRUE if data should be echoed back to device, otherwise FALSE */
                   int timeout_ms);     /* Input: If not 0, number of milliseconds to wait */
                                        /* Return: number of bytes received */ int
ScoreIomngrSendData(int connection_id,  /* Input: connection id */
                    char *p_data,       /* Input: pointer to the data buffer */
                    int len);           /* Input: number of bytes to send */
                                        /* Return: 0 if successful, or (-1) in case of error */ void
ScoreIomngrSendStream(int stream_type,  /* Input: type of output stream */
                      char *p_data,     /* Input: pointer to the data buffer */
                      int len);         /* Input: number of bytes to send */
```

FIG. 12E2

Timer Subsystem

Provides a means of creating, deleting...

```
int
ScoreCreateTimer(int flags);    /* Return: timer id if successful, otherwise (-1) */
                                /* Input: optional SCORE_TIMER_CONTINUOUS */ void
ScoreDeleteTimer(int timer_id);         /* Input: timer id, must be >= 0 */ int
ScoreStartTimer(int timer_id,   /* Return: 0 if successful, otherwise (-1) */
                                /* Input: timer id */
    int time_ms);               /* Input: timer value, in ms */ int
ScoreStopTimer(int timer_id);   /* Return: 0 if successful, otherwise (-1) */
                                /* Input: timer id */
```

FIG. 12F1

Timer Subsystem

...and utilizing logical timers

```
BOOL                /* Return: TRUE if the timer timed out, otherwise FALSE */
ScoreTimerTimedOut(int timer_id);        /* Input:  timer id */ int          /* Return: time (in ms) left before the timer times out, or (-1) in case of error */
ScoreGetTimeLeft(int timer_id);          /* Input:  timer id */ int     /* Return: time (in ms) gone since the timer has been started (or restarted), or (-1) in case of error */
ScoreGetTime(int timer_id);              /* Input:  timer id */

BOOL                /* Return: TRUE if timer is stopped, otherwise FALSE */
ScoreIsTimerStopped(int timer_id);       /* Input:  timer id */
```

FIG. 12F2

Memory Control Subsystem

Provides a thread-level dynamic memory management (the interfaces fully compatible with standard dynamic memory management functions)...

```
void *
ScoreMalloc(size_t size);     /* Return: pointer to the allocated memory if successful, otherwise NULL */
                              /* Input: size, in bytes, of the needed memory */ void
ScoreFree(void *mem);         /* Input: pointer to the memory to be freed */
```

FIG. 12G1

Memory Control Subsystem

...as well as a means of buffering the data

```
int
ScoreCreateOutpMem(SCORE_OUTP_MEM *p_outp_mem);        /* Return: 0 if successful */
                                                        /* Input: pointer to buffered memory structure */ void
ScoreDestroyOutpMem(SCORE_OUTP_MEM *p_outp_mem);       /* Input: pointer to buffered memory structure */ int
ScoreWriteToOutpMem (SCORE_OUTP_MEM *p_outp_mem,       /* Return: 0 if successful */
                                                        /* Input: pointer to buffered memory structure */
    void *p_data,                                       /* Input: pointer to the data to be buffered up for output */
    size_t len);                                        /* Input: size of the data, in bytes */ int
ScoreSendDataFromOutpMem(int connection_id,            /* Return: 0 if successful */
                                                        /* Input: id of the connection to send the data to */
    SCORE_OUTP_MEM *p_outp_mem);                       /* Input: pointer to buffered memory structure */ int
ScoreSendStreamFromOutpMem(int stream_type,            /* Return: 0 if successful */
                                                        /* Input: type of output stream */
    SCORE_OUTP_MEM *p_outp_mem);                       /* Input: pointer to buffered memory structure */
```

FIG. 12G2

User Commands Manager

Provides a standard way of entering user commands and executing application modules responsible for handling them (pointer to User Commands Table is provided at the SCORE initialization)

```
int
ScoreCmdManager(void *params);

rc = ScoreStartTask(ScoreCmdManager,
    CMDMNGR_TASK_ID,              /* Input: user command manager task */
    NULL,                          /* Input: id assigned to the commands manager */
    0,
    connection_id,                 /* Input: connection id of the owner */
    0,                             /* Input: priority */
    (64 * 1024),                   /* Input: stack size */
    (512 * 1024),                  /* Input: heap size */
    &cmdmngr_utid);                /* Output: unique task identifier */
```

FIG. 12H

Device Drivers

- Trigger driver -- establishes software connection with the hardware trigger
- Image acquisition driver -- implements image acquisition functionality
- IR driver -- implements object detection functionality

FIG. 12I

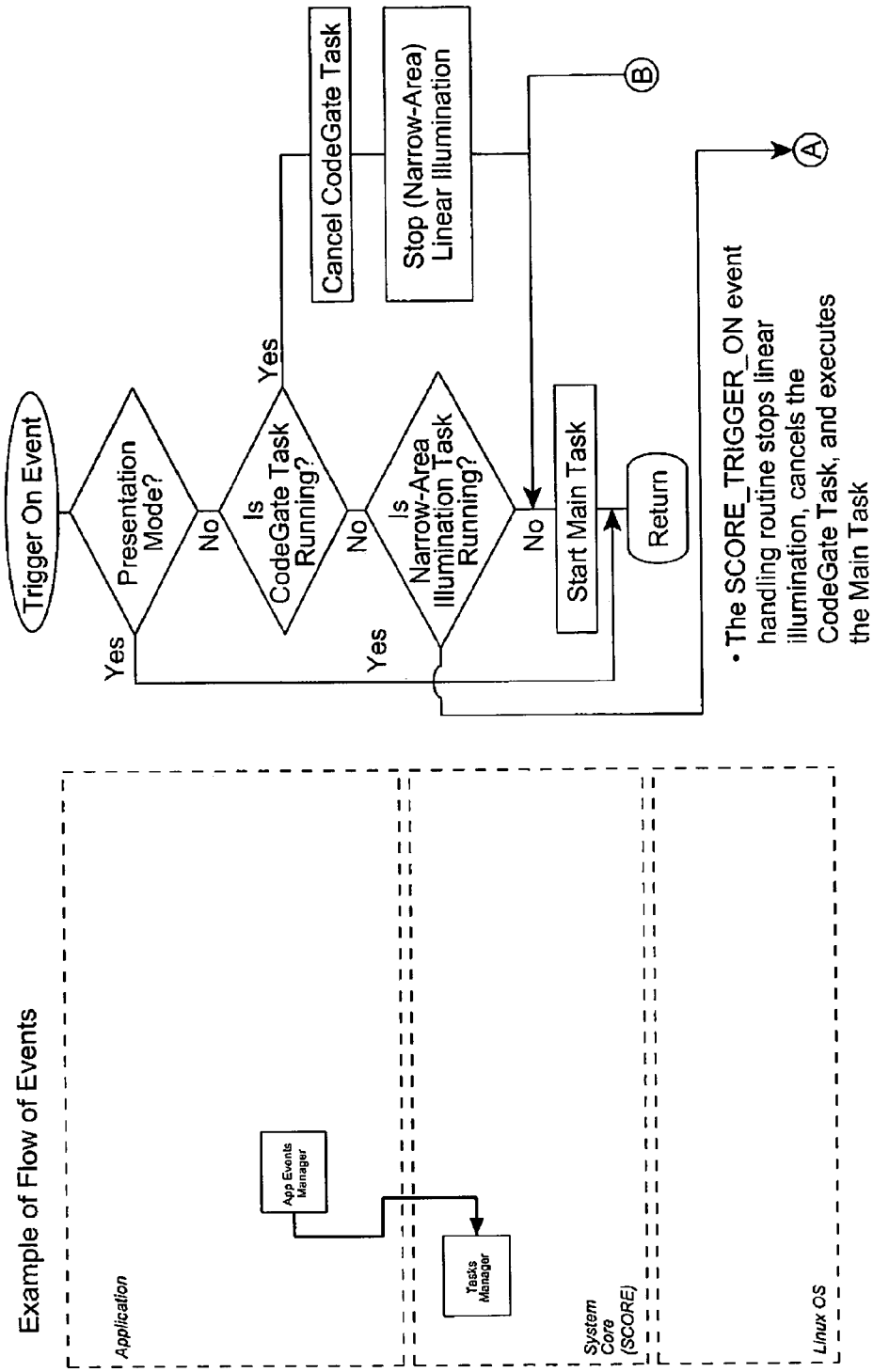
FIG. 13I1

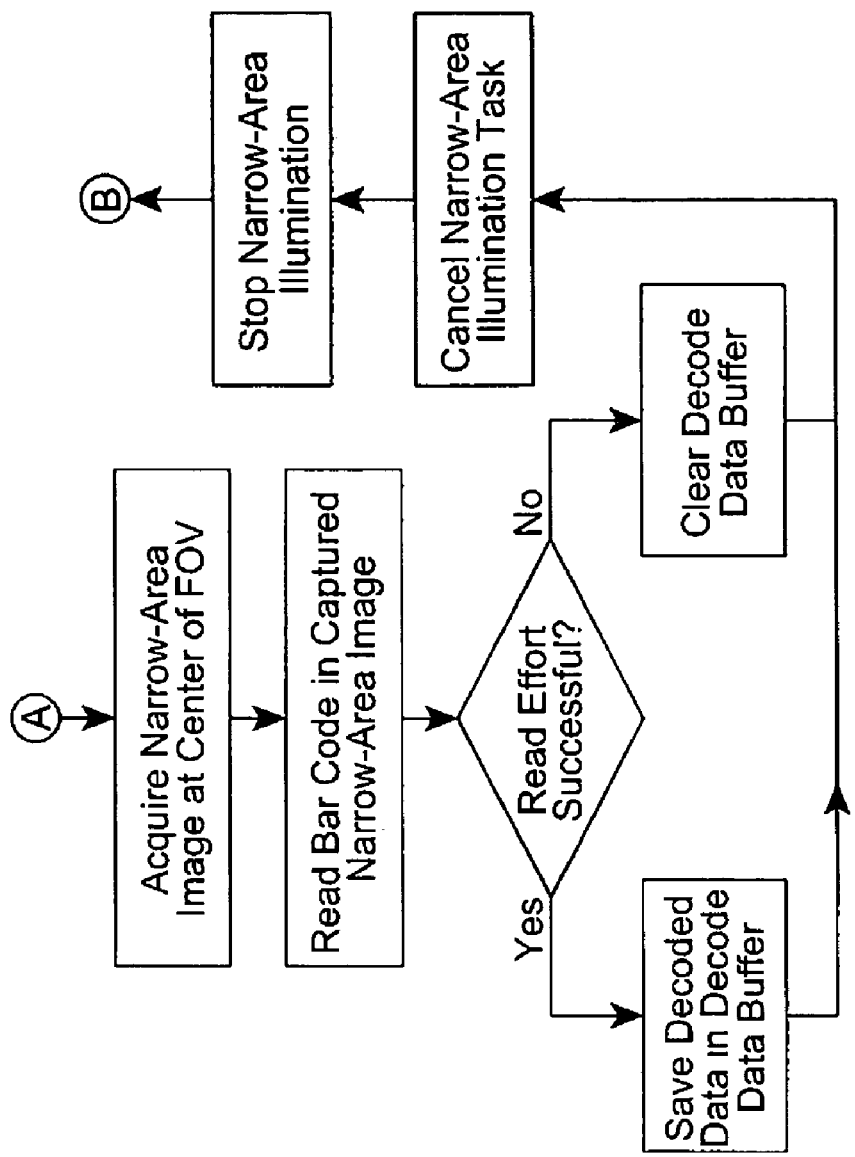
FIG. 13I2

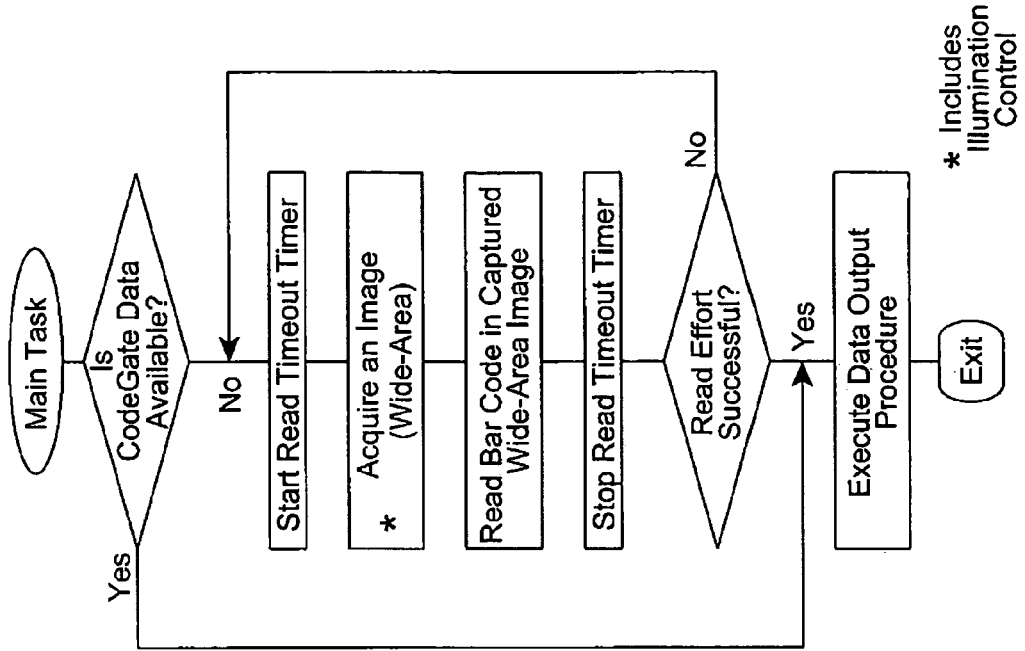
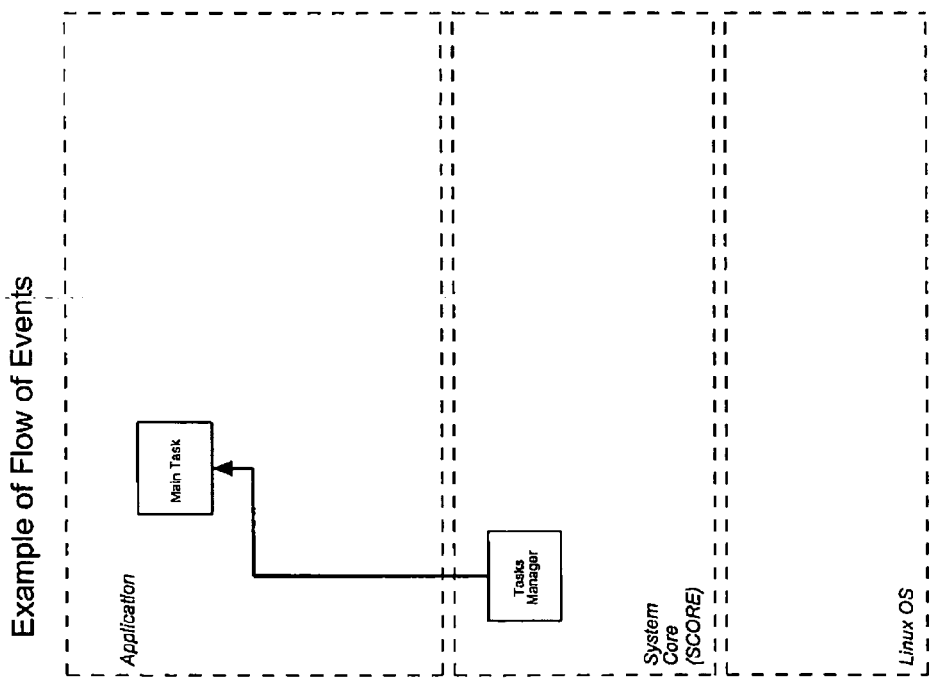
FIG. 13J

METHOD OF ILLUMINATING OBJECTS WITHOUT SPECULAR REFLECTION

STEP A: USE THE AUTOMATIC LIGHT EXPOSURE MEASUREMENT AND CONTROL SUBSYSTEM TO MEASURE THE LIGHT LEVEL TO WHICH THE CMOS IMAGE SENSING ARRAY IS EXPOSED.

STEP B: USE THE AUTOMATIC IR-BASED OBJECT PRESENCE AND RANGE DETECTION SUBSYSTEM TO MEASURE THE PRESENCE AND RANGE OF THE OBJECT IN EITHER THE NEAR OR FAR FIELD PORTION OF THE FIELD OF VIEW (FOV) OF THE SYSTEM.

STEP C: USE THE DETECTED RANGE AND THE MEASURED LIGHT EXPOSURE LEVEL TO DRIVE BOTH THE UPPER AND LOWER LED SUBARRAYS ASSOCIATED WITH EITHER THE NEAR OR FAR FIELD WIDE AREA ILLUMINATION ARRAY.

STEP D: CAPTURE A WIDE-AREA IMAGE AT THE CMOS IMAGE SENSING ARRAY USING THE ILLUMINATION FIELD PRODUCED DURING STEP C.

STEP E: RAPIDLY PROCESS THE CAPTURED WIDE-AREA IMAGE DURING STEP D TO DETECT THE OCCURANCE OF HIGH SPATIAL-INTENSITY LEVELS IN THE CAPTURED WIDE-AREA IMAGE, INDICATIVE OF A SPECULAR REFLECTION CONDITION.

STEP F:

IF A SPECULAR REFLECTION CONDITION IS DETECTED IN THE PROCESSED WIDE-AREA IMAGE, THEN DRIVE ONLY THE UPPER LED SUBARRAY ASSOCIATED WITH EITHER THE NEAR FIELD OR FAR FIELD WIDE AREA ILLUMINATION ARRAY.

IF A SPECULAR REFLECTION CONDITION IS NOT DETECTED IN THE PROCESSED WIDE-AREA IMAGE, THEN USE THE DETECTED RANGE AND THE MEASURED LIGHT EXPOSURE LEVEL TO DRIVE BOTH THE UPPER AND LOWER LED SUBARRAYS ASSOCIATED WITH EITHER THE NEAR FIELD OR FAR FIELD WIDE AREA ILLUMINATION ARRAY.

FIG. 13N1

STEP G: CAPTURE A WIDE-AREA IMAGE AT THE CMOS IMAGE SENSING ARRAY USING THE ILLUMINATION FIELD PRODUCED DURING STEP F.

STEP H: RAPIDLY PROCESS THE CAPTURED WIDE-AREA IMAGE DURING STEP G TO DETECT THE OCCURANCE OF HIGH SPATIAL-INTENSITY LEVELS IN THE CAPTURED WIDE-AREA IMAGE, INDICATIVE OF A SPECULAR REFLECTION CONDITION.

STEP I:

IF A SPECULAR REFLECTION CONDITION IS STILL DETECTED IN THE PROCESSED WIDE-AREA IMAGE, THEN DRIVE THE OTHER LED SUBARRAY ASSOCIATED WITH EITHER THE NEAR FIELD OR FAR FIELD WIDE AREA ILLUMINATION ARRAY.

IF A SPECULAR REFLECTION CONDITION IS NOT DETECTED IN THE PROCESSED WIDE-AREA IMAGE, THEN DRIVE USE THE DETECTED RANGE AND THE MEASURED LIGHT EXPOSURE LEVEL TO DRIVE THE SAME LED SUBARRAY (AS IN STEP C) ASSOCIATED WITH EITHER THE NEAR FIELD OR FAR FIELD WIDE AREA ILLUMINATION ARRAY.

STEP J: CAPTURE A WIDE-AREA IMAGE AT THE CMOS IMAGE SENSING ARRAY USING THE ILLUMINATION FIELD PRODUCED DURING STEP I.

STEP K: RAPIDLY PROCESS THE CAPTURED WIDE-AREA IMAGE DURING STEP J TO DETECT THE ABSENCE OF HIGH SPATIAL-INTENSITY LEVELS IN THE CAPTURED WIDE-AREA IMAGE, CONFIRMING THE ELIMINATION OF THE ONCE DETECTED SPECULAR REFLECTION CONDITION.

FIG. 13N2

STEP L:

IF NO SPECULAR REFLECTION CONDITION IS DETECTED IN THE PROCESSED WIDE-AREA IMAGE AT STEP K, THEN PROCESS THE WIDEAREA IMAGE USING MODE(S) SELECTED FOR THE MULTI-MODE IMAGEPROCESSING BAR CODE READING SUBSYSTEM.

IF A SPECULAR REFLECTION CONDITION IS STILL DETECTED IN THE PROCESSED WIDE-AREA IMAGE, THEN RETURN TO STEP A REPEAT STEPS A THROUGH K.

FIG. 13N3

Symbologies Readable By Multi-Mode Bar Code Symbol Reading Subsystem (1) Code 128     (2) Code 39     (3) I2of5

(4) Code93     (5) Codabar     (6) UPC/EAN (7) Telepen     (8) UK-Plessey     (9) Trioptic

(10) Matrix 2of5     (11) Airline 2of5     (12) Straight 2of5

(13) MSI-Plessey     (14) Code11     (15) PDF417

FIG. 14

Modes of Operation of Multi-mode Bar Code Reading Subsystem

- Automatic – Look for multiple barcodes incrementally and continue looking until entire image is processed

- Manual – Look for a programmable number of barcodes starting from center of image

- NoFinder – Look for one barcode in picket-fence orientation starting from center of image

- OmniScan – Look for one barcode along pre-determined orientations

- ROI-Specific Method – Look for bar code at specific region of interest (ROI) in captured image

FIG. 15

Step 2: Search for ROIs: Partition image

- Image overlaid with XY grid
- Each block formed by grids has an associated "feature vector" (Fv)
- Feature vectors are analyzed for the presence of parallel lines
- All feature vector calculations are performed on the low-resolution image

Step 3: Search for ROIs: Create feature vectors

$$Fv = \begin{pmatrix} \text{- Gradient vectors} \\ \text{- Edge density} \\ \text{- Number of parallel edge vectors} \\ \text{- Centroid of edgels} \\ \text{- Intensity variance} \\ \text{- Histogram of intensities} \end{pmatrix}$$

Step 4: Mark ROIs: Examine feature vectors

- High edge density
- Large number of parallel edge vectors
- Large intensity variance

Step 5: Mark ROIs: Calculate barcode orientation

- Within each "feature vector" block the barcode is traversed ("sliced") at different angles
- The slices are matched with each other based on "least mean square error"
- The correct orientation is that angle that matches in a "mean square error" sense every slice of the barcode Step 5: Mark ROIs: Calculate barcode orientation
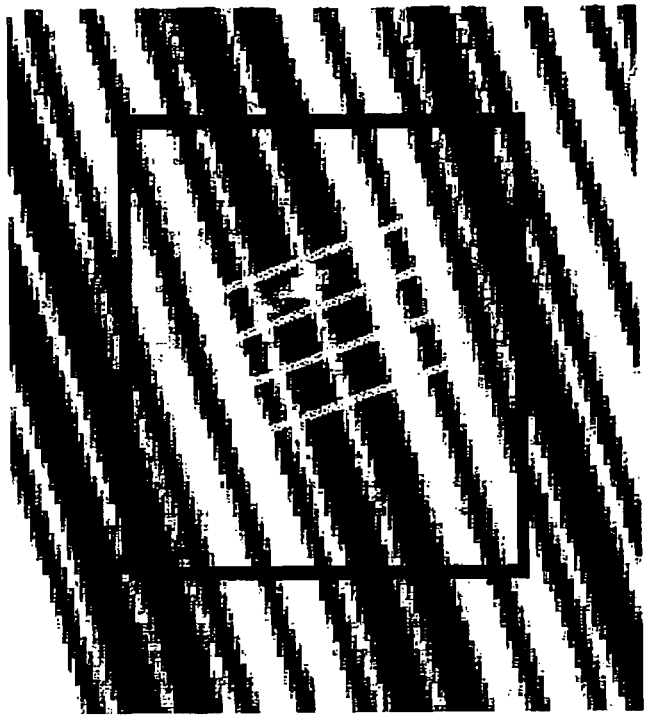
Lowest mean square error between slices
- Correct orientation
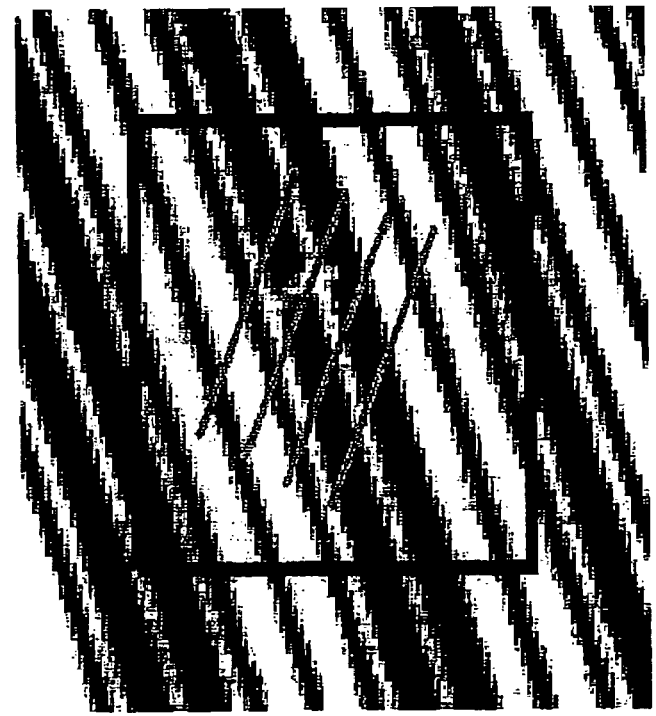
High mean square error between slices
FIG. 18F Step 6: Mark ROIs: Mark four corners of barcode

- From here on all operations are performed on the full-resolution image
- Barcode is traversed in either direction starting from center of block
- Using intensity variance the extent of modulation is detected (1 & 2)
- Starting from 1 & 2 and moving perpendicular to barcode orientation the four corners are determined (3, 4, 5, 6)
- 3, 4, 5, 6 define the ROI

FIG. 18G

Step 10: Decode ROIs: Decode bar and space pattern

- Bar and space data framed with "borders"
- Bar and space data decoded using existing Metrologic laser-scanner algorithms

FIG. 18K

PROGRAMMABLE MODES OF BAR CODE SYMBOL READING OPERATION WITHIN THE HAND-SUPPORTABLE DIGITAL IMAGING-BASED BAR CODE SYMBOL READER OF THE PRESENT INVENTION

Programmed Mode of System Operation No.1: Manually-Triggered Single-Attempt 1D Single-Read Mode Employing the No-Finder Mode of Operation Programmed Mode of System Operation No.2: Manually-Triggered Multiple-Attempt 1D Single-Read Mode Employing the No-Finder Mode of Operation Programmed Mode of System Operation No.3: Manually-Triggered Single-Attempt 1D/2D Single-Read Mode Employing the No-Finder And The Automatic Or Manual Modes of Operation Programmed Mode of System Operation No.4: Manually-Triggered Multiple-Attempt 1D/2D Single-Read Mode Employing the No-Finder And The Automatic Or Manual Modes of Operation Programmed Mode of System Operation No.5: Manually-Triggered Multiple-Attempt 1D/2D Multiple-Read Mode Employing the No-Finder And The Automatic Or Manual Modes of Operation Programmed Mode of System Operation No.6: Automatically- Triggered Single-Attempt 1D Single-Read Mode Employing The No-Finder Mode Of Operation Programmed Mode of System Operation No.7: Automatically-Triggered Multi-Attempt 1D Single-Read Mode Employing The No-Finder Mode Of Operation Programmed Mode of System Operation No.8: Automatically-Triggered Multi-Attempt 1D/2D Single-Read Mode Employing The No-Finder and Manual and/or Automatic Modes Of Operation Programmed Mode of System Operation No.9: Automatically-Triggered Multi-Attempt 1D/2D Multiple-Read Mode Employing The No-Finder and Manual and/or Automatic Modes Of Operation Programmable-Mode-of-System Operation No. 10: Automatically-Triggered Multiple-Attempt 1D/2D Single-Read Mode Employing The Manual, Automatic or Omniscan Modes Of Operation Programmed Mode of System Operation No. 11: Semi-Automatic-Triggered Single-Attempt 1D/2D Single-Read Mode Employing The No-Finder And The Automatic Or Manual Modes Of Operation

FIG. 26A

Programmable Mode of System Operation No. 12: Semi-Automatic-Triggered Multiple-Attempt 1D/2D Single-Read Mode Employing The No-Finder And The Automatic Or Manual Modes Of Operation Semi-Automatic-Triggered Multiple-Attempt 1D/2D Multiple-Read Mode Employing The No-Finder And The Automatic Or Manual Modes Of Decoder Operation; Programmable Mode of Operation No. 13

Programmable Mode of Operation No. 14: Semi-Automatic-Triggered Multiple-Attempt 1D/2D Multiple-Read Mode Employing The No-Finder And The Omniscan Modes Of Operation Programmable Mode of Operation No. 15: Continuously-Automatically-Triggered Multiple-Attempt 1D/2D Multiple-Read Mode Employing The Automatic, Manual Or Omniscan Modes Of Operation Programmable Mode of System Operation No. 16: Diagnostic Mode Of Imaging-Based Bar Code Reader Operation Programmable Mode of System Operation No. 17: Live Video Mode Of Imaging-Based Bar Code Reader Operation

FIG. 26B

Imaging-Based Bar Code Symbol Reading System With Extended Multi-Mode Illumination Subsystem

• Four Modes Of Illumination
(1) Wide-Area For "Near" Object (0 mm-100 mm)
(2) Wide-Area For "Far" Object (100 mm-200 mm)
(3) Narrow-Area For "Near" Object (0 mm-100 mm)
(4) Narrow-Area For "Far" Object (100 mm-200 mm)

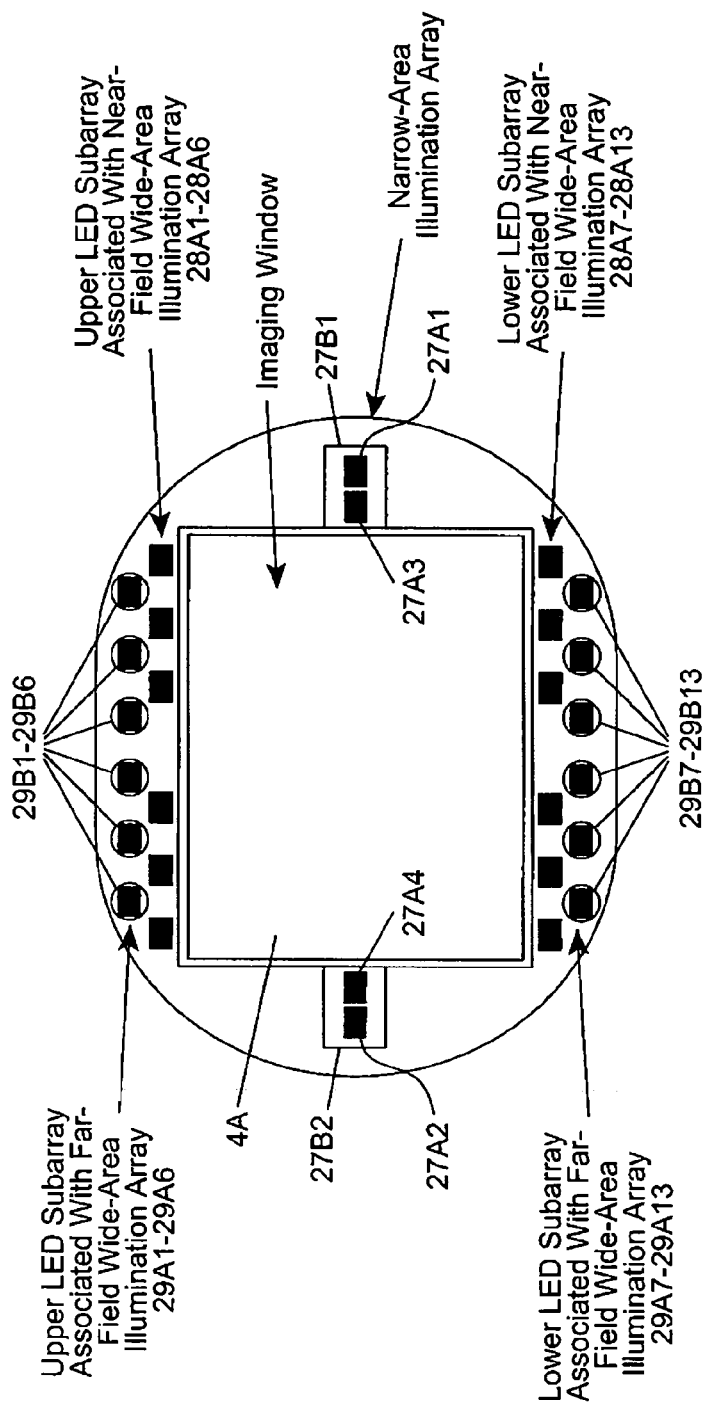

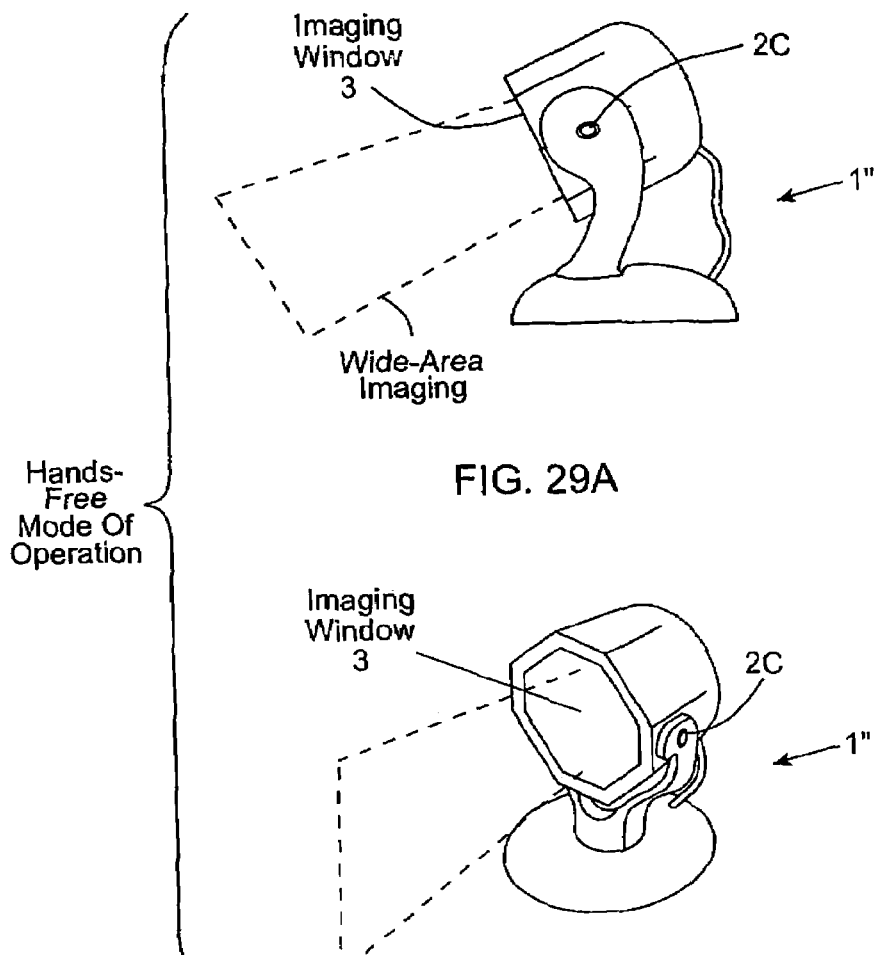
FIG. 29A
FIG. 29B
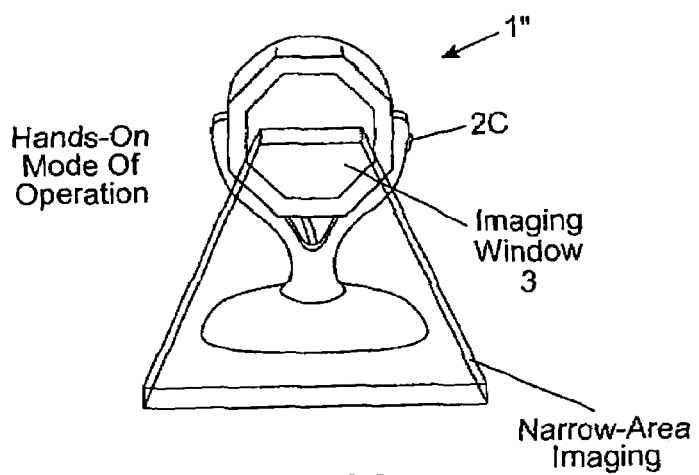
FIG. 29C

DIGITAL IMAGE CAPTURE AND PROCESSING SYSTEM HAVING AUTOMATIC ILLUMINATION MEASUREMENT AND CONTROL CAPABILITIES REALIZED USING A PHOTODETECTOR OPERATING INDEPENDENTLY OF THE IMAGE SENSING ARRAY, AND AN IMAGE-PROCESSING BASED ILLUMINATION METERING PROGRAM FOR AUTOMATICALLY ADJUSTING THE ILLUMINATION DURATION OF THE SYSTEM DURING OBJECT ILLUMINATION AND IMAGING OPERATIONS

RELATED CASES

This Application is a Continuation of U.S. application Ser. No. 10/989,220 filed Nov. 15, 2004, now U.S. Pat. No. 7,490,774; which is a Continuation-in-Part of the following Applications: U.S. application Ser. No. 10/712,787 filed Nov. 11, 2003, now U.S. Pat. No. 7,128,266; Ser. No. 10/893,800 filed Jul. 16, 2004, now U.S. Pat. No. 7,273,180; Ser. No. 10/893,797 filed Jul. 16, 2004. now U.S. Pat. No. 7,188,770; Ser. No. 10/893,798 filed Jul. 16, 2004. now U.S. Pat. No. 7,185,817; Ser. No. 10/894,476 filed Jul. 16, 2004, now U.S. Pat. No. 7,178,733; Ser. No. 10/894,478 filed Jul. 19, 2004, now U.S. Pat. No. 7,357,325; Ser. No. 10/894,412 filed Jul. 19, 2004, now U.S. Pat. No. 7,213,762; Ser. No. 10/894,477 filed Jul. 19, 2004, now U.S. Pat. No. 7,360,706; Ser. No. 10/895,271 filed Jul. 20, 2004, now U.S. Pat. No. 7,216,810; Ser. No. 10/895,811 filed Jul. 20, 2004, now U.S. Pat. No. 7,255,988; Ser. No. 10/897,390 filed Jul. 22, 2004, now U.S. Pat. No. 7,237,722; Ser. No. 10/897,389 filed Jul. 22, 2004, now U.S. Pat. No. 7,225,989; Ser. No. 10/901,463 filed Jul. 27, 2004, now U.S. Pat. No. 7,086,595; Ser. No. 10/901,426 filed Jul. 27, 2004, now U.S. Pat. No. 7,278,575; Ser. No. 10/901,446 filed Jul. 27, 2004; Ser. No. 10/901,461 filed Jul. 28, 2004, now U.S. Pat. No. 7,320,431; Ser. No. 10/901,429 filed Jul. 28, 2004, now U.S. Pat. No. 7,243,847; Ser. No. 10/901,427 filed Jul. 28, 2004, now U.S. Pat. No. 7,267,282; Ser. No. 10/901,445 filed Jul. 28, 2004, now U.S. Pat. No. 7,240,844; Ser. No. 10/901,428 filed Jul. 28, 2004, now U.S. Pat. No. 7,293,714; Ser. No. 10/902,709 filed Jul 29, 2004, now U.S. Pat. No. 7,270,272; Ser. No. 10/901,914 filed Jul. 29, 2004, now U.S. Pat. No. 7,325,738; Ser. No. 10/902,710 filed Jul. 29, 2004, now U.S. Pat. No. 7,281,661; Ser. No. 10/909,270 filed Jul. 30, 2004, now U.S. Pat. No. 7,284,705; and Ser. No. 10/909,255 filed Jul. 30, 2004, now U.S. Pat. No. 7,299, 986; and Ser. No. 10/903,904 filed Jul. 30, 2004, now U.S. Pat. No. 7,255,279. Each said patent application is assigned to and commonly owned by Metrologic Instruments, Inc. of Blackwood, N.J., and is incorporated herein by reference in its entirety.

BACKGROUND OF INVENTION

1. Field of Invention

The present invention relates to hand-supportable and portable area-type digital bar code readers having diverse modes of digital image processing for reading one-dimensional (1D) and two-dimensional (2D) bar code symbols, as well as other forms of graphically-encoded intelligence.

2. Brief Description of the State of the Art

The state of the automatic-identification industry can be understood in terms of (i) the different classes of bar code symbologies that have been developed and adopted by the industry, and (ii) the kinds of apparatus developed and used to read such bar code symbologies in various user environments.

In general, there are currently three major classes of bar code symbologies, namely: one dimensional (1D) bar code symbologies, such as UPC/EAN, Code 39, etc.; 1D stacked bar code symbologies, Code 49, PDF417, etc.; and two-dimensional (2D) data matrix symbologies.

One Dimensional optical bar code readers are well known in the art. Examples of such readers include readers of the Metrologic Voyager® Series Laser Scanner manufactured by Metrologic Instruments, Inc. Such readers include processing circuits that are able to read one dimensional (1D) linear bar code symbologies, such as the UPC/EAN code, Code 39, etc., that are widely used in supermarkets. Such 1D linear symbologies are characterized by data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed, including Code 49, as described in U.S. Pat. No. 4,794,239 (Allais), and PDF417, as described in U.S. Pat. No. 5,340,786 (Pavlidis, et al.). Stacked symbols partition the encoded data into multiple rows, each including a respective 1D bar code pattern, all or most of all of which must be scanned and decoded, then linked together to form a complete message. Scanning still requires relatively high resolution in one dimension only, but multiple linear scans are needed to read the whole symbol.

The third class of bar code symbologies, known as 2D matrix symbologies offer orientation-free scanning and greater data densities and capacities than their 1D counterparts. In 2D matrix codes, data is encoded as dark or light data elements within a regular polygonal matrix, accompanied by graphical finder, orientation and reference structures. When scanning 2D matrix codes, the horizontal and vertical relationships of the data elements are recorded with about equal resolution.

In order to avoid having to use different types of optical readers to read these different types of bar code symbols, it is desirable to have an optical reader that is able to read symbols of any of these types, including their various subtypes, interchangeably and automatically. More particularly, it is desirable to have an optical reader that is able to read all three of the above-mentioned types of bar code symbols, without human intervention, i.e., automatically. This is turn, requires that the reader have the ability to automatically discriminate between and decode bar code symbols, based only on information read from the symbol itself. Readers that have this ability are referred to as "auto-discriminating" or having an "auto-discrimination" capability.

If an auto-discriminating reader is able to read only 1D bar code symbols (including their various subtypes), it may be said to have a 1D auto-discrimination capability. Similarly, if it is able to read only 2D bar code symbols, it may be said to have a 2D auto-discrimination capability. If it is able to read both 1D and 2D bar code symbols interchangeably, it may be said to have a 1D/2D auto-discrimination capability. Often, however, a reader is said to have a 1D/2D auto-discrimination capability even if it is unable to discriminate between and decode 1D stacked bar code symbols.

Optical readers that are capable of 1D auto-discrimination are well known in the art. An early example of such a reader is Metrologic's VoyagerCG® Laser Scanner, manufactured by Metrologic Instruments, Inc.

Optical readers, particularly hand held optical readers, that are capable of 1D/2D auto-discrimination and based on the use of an asynchronously moving 1D image sensor, are described in U.S. Pat. Nos. 5,288,985 and 5,354,977, which applications are hereby expressly incorporated herein by reference. Other examples of hand held readers of this type, based on the use of a stationary 2D image sensor, are described in U.S. Pat. Nos. 6,250,551; 5,932,862; 5,932,741; 5,942,741; 5,929,418; 5,914,476; 5,831,254; 5,825,006; 5,784,102, which are also hereby expressly incorporated herein by reference.

Optical readers, whether of the stationary or movable type, usually operate at a fixed scanning rate, which means that the readers are designed to complete some fixed number of scans during a given amount of time. This scanning rate generally has a value that is between 30 and 200 scans/sec for 1D readers. In such readers, the results the successive scans are decoded in the order of their occurrence.

Imaging-based bar code symbol readers have a number advantages over laser scanning based bar code symbol readers, namely: they are more capable of reading stacked 2D symbologies, such as the PDF 417 symbology; more capable of reading matrix 2D symbologies, such as the Data Matrix symbology; more capable of reading bar codes regardless of their orientation; have lower manufacturing costs; and have the potential for use in other applications, which may or may not be related to bar code scanning, such as OCR, security systems, etc Prior art imaging-based bar code symbol readers suffer from a number of additional shortcomings and drawbacks.

Most prior art hand held optical reading devices can be reprogrammed by reading bar codes from a bar code programming menu or with use of a local host processor as taught in U.S. Pat. No. 5,929,418. However, these devices are generally constrained to operate within the modes in which they have been programmed to operate, either in the field or on the bench, before deployment to end-user application environments. Consequently, the statically-configured nature of such prior art imaging-based bar code reading systems has limited their performance.

Prior art imaging-based bar code symbol readers with integrated illumination subsystems also support a relatively short range of the optical depth of field. This limits the capabilities of such systems from reading big or highly dense bar code labels.

Prior art imaging-based bar code symbol readers generally require separate apparatus for producing a visible aiming beam to help the user to aim the camera's field of view at the bar code label on a particular target object.

Prior art imaging-based bar code symbol readers generally require capturing multiple frames of image data of a bar code symbol, and special apparatus for synchronizing the decoding process with the image capture process within such readers, as required in U.S. Pat. Nos. 5,932,862 and 5,942,741 assigned to Welch Allyn, Inc.

Prior art imaging-based bar code symbol readers generally require large arrays of LEDs in order to flood the field of view within which a bar code symbol might reside during image capture operations, oftentimes wasting larges amounts of electrical power which can be significant in portable or mobile imaging-based readers.

Prior art imaging-based bar code symbol readers generally require processing the entire pixel data set of capture images to find and decode bar code symbols represented therein. On the other hand, some prior art imaging systems use the inherent programmable (pixel) windowing feature within conventional CMOS image sensors to capture only partial image frames to reduce pixel data set processing and enjoy improvements in image processing speed and thus imaging system performance.

Many prior art imaging-based bar code symbol readers also require the use of decoding algorithms that seek to find the orientation of bar code elements in a captured image by finding and analyzing the code words of 2-D bar code symbologies represented therein.

Some prior art imaging-based bar code symbol readers generally require the use of a manually-actuated trigger to actuate the image capture and processing cycle thereof.

Prior art imaging-based bar code symbol readers generally require separate sources of illumination for producing visible aiming beams and for producing visible illumination beams used to flood the field of view of the bar code reader.

Prior art imaging-based bar code symbol readers generally utilize during a single image capture and processing cycle, and a single decoding methodology for decoding bar code symbols represented in captured images.

Some prior art imaging-based bar code symbol readers require exposure control circuitry integrated with the image detection array for measuring the light exposure levels on selected portions thereof.

Also, many imaging-based readers also require processing portions of captured images to detect the image intensities thereof and determine the reflected light levels at the image detection component of the system, and thereafter to control the LED-based illumination sources to achieve the desired image exposure levels at the image detector.

Prior art imaging-based bar code symbol readers employing integrated illumination mechanisms control image brightness and contrast by controlling the time the image sensing device is exposed to the light reflected from the imaged objects. While this method has been proven for the CCD-based bar code scanners, it is not suitable, however, for the CMOS-based image sensing devices, which require a more sophisticated shuttering mechanism, leading to increased complexity, less reliability and, ultimately, more expensive bar code scanning systems.

Prior art imaging-based bar code symbol readers generally require the use of tables and bar code menus to manage which decoding algorithms are to be used within any particular mode of system operation to be programmed by reading bar code symbols from a bar code menu.

Finally, as a result of limitations in the mechanical, electrical, optical, and software design of prior art imaging-based bar code symbol readers, such prior art readers generally (i) fail to enable users to read high-density 1D bar codes with the ease and simplicity of laser scanning based bar code symbol readers, and also 2D symbologies, such as PDF 417 and Data Matrix, and (ii) are incapable of use in OCR and OCV, security applications, etc.

Thus, there is a great need in the art for an improved method of and apparatus for reading bar code symbols using image capture and processing techniques which avoid the shortcomings and drawbacks of prior art methods and apparatus.

OBJECTS AND SUMMARY OF THE PRESENT INVENTION

Accordingly, a primary object of the present invention is to provide a novel method of and apparatus for enabling the reading of 1D and 2D bar code symbologies using image capture and processing based systems and devices, which avoid the shortcomings and drawbacks of prior art methods and apparatus.

Another object of the present invention is to provide a novel hand-supportable digital imaging-based bar code symbol reader capable of automatically reading 1D and 2D bar code symbologies using the state-of-the art imaging technology, and at the speed and with the reliability achieved by conventional laser scanning bar code symbol readers.

Another object of the present invention is to provide a novel hand-supportable digital imaging-based bar code symbol reader that is capable of reading stacked 2D symbologies such as PDF417, as well as Data Matrix.

Another object of the present invention is to provide a novel hand-supportable digital imaging-based bar code symbol reader that is capable of reading bar codes independent of their orientation with respect to the reader.

Another object of the present invention is to provide a novel hand-supportable digital imaging-based bar code symbol reader that utilizes an architecture that can be used in other applications, which may or may not be related to bar code scanning, such as OCR, OCV, security systems, etc.

Another object of the present invention is to provide a novel hand-supportable digital imaging-based bar code symbol reader that is capable of reading high-density bar codes, as simply and effectively as "flying-spot" type laser scanners do.

Another object of the present invention is to provide a hand-supportable imaging-based bar code symbol reader capable of reading 1D and 2D bar code symbologies in a manner as convenient to the end users as when using a conventional laser scanning bar code symbol reader.

Another object of the present invention is to provide a hand-supportable imaging-based bar code symbol reader having a multi-mode bar code symbol reading subsystem, which is dynamically reconfigured in response to real-time processing operations carried out on captured images.

Another object of the present invention is to provide a hand-supportable imaging-based bar code symbol reader having an integrated LED-based multi-mode illumination subsystem for generating a visible narrow-area illumination beam for aiming on a target object and illuminating a 1D bar code symbol aligned therewith during a narrow-area image capture mode of the system, and thereafter illuminating randomly-oriented 1D or 2D bar code symbols on the target object during a wide-area image capture mode of the system.

Another object of the present invention is to provide a hand-supportable imaging-based bar code symbol reader employing an multi-mode illumination subsystem which generates a visible narrow-area illumination beam for aiming onto a target object, then illuminates a 1D bar code symbol aligned therewith, captures an image thereof, and thereafter generates a wide-area illumination beam for illuminating 1D or 2D bar code symbols on the object and capturing an image thereof and processing the same to read the bar codes represented therein.

Another object of the present invention is to provide a hand-supportable imaging-based bar code symbol reader employing automatic object presence and range detection to control the generation of near-field and far-field wide-area illumination beams during bar code symbol imaging operations.

Another object of the present invention is to provide a hand-supportable imaging-based bar code symbol reader employing a CMOS-type image sensing array using global exposure control techniques.

Another object of the present invention is to provide a hand-supportable imaging-based bar code symbol reader employing a CMOS-type image sensing array with a band-pass optical filter subsystem integrated within the hand-supportable housing thereof, to allow only narrow-band illumination from the Multi-Mode Illumination Subsystem to expose the CMOS image sensing array.

Another object of the present invention is to provide a hand-supportable imaging-based auto-discriminating 1D/2D bar code symbol reader employing multi-mode image-processing based bar code symbol reading subsystem dynamically reconfigurable in response to real-time image analysis during bar code reading operations.

Another object of the present invention is to provide a hand-supportable imaging-based bar code symbol reader employing a continuously operating automatic light exposure measurement and illumination control subsystem.

Another object of the present invention is to provide a hand-supportable imaging-based bar code symbol reader employing a multi-mode led-based illumination subsystem.

Another object of the present invention is to provide a hand-supportable imaging-based bar code symbol reader having 1D/2D auto-discrimination capabilities.

Another object of the present invention is to provide a method of performing auto-discrimination of 1D/2D bar code symbologies in an imaging-based bar code symbol reader having both narrow-area and wide-area image capture modes of operation.

Another object of the present invention is to provide a method of and apparatus for processing captured images within an imaging-based bar code symbol reader in order to read (i.e. recognize) bar code symbols graphically represented therein.

Another object of the present invention is to provide a hand-supportable imaging-based bar code symbol reader employing helically-sweeping feature-extraction analysis on captured 2D images of objects, referenced from the center thereof.

Another object of the present invention is to provide a hand-supportable imaging-based bar code symbol reader employing simple image processing operations applied in an outwardly-directed manner on captured narrow-area images of objects bearing 1D bar code symbols.

Another object of the present invention is to provide a hand-supportable imaging-based bar code symbol reader employing an integrated LED-based multi-mode illumination subsystem with far-field and near-field illumination arrays responsive to control signals generated by an IR-based object presence and range detection subsystem during a first mode of system operation and a system control subsystem during a second mode of system operation.

Another object of the present invention is to provide a hand-supportable imaging-based bar code symbol reader employing an integrated LED-based multi-mode illumination subsystem driven by an automatic light exposure measurement and illumination control subsystem responsive to control activation signals generated by a CMOS image sensing array and an IR-based object presence and range detection subsystem during object illumination and image capturing operations.

Another object of the present invention is to provide a hand-supportable imaging-based bar code symbol reader employing a CMOS image sensing array which activates LED illumination driver circuitry to expose a target object to narrowly-tuned LED-based illumination when all of rows of pixels in said CMOS image sensing array are in a state of integration, thereby capturing high quality images independent of the relative motion between said bar code reader and the target object.

Another object of the present invention is to provide a hand-supportable imaging-based bar code symbol reader, wherein the exposure time of narrow-band illumination onto its CMOS image sensing array is managed by controlling the illumination time of its LED-based illumination arrays using control signals generated by an automatic light exposure measurement and illumination control subsystem and the CMOS image sensing array while controlling narrow-band illumination thereto by way of a band-pass optical filter subsystem.

Another object of the present invention is to provide a hand-supportable imaging-based bar code symbol reader employing a mechanism of controlling the image brightness and contrast by controlling the time the illumination subsystem illuminates the target object, thus, avoiding the need for a complex shuttering mechanism for CMOS-based image sensing arrays employed therein.

Another object of the present invention is to provide a hand-supportable imaging-based bar code symbol reader employing a multi-mode image-processing bar code symbol reading subsystem that automatically switches its modes of reading during a single bar code symbol reading cycle, and a plurality of different bar code symbology decoding algorithms are applied within each mode of reading.

Another object of the present invention is to provide a hand-supportable imaging-based bar code symbol reader, wherein the multi-mode image-processing symbol reading subsystem has a first multi-read (e.g. Omniscan/ROI-Specific) mode of operation, for adaptively processing and decoding a captured high-resolution image in a high-speed manner, applying adaptive learning techniques.

Another object of the present invention is to provide such a hand-supportable imaging-based bar code symbol reader with a multi-mode image-processing symbol reading subsystem having a first multi-read (e.g. Omniscan/ROI-Specific) mode of operation, wherein if during the Omniscan Mode of operation, code fragments associated with a PDF417 bar code symbol are detected within a ROI in a captured (narrow or wide) area image, but processing thereof is unsuccessful, then the multi-mode image-processing symbol reading subsystem will automatically (i) enter its ROI-Specific Mode of operation described above, and then (ii) immediately commence processing of the captured image at the ROI specified by ROI coordinates acquired by feature vector analysis during the Omniscan Mode of operation.

Another object of the present invention is to provide a hand-supportable imaging-based bar code symbol reader with a multi-mode image-processing symbol reading subsystem having a first multi-read (e.g. Omniscan/ROI-Specific) mode of operation, which offers an OmniScan Mode of operation to initially and rapidly read 1D bar code symbologies, and various kinds of 2D bar code symbologies whenever present in the captured image, and whenever a PDF417 symbology is detected (through its code fragments), the multi-mode image-processing symbol reading subsystem of the present invention can automatically switch (on-the-fly) to its ROI-specific Mode of operation to immediately process high-resolution image data at a specific ROI (at which there is a high likelihood of a bar code symbol present).

Another object of the present invention is to provide a hand-supportable imaging-based bar code symbol reader, wherein its multi-mode image-processing symbol reading subsystem has a second multi-read (e.g. NoFinder/ROI-Specific) mode of operation, for adaptively processing a captured high-resolution image in a high-speed manner, applying adaptive learning techniques.

Another object of the present invention is to provide a hand-supportable imaging-based bar code symbol reader, wherein the multi-mode image-processing symbol reading subsystem has a second multi-read (e.g. NoFinder/ROI-Specific) mode of operation, and wherein if during the NoFinder Mode of operation, code fragments associated with a PDF417 bar code symbol are detected within the captured wide-area image, but decode processing thereof is unsuccessful, then the multi-mode image-processing symbol reading subsystem will automatically (i) enter its ROI-specific mode of operation described above, and then (ii) immediately commence processing of the captured wide-area image at a ROI specified by y coordinates corresponding to the wide-area image processed during the NoFinder Mode of operation.

Another object of the present invention is to provide such a hand-supportable imaging-based bar code symbol reader, wherein its multi-mode image-processing symbol reading subsystem has a second multi-read (e.g. NoFinder/ROI-Specific) mode of operation, and wherein the No-Finder Mode can rapidly read 1D bar code symbologies whenever they are presented to the bar code symbol reader, and then whenever a 2D (e.g. PDF417) symbology is encountered, the bar code symbol reader can automatically switch its method of reading to the ROI-specific Mode and use features collected from a narrow (or wide) area image processed during the No-Finder Mode, so as to immediately process a specific ROI in a captured wide-area image frame, at which there is a high likelihood of a bar code symbol present, and to do so in a highly targeted manner.

Another object of the present invention is to provide a hand-supportable imaging-based bar code symbol reader, wherein the Multi-Mode Image-Processing Bar Code Reading Subsystem has a third multi-read (e.g. NoFinder/Omniscan/ROI-Specific) mode of operation, for adaptively processing a captured high-resolution image in a high-speed manner, applying adaptive learning techniques.

Another object of the present invention is to provide such a hand-supportable imaging-based bar code symbol reader, wherein the multi-mode image-processing symbol reading subsystem has a third multi-read (e.g. NoFinder/Omniscan/ROI-Specific) mode of operation, and wherein if during the NoFinder Mode of operation, code fragments associated with a PDF417 bar code symbol are detected within the captured narrow-area image, but processing thereof is unsuccessful, then the image formation and detection subsystem (i) automatically captures a wide-area image, while the multi-mode image-processing symbol reading subsystem (ii) automatically enters its Omniscan Mode of operation described above, and then (iii) immediately commences processing of the captured wide-area image at a plurality of parallel spatially-separated (e.g. by 50 pixels) virtual scan lines, beginning at a start pixel and start angle specified by x and/or y coordinates of code fragments detected in the narrow-area image processed during the NoFinder Mode of operation; and, if the Omniscan Mode does not successfully read a bar code symbol within the ROI, then the multi-mode image-processing symbol reading subsystem (i) automatically enters its ROI-specific mode of operation described above, and then (ii) immediately commences processing of the captured wide-area image at a ROI specified by the x,y coordinates corresponding to code fragments detected in the wide-area image processed during the Omniscan Mode of operation.

Another object of the present invention is to provide a hand-supportable imaging-based bar code symbol reader, wherein the multi-mode image-processing symbol reading subsystem has a third multi-read (e.g. NoFinder/Omniscan/ROI-Specific) mode of operation, and wherein the No-Finder Mode can rapidly acquire 1D bar code symbologies whenever they are presented to the bar code symbol reader, and then whenever a 2D symbology is encountered, the bar code symbol reader can automatically switch its method of reading to the OmniScan Mode, collected features on processed image data, and if this reading method is not successful, then the bar code reader can automatically switch its method of reading to the ROI-Specific Mode and use features collected during the Omniscan Mode to immediately process a specific ROI in a captured image frame, at which there is a high likelihood of a bar code symbol present, and to do so in a highly targeted manner.

Another object of the present invention is to provide a hand-supportable imaging-based bar code symbol reader having an integrated multi-mode illumination subsystem that supports an optical depth of field larger than conventional imaging-based bar code symbol readers.

Another object of the present invention is to provide a hand-supportable imaging-based bar code symbol reader having a Depth of Field (DOF) of about 0 mm to 200 mm (face to 8") for 13.5 mil bar code symbols, wherein the resolution varies as function of object distance, it can decode 5 mil codes somewhere, its optics can resolve 4 mil codes somewhere, and it has a 45° Field of View (FOV).

Another object of the present invention is to provide an imaging-based bar code symbol reader having a multi-mode image-processing based bar code symbol reading subsystem, which uses a set of features and constructing a feature vector to determine a region of interest that may contain a bar code.

Another object of the present invention is to provide an imaging-based bar code symbol reader having a Multi-Mode Image-Processing Based Bar Code Symbol Reading Subsystem which uses multiple, adaptive thresholds to determine and mark regions of interest (ROIs).

Another object of the present invention is to provide an imaging-based bar code symbol reader having a multi-mode image-processing based bar code symbol reading subsystem, which uses several image processing methods to determine bar code orientation in a hierarchical scheme.

Another object of the present invention is to provide an imaging-based bar code symbol reader having a multi-mode image-processing based bar code symbol reading subsystem, which uses several different scan-data filtering techniques to generate bar-space counts.

Another object of the present invention is to provide an imaging-based bar code symbol reader having a multi-mode image-processing based bar code symbol reading subsystem which uses bar and space stitching for correcting perspective and projection transforms, and also decoding damaged labels.

Another object of the present invention is to provide an imaging-based bar code symbol reader having a multi-mode image-processing based bar code symbol reading subsystem, which uses incremental processing of image data while an image is being progressively acquired.

Another object of the present invention is to provide an imaging-based bar code symbol reader having a multi-mode image-processing based bar code symbol reading subsystem, which uses low-rise histogram analysis to determine bright spots in captured images.

Another object of the present invention is to provide an imaging-based bar code symbol reader having a multi-mode image-processing based bar code symbol reading subsystem, which detects all 1D symbologies and PDF417 omnidirectionally.

Another object of the present invention is to provide an imaging-based bar code symbol reader having a multi-mode image-processing based bar code symbol reading subsystem which decodes UPC/EAN, 1205, C128, C39, C93, CBR omnidirectionally.

Another object of the present invention is to provide an imaging-based bar code symbol reader having a multi-mode image-processing based bar code symbol reading subsystem, which uses low incidence of "false-positives"

Another object of the present invention is to provide an imaging-based bar code symbol reader having a multi-mode image-processing based bar code symbol reading subsystem, which works with images stored in memory during a snap-shot mode of operation.

Another object of the present invention is to provide an imaging-based bar code symbol reader having a multi-mode image-processing based bar code symbol reading subsystem which works with images acquired progressively during an incremental mode of operation.

Another object of the present invention is to provide an imaging-based bar code symbol reader having a multi-mode image-processing based bar code symbol reading subsystem which operates on captured high-resolution images having an image size of 32768×32768 pixels.

Another object of the present invention is to provide a hand-supportable imaging-based bar code symbol reader which is simple to use, is inexpensive to manufacture, requires as few elements as possible, has a small as possible form factor, employs no moving elements (i.e. no dynamic focus, and no zoom), and employs all spherical surfaces and common glasses.

Another object of the present invention is to provide a low-cost, high-resolution imaging-based bar code symbol reader for omni-directional reading of regular 1D bar codes and two-dimensional bar codes, such as the PDF417 symbology.

Another object of the present invention is to provide such an imaging-based bar code symbol reader having target applications at point of sales in convenience stores, gas stations, quick markets, and liquor stores, where 2D bar code reading is required for age verification and the like.

Another object of the present invention is to provide an improved imaging-based bar code symbol reading engine for integration into diverse types of information capture and processing systems, such as bar code driven portable data terminals (PDT) having wireless interfaces with their base stations, reverse-vending machines, retail bar code driven kiosks, and the like.

Another object of the present invention is to provide a novel method of and apparatus for enabling global exposure control in an imaging-based bar code symbol reader using a CMOS image sensing array.

Another object of the present invention is to provide a hand-supportable imaging-based bar code reading system that employs a novel method of illumination, which automatically reduces noise in detected digital images caused by specular reflection during illumination and imaging operations.

Another object of the present invention is to provide a novel method of and system for producing a composite DOF plot that completely theoretically characterizes the Depth of Field (DOF) of the image formation optics employed in an imaging-based bar code symbol reader.

Another object of the present invention is to provide a hand-supportable digital imaging-based bar code symbol reader supporting narrow-area and wide-area modes of illumination and image capture.

Another object of the present invention is to provide a hand-supportable imaging-based bar code symbol reader having a multi-mode bar code symbol image processor dynamically reconfigurable in response to real-time image processing operations carried out on captured images.

Another object of the present invention is to provide a hand-supportable semi-automatic imaging-based bar code reading system wherein an LED-based illumination subsystem automatically illuminates a target object in a narrow-area field of illumination while a multi-mode image formation and detection (IFD) subsystem captures a narrow-area image of an aligned 1D bar code symbol therein, and when manually switched into a wide-area illumination and image capture mode by a trigger switch, the LED-based illumination subsystem illuminates the target object in a wide-area field of illumination, while the multi-mode IFD subsystem captures a wide-area image of randomly-oriented 1D or 2D code symbols thereon.

Another object of the present invention is to provide a hand-supportable imaging-based bar code symbol reader employing a multi-mode illumination subsystem enabling narrow-area illumination for aiming at a target object and illuminating aligned 1D bar code symbols during the narrow-area image capture mode, and wide-area illumination for illuminating randomly-oriented 1D and 2D bar code symbols during the wide-area image capture mode.

Another object of the present invention is to provide a hand-supportable imaging-based bar code symbol reader employing automatic object presence and range detection to control the generation of near-field and far-field wide-area illumination during bar code symbol imaging operations.

Another object of the present invention is to provide a hand-supportable imaging-based bar code symbol reader employing a CMOS-type image sensor using global exposure techniques.

Another object of the present invention is to provide a hand-supportable imaging-based bar code symbol reader employing a CMOS-type image sensing array with a band-pass optical filter subsystem integrated within the hand-supportable housing thereof.

Another object of the present invention is to provide a hand-supportable imaging-based auto-discriminating 1D/2D bar code symbol reader employing a multi-mode image processing bar code symbol reading subsystem having a plurality of modes of operation which are dynamically reconfigurable in response to real-time image analysis.

Another object of the present invention is to provide a hand-supportable multi-mode imaging-based bar code symbol reader employing an automatic illumination and exposure control subsystem that automatically controls the operation of an LED-based multi-mode illumination subsystem so that detected objects are sufficiently illuminated and good quality digital images of detected objects are formed and detected by a multi-mode image formation and detection subsystem during illumination and imaging operations.

Another object of the present invention is to provide a hand-supportable imaging-based bar code symbol reader employing a tri-mode LED-based illumination subsystem.

Another object of the present invention is to provide a hand-supportable imaging-based bar code symbol reader employing a multi-mode image-processing based bar code reading subsystem with modular image-processing architecture.

Another object of the present invention is to provide a method of performing auto-discrimination of 1D/2D bar code symbologies in a semi-automatic hand-supportable imaging-based bar code symbol reader having narrow-area and wide-area image capture modes of operation.

Another object of the present invention is to provide a method of and apparatus for processing captured digital images of objects within a semi-automatic hand-supportable imaging-based bar code symbol reader so as to read 1D and/or 2D bar code symbols graphically represented therein.

Another object of the present invention is to provide a hand-supportable image-based bar code symbol reader employing helically-sweeping feature-extraction analysis on a captured digital image of an object referenced from the center thereof.

Another object of the present invention is to provide an automatic hand-supportable image-based bar code symbol reader having image-processing based bar code reading subsystem employing simple decode image processing operations applied in an outwardly-directed manner referenced from the center of a captured narrow-area digital image of an object bearing a 1D bar code symbol.

Another object of the present invention is to provide a digital imaging-based bar code symbol reading system employing an LED-based multi-mode illumination subsystem with far-field and near-field LED illumination arrays driven by an automatic light exposure measurement and illumination control subsystem responsive to control activation signals generated by an automatic object presence and range detection subsystem.

Another object of the present invention is to provide a digital imaging-based bar code symbol reader employing an LED-based illumination subsystem driven by an automatic light exposure measurement and control subsystem responsive to control activation signals generated by an area-type image sensing array and an automatic object presence detection subsystem during object illumination and image capture operations.

Another object of the present invention is to provide a hand-supportable imaging-based bar code symbol reader employing an automatic light exposure measurement and illumination control subsystem which controls LED illumination driver circuitry to expose an automatically detected object to a field of narrow-band LED-based illumination only when substantially all rows of pixels in a CMOS image sensing array are in a state of integration, thereby capturing high quality digital images independent of the relative motion between said bar code symbol reader and the object.

Another object of the present invention is to provide a digital imaging-based bar code reading system wherein the time duration that an CMOS image sensing array is exposed to narrow-band illumination from an LED-based illumination array is managed by controlling the time that said LED-based illumination array generates narrow-band illumination in response to control activation signals generated by the CMOS image sensing array and an automatic object presence detection subsystem aboard said system.

Another object of the present invention is to provide a hand-supportable digital imaging-based bar code symbol reading system having a subsystem for automatically processing a captured digital image along a set of parallel virtual scan lines spaced-apart by a number of pixel-offset distances proportional to the maximum pixel height of the region of interest (roi) in the captured digital image containing a bar code symbol.

Another object of the present invention is to provide a digital imaging-based bar code symbol reading system employing a multi-mode image-processing symbol reading subsystem that switches its modes of reading during a single bar code symbol reading cycle, and within each said mode of reading, automatically applies a different image-processing based bar code symbol reading methodology.

Another object of the present invention is to provide a method of and system for determining the lower limit of decoding resolution in an imaging-based bar code symbol reader.

Another object of the present invention is to provide a hand-supportable digital imaging-based bar code symbol reading system employing a method of intelligently illuminating an object so as to generate a digital image thereof which is substantially free of noise caused by specular-type reflection of illumination off said object during illumination and imaging operations.

Another object of the present invention is to provide a hand-supportable semi-automatic digital imaging-based bar code symbol reading system realized upon a multi-tier modular software platform.

Another object of the present invention is to provide a digital imaging-based bar code symbol driven portable data terminal system.

Another object of the present invention is to provide a hand-supportable digital imaging-based bar code reading system wherein, during each imaging cycle, a single frame of pixel data is automatically detected by a CMOS area-type image sensing array when substantially all rows of pixels therein are in a state of integration and have a common integration time, and then pixel data is transmitted from said CMOS area-type image sensing array into a FIFO buffer, and then mapped into memory for subsequent image processing.

Another object of the present invention is to provide a method of automatic illumination control within a hand-supportable imager having an image sensing array with a field of view, and a LED-based illumination subsystem, wherein the method employs a software-based image illumination metering program that involves analyzing the spatial intensity of a captured image.

Another object of the present invention is to provide a hand-supportable digital imaging-based bar code symbol reading device comprising an automatic light exposure measurement and illumination control subsystem and a software-based illumination metering program, for improve illumination control.

Another object of the present invention is to provide a hand-supportable digital image-processing based bar code symbol reading system employing an image cropping zone (ICZ) framing and post-image capture cropping process.

These and other objects of the present invention will become more apparently understood hereinafter and in the Claims to Invention appended hereto.

BRIEF DESCRIPTION OF THE DRAWINGS OF PRESENT INVENTION

For a more complete understanding of how to practice the Objects of the Present Invention, the following Detailed Description of the Illustrative Embodiments can be read in conjunction with the accompanying Drawings, briefly described below.

Figure 1A:
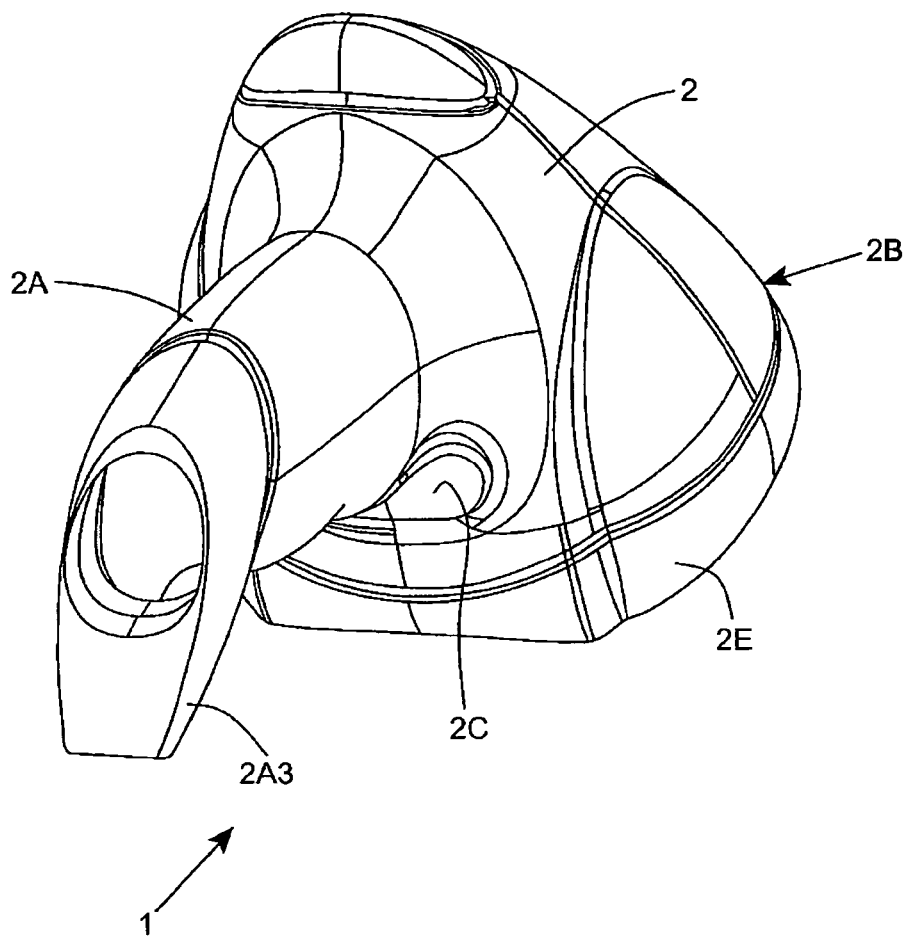
FIG. 1A is a rear perspective view of the hand-supportable digital imaging-based bar code symbol reading device of the first illustrative embodiment of the present invention.
Figure 1B:
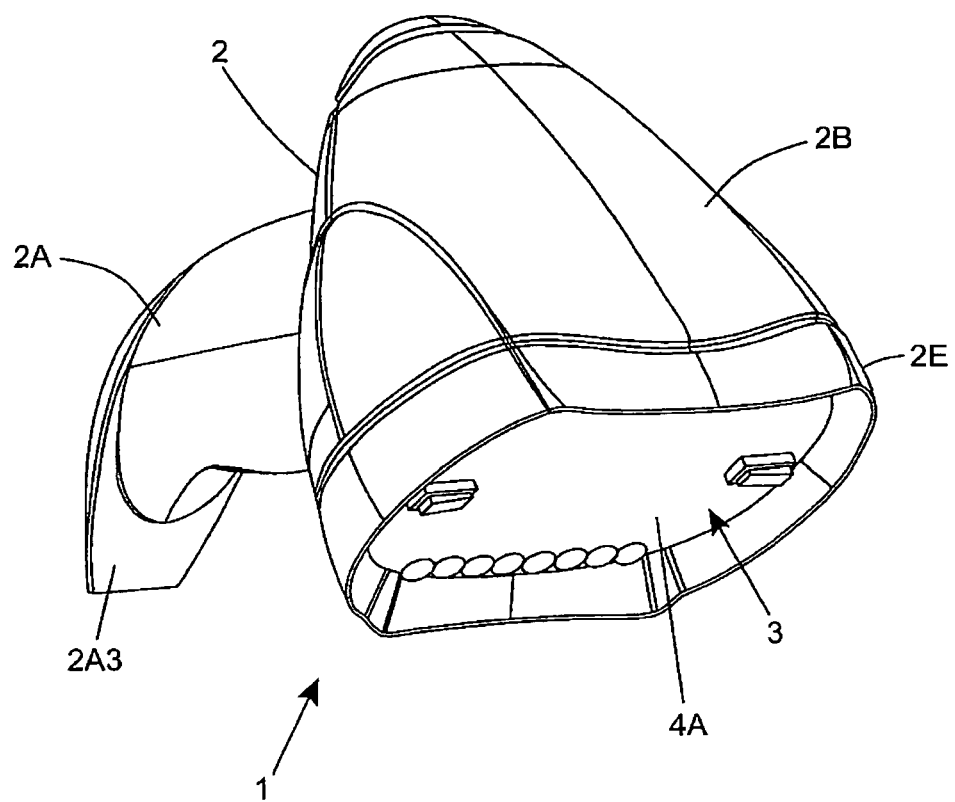
FIG. 1B is a front perspective view of the hand-supportable digital imaging-based bar code symbol reading device of the first illustrative embodiment of the present invention.
Figure 1C:
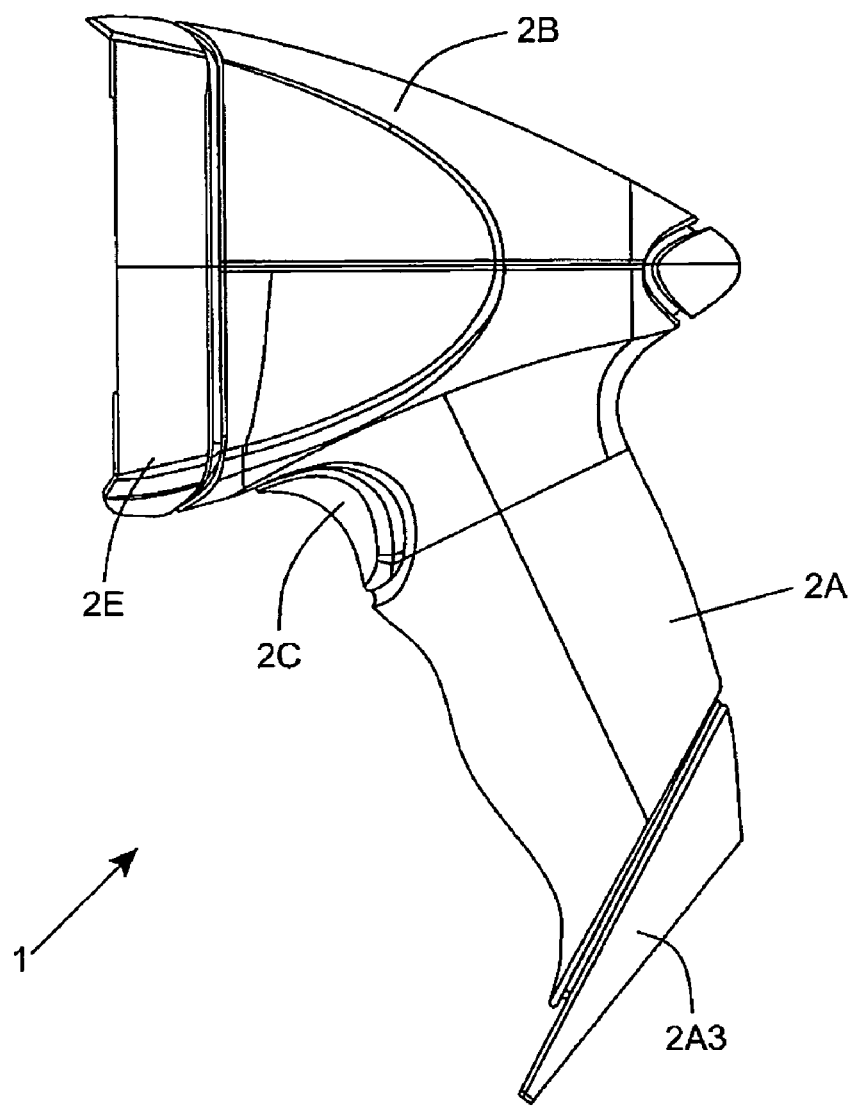
FIG. 1C is an elevated left side view of the hand-supportable digital imaging-based bar code symbol reading device of the first illustrative embodiment of the present invention.
Figure 1D:
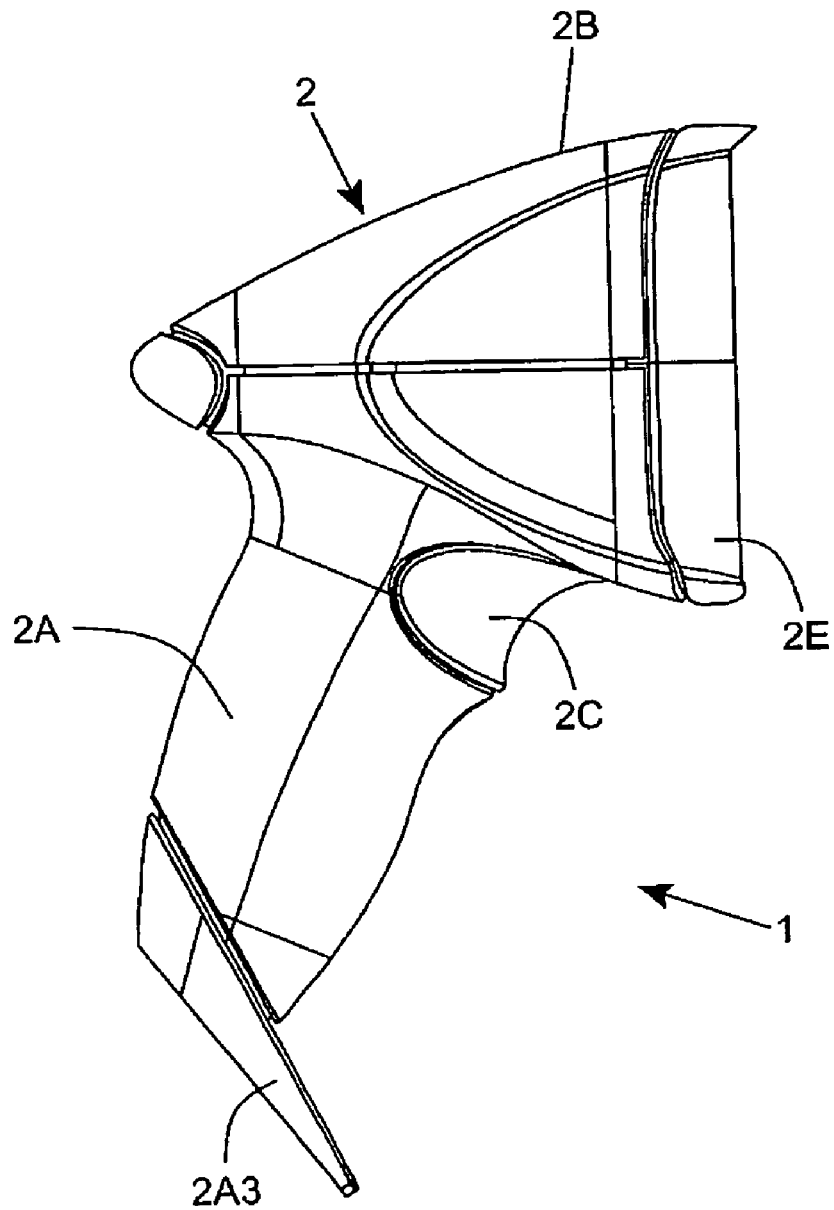
FIG. 1D is an elevated right side view of the hand-supportable digital imaging-based bar code symbol reading device of the first illustrative embodiment of the present invention.
Figure 1E:
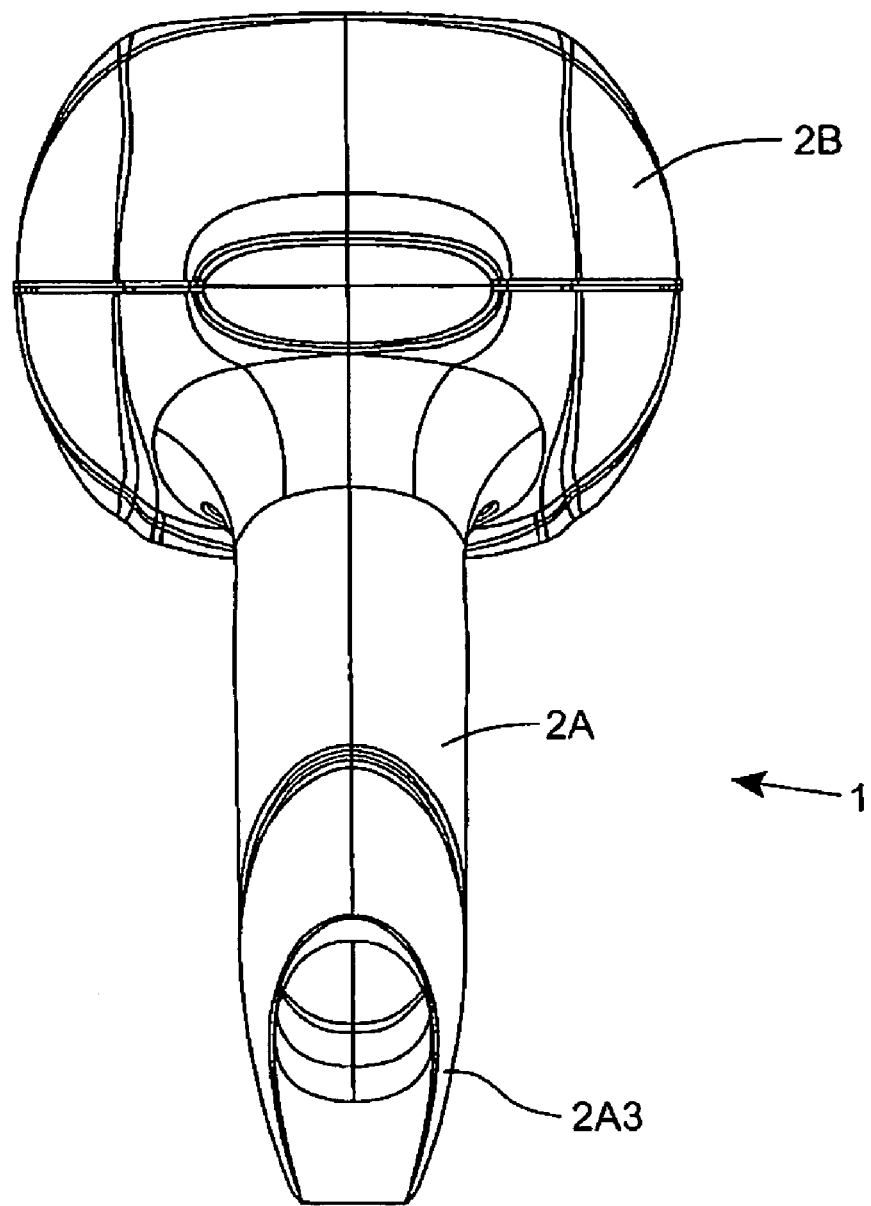
FIG. 1E is an elevated rear view of the hand-supportable digital imaging-based bar code symbol reading device of the first illustrative embodiment of the present invention.
Figure 1F:
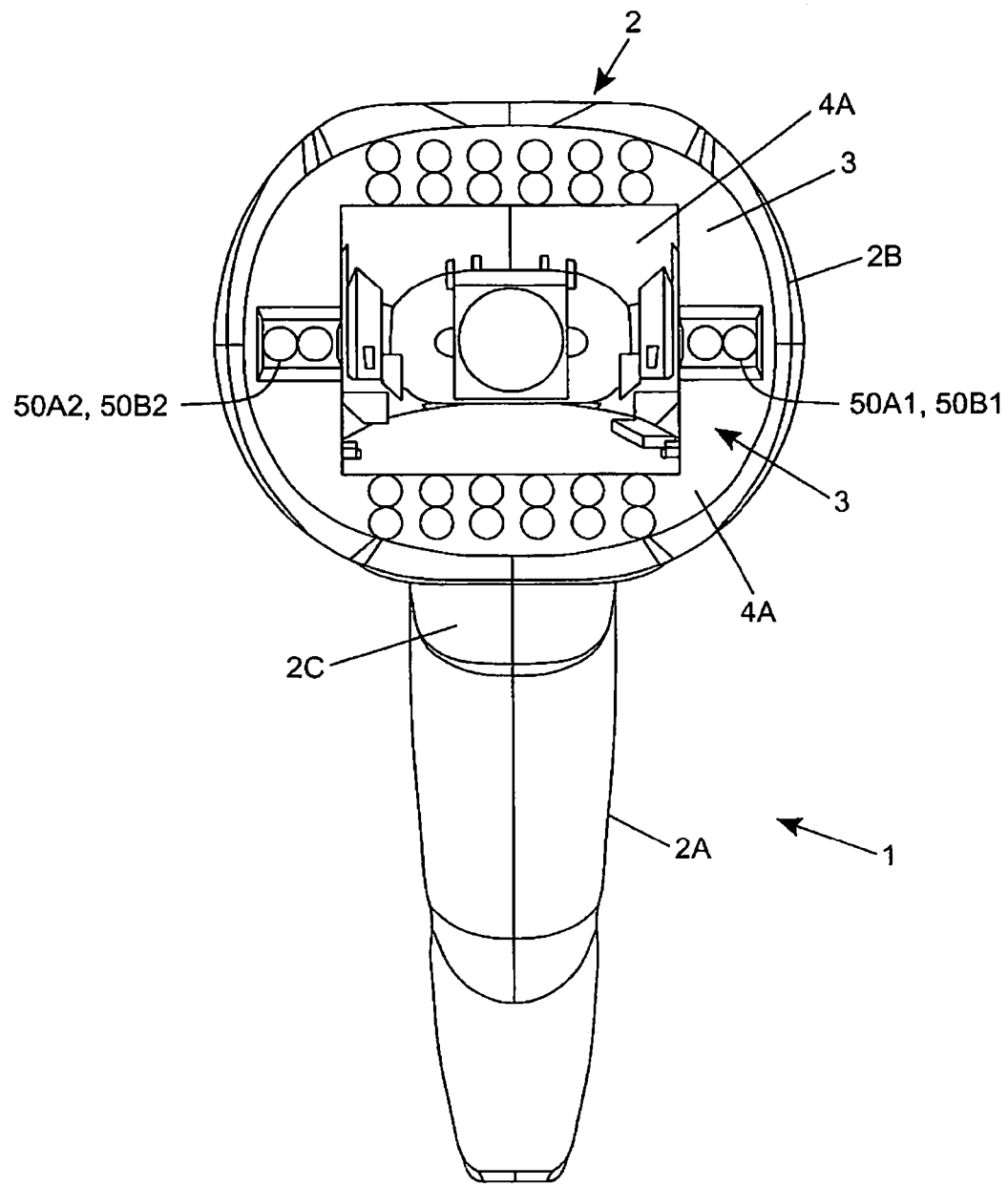
FIG. 1F is an elevated front view of the hand-supportable digital imaging-based bar code symbol reading device of the first illustrative embodiment of the present invention, showing components associated with its illumination subsystem and its image capturing subsystem.
Figure 1G:
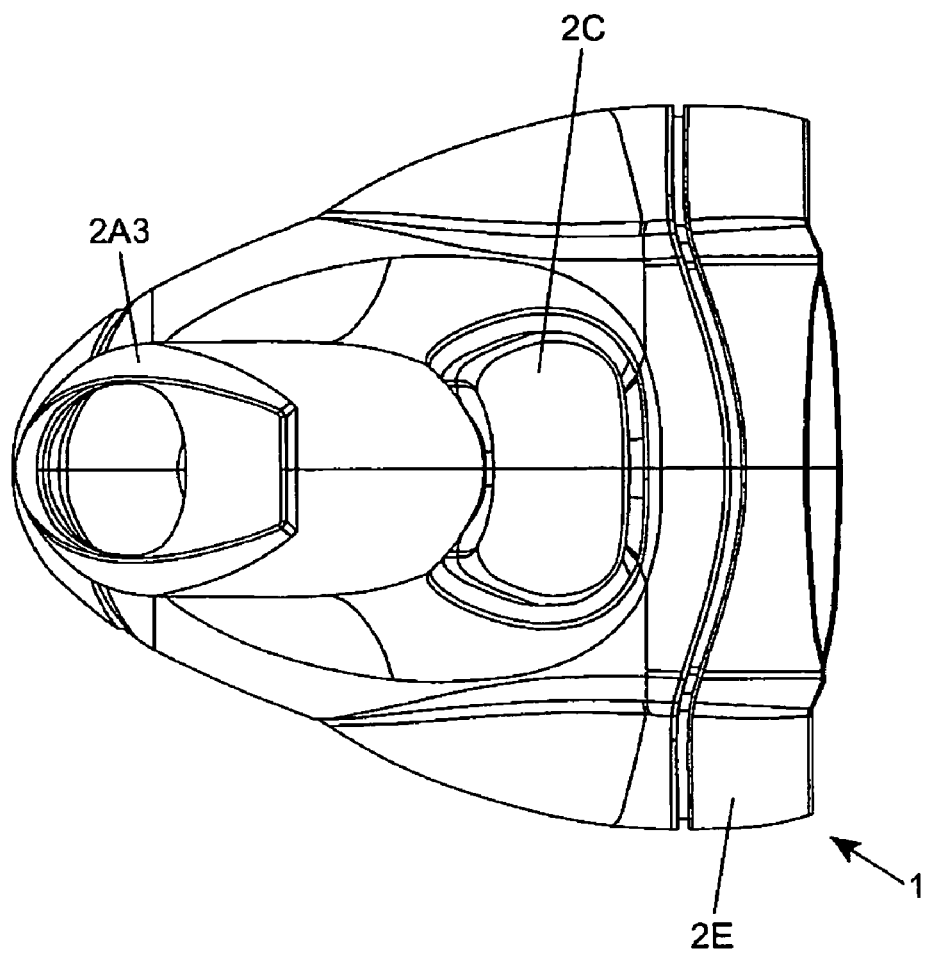
FIG. 1G is a bottom view of the hand-supportable digital imaging-based bar code symbol reading device of the first illustrative embodiment of the present invention.
Figure 1H:
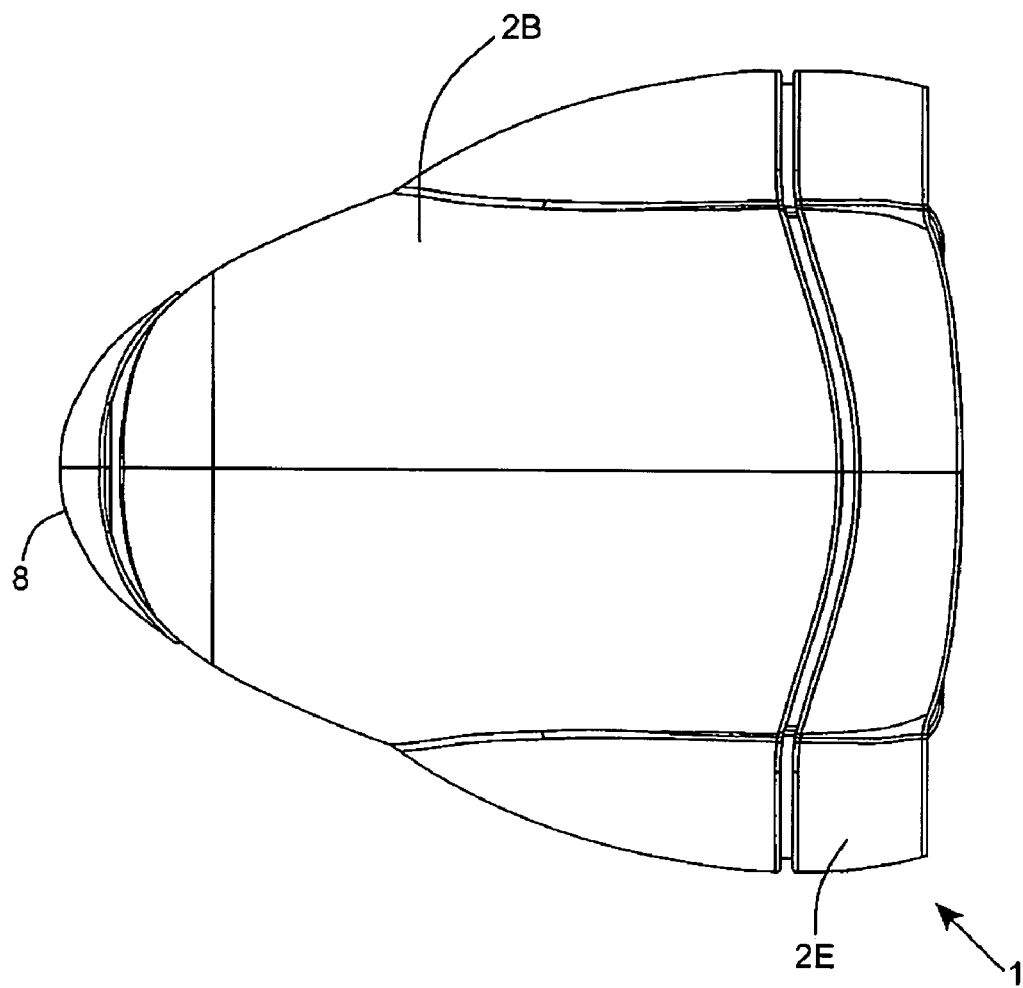
FIG. 1H is a top rear view of the hand-supportable digital imaging-based bar code symbol reading device of the first illustrative embodiment of the present invention.
Figure 2B:
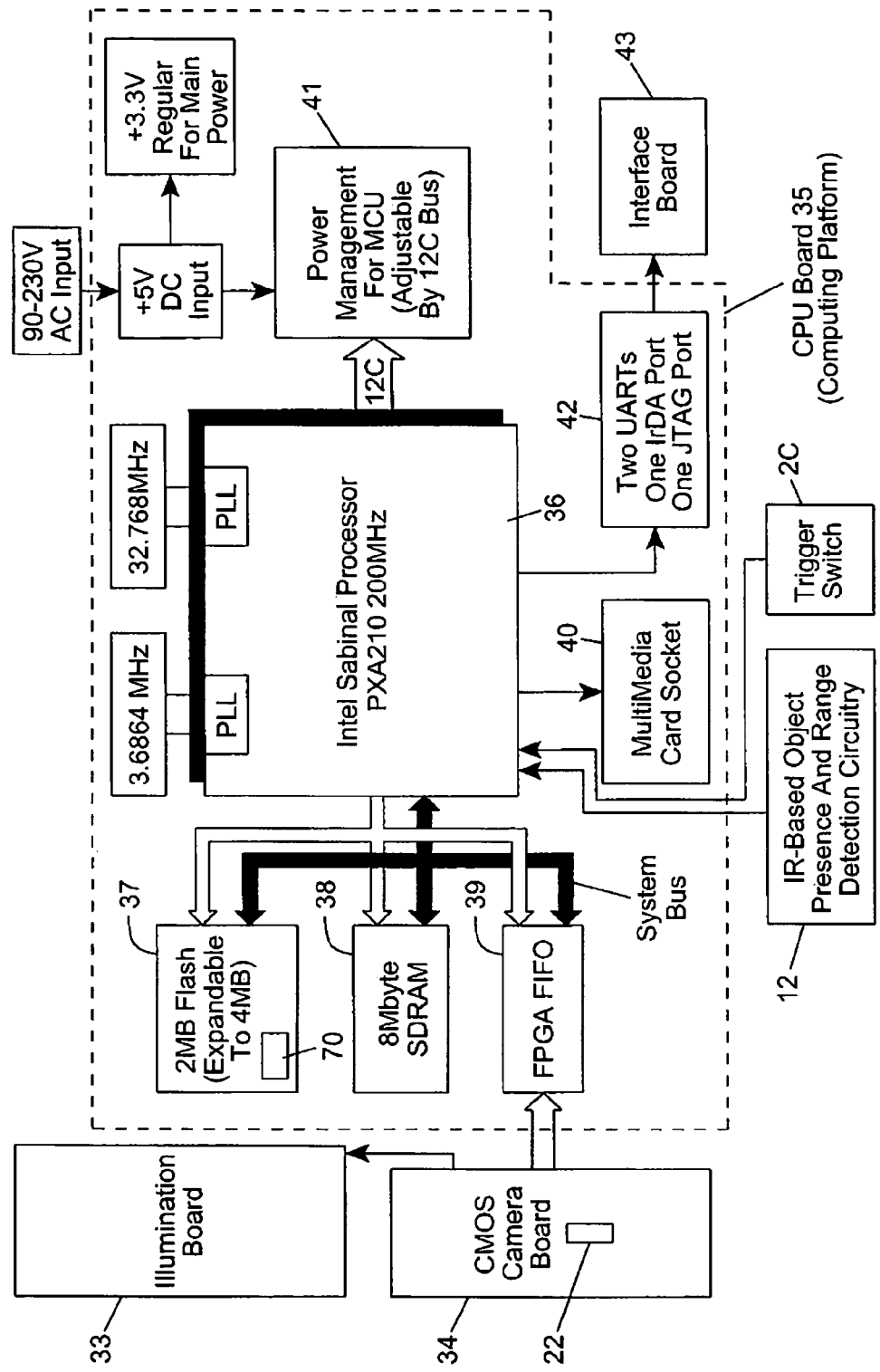
Figure 3A:
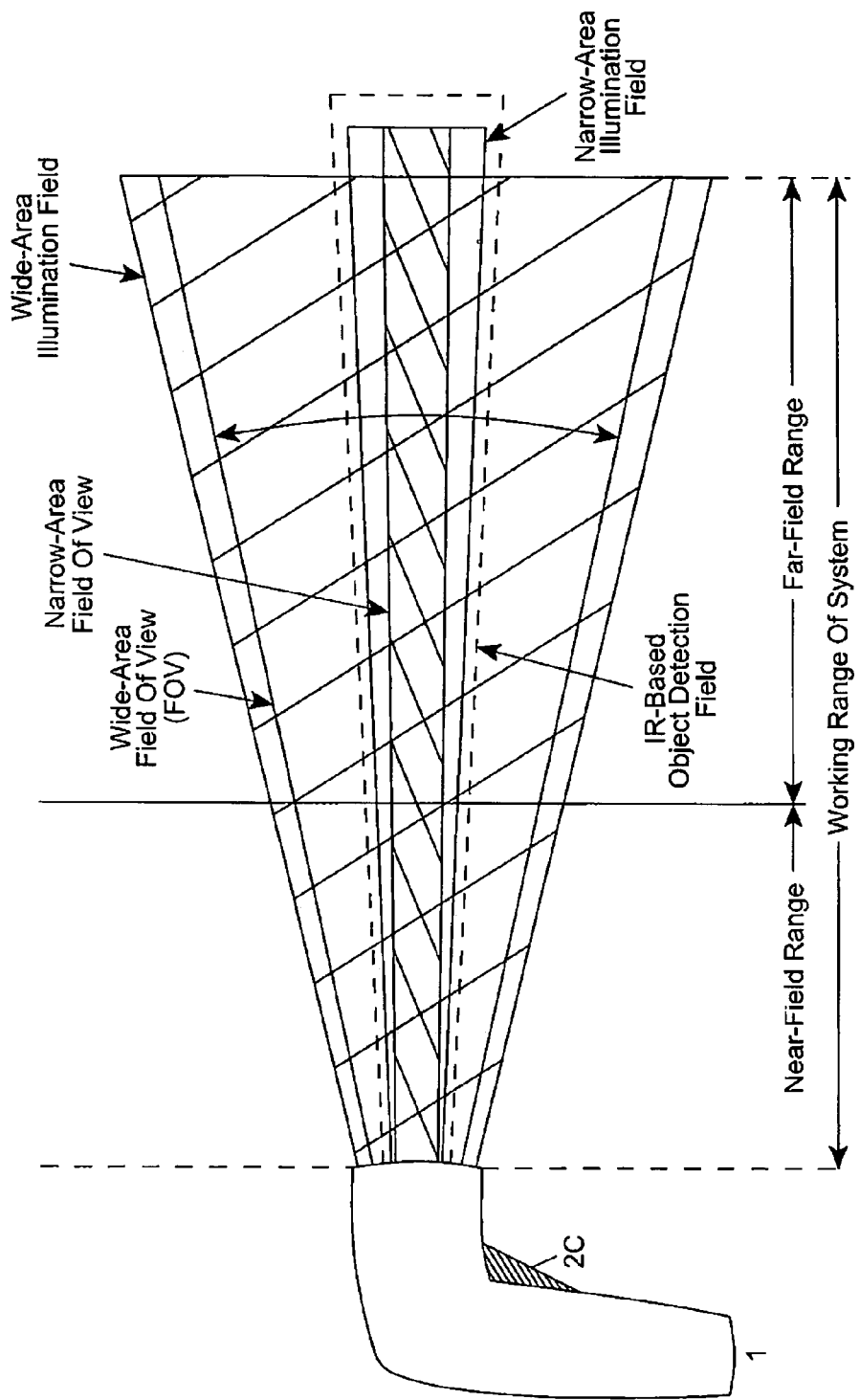
Figure 3B:
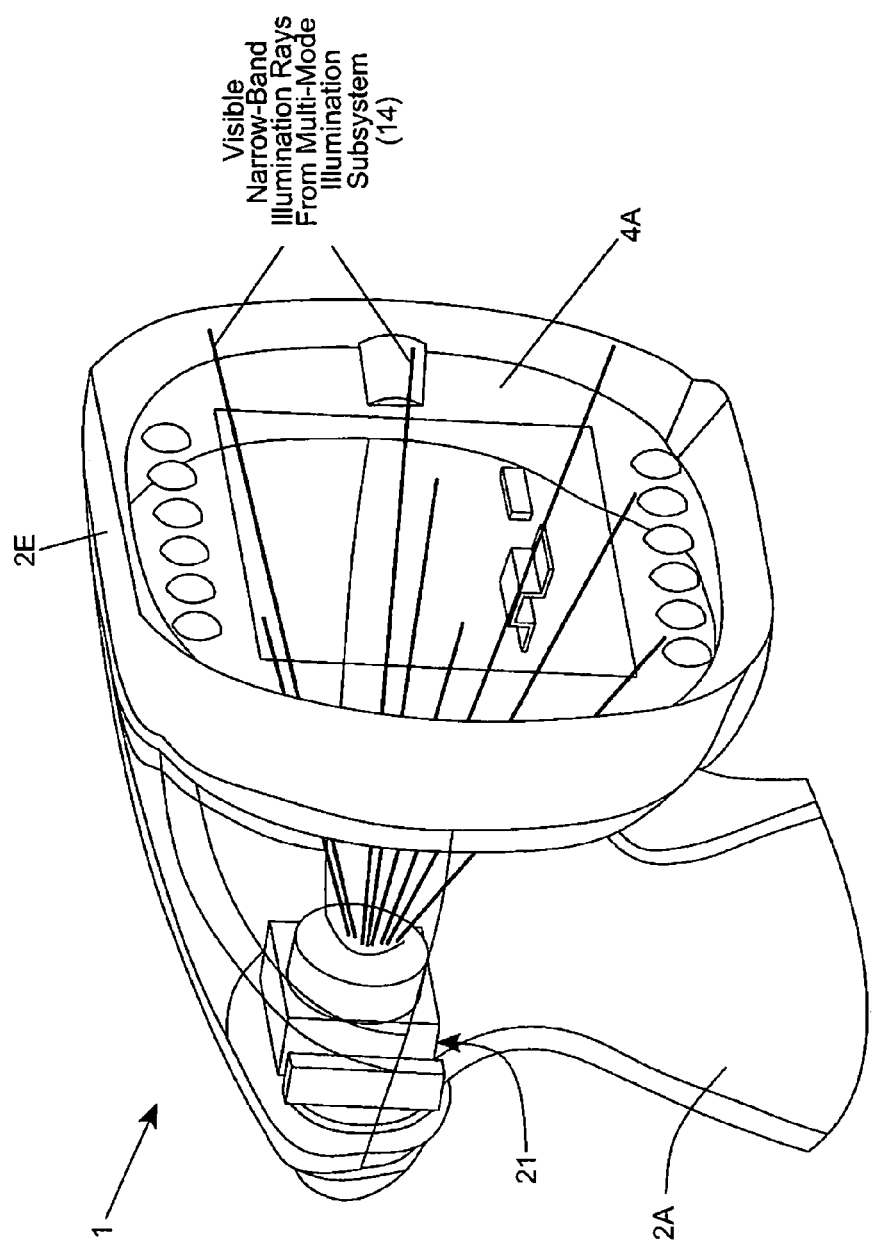
Figure 3C:
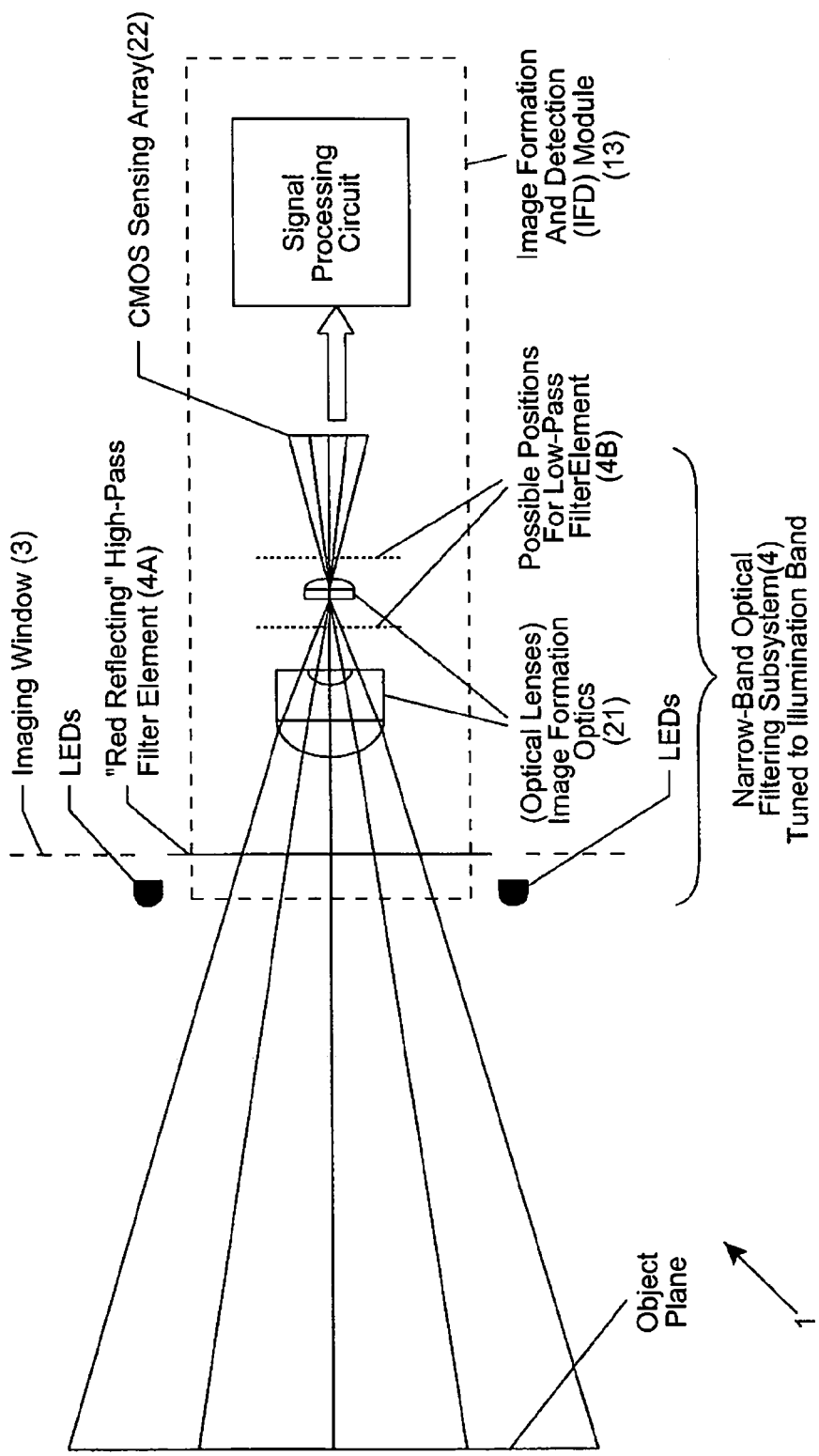
Figure 3D:
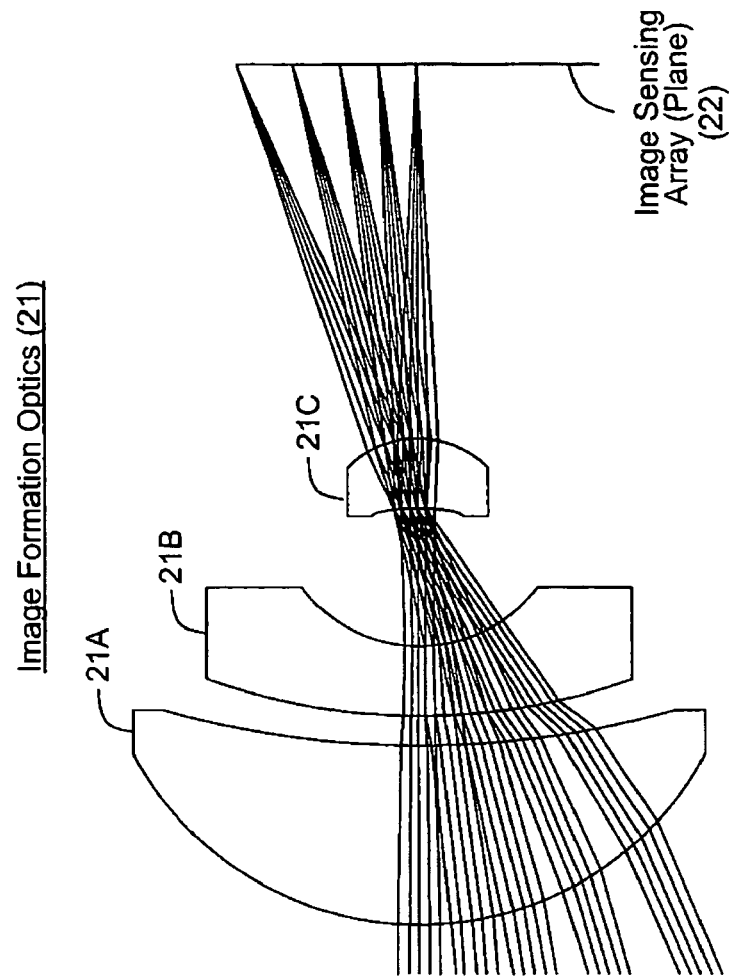
Figure 3E:
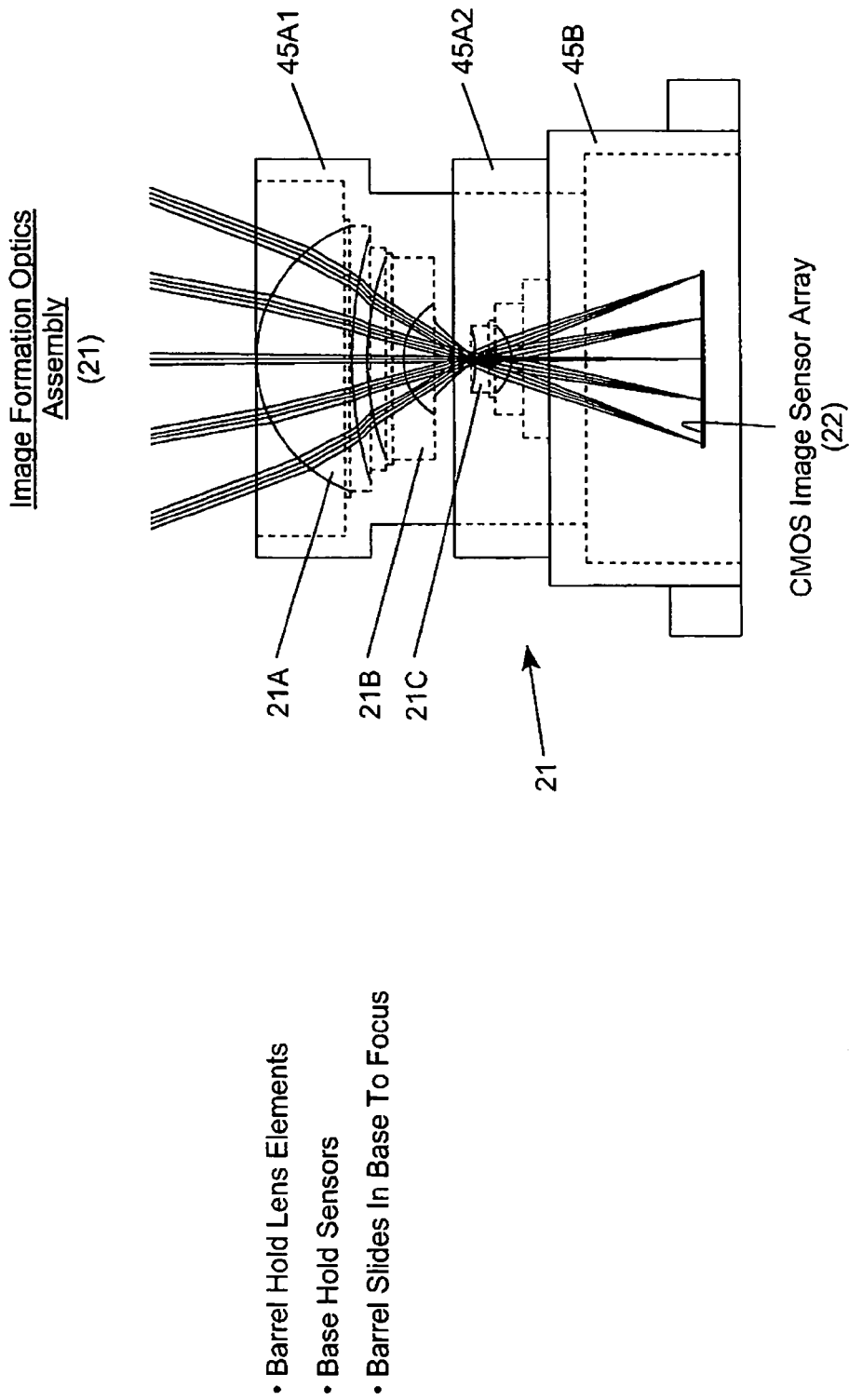
Figure 3G:
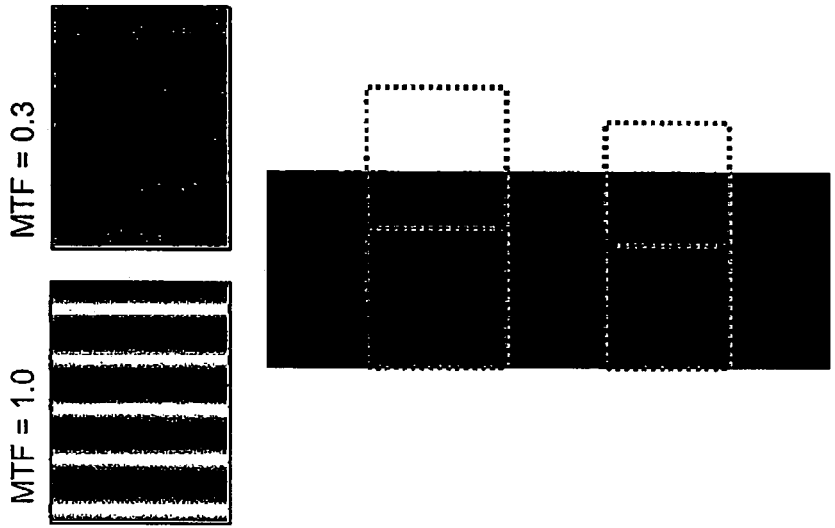
Figure 4A:
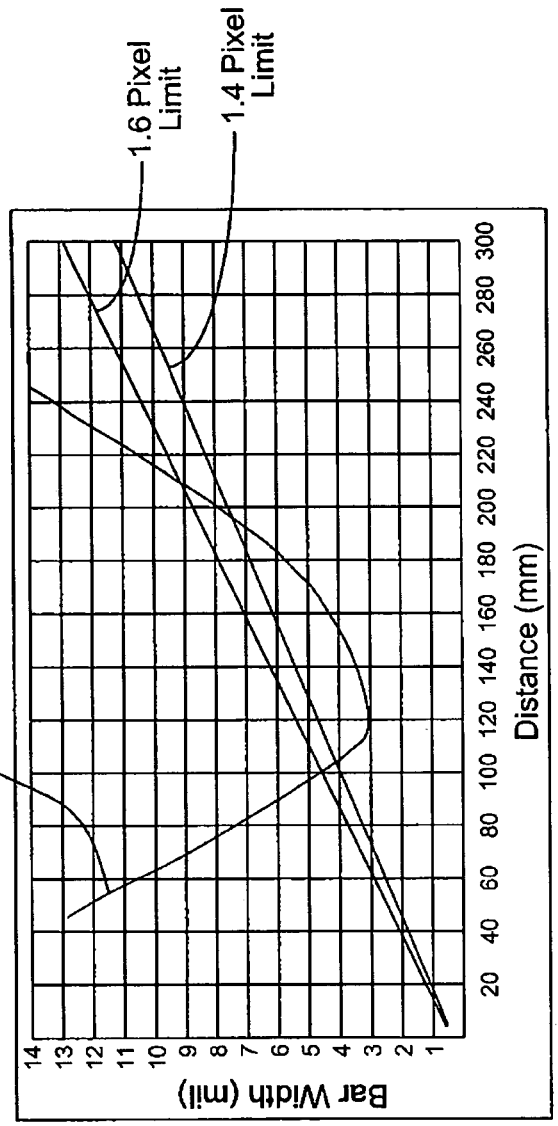
Figure 4B:
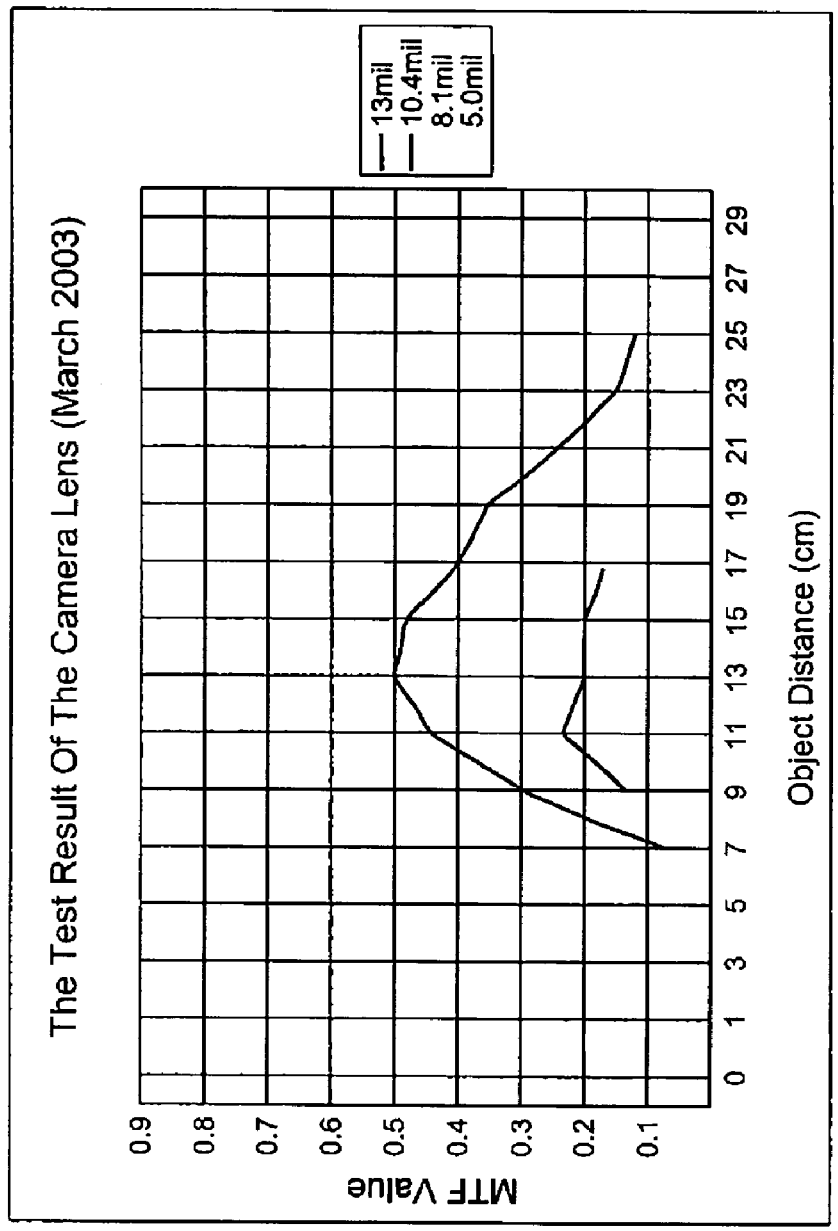
Figure 4C:
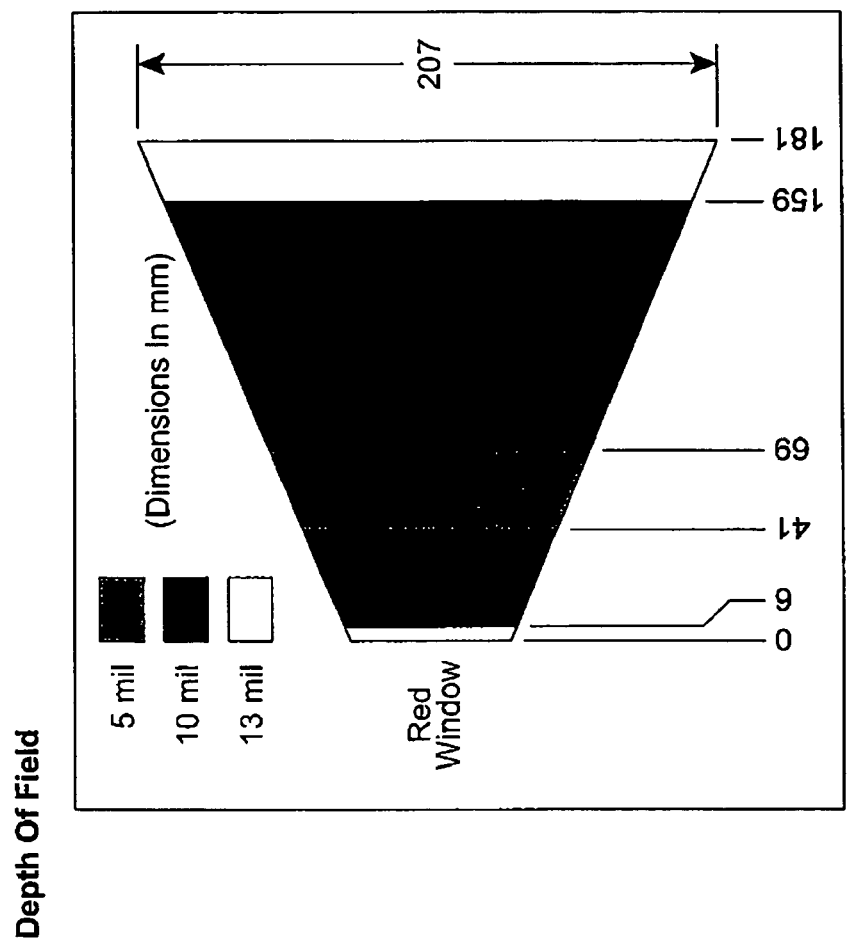
Figure 4D:
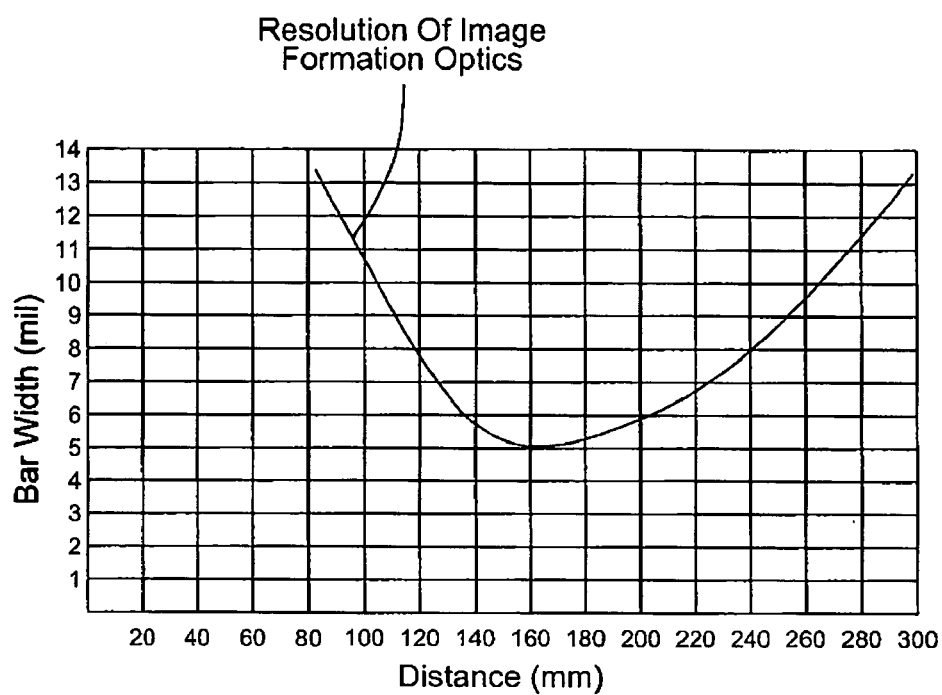
Figure 4E:
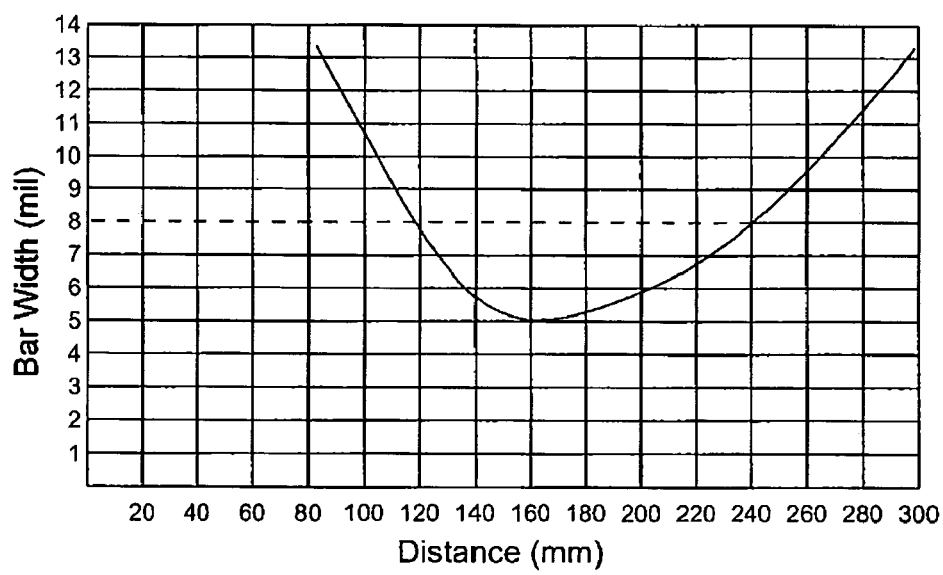
Figure 4F:
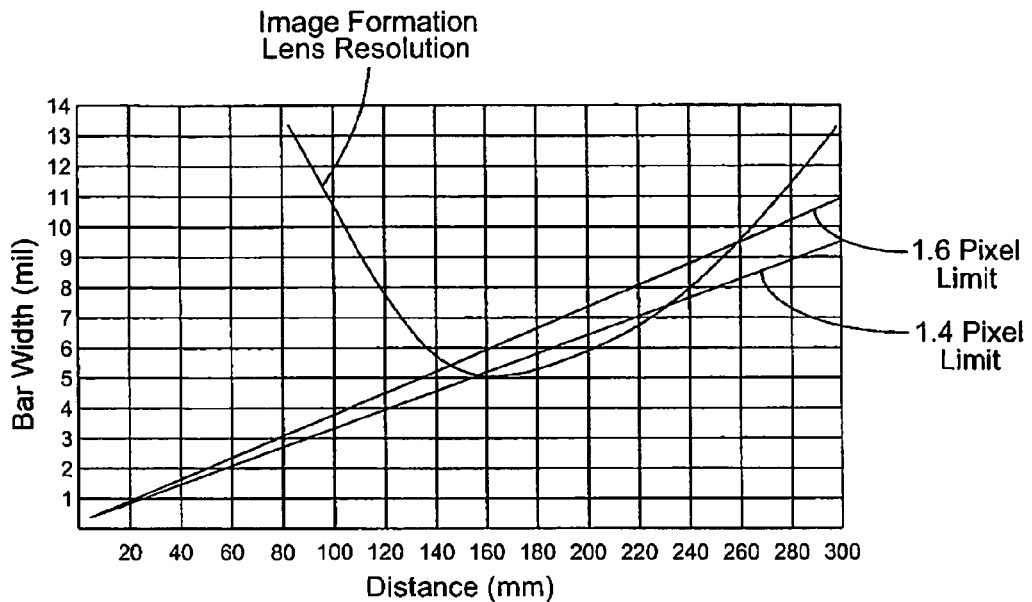
Figure 4G:
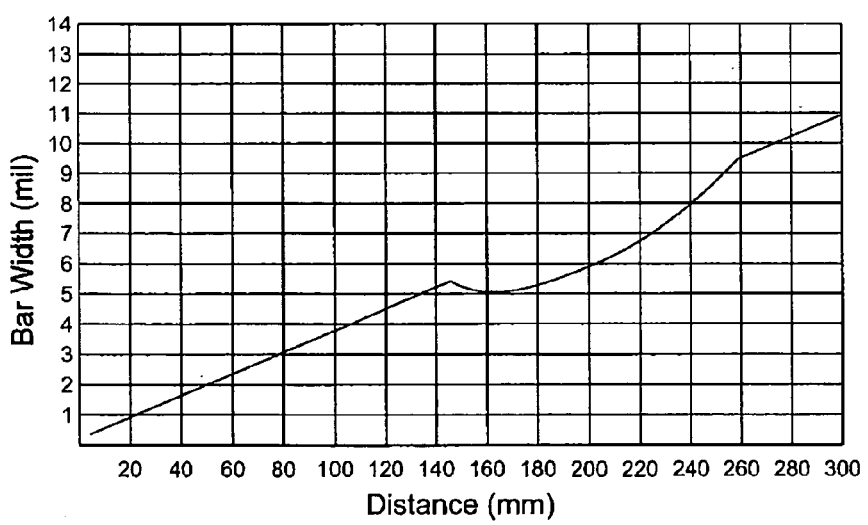
Figure 4H:
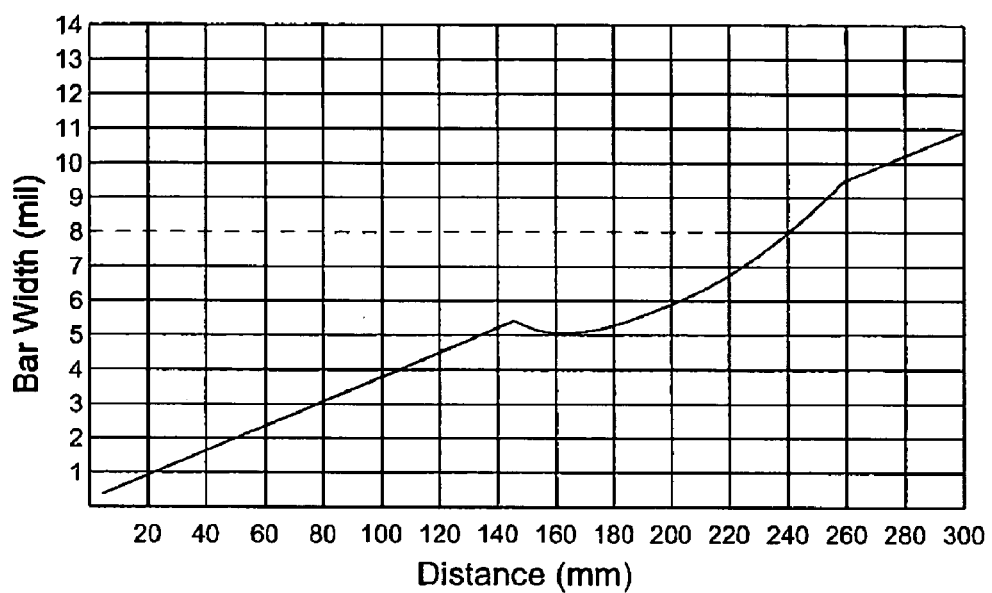
Figure 5B:
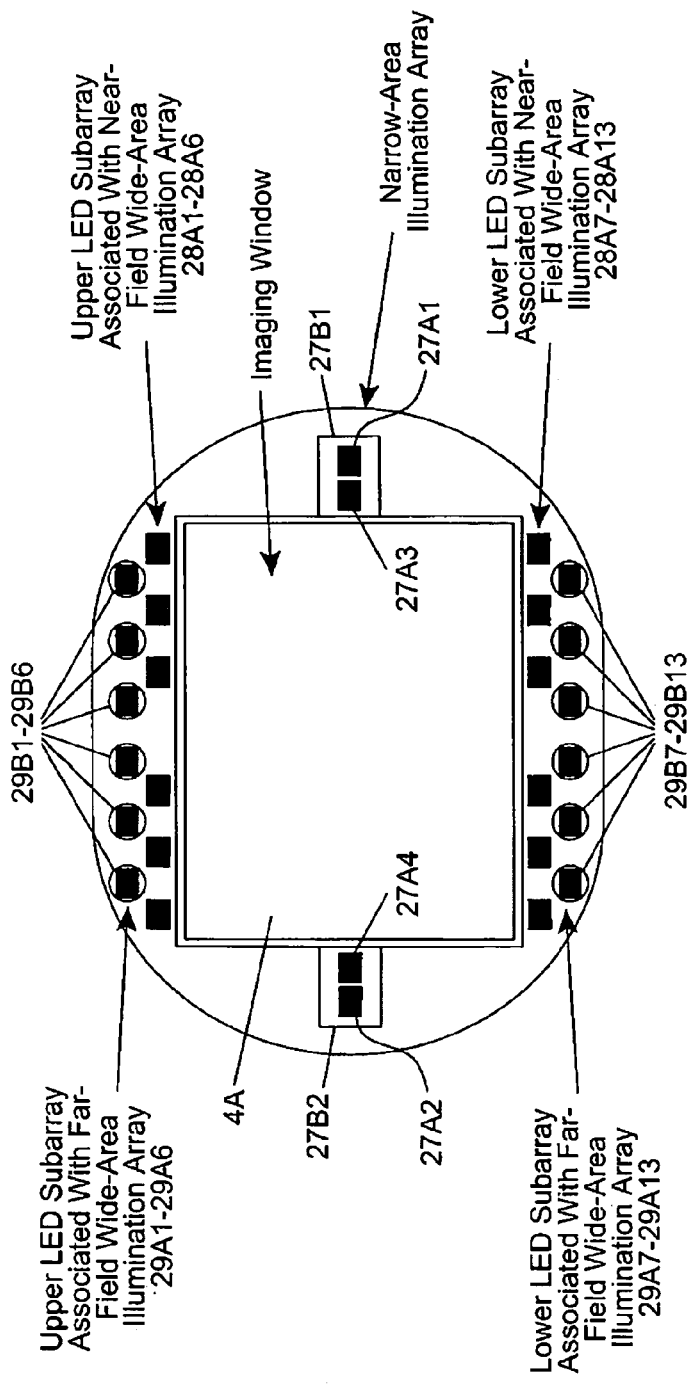
Figure 7A:
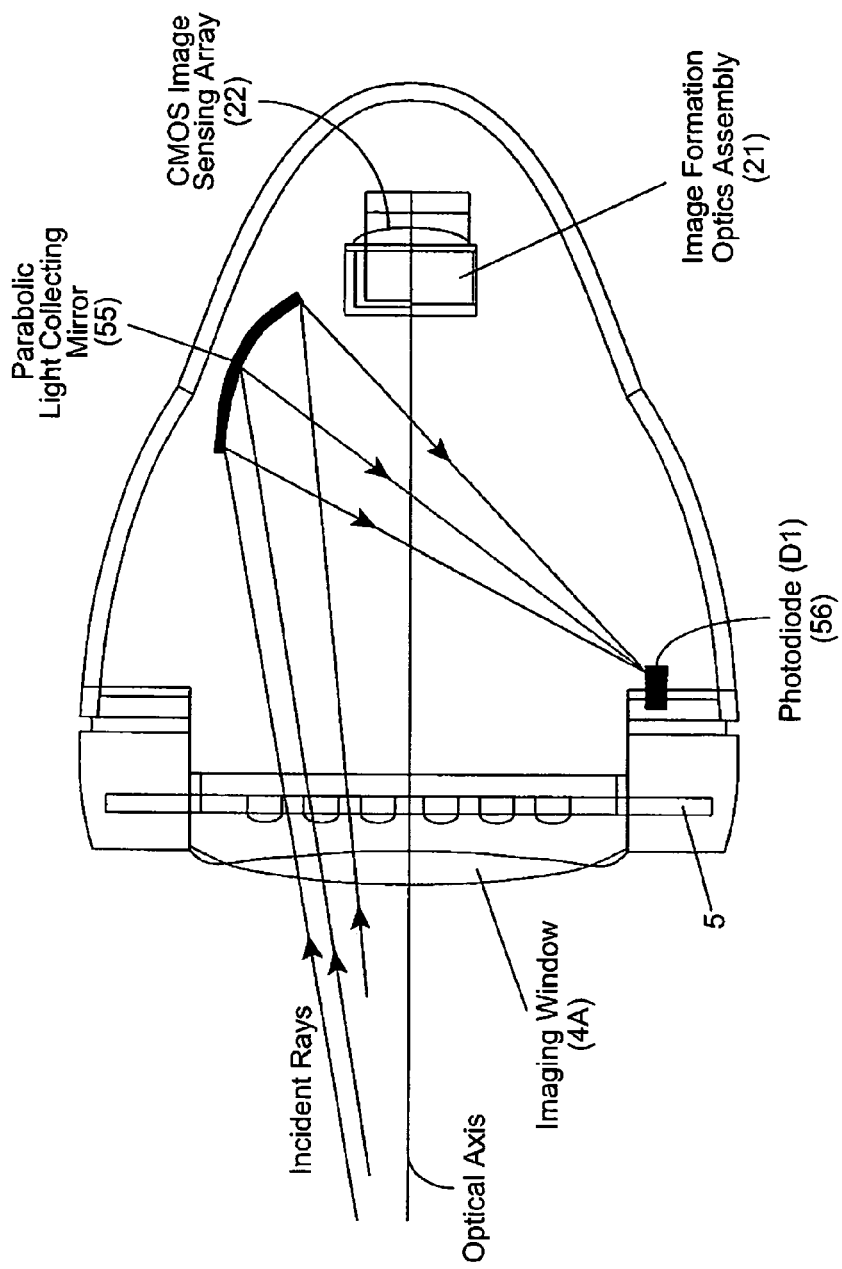
Figure 7B:
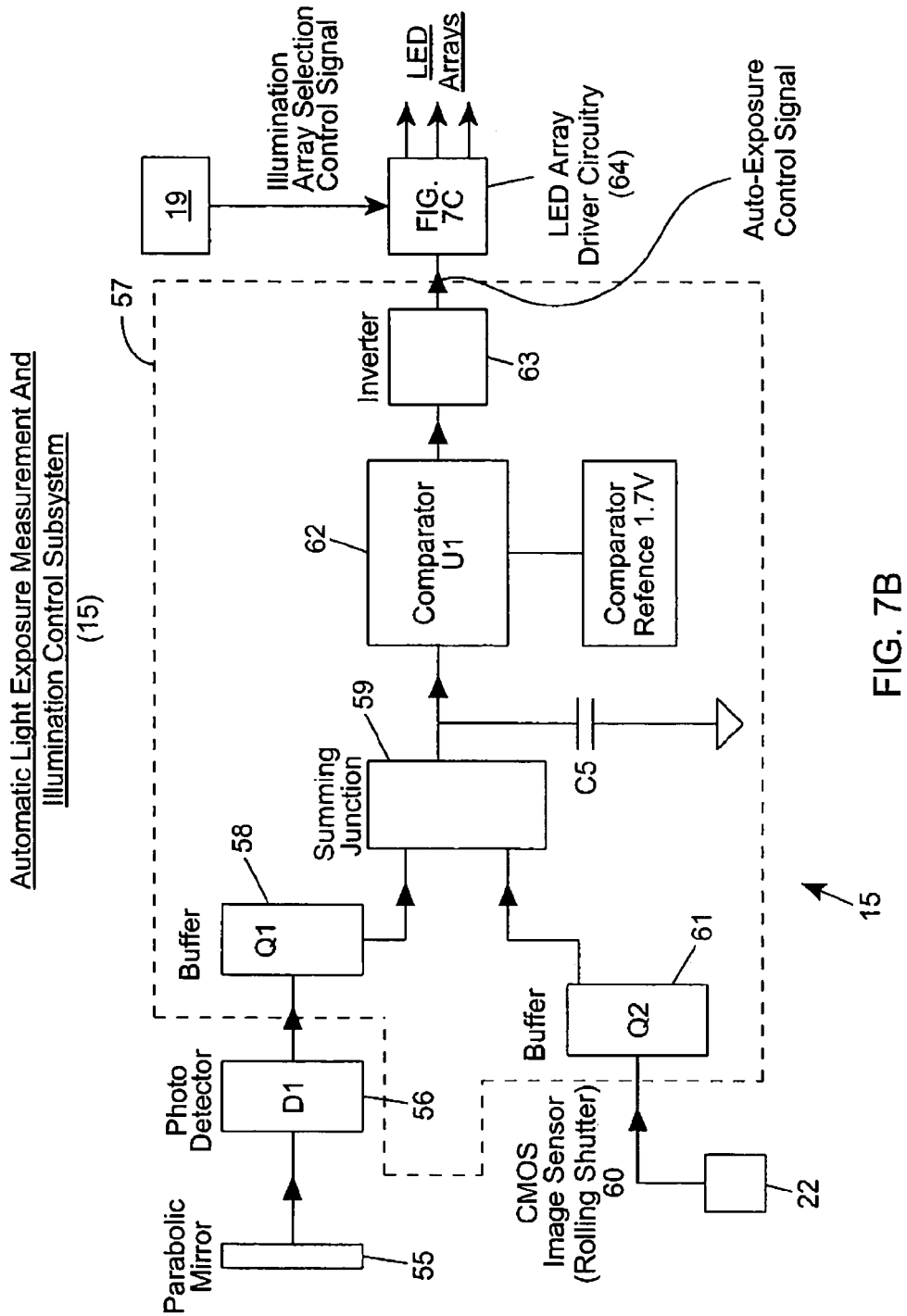
Figure 7D:
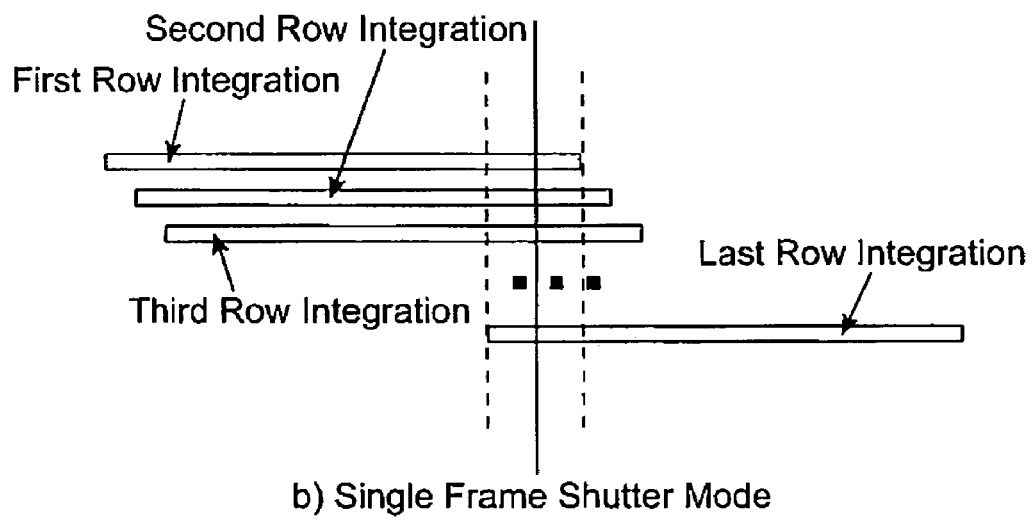
Figure 8:
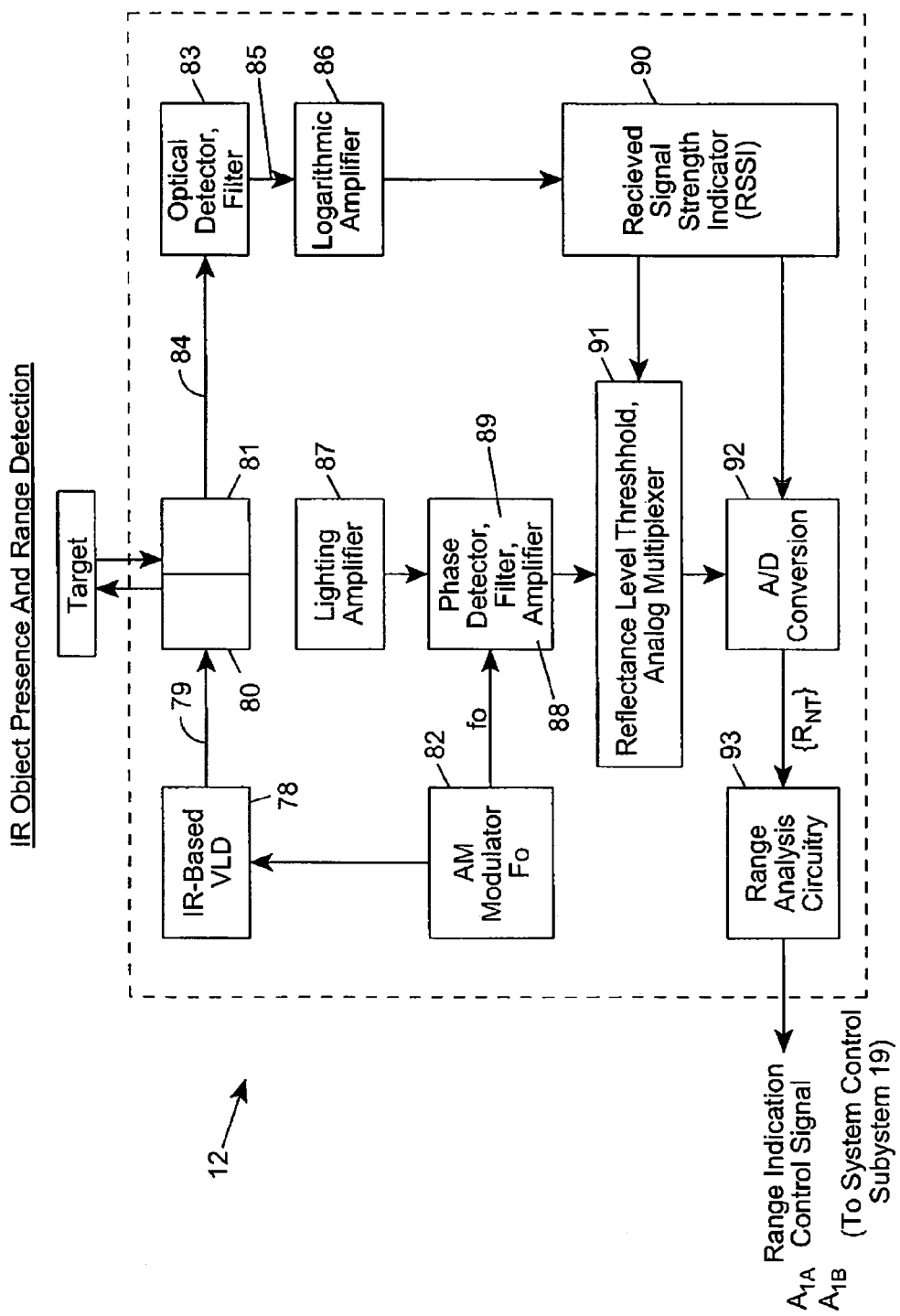
Figure 9:
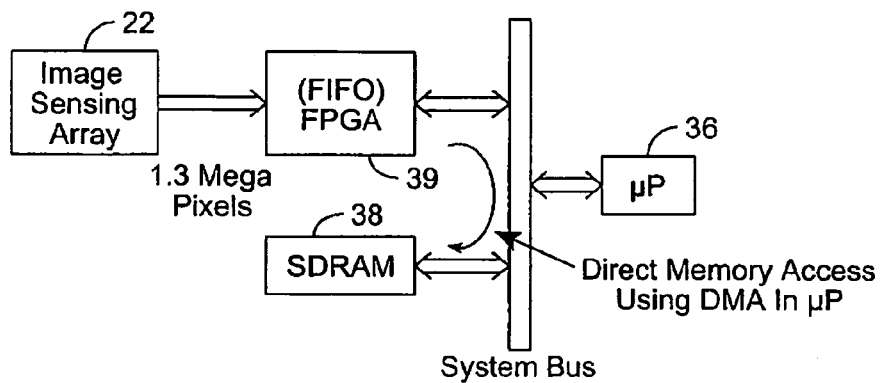
Figure 10:
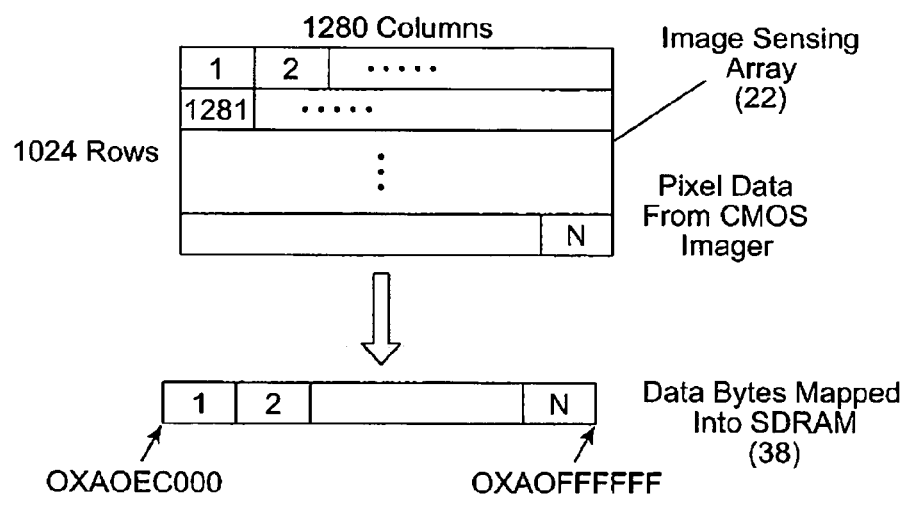
Figure 11:
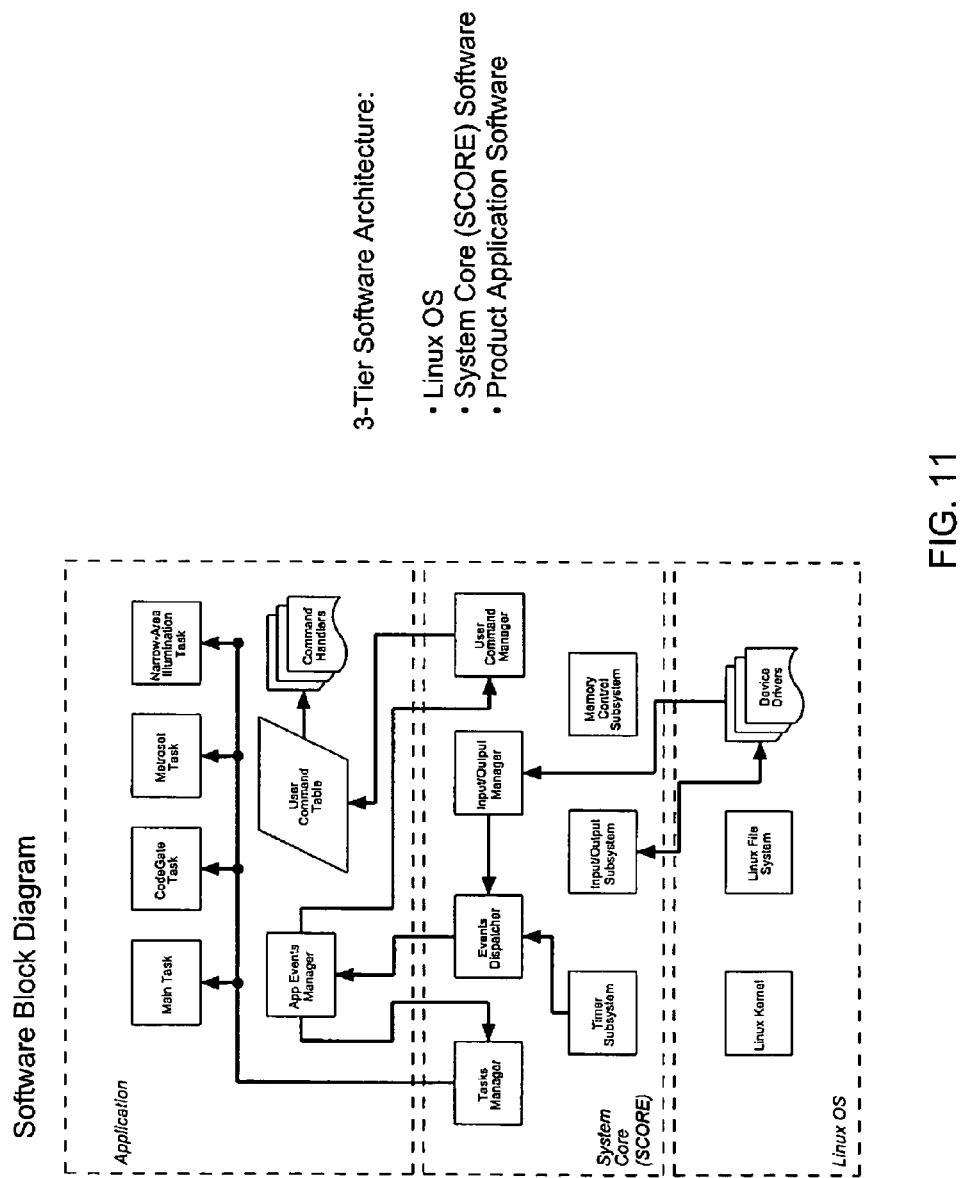
Figure 13A:
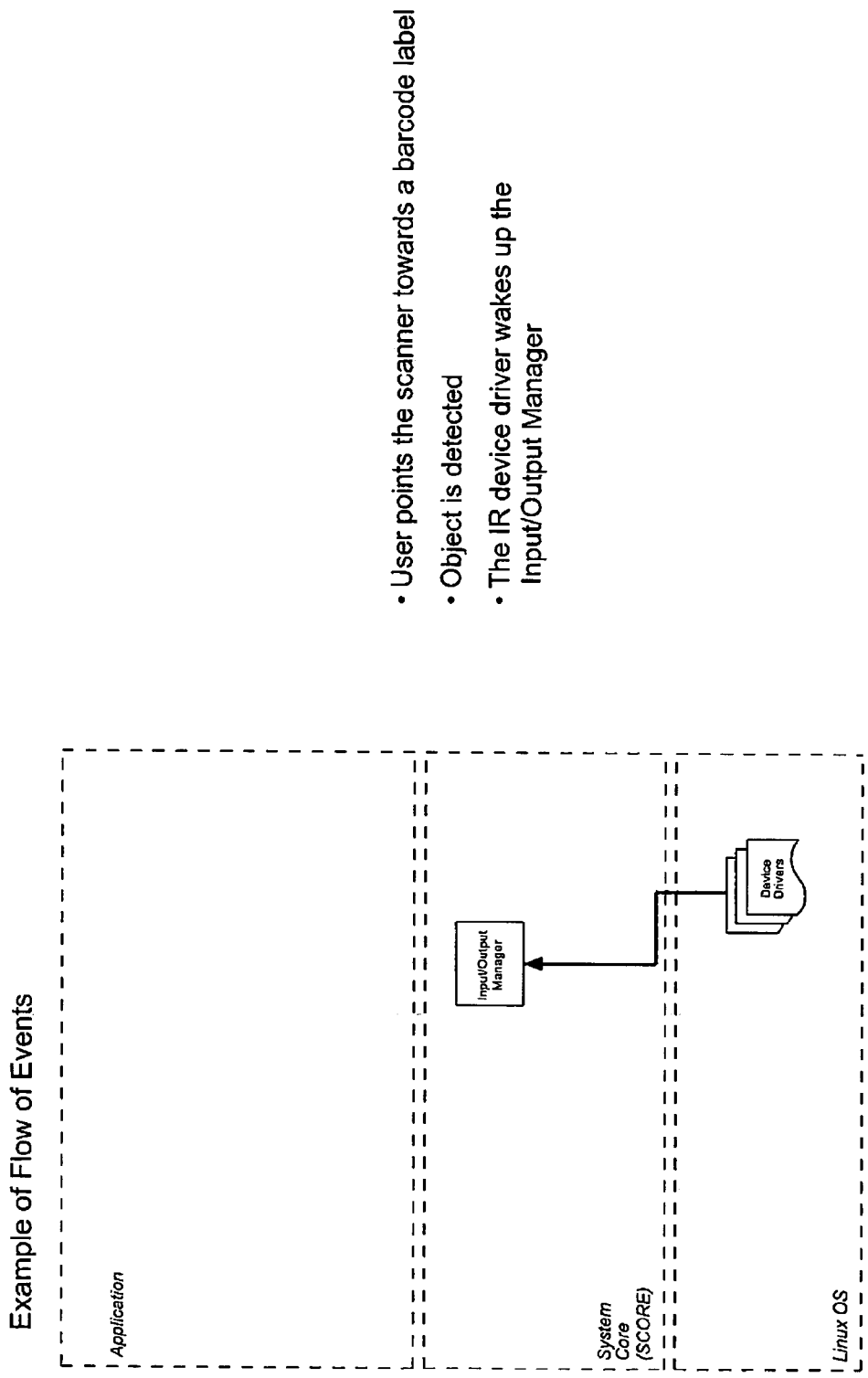
Figure 13B:
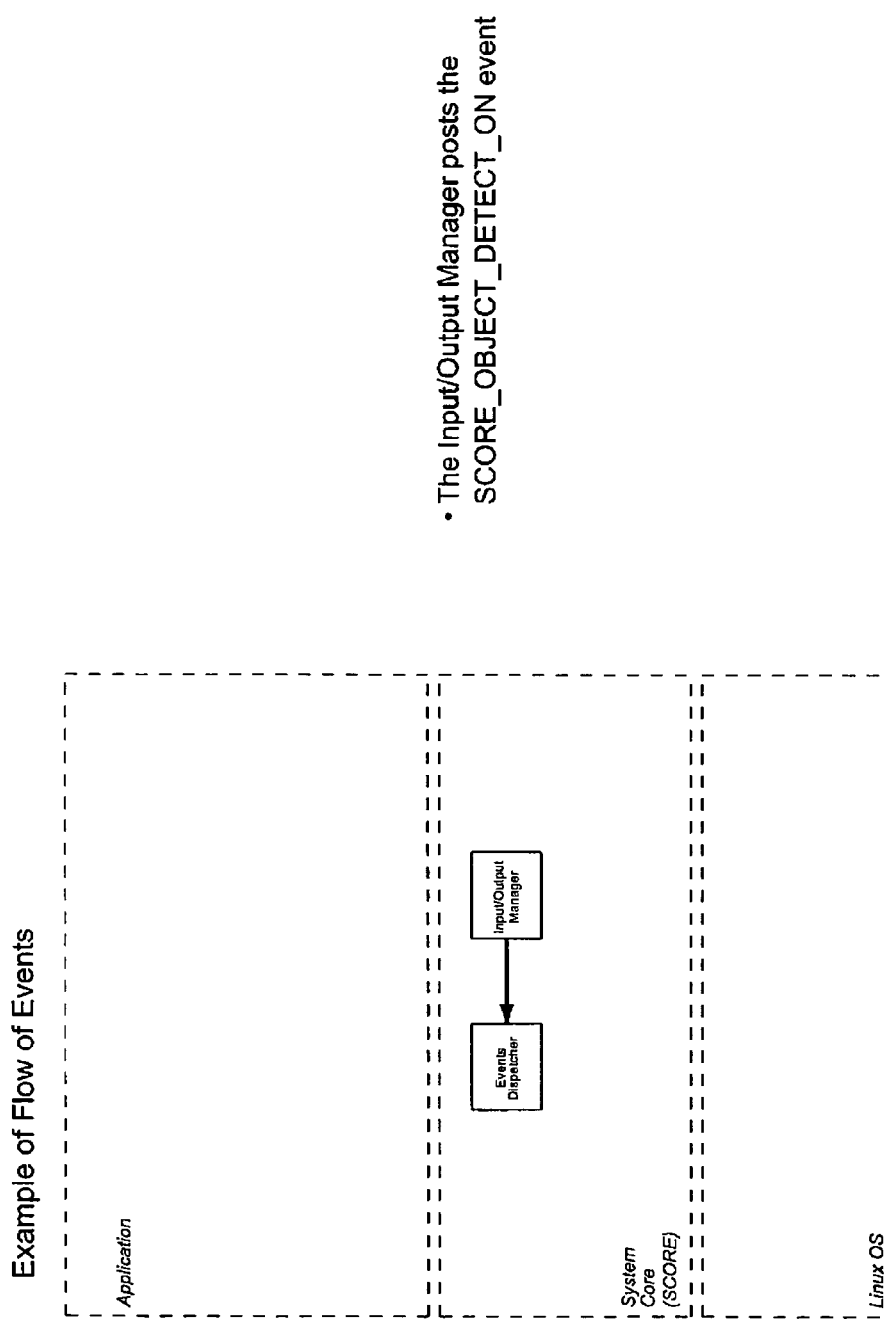
Figure 13C:
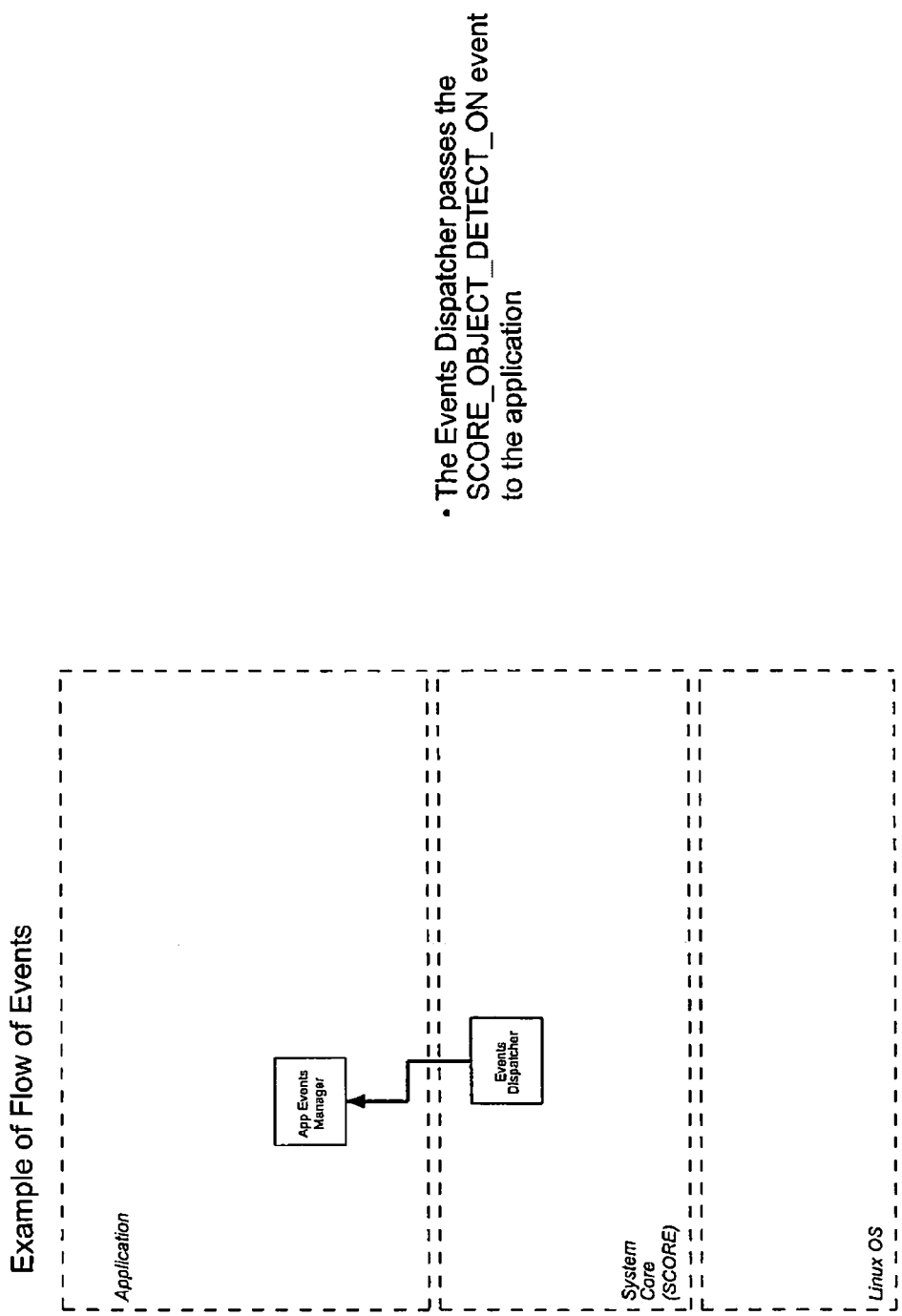
Figure 13D:
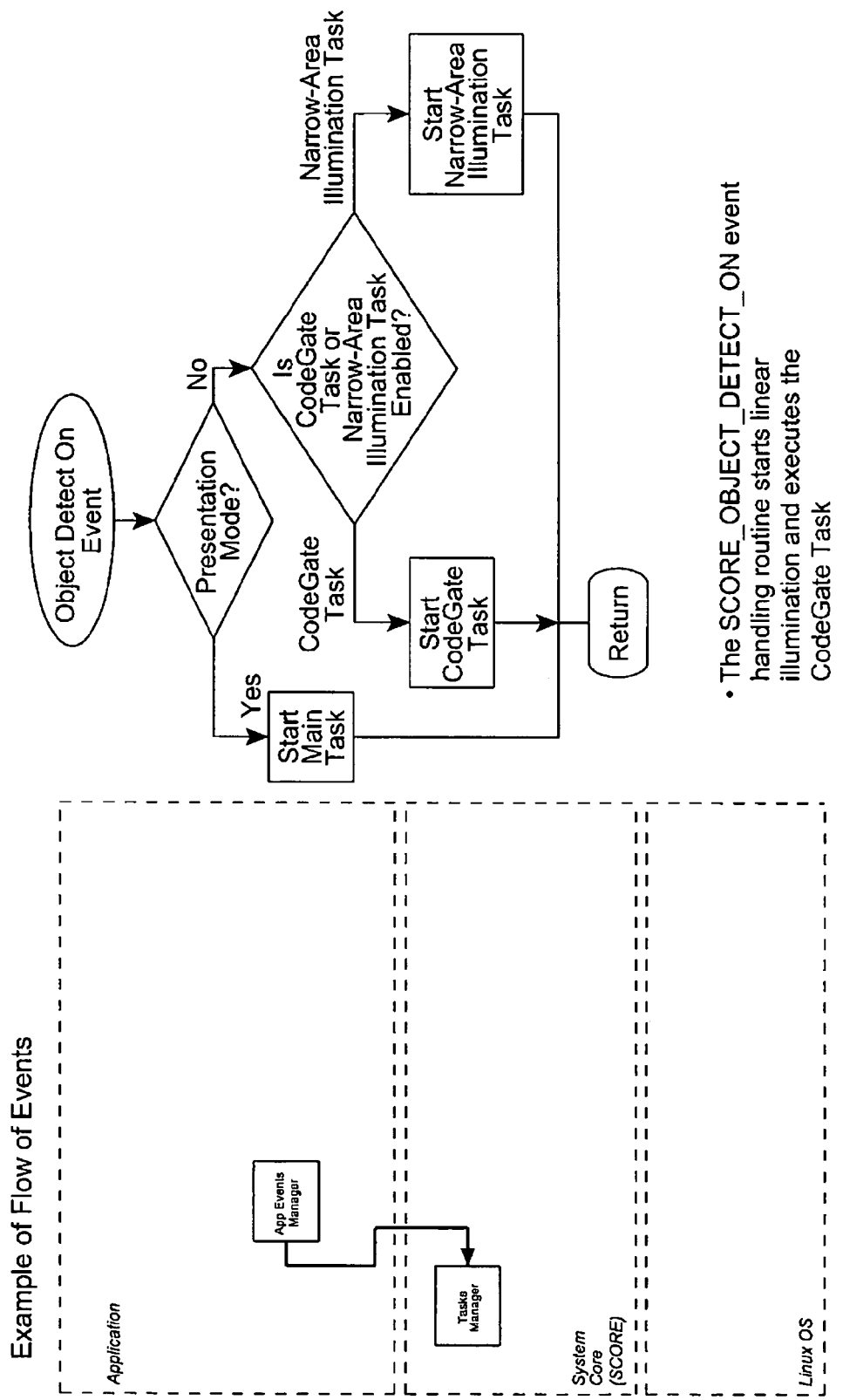
Figure 13E:
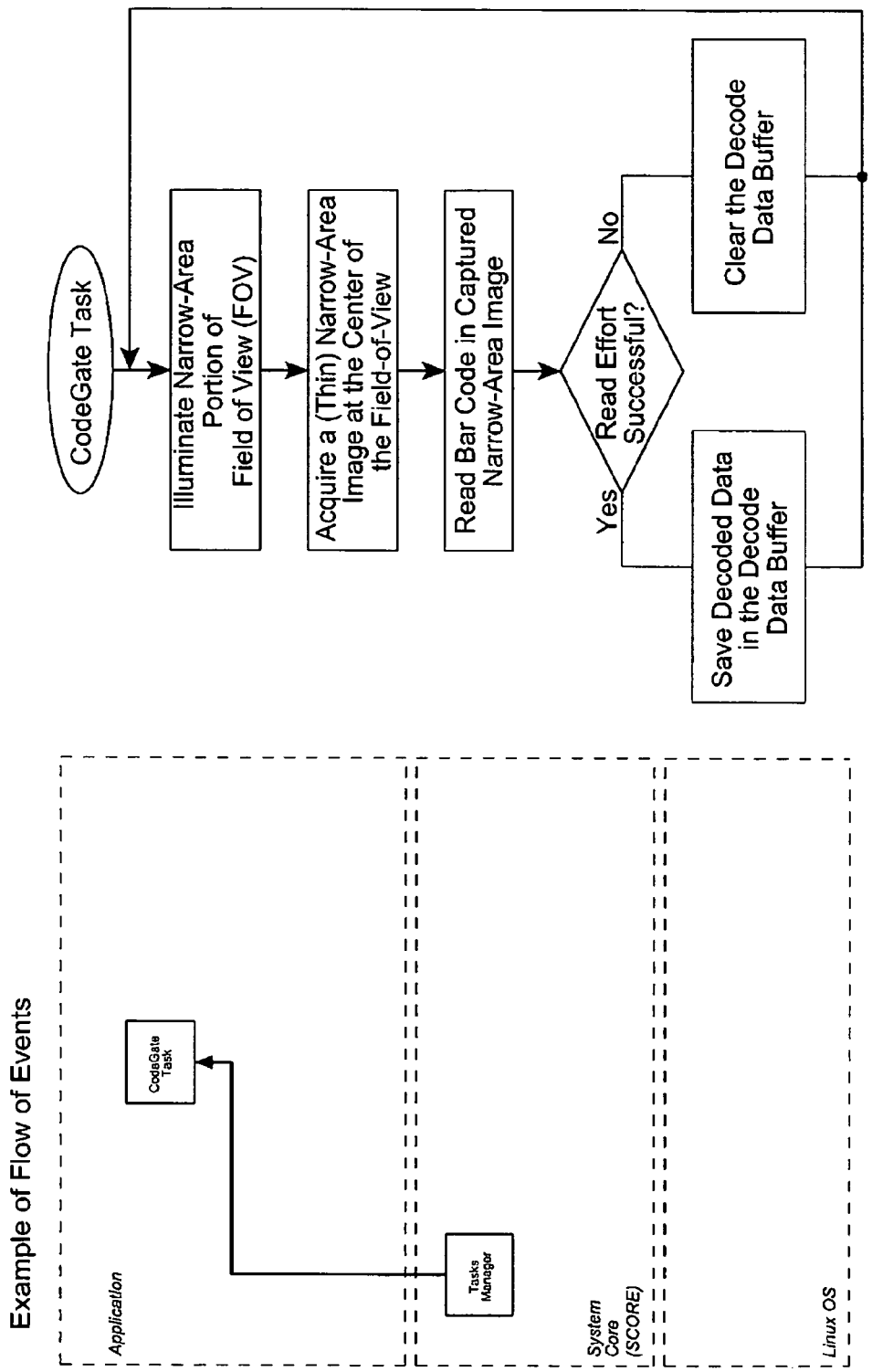
Figure 13F:
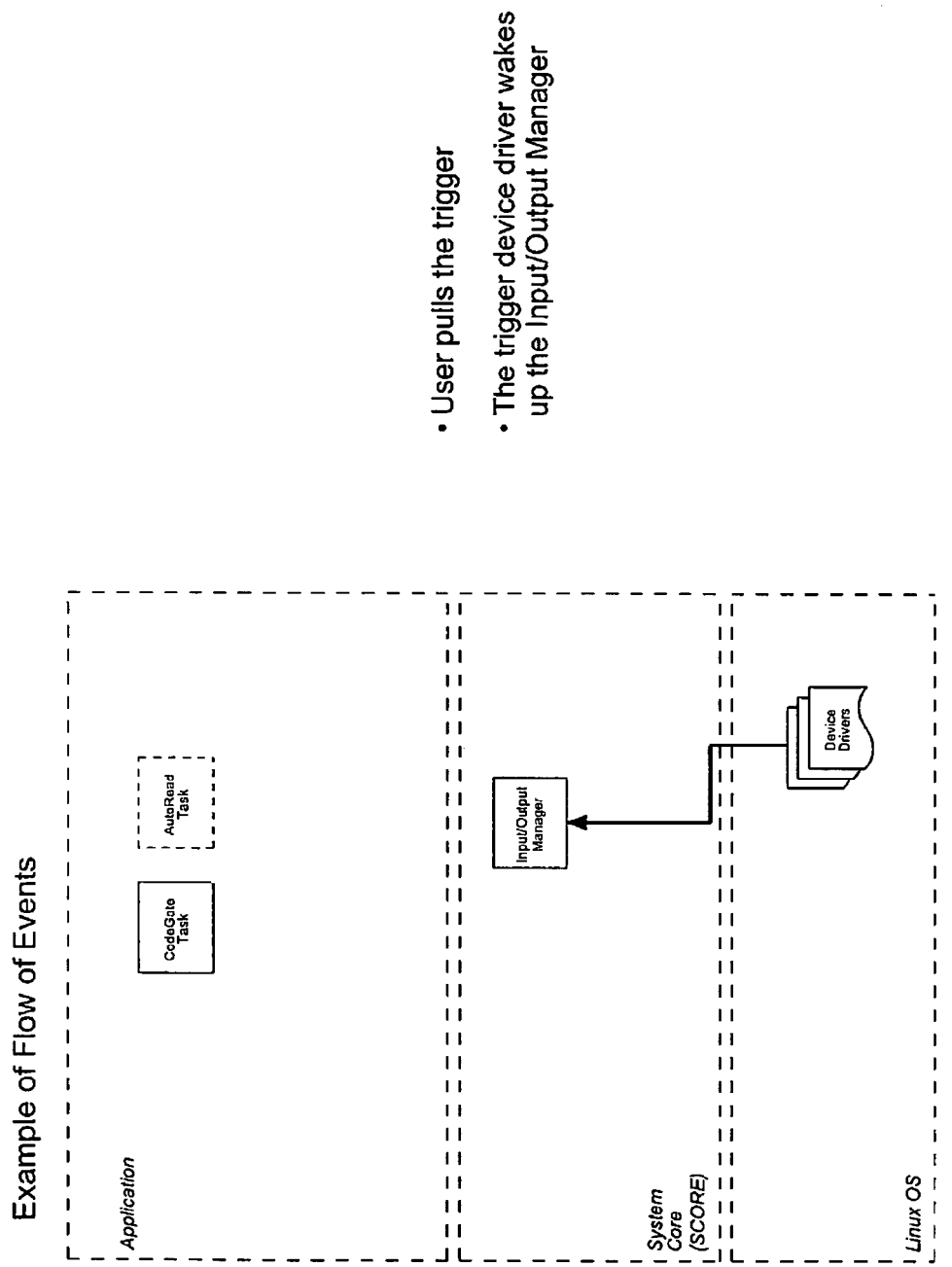
Figure 13G:
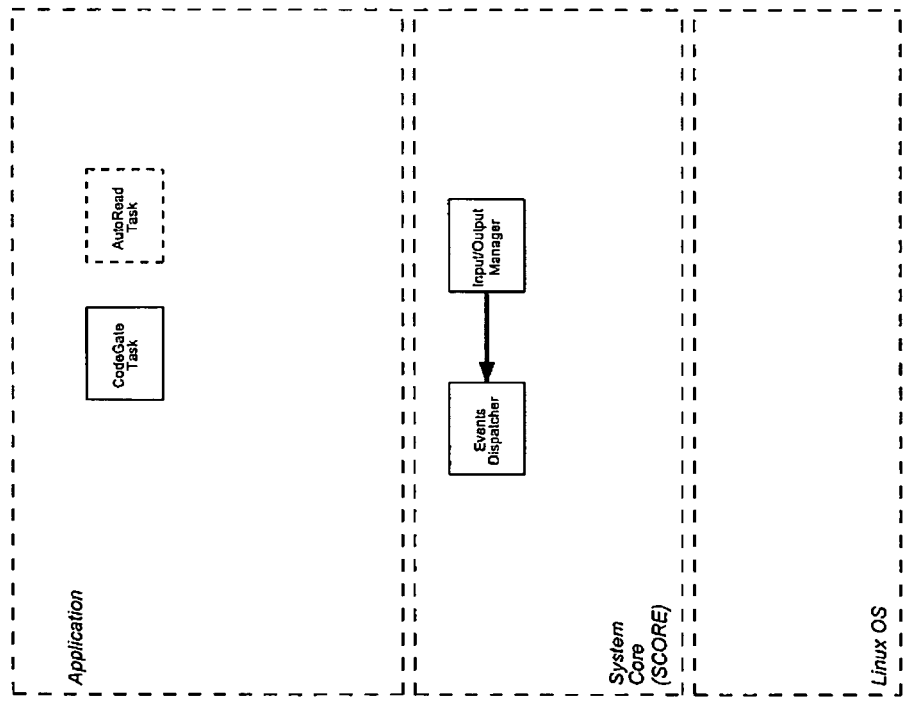
Figure 13H:
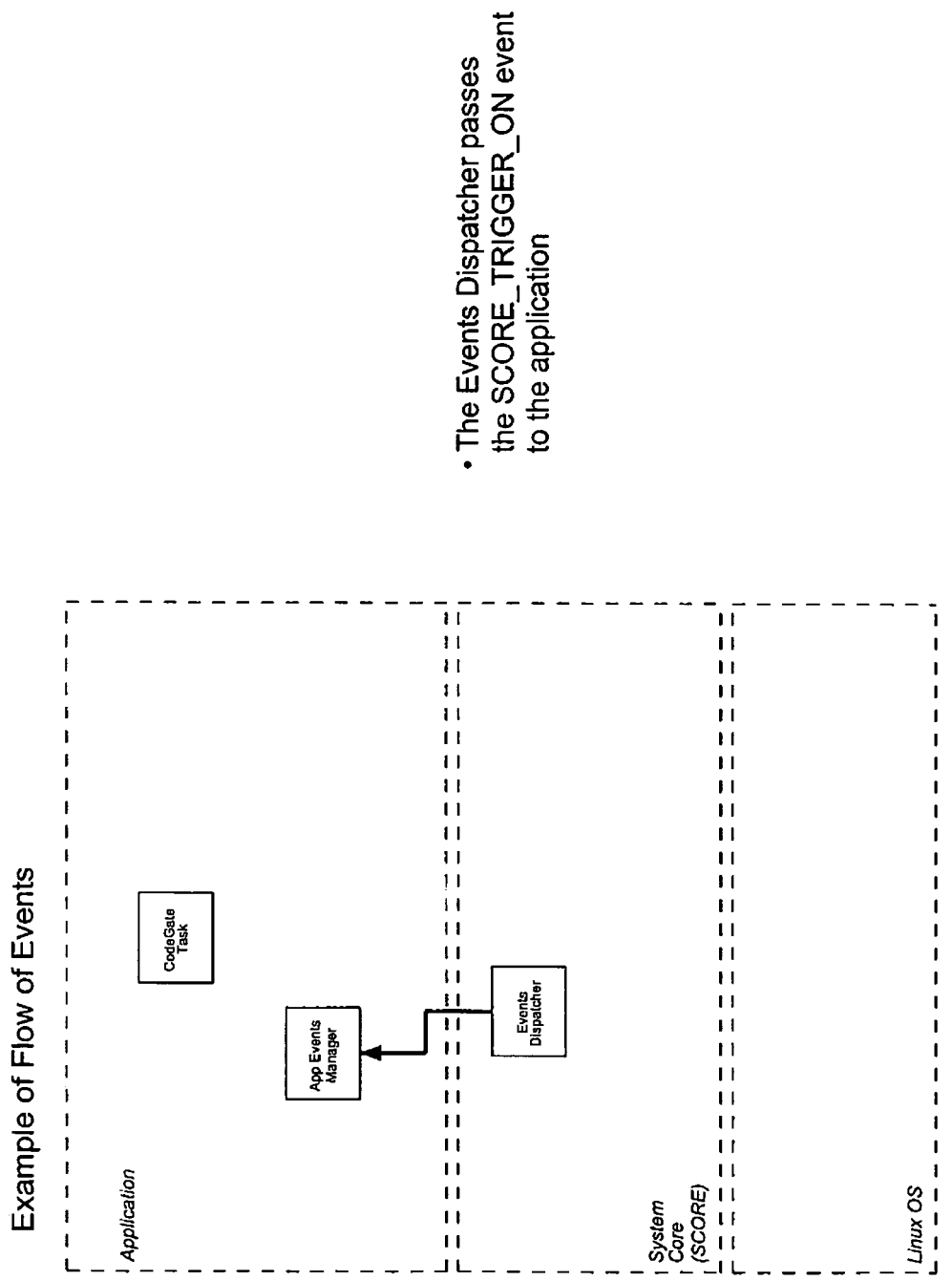
Figure 13K:
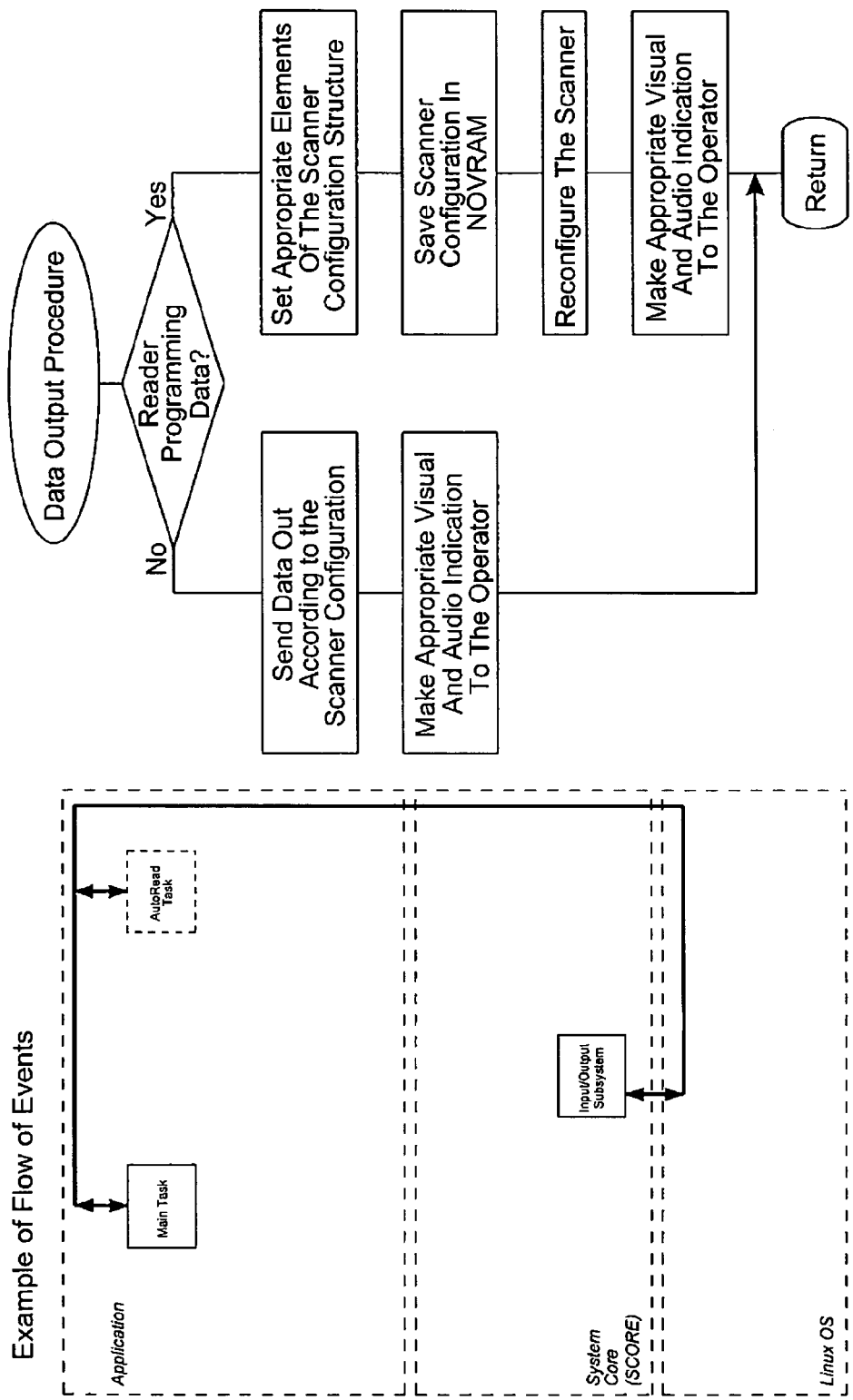
Figure 13L:
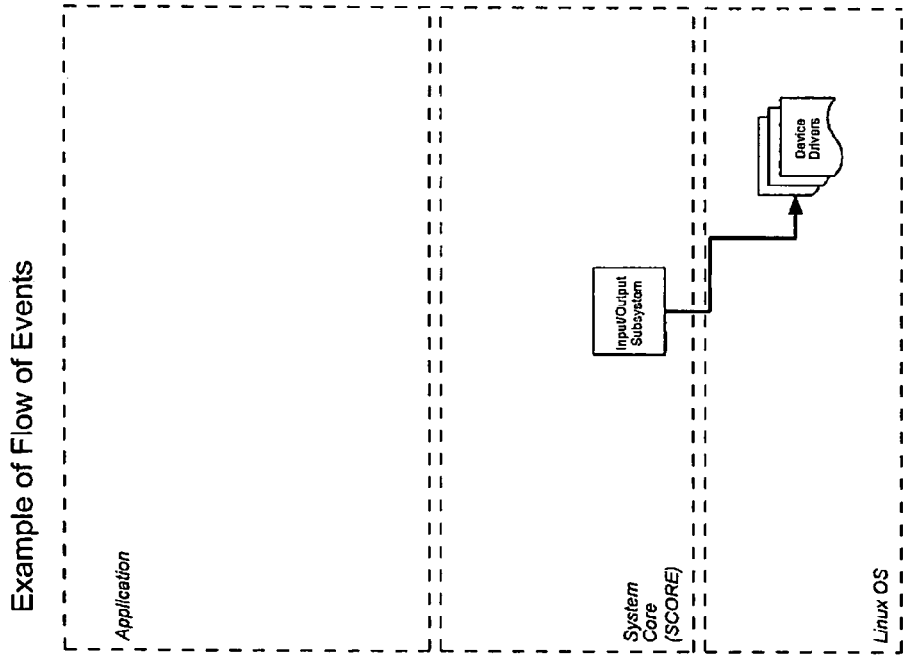
Figure 13M:
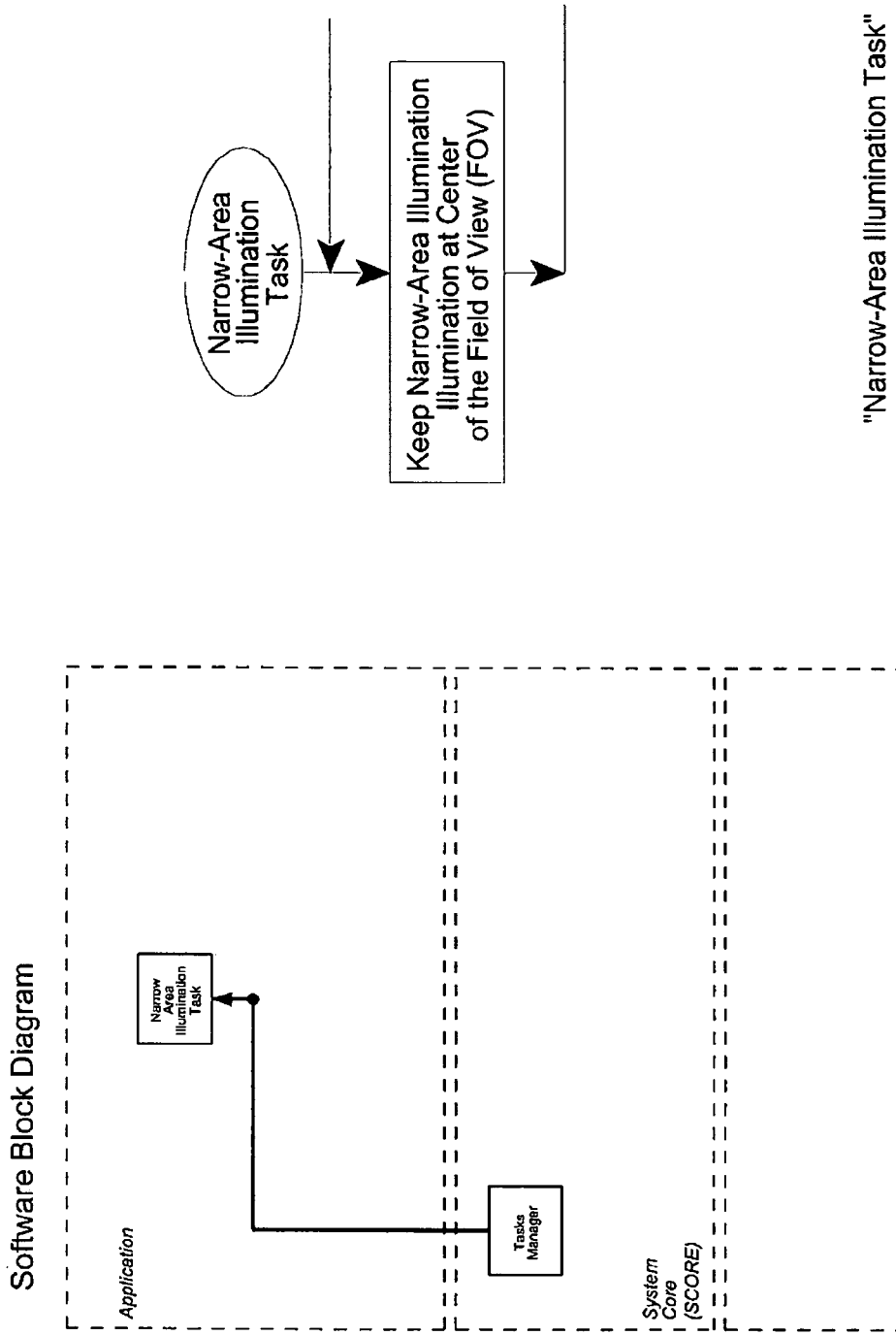
Figure 16:
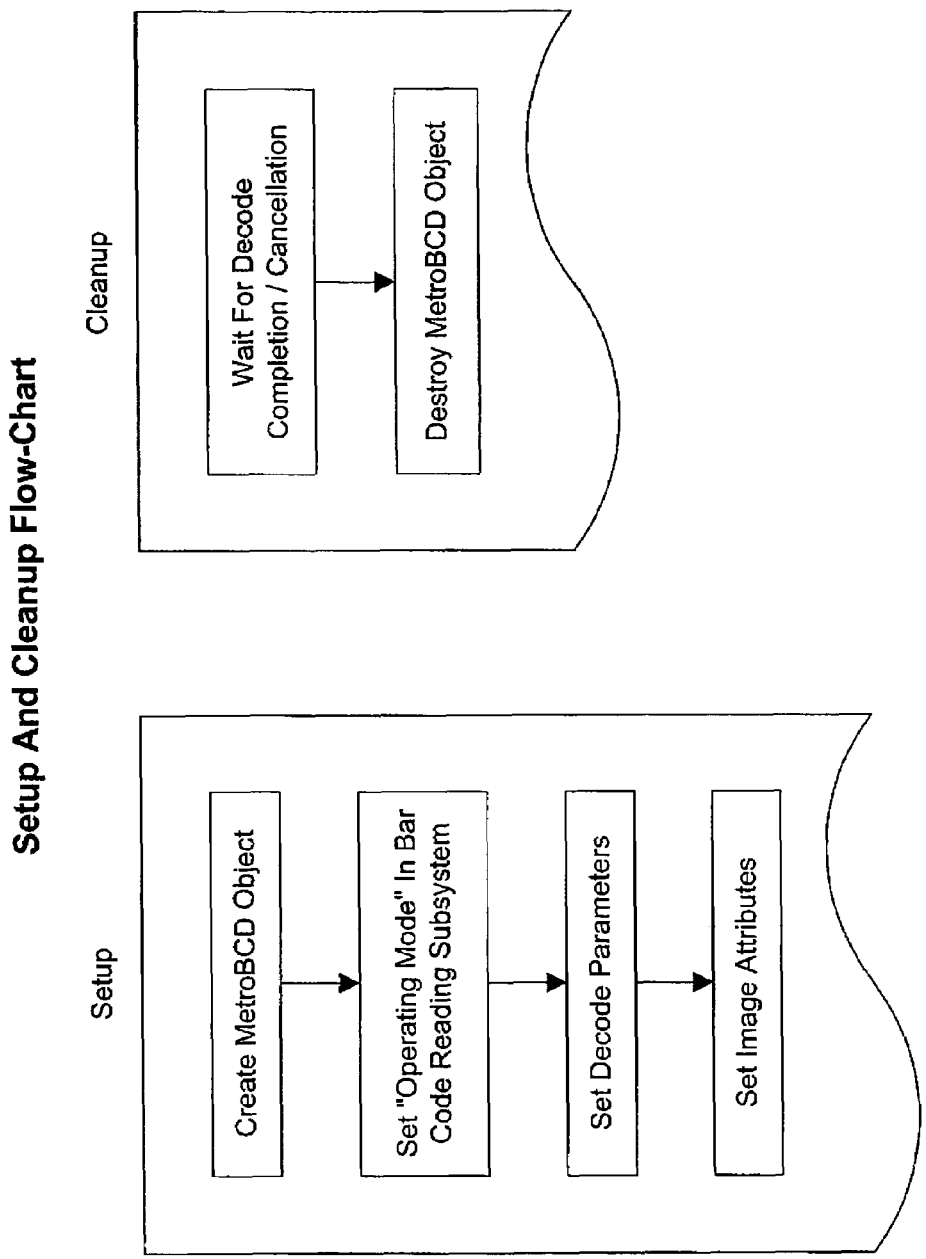
Figure 17A:
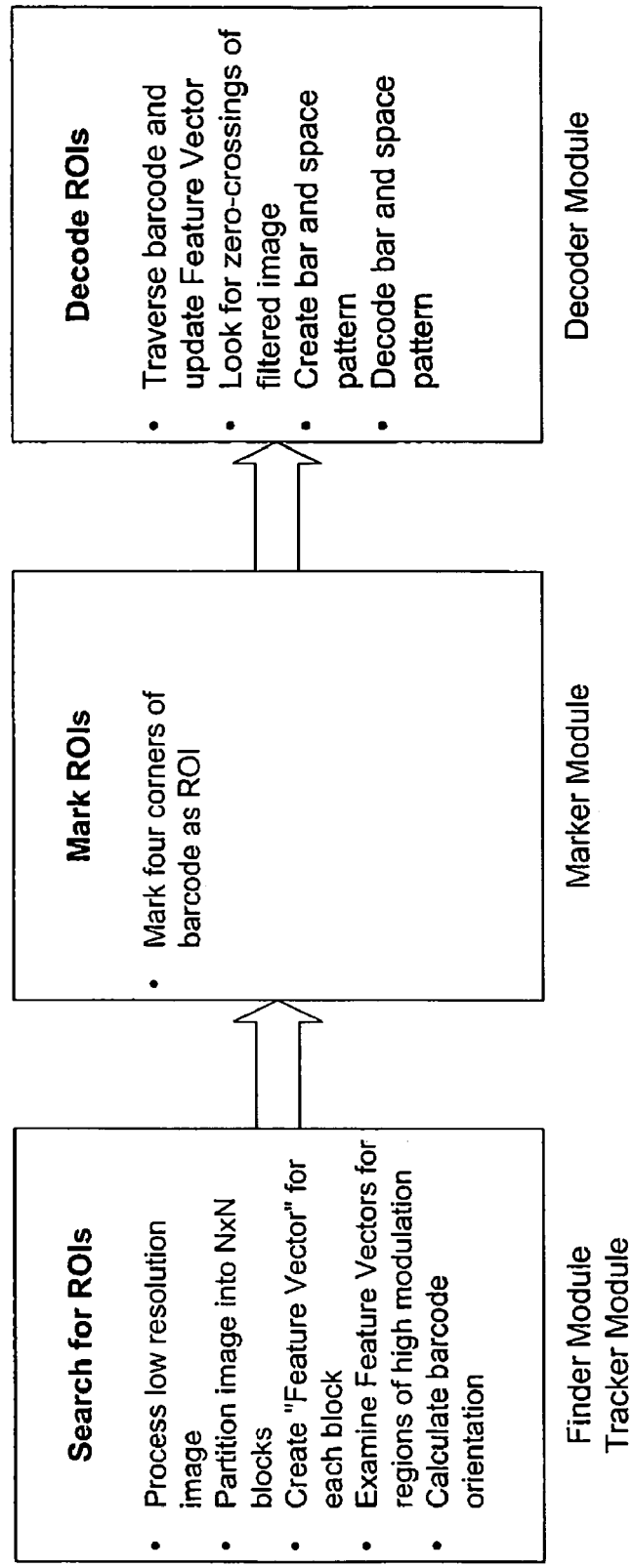
Figure 17B:
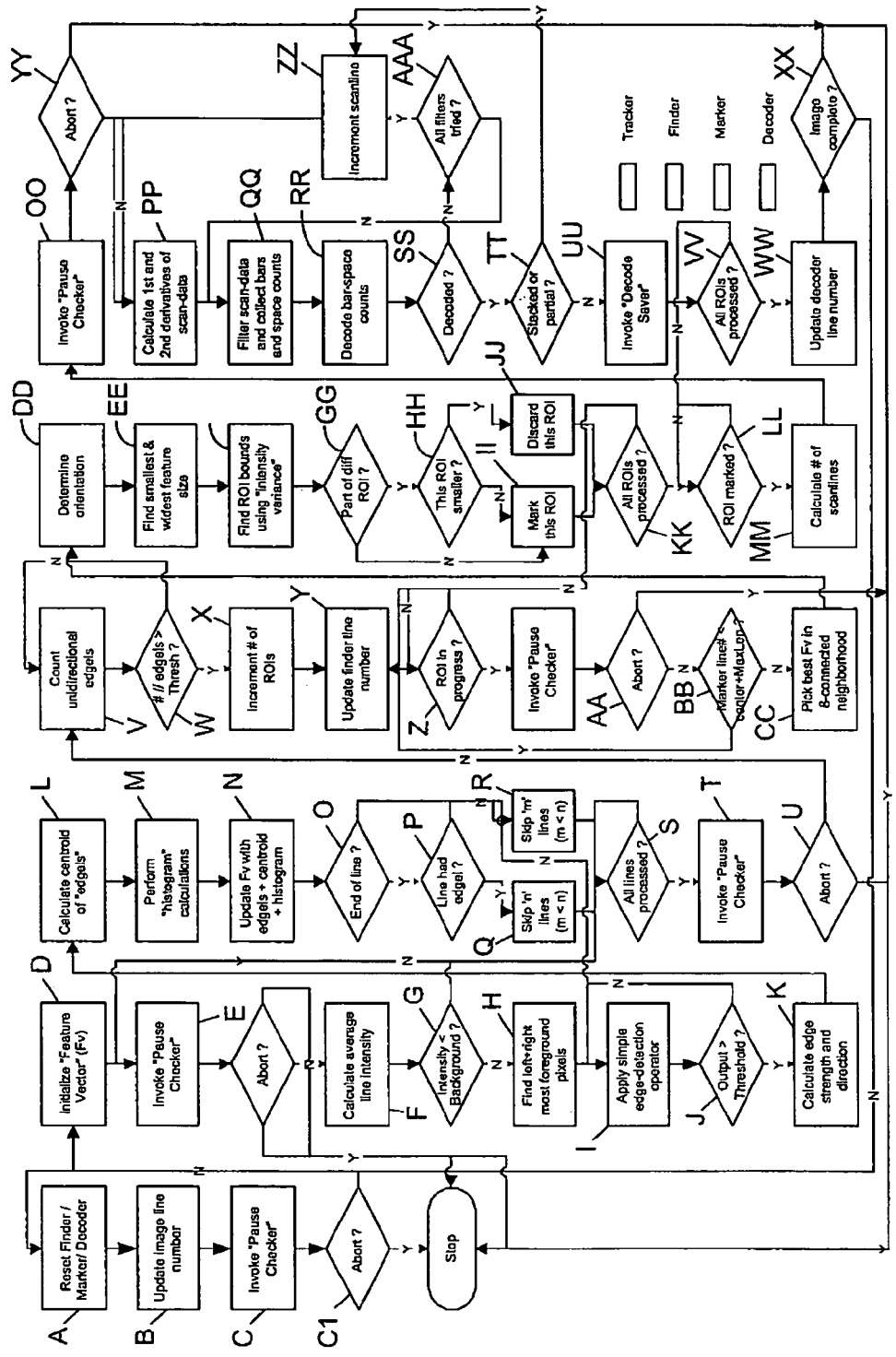
Figure 18A:
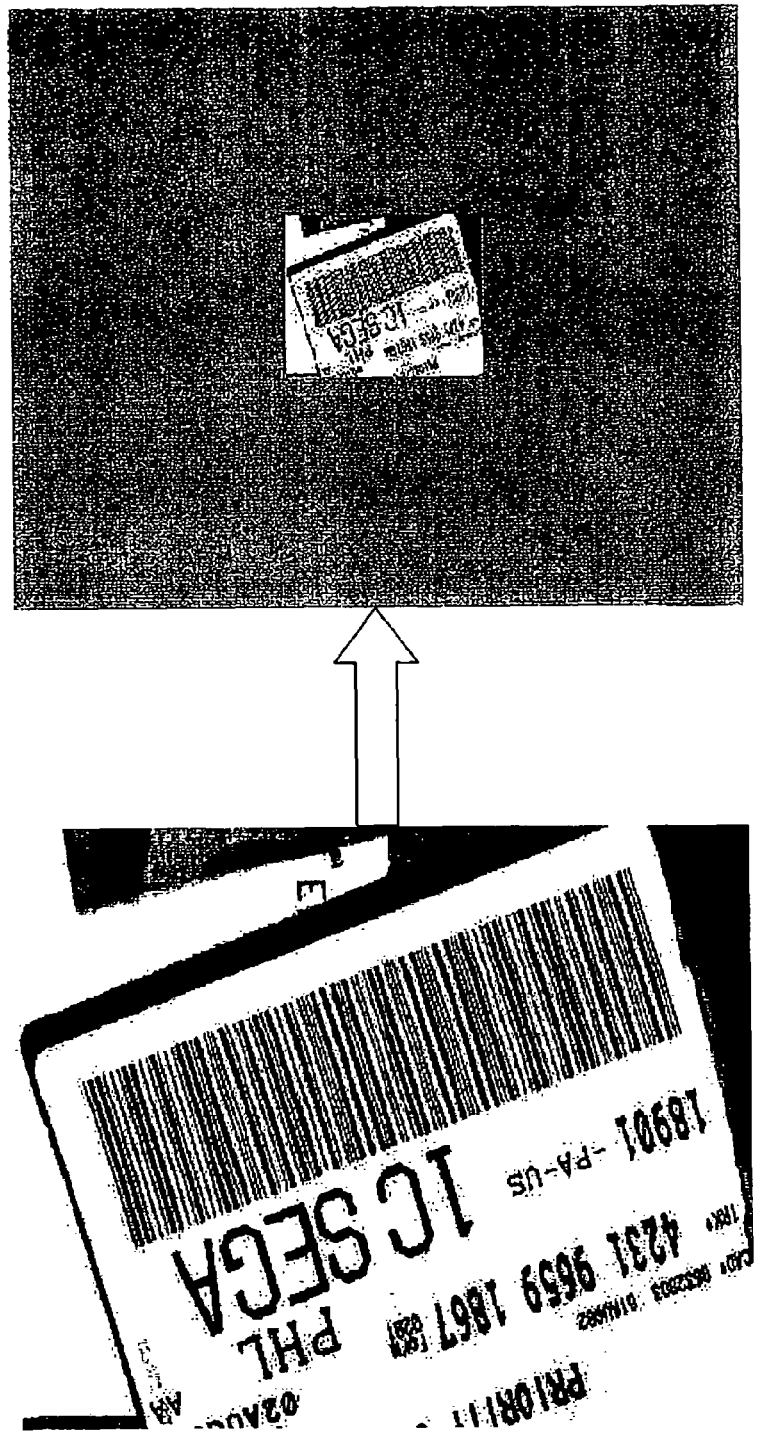
Figure 18B:
Figure 18C:
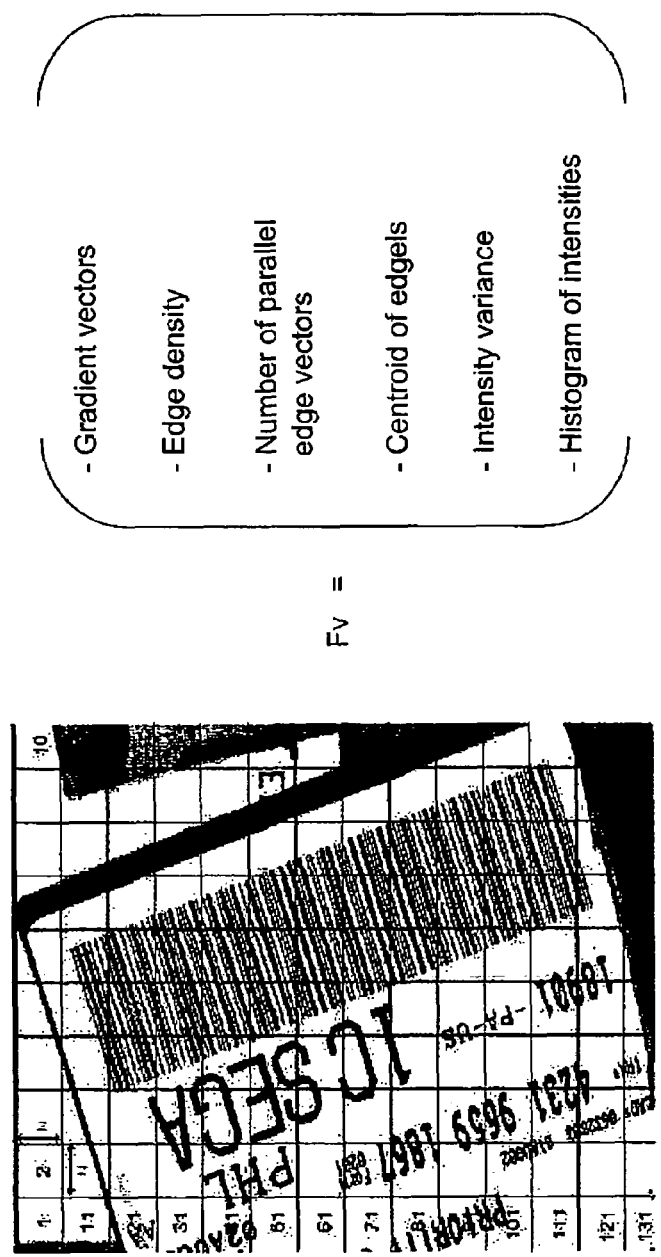
Figure 18D:
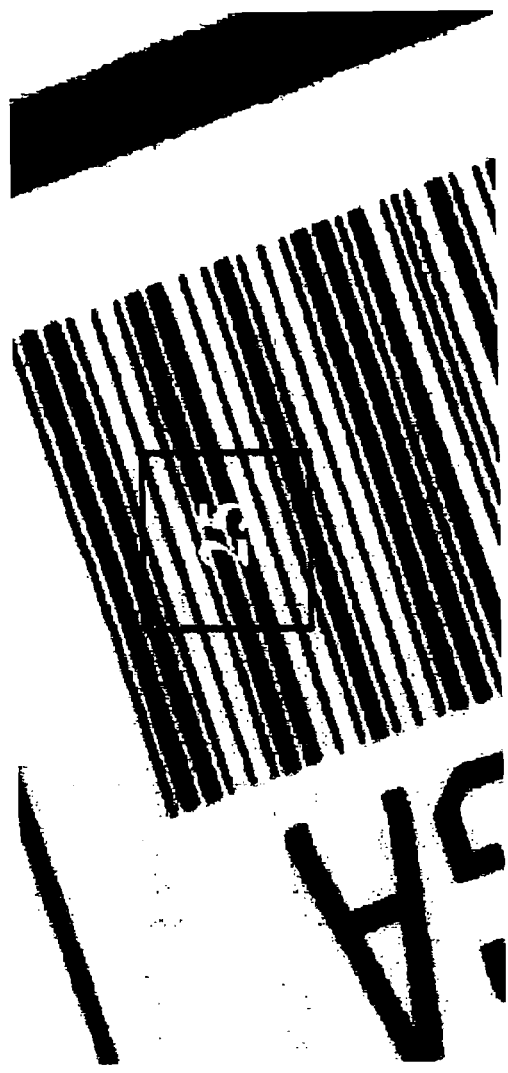
Figure 18E:
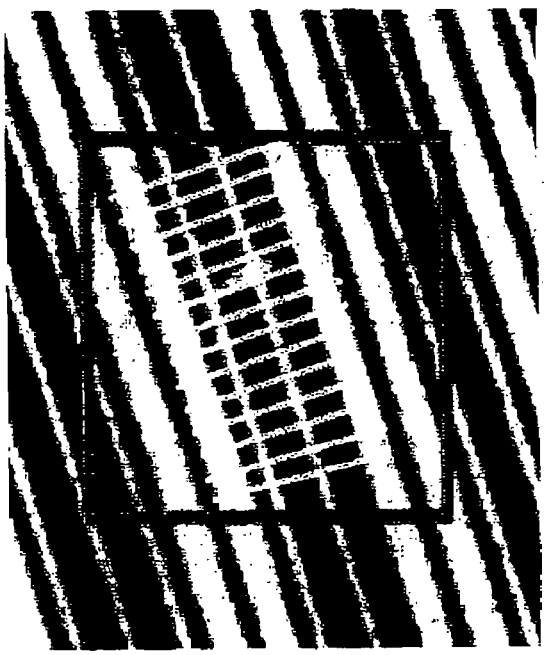
Figure 18H:
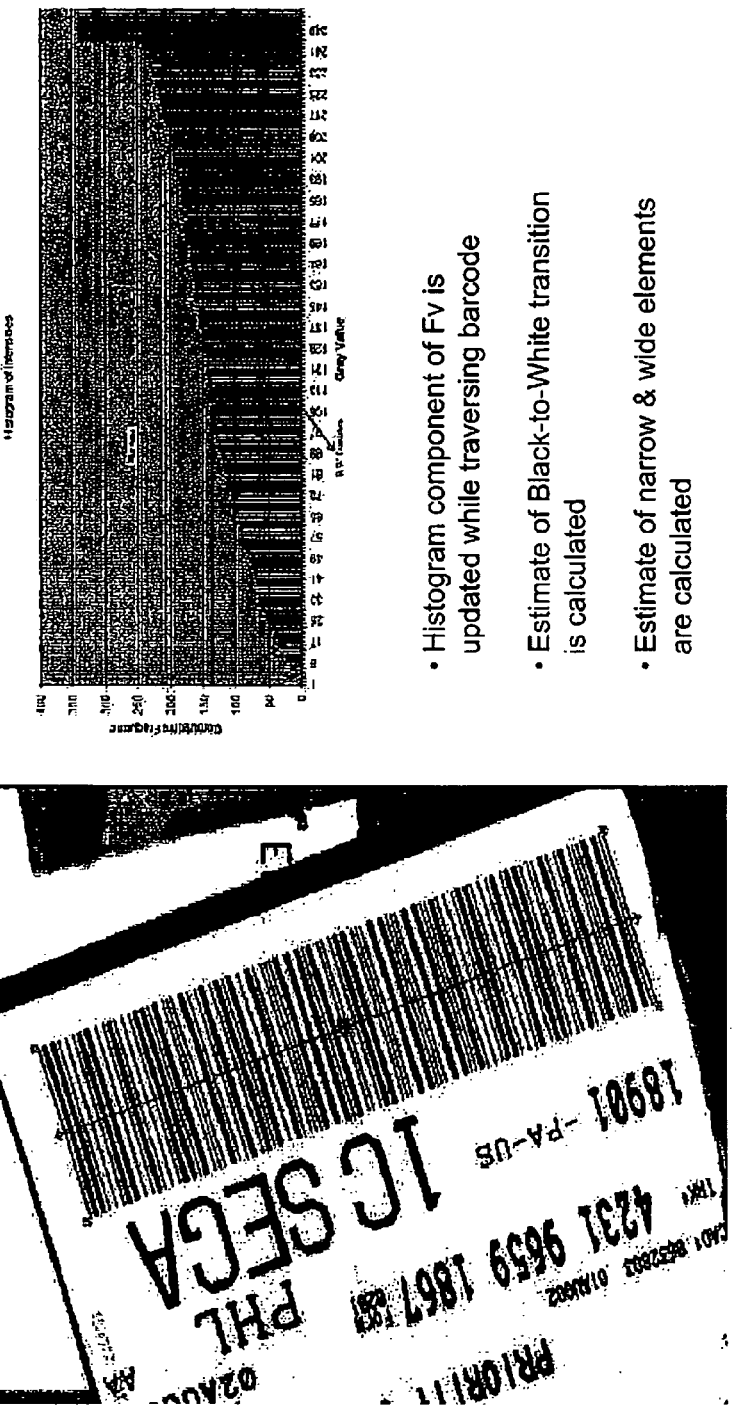
Figure 18I:
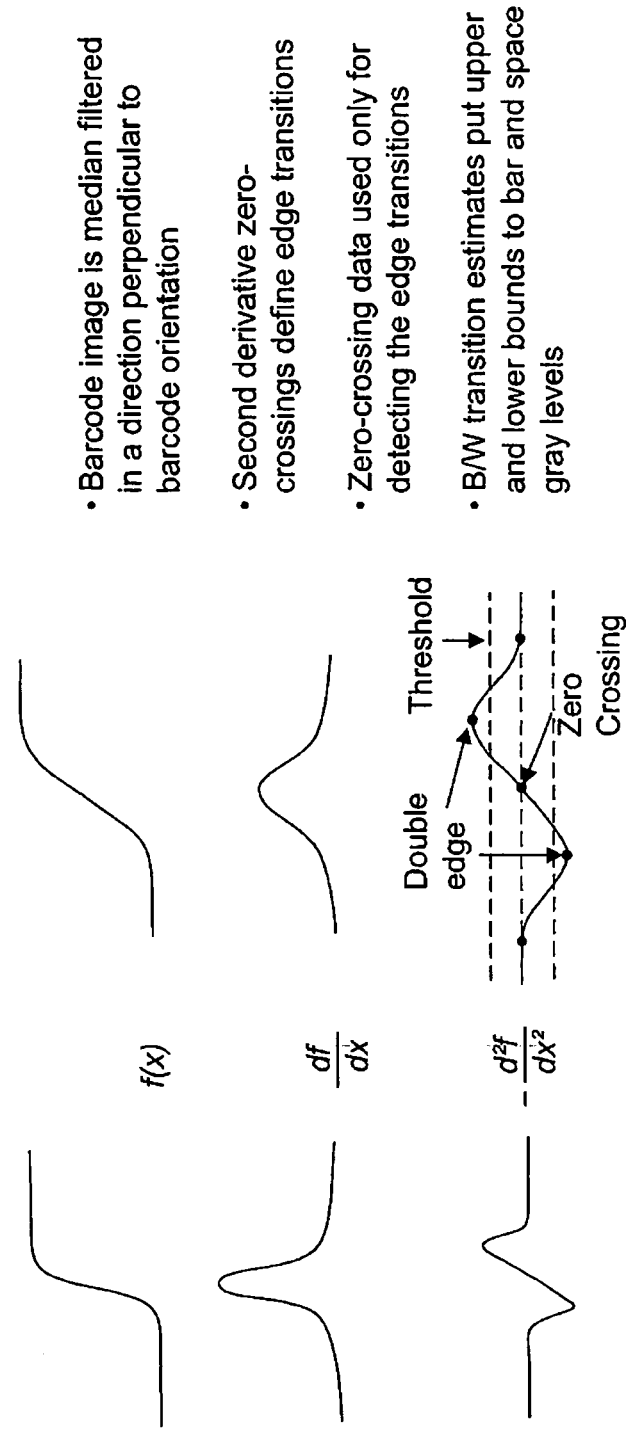
Figure 18J:
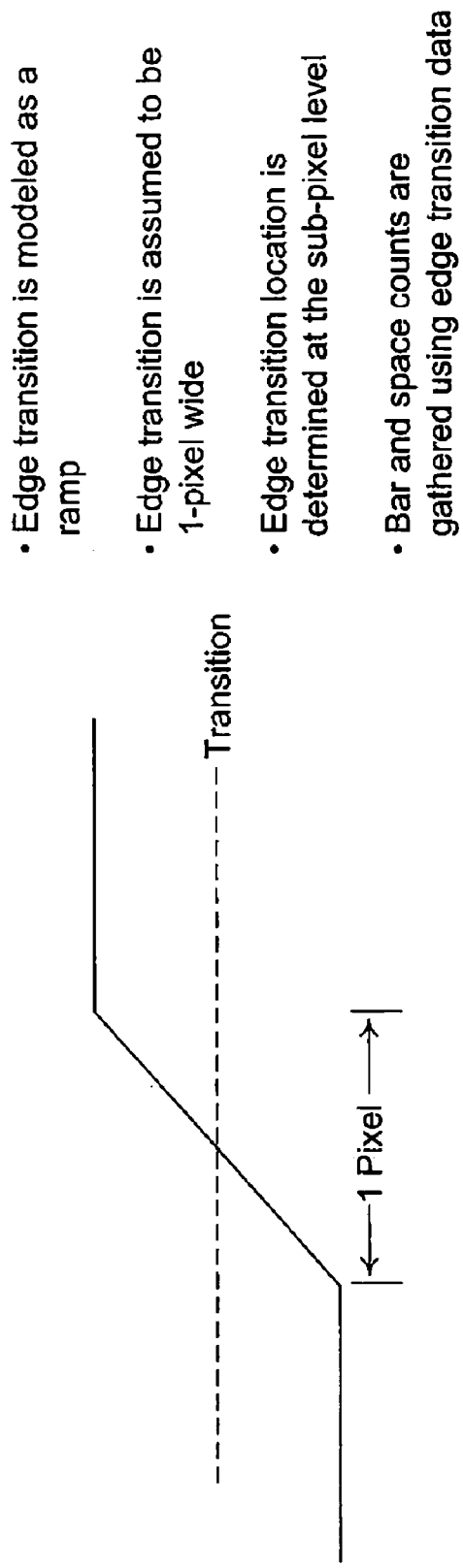
Figure 19A:
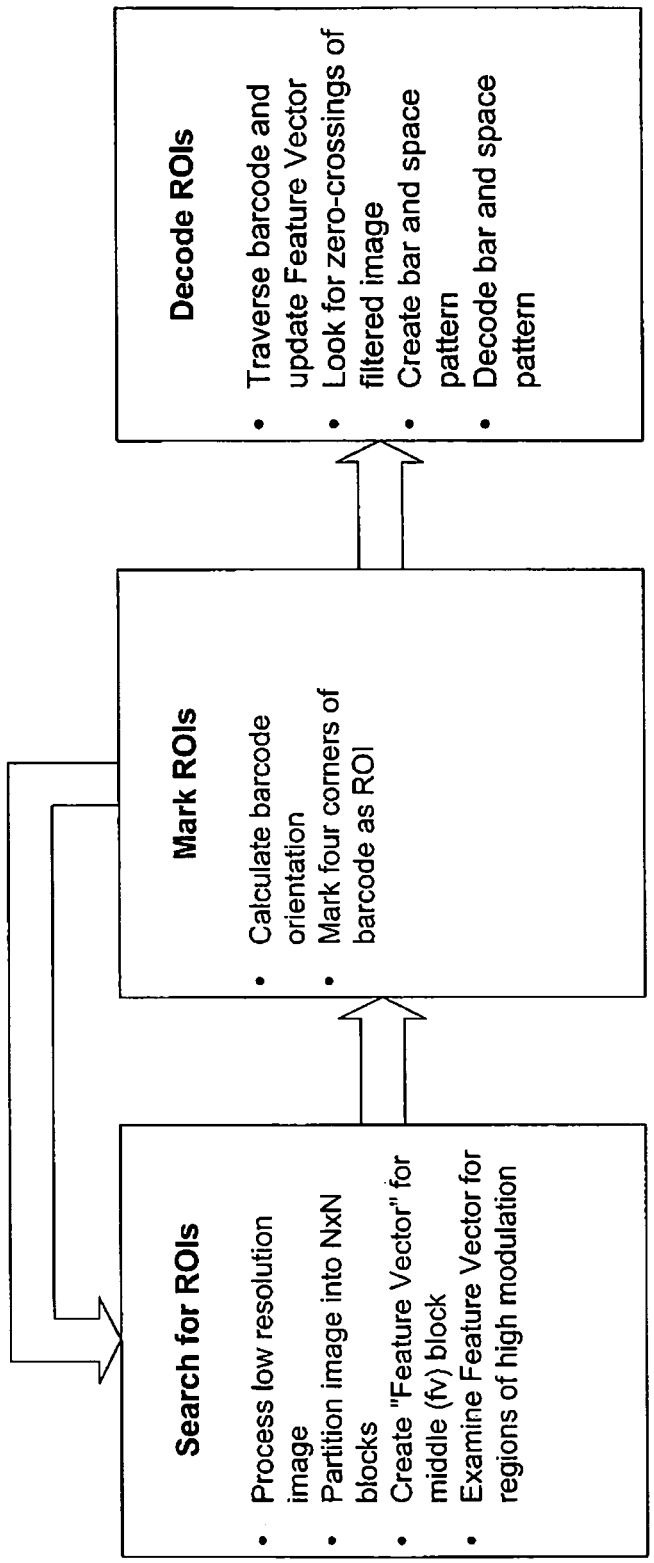
Figure 19B:
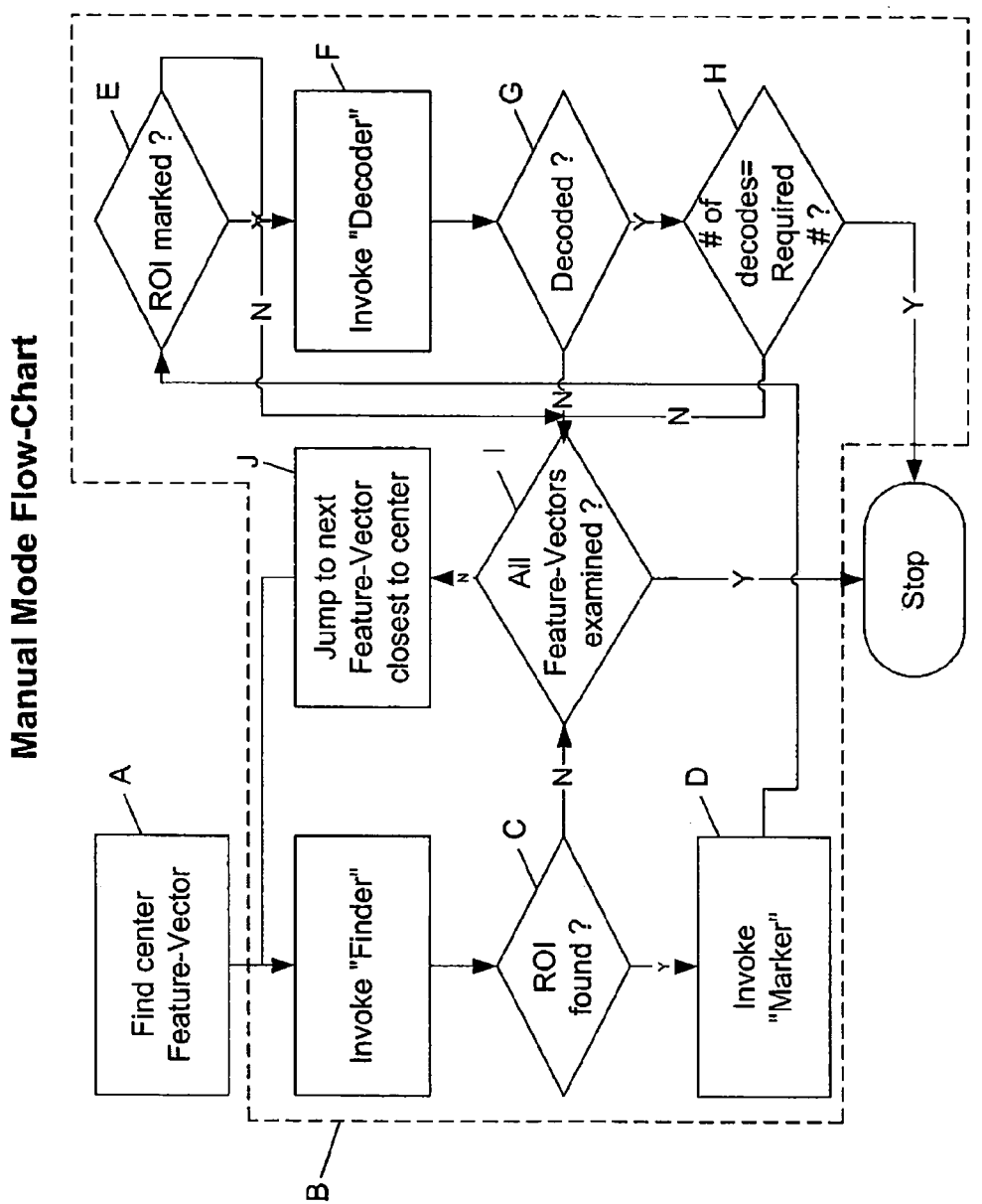
Figure 20A:
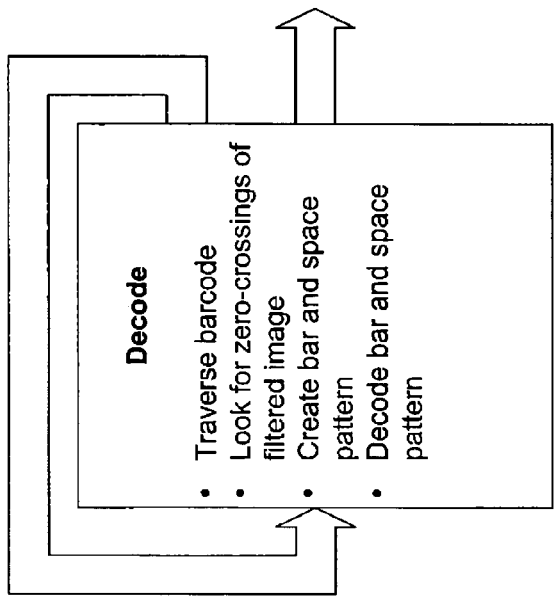
Figure 20B:
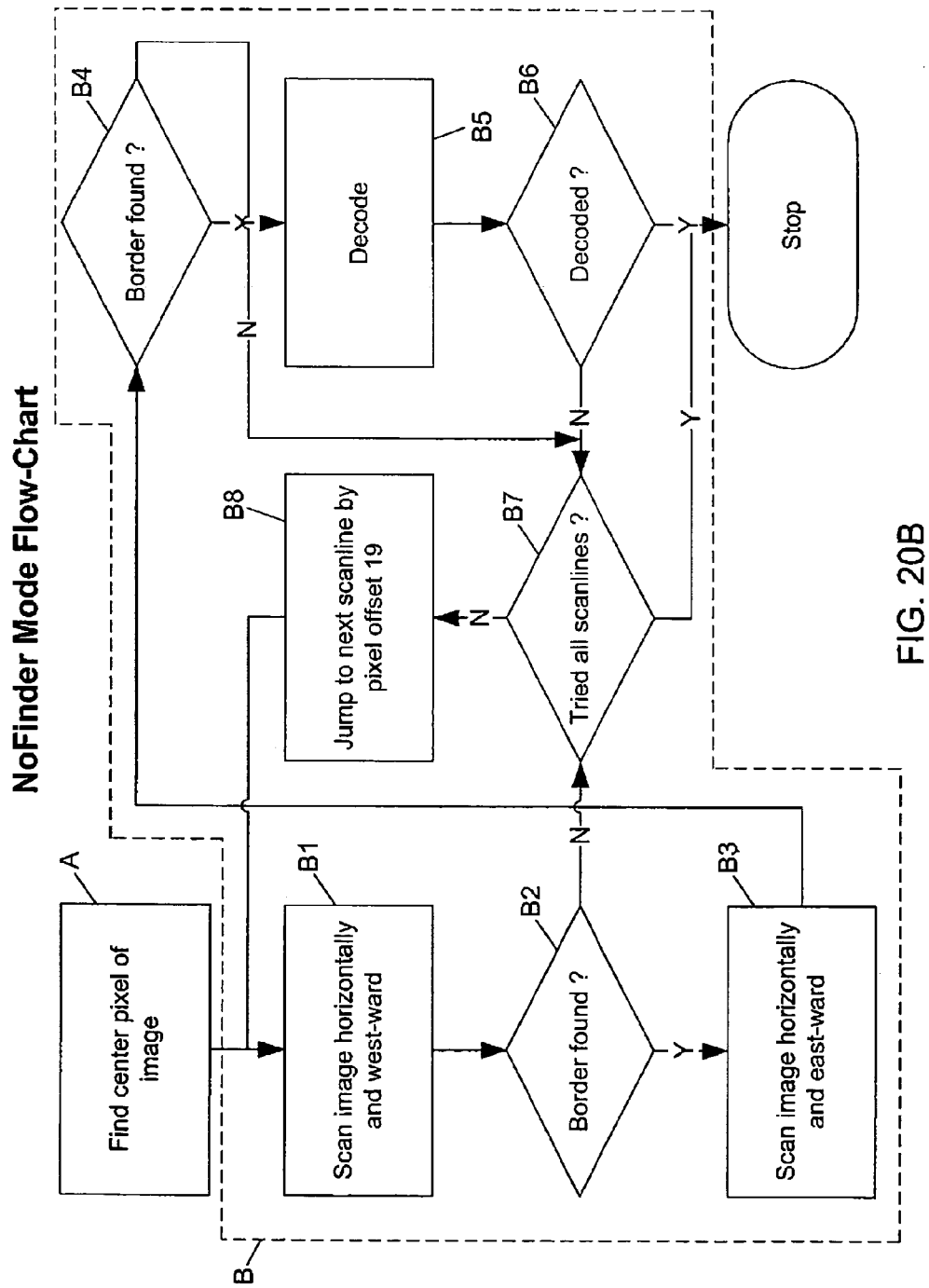
Figure 21A:
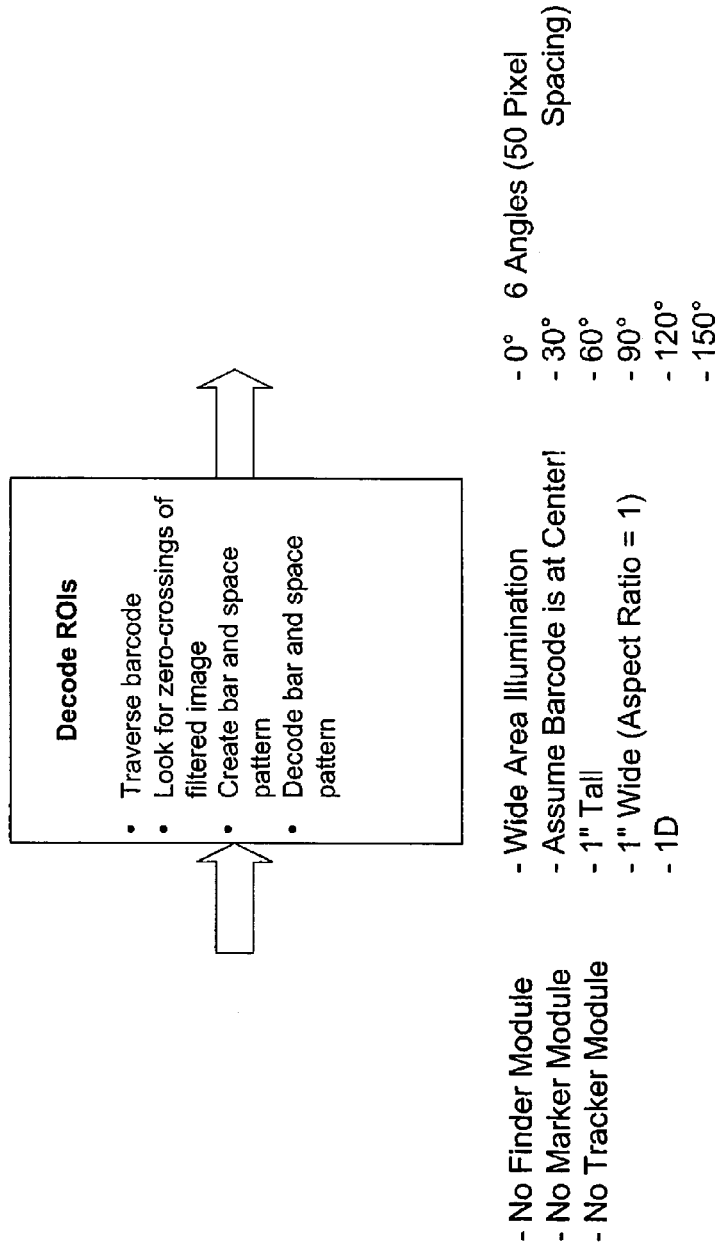
Figure 21B:
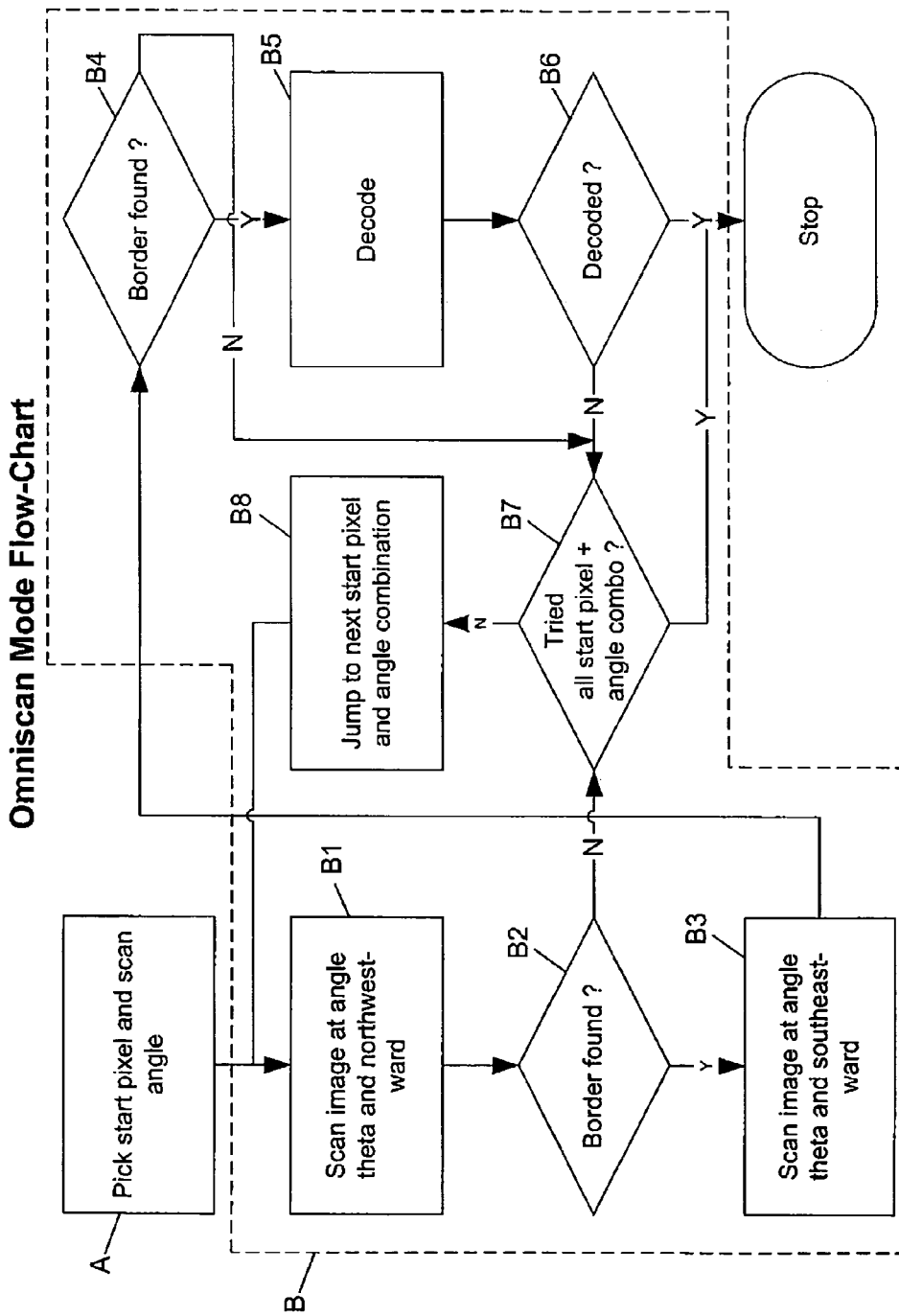
Figure 22A:
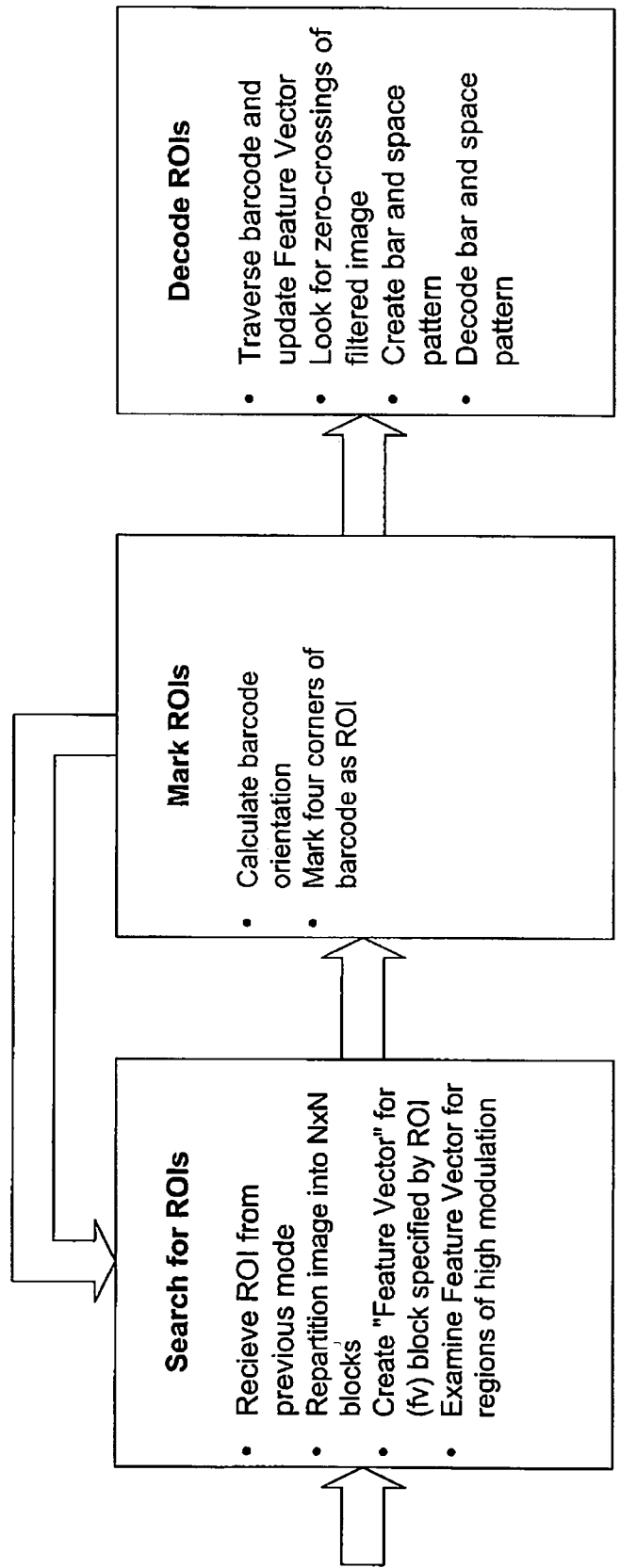
Figure 22B:
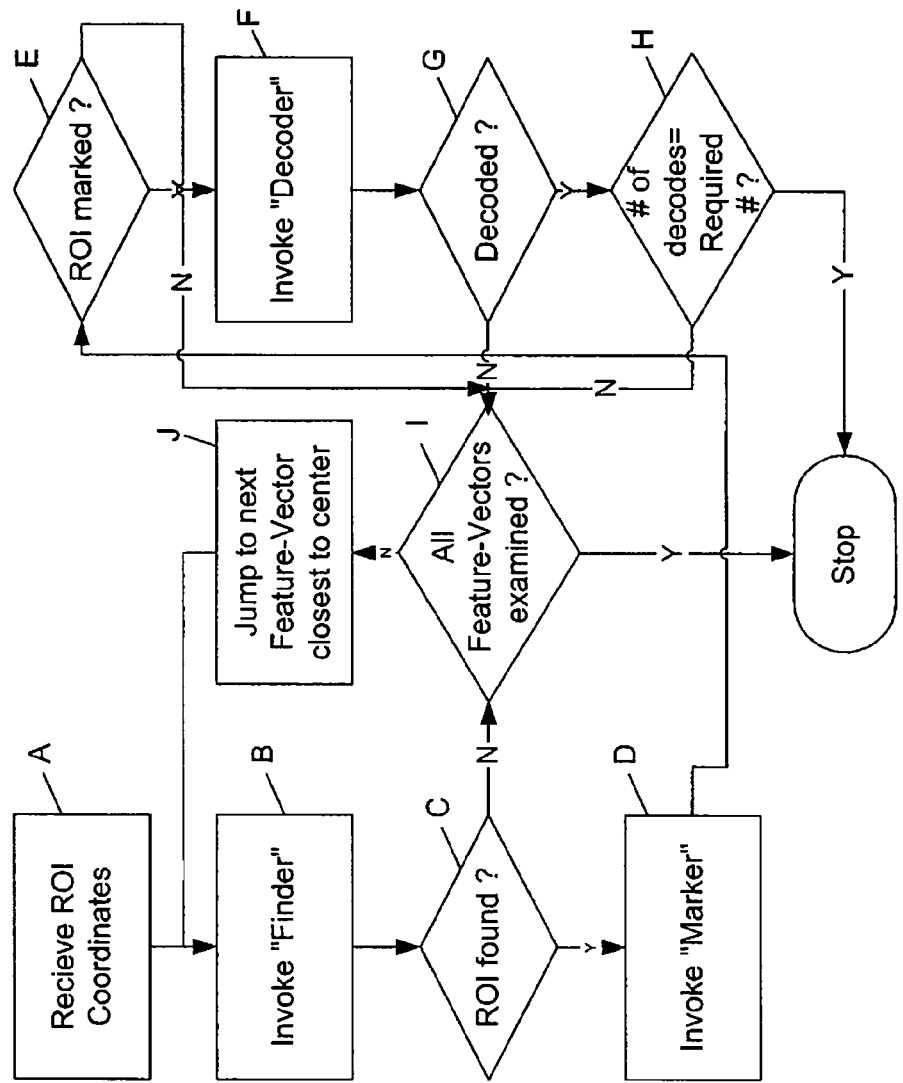
Figure 23:
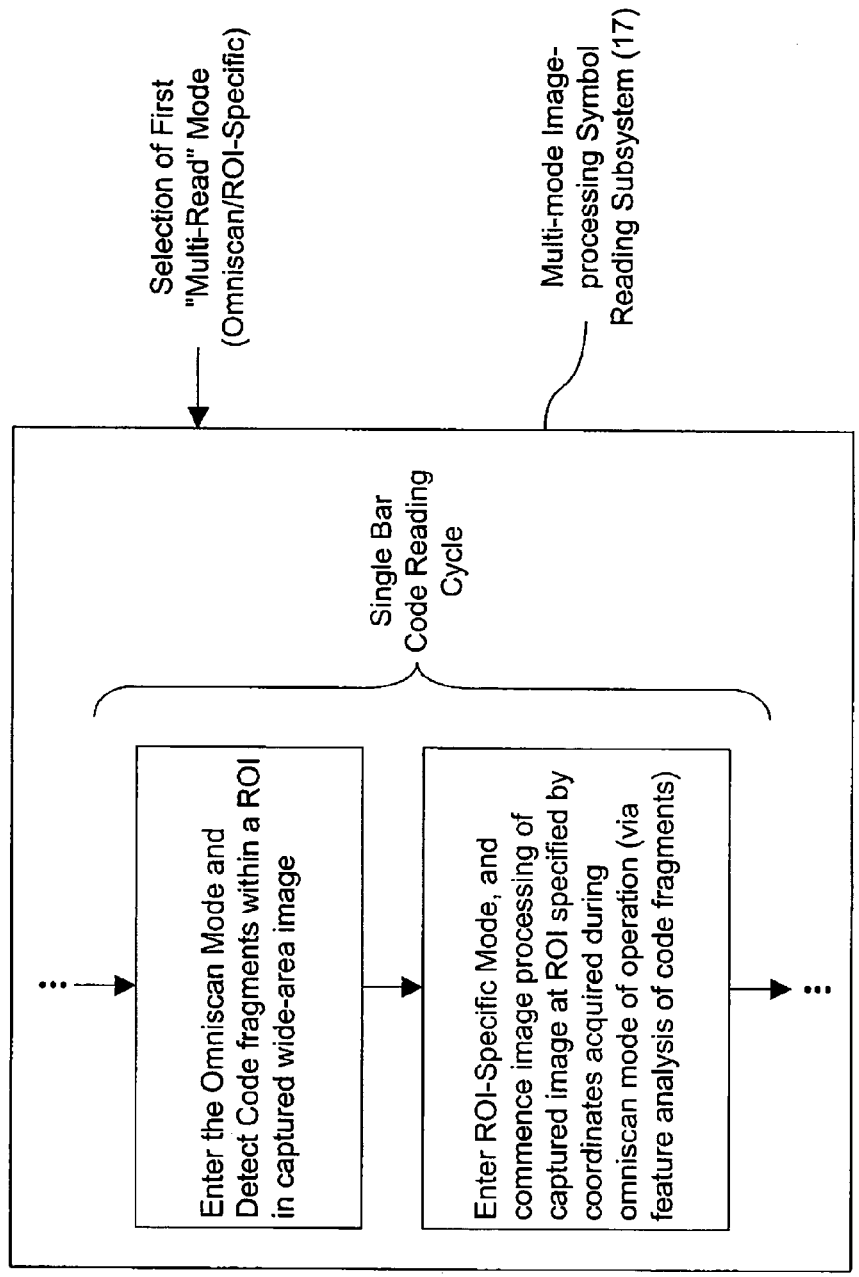
Figure 24:
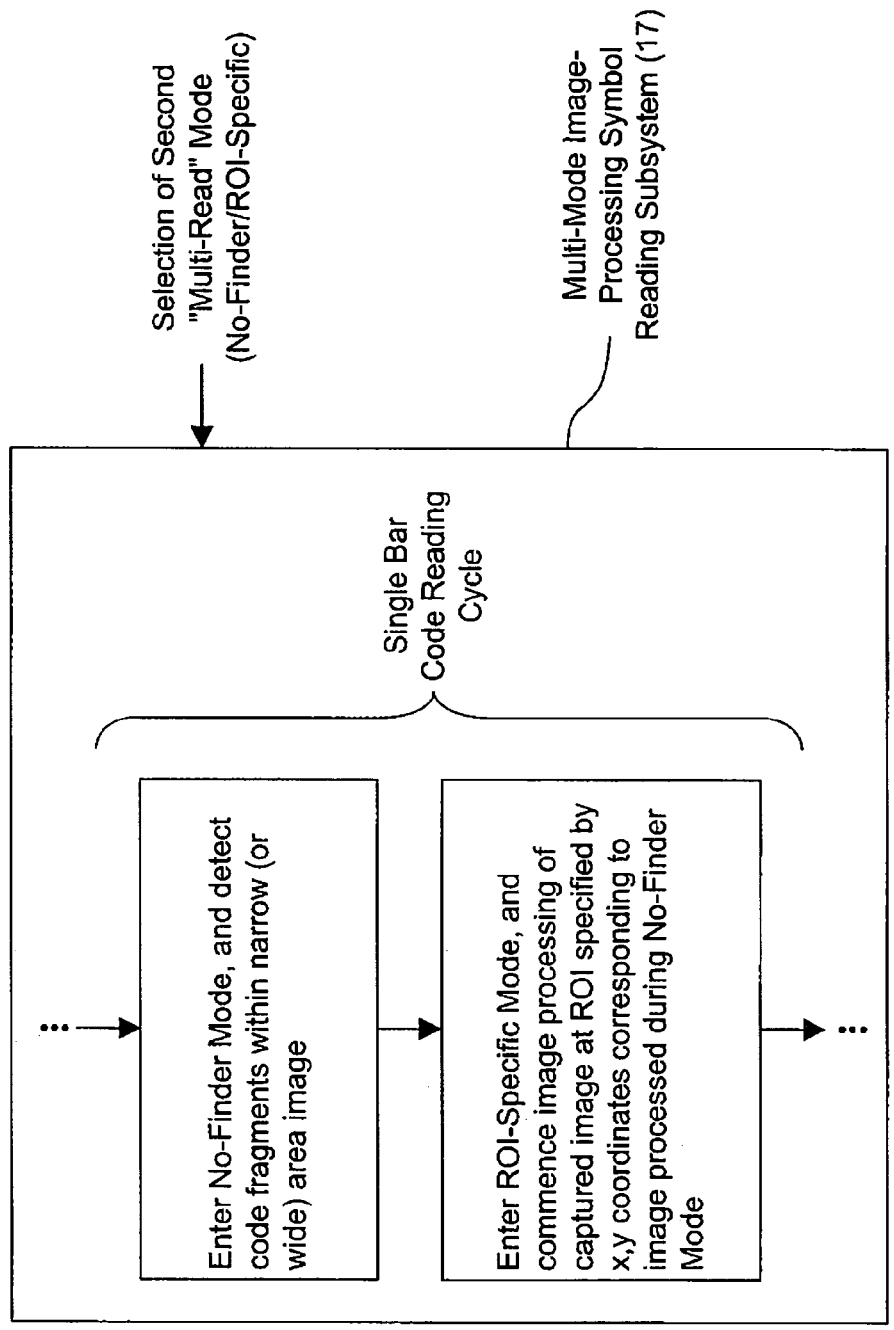
Figure 25:
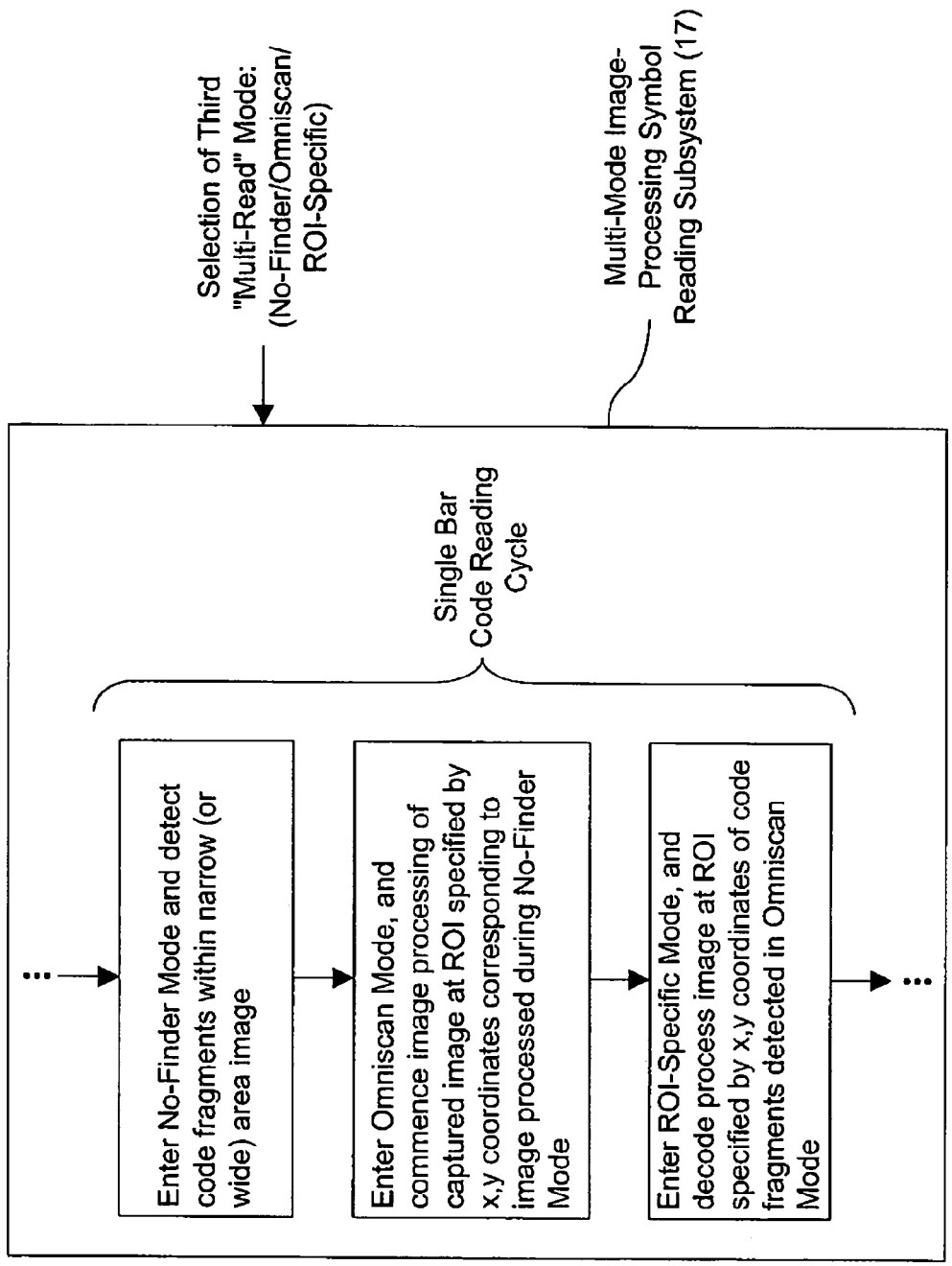
Figure 27B:
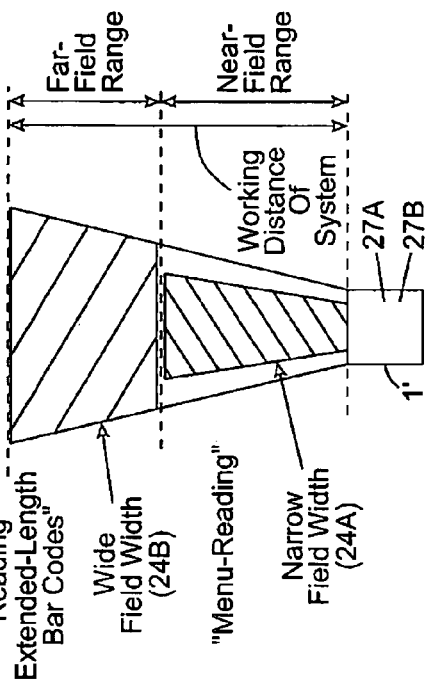
Figure 27A:
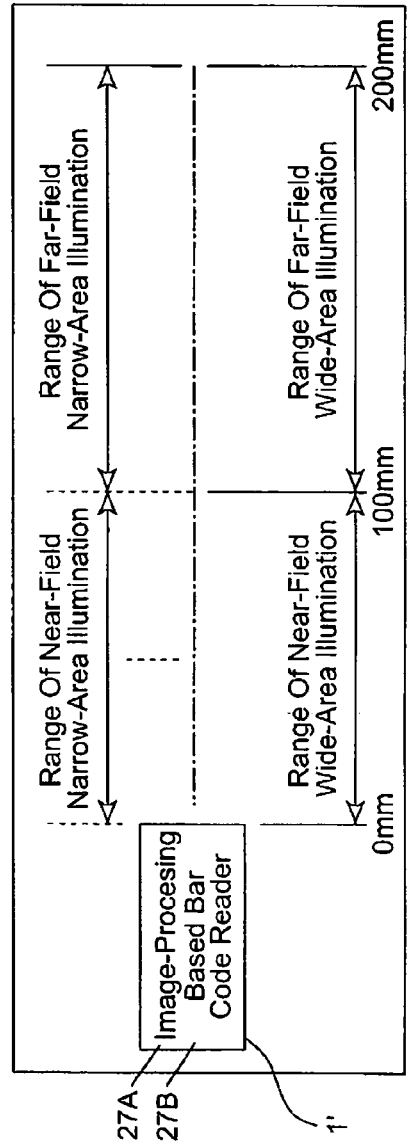
Figure 30:
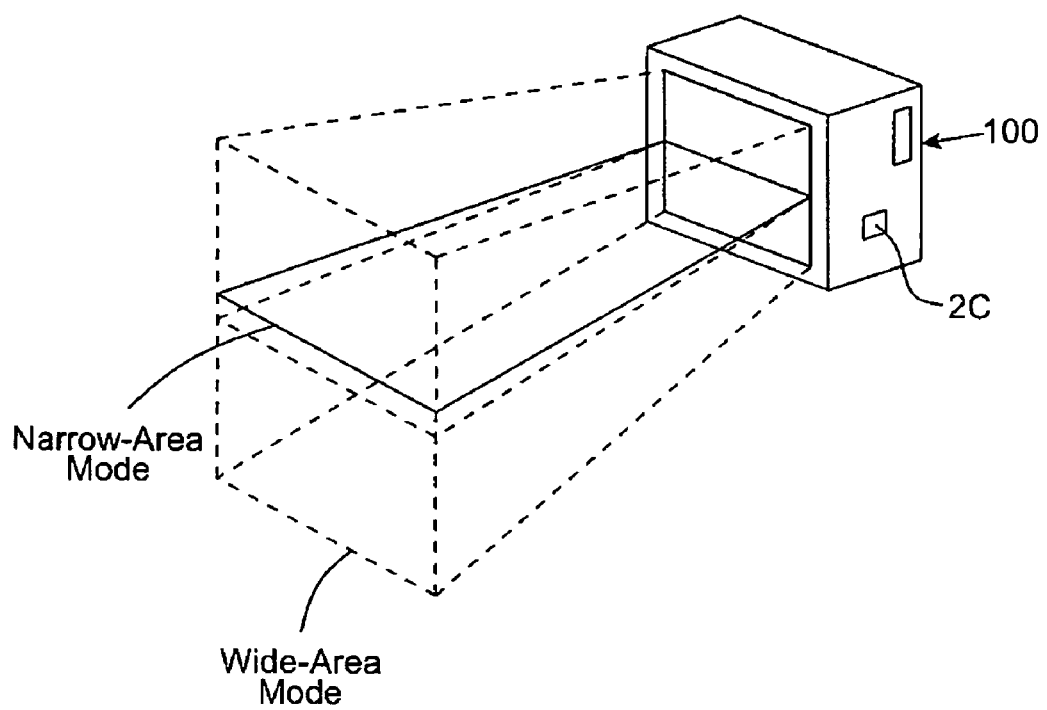
Figure 31:
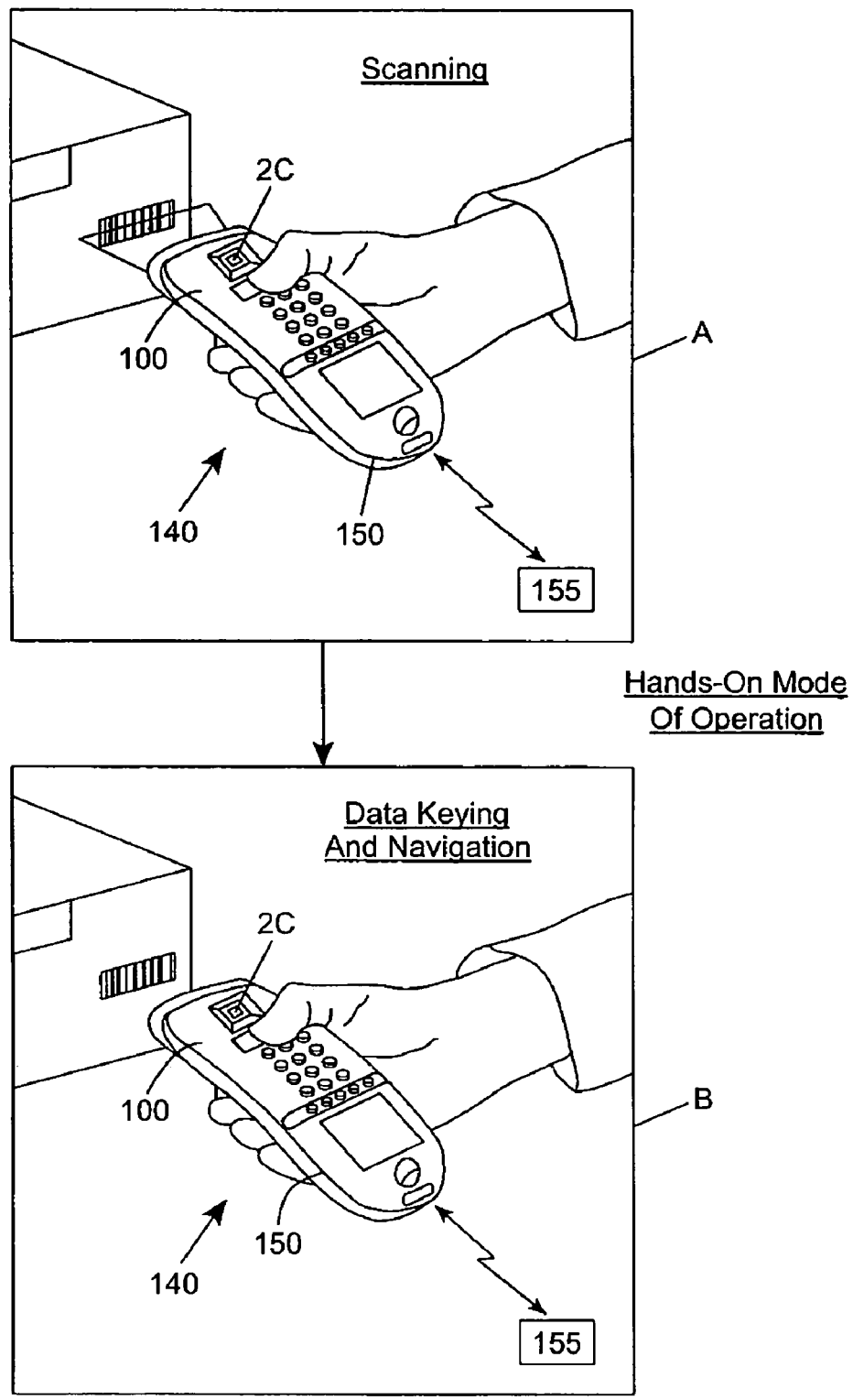
Figure 32:
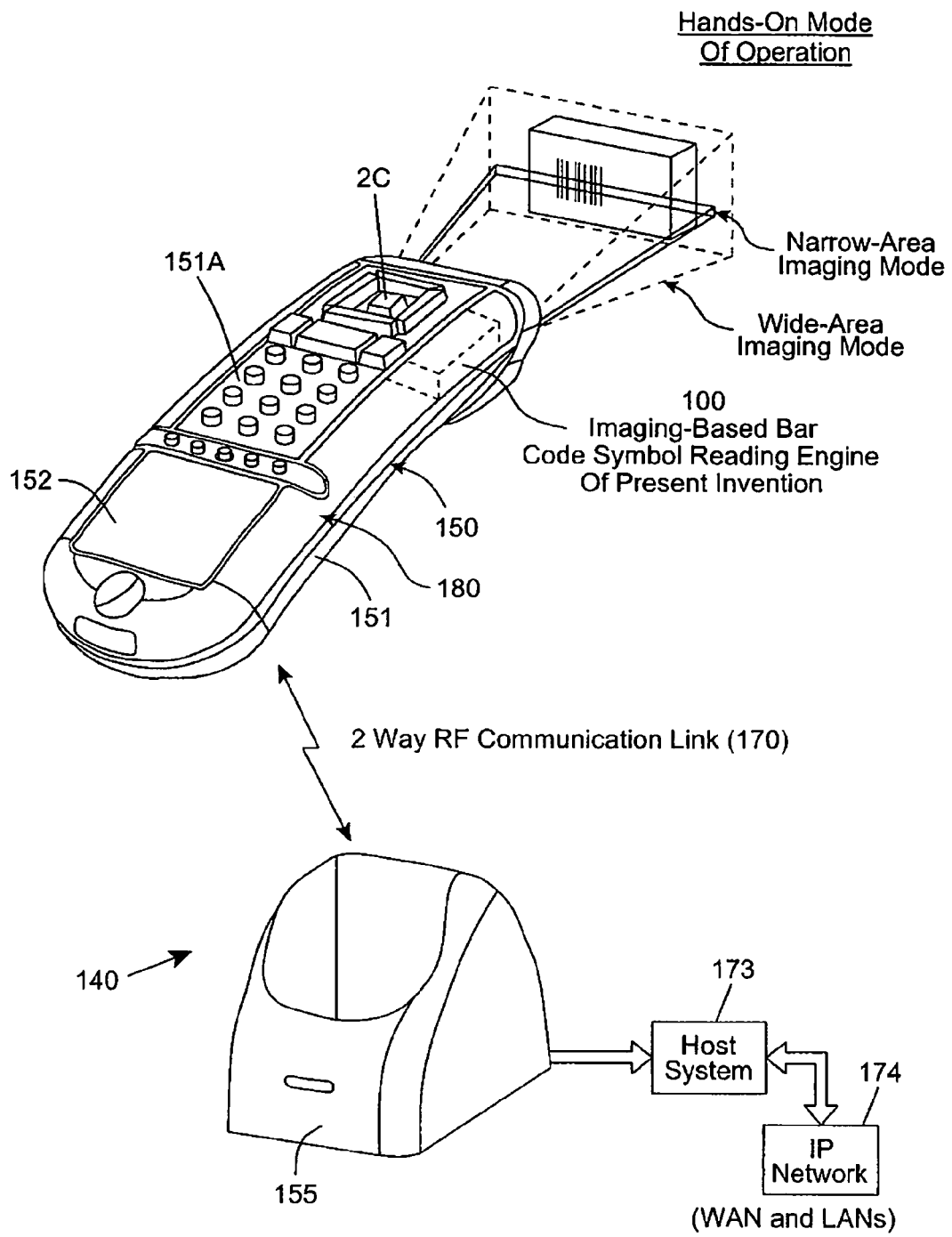
Figure 33:
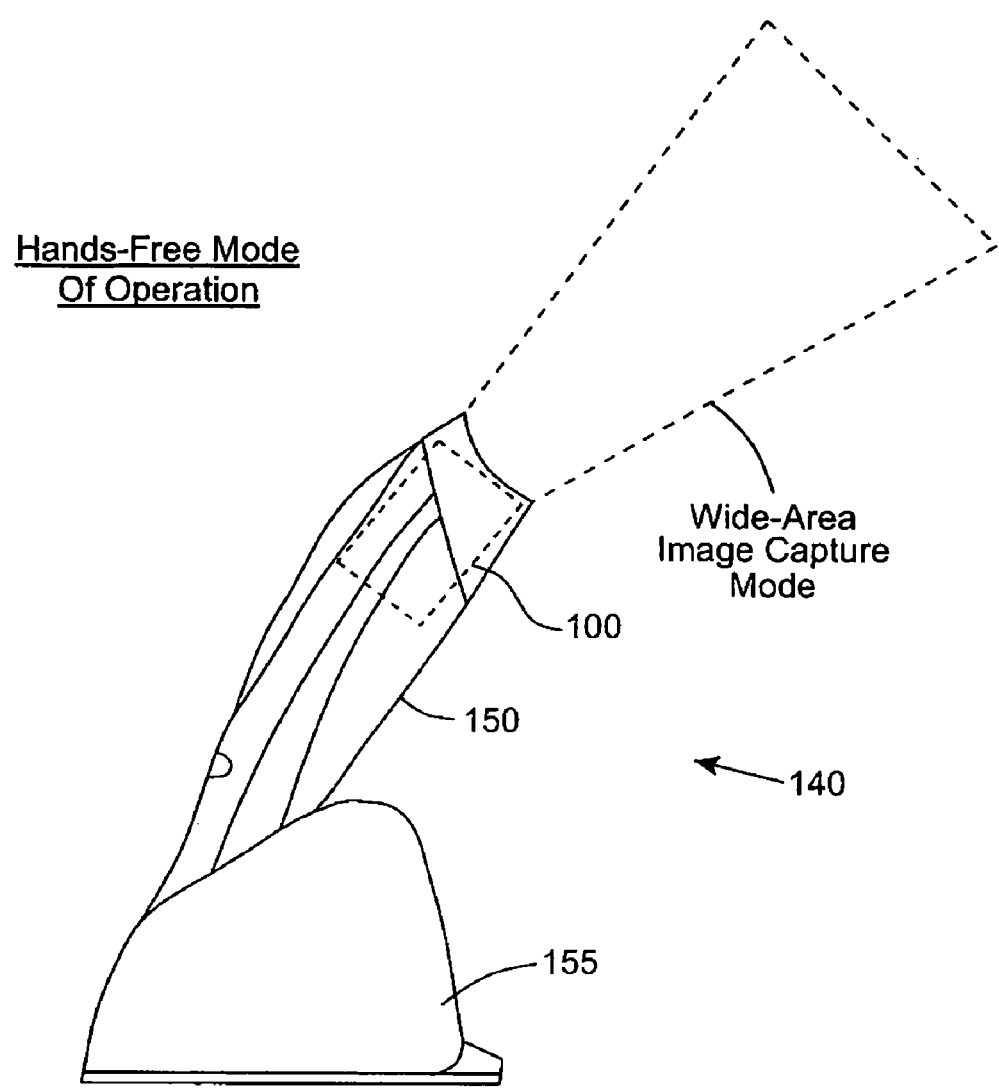
Figure 34:
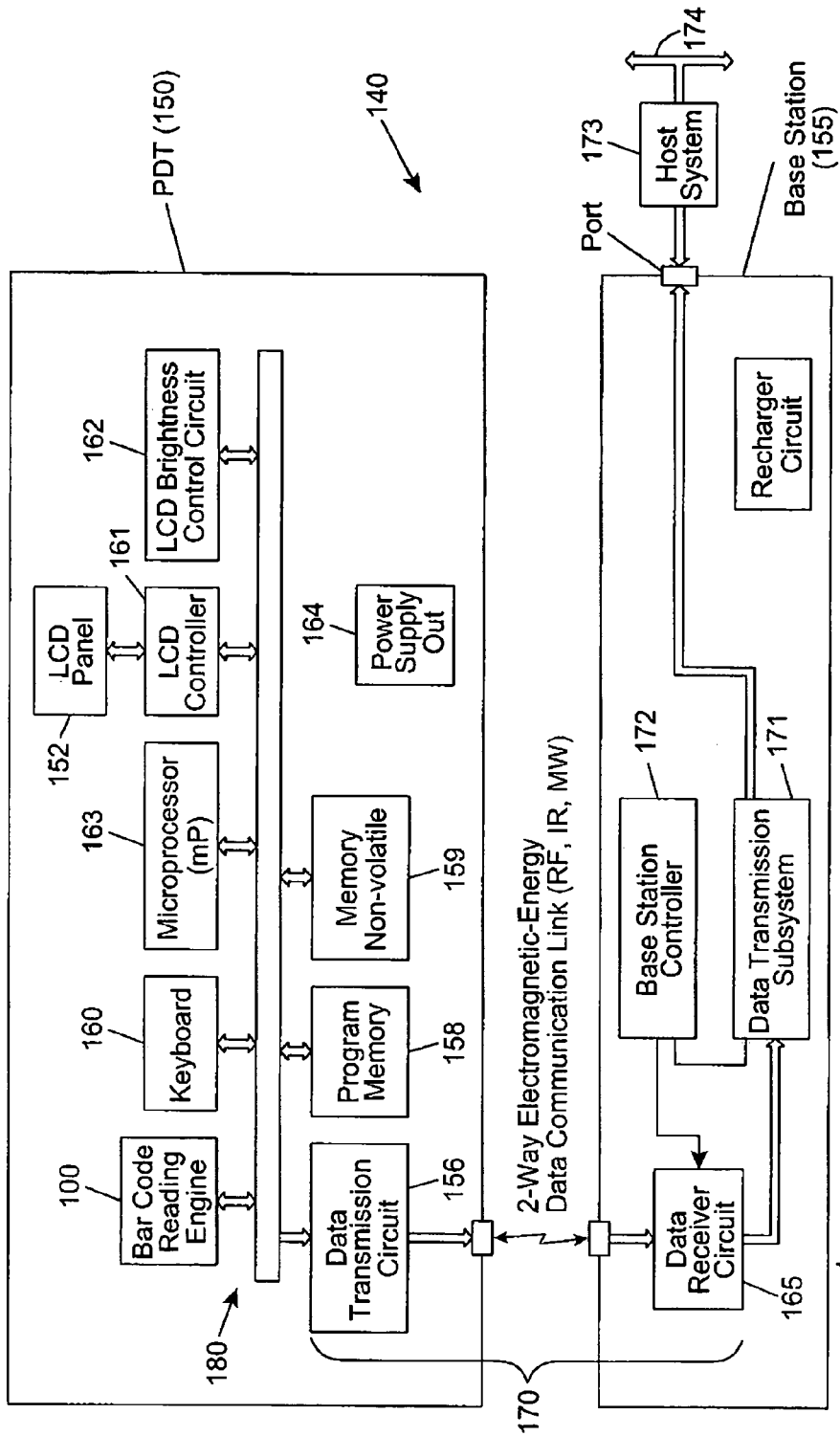
Figure 35:
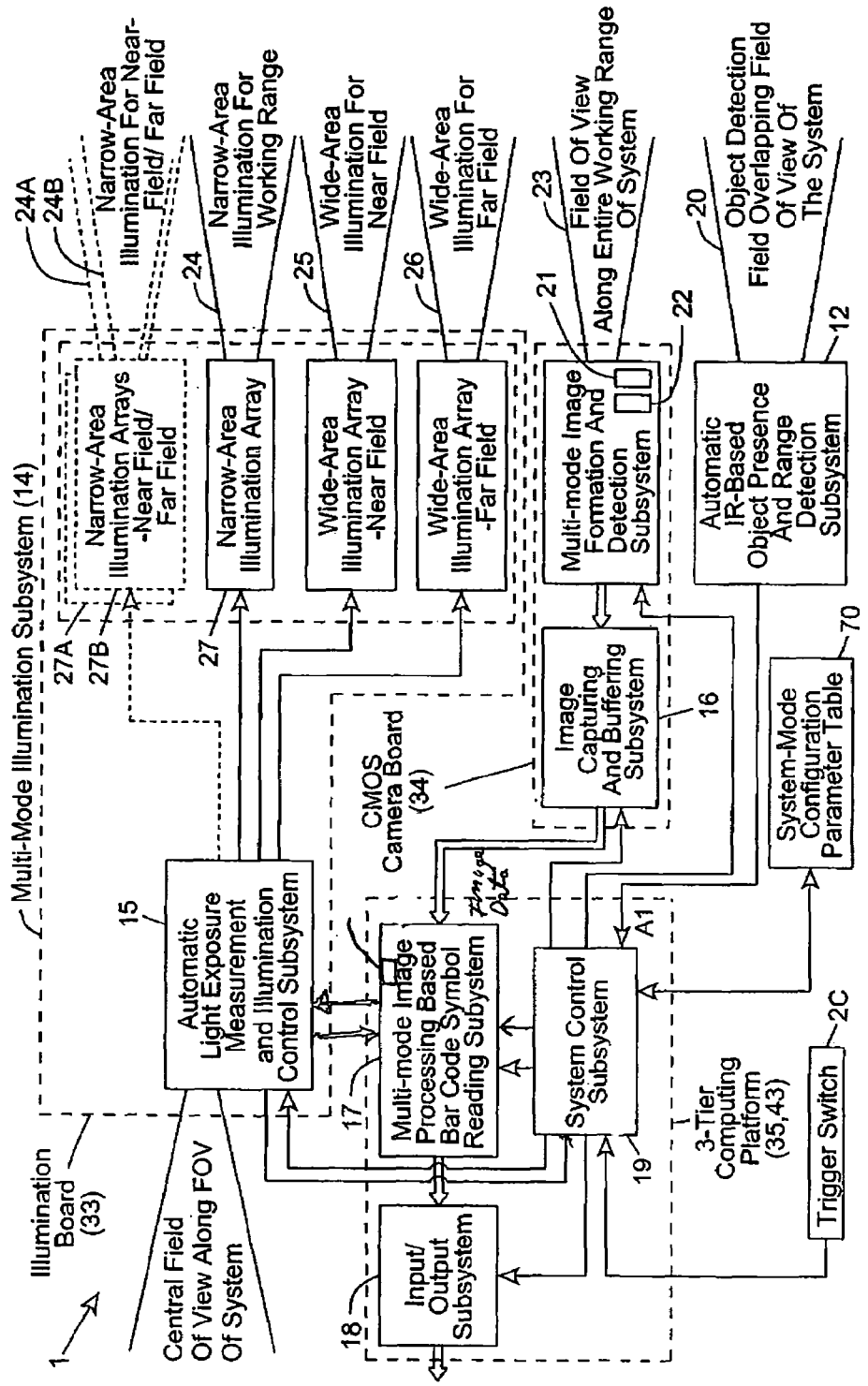
Figure 35A:
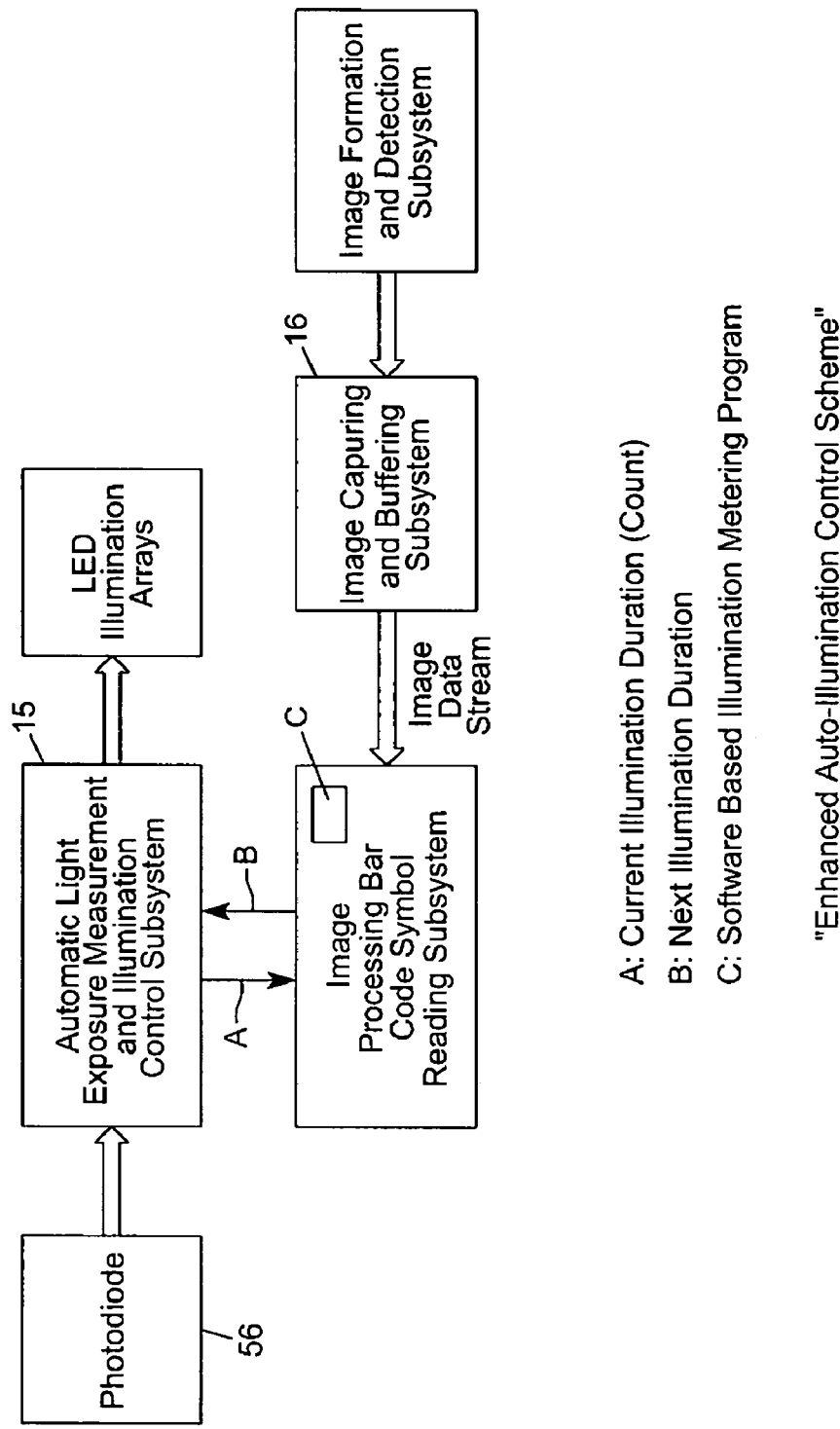
Figure 36:
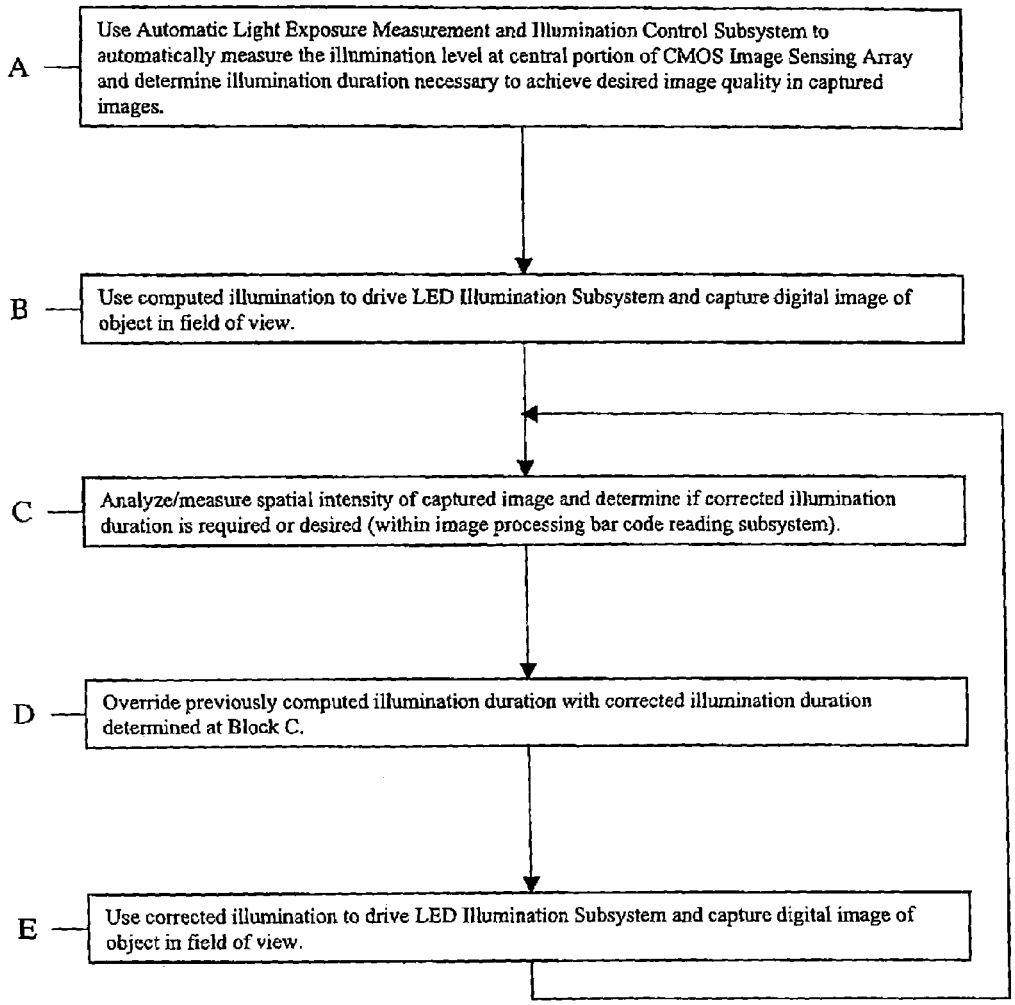
Figure 37:
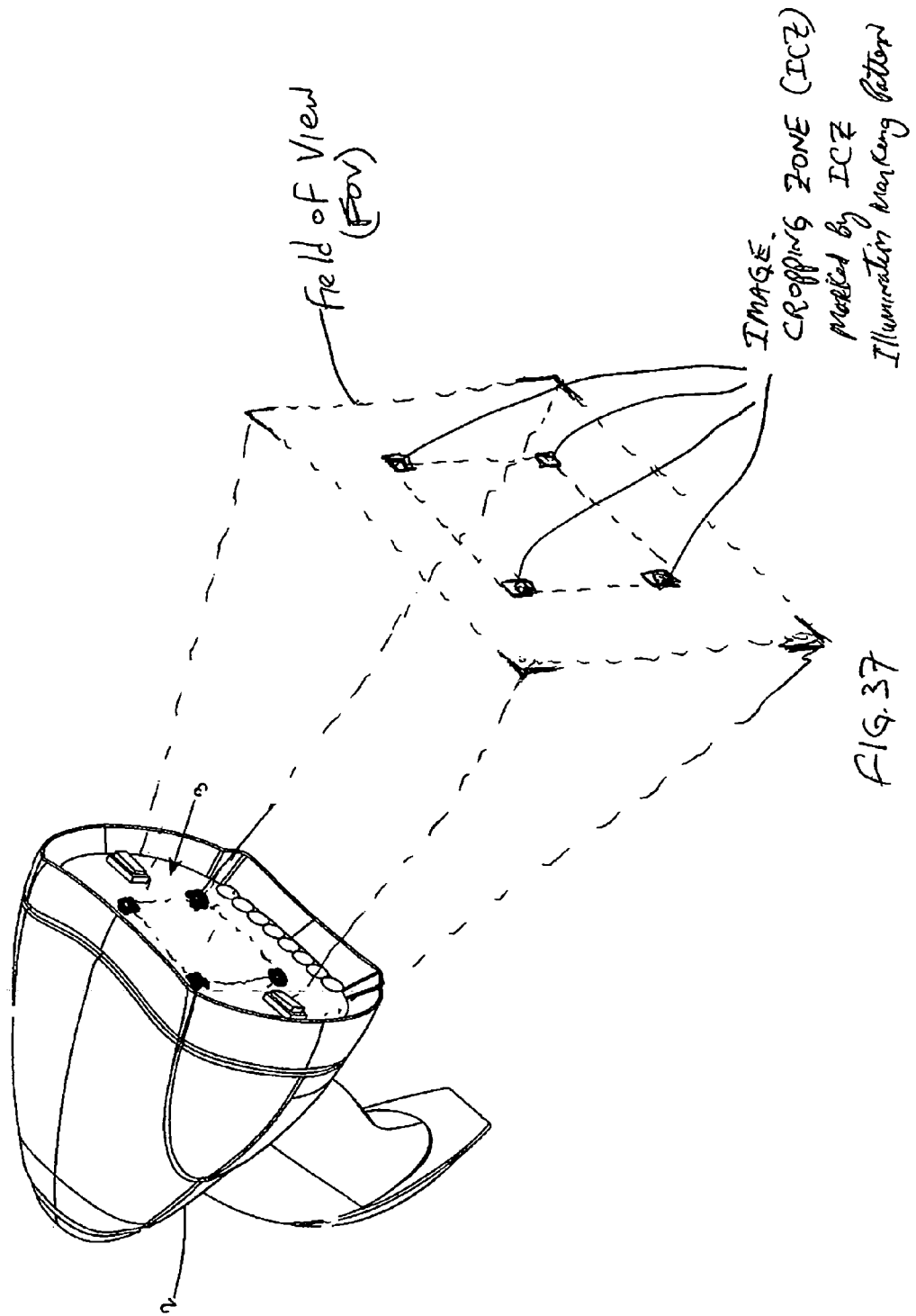
Figure 38:
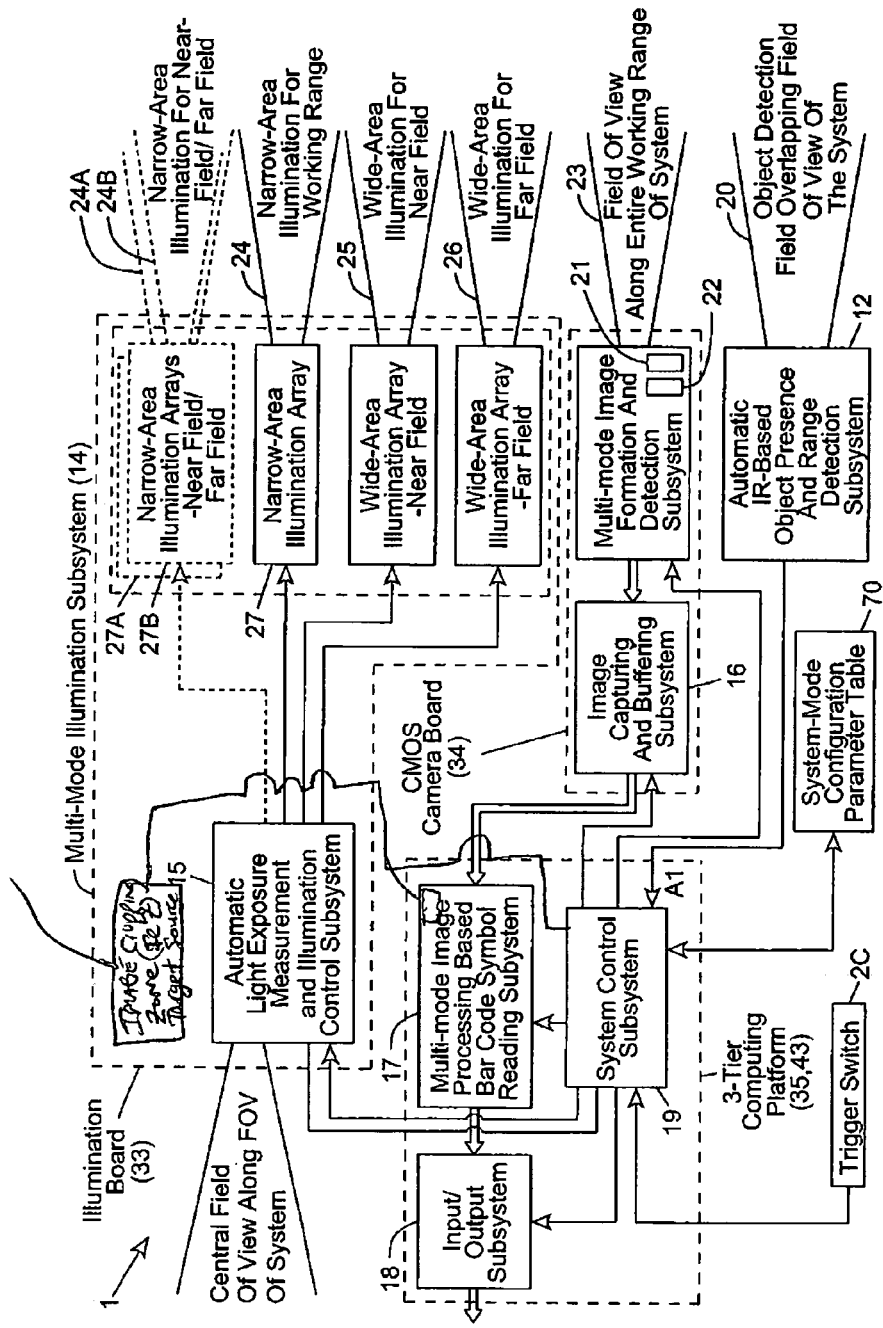
Figure 39:
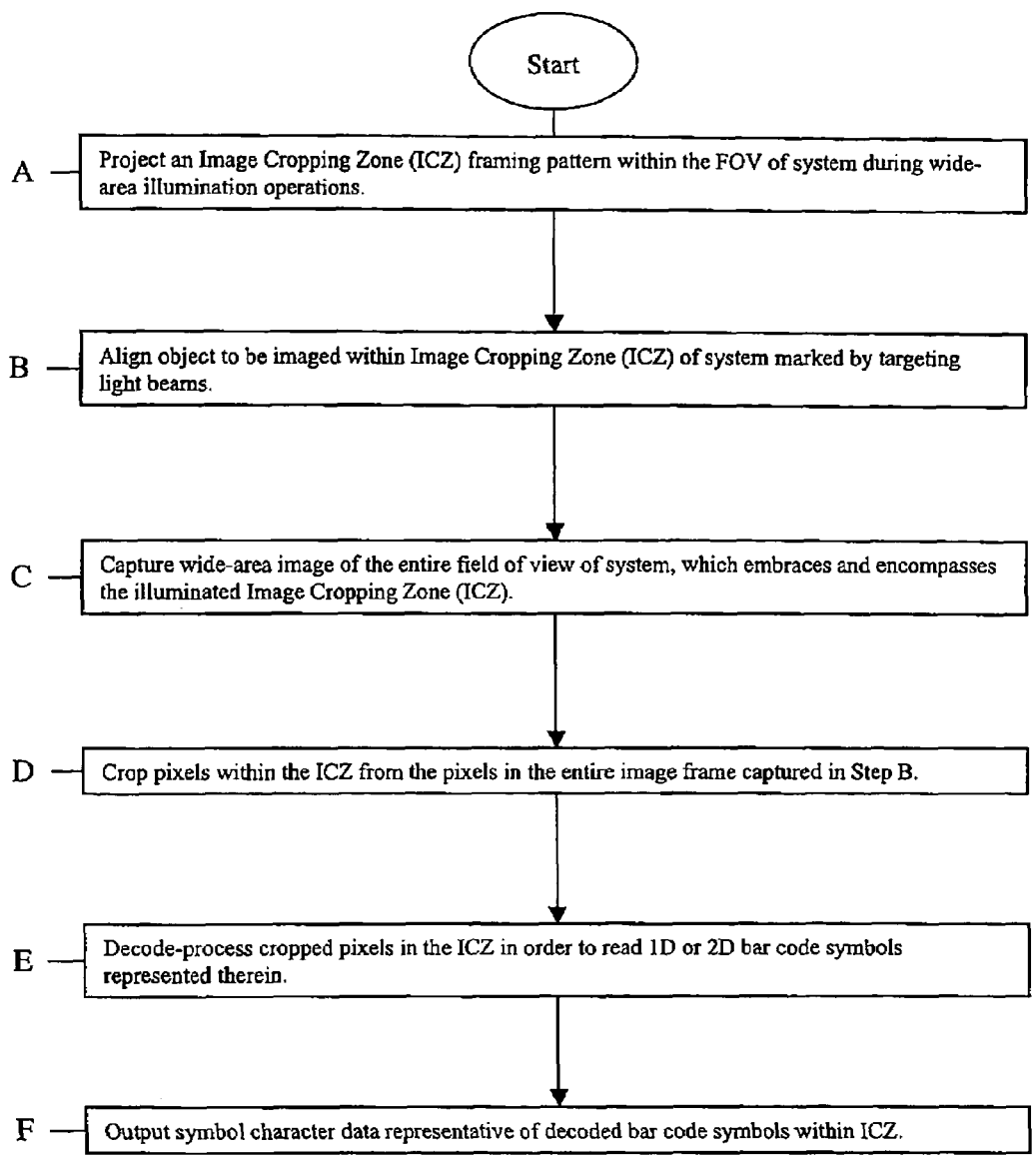

FIG. 2A1 is a schematic block diagram representative of a system design for the hand-supportable digital imaging-based bar code symbol reading device illustrated in FIGS. 1A through 1L, wherein the system design is shown comprising (1) a Multi-Mode Area-Type Image Formation and Detection (i.e. Camera) Subsystem having image formation (camera) optics for producing a field of view (FOV) upon an object to be imaged and a CMOS or like area-type image sensing array for detecting imaged light reflected off the object during illumination operations in either (i) a narrow-area image capture mode in which a few central rows of pixels on the image sensing array are enabled, or (ii) a wide-area image capture mode in which all rows of the image sensing array are enabled, (2) a Multi-Mode LED-Based Illumination Subsystem for producing narrow and wide area fields of narrow-band illumination within the FOV of the Image Formation And Detection Subsystem during narrow and wide area modes of image capture, respectively, so that only light transmitted from the Multi-Mode Illumination Subsystem and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected, (3) an IR-based object presence and range detection subsystem for producing an IR-based object detection field within the FOV of the Image Formation and Detection Subsystem, (4) an Automatic Light Exposure Measurement and Illumination Control Subsystem for controlling the operation of the LED-Based Multi-Mode Illumination Subsystem, (5) an Image Capturing and Buffering Subsystem for capturing and buffering 2-D images detected by the Image Formation and Detection Subsystem, (6) a Multimode Image-Processing Based Bar Code Symbol Reading Subsystem for processing images captured and buffered by the Image Capturing and Buffering Subsystem and reading 1D and 2D bar code symbols represented, and (7) an Input/Output Subsystem for outputting processed image data and the like to an external host system or other information receiving or responding device, in which each said subsystem component is integrated about (8) a System Control Subsystem, as shown;

FIG. 2A2 is a schematic block representation of the multi-Mode Image-Processing Based Bar Code Symbol Reading Subsystem, realized using the three-tier computing platform illustrated in FIG. 2B;

FIG. 2B is a schematic diagram representative of a system implementation for the hand-supportable digital imaging-based bar code symbol reading device illustrated in FIGS. 1A through 2A2, wherein the system implementation is shown comprising (1) an illumination board 33 carrying components realizing electronic functions performed by the Multi-Mode LED-Based Illumination Subsystem and the Automatic Light Exposure Measurement and Illumination Control Subsystem, (2) a CMOS camera board carrying a high resolution (1280×1024 8-bit 6 micron pixel size) CMOS image sensor array running at 25 Mhz master clock, at 7 frames/second at 1280*1024 resolution with randomly accessible region of interest (ROI) window capabilities, realizing electronic functions performed by the multi-mode area-type Image Formation and Detection Subsystem, (3) a CPU board (i.e. computing platform) including (i) an Intel Sabinal 32-Bit Microprocessor PXA210 running at 200 Mhz 1.0 core voltage with a 16 bit 100 Mhz external bus speed, (ii) an expandable (e.g. 8+ megabyte) Intel J3 Asynchronous 16-bit Flash memory, (iii) a 16 Megabytes of 100 MHz SDRAM, (iv) an Xilinx Spartan II FPGA FIFO 39 running at 50 Mhz clock frequency and 60 MB/Sec data rate, configured to control the camera timings and drive an image acquisition process, (v) a multimedia card socket, for realizing the other subsystems of the system, (vi) a power management module for the MCU adjustable by the system bus, and (vii) a pair of UARTs (one for an IRDA port and one for a JTAG port), (4) an interface board for realizing the functions performed by the I/O subsystem, and (5) an IR-based object presence and range detection circuit for realizing the IR-based Object Presence and Range Detection Subsystem;

FIG. 3A is a schematic representation showing the spatial relationships between the near and far and narrow and wide area fields of narrow-band illumination within the FOV of the Multi-Mode Image Formation and Detection Subsystem during narrow and wide area image capture modes of operation;

FIG. 3B is a perspective partially cut-away view of the hand-supportable digital imaging-based bar code symbol reading device of the first illustrative embodiment, showing the LED-Based Multi-Mode Illumination Subsystem transmitting visible narrow-band illumination through its narrow-band transmission-type optical filter system and illuminating an object with such narrow-band illumination, and also showing the image formation optics, including the low pass filter before the image sensing array, for collecting and focusing light rays reflected from the illuminated object, so that an image of the object is formed and detected using only the optical components of light contained within the narrow-band of illumination, while all other components of ambient light are substantially rejected before image detection at the image sensing array;

FIG. 3C is a schematic representation showing the geometrical layout of the optical components used within the hand-supportable digital imaging-based bar code symbol reading device of the first illustrative embodiment, wherein the red-wavelength reflecting high-pass lens element is positioned at the imaging window of the device before the image formation lens elements, while the low-pass filter is disposed before the image sensor between the image formation elements, so as to image the object at the image sensing array using only optical components within the narrow-band of illumination, while rejecting all other components of ambient light;

FIG. 3D is a schematic representation of the image formation optical subsystem employed within the hand-supportable digital imaging-based bar code symbol reading device of the first illustrative embodiment, wherein all three lenses are made as small as possible (with a maximum diameter of 12 mm), all have spherical surfaces, all are made from common glass, e.g. LAK2 (~LaK9), ZF10(=SF8), LAF2 (~LaF3);

FIG. 3E is a schematic representation of the lens holding assembly employed in the image formation optical subsystem of the hand-supportable digital imaging-based bar code symbol reading device of the first illustrative embodiment, showing a two-piece barrel structure which holds the lens elements, and a base structure which holds the image sensing array, wherein the assembly is configured so that the barrel structure slides within the base structure so as to focus the assembly;

FIG. 3F1 is a first schematic representation showing, from a side view, the physical position of the LEDs used in the Multi-Mode Illumination Subsystem, in relation to the image formation lens assembly, the image sensing array employed therein (e.g. a Motorola MCM20027 or National Semiconductor LM9638 CMOS 2-D image sensing array having a 1280×1024 pixel resolution (½" format), 6 micron pixel size, 13.5 Mhz clock rate, with randomly accessible region of interest (ROI) window capabilities);

FIG. 3F2 is a second schematic representation showing, from an axial view, the physical layout of the LEDs used in the Multi-Mode Illumination Subsystem of the digital imaging-based bar code symbol reading device, shown in relation to the image formation lens assembly, and the image sensing array employed therein;

FIG. 3G is a flow chart describing the steps involved in determining the Depth of Field (DOF) of the image formation optics assembly employed in the bar code reading system of the present invention;

FIG. 4A is a schematic representation of the Depth of Field Chart used in the design of the image formation optics in the digital imaging-based bar code symbol reading device, wherein image formation lens resolution characteristics are plotted against the pixel limits of the image sensing array;

FIG. 4B is a graphical chart illustrating the performance of the image formation optics of the digital imaging-based bar code symbol reading device of the present invention, plotting object distance (centimeters) against MTF values of image formation optics;

FIG. 4C is a schematic representation illustrating the Depth of Field of the image formation optics of the digital imaging-based bar code symbol reading device of the present invention, measured in millimeters, and showing the narrowest bar code element dimension that can be measured over particular regions within its Depth of Field;

FIG. 4D shows a DOF chart that plots the resolution of the image formation optics, indicating only the optical performance of the subsystem;

FIG. 4E graphically illustrates how to read off the DOF for a certain mil size code, considering only the optical performance of the image formation optics of the Image Formation and Detection Subsystem;

FIG. 4F shows the 1.4 and 1.6 pixel sampling limits plotted on the same axes as the optical performance curve for a fixed focal length reader (as they are functions of object distance);

FIG. 4G graphically illustrates how to determine the composite DOF curve of the Image Formation and Detection Subsystem, considering optical performance and sampling limit together, for the 1.6 pixel case;

FIG. 4H graphically illustrates how to read off the DOF for a certain mil size code, considering optical performance and sampling limit together, for the 1.6 pixel case;

FIG. 4I1 through 4I3, taken together, show an exemplary computer program written in ZPL (Zemax Programming Language) and capable of generating the composite DOF chart;

FIG. 5A1 is a schematic representation specifying the range of narrow-area illumination, near-field wide-area illumination, and far-field wide-area illumination produced from the LED-Based Multi-Mode Illumination Subsystem employed in the hand-supportable digital imaging-based bar code symbol reading device of the present invention;

FIG. 5A2 is a table specifying the geometrical properties and characteristics of each illumination mode supported by the LED-Based Multi-Mode Illumination Subsystem employed in the hand-supportable digital imaging-based bar code symbol reading device of the present invention;

FIG. 5B is a schematic representation illustrating the physical arrangement of LED light sources associated with the narrow-area illumination array and the near-field and far-field wide-area illumination arrays employed in the digital imaging-based bar code symbol reading device of the present invention, wherein the LEDs in the far-field wide-area illuminating arrays are located behind spherical lenses, the LEDs in the narrow-area illuminating array are disposed behind cylindrical lenses, and the LEDs in the near-field wide-area illuminating array are unlensed in the first illustrative embodiment of the Digital Imaging-Based Bar Code Reading Device;

FIG. 5C1 is a graphical representation showing the Lambertian emittance versus wavelength characteristics of the LEDs used to implement the narrow-area illumination array in the Multi-Mode Illumination Subsystem of the present invention;

FIG. 5C2 is a graphical representation showing the Lambertian emittance versus polar angle characteristics of the LEDs used to implement the narrow-area illumination array in the Multi-Mode Illumination Subsystem of the present invention;

FIG. 5C3 is a schematic representation of the cylindrical lenses used before the LEDs in the narrow-area (linear) illumination arrays in the digital imaging-based bar code symbol reading device of the present invention, wherein the first surface of the cylindrical lens is curved vertically to create a narrow-area (i.e. linear) illumination pattern, and the second surface of the cylindrical lens is curved horizontally to control the height of the of the narrow-area illumination pattern to produce a narrow-area (i.e. linear) illumination field;

FIG. 5C4 is a schematic representation of the layout of the pairs of LEDs and two cylindrical lenses used to implement the narrow-area (linear) illumination array employed in the digital imaging-based bar code symbol reading device of the present invention;

FIG. 5C5 is a set of six illumination profiles for the narrow-area (linear) illumination fields produced by the narrow-area (linear) illumination array employed in the digital imaging-based bar code symbol reading device of the illustrative embodiment, taken at 30, 40, 50, 80, 120, and 220 millimeters along the field away from the imaging window (i.e. working distance) of the digital imaging-based bar code symbol reading device, illustrating that the spatial intensity of the narrow-area illumination field begins to become substantially uniform at about 80 millimeters;

FIG. 5D1 is a graphical representation showing the Lambertian emittance versus wavelength characteristics of the LEDs used to implement the wide area illumination arrays employed in the digital imaging-based bar code symbol reading device of the present invention;

FIG. 5D2 is a graphical representation showing the Lambertian emittance versus polar angle characteristics of the LEDs used to implement the far-field and near-field wide-area illumination arrays employed in the digital imaging-based bar code symbol reading device of the present invention;

FIG. 5D3 is a schematic representation of the plano-convex lenses used before the LEDs in the far-field wide-area illumination arrays in the illumination subsystem of the present invention;

FIG. 5D4 is a schematic representation of the layout of LEDs and plano-convex lenses used to implement the far and narrow wide-area illumination array employed in the digital imaging-based bar code symbol reading device of the present invention, wherein the illumination beam produced therefrom is aimed by positioning the lenses at angles before the LEDs in the near-field (and far-field) wide-area illumination arrays employed therein;

FIG. 5D5 is a set of six illumination profiles for the near-field wide-area illumination fields produced by the near-field wide-area illumination arrays employed in the digital imaging-based bar code symbol reading device of the illustrative embodiment, taken at 10, 20, 30, 40, 60, and 100 millimeters along the field away from the imaging window (i.e. working distance) of the digital imaging-based bar code symbol reading device, illustrating that the spatial intensity of the near-field wide-area illumination field begins to become substantially uniform at about 40 millimeters;

FIG. 5D6 is a set of three illumination profiles for the far-field wide-area illumination fields produced by the far-field wide-area illumination arrays employed in the digital imaging-based bar code symbol reading device of the illustrative embodiment, taken at 100, 150 and 220 millimeters along the field away from the imaging window (i.e. working distance) of the digital imaging-based bar code symbol reading device, illustrating that the spatial intensity of the far-field wide-area illumination field begins to become substantially uniform at about 100 millimeters;

FIG. 5D7 is a table illustrating a preferred method of calculating the pixel intensity value for the center of the far-field wide-area illumination field produced from the Multi-Mode Illumination Subsystem employed in the digital imaging-based bar code symbol reading device of the present invention, showing a significant signal strength (greater than 80 DN);

FIG. 6A1 is a schematic representation showing the red-wavelength reflecting (high-pass) imaging window integrated within the hand-supportable housing of the digital imaging-based bar code symbol reading device, and the low-pass optical filter disposed before its CMOS image sensing array therewithin, cooperating to form a narrow-band optical filter subsystem for transmitting substantially only the very narrow band of wavelengths (e.g. 620-700 nanometers) of visible illumination produced from the Multi-Mode Illumination Subsystem employed in the digital imaging-based bar code symbol reading device, and rejecting all other optical wavelengths outside this narrow optical band however generated (i.e. ambient light sources);

FIG. 6A2 is a schematic representation of transmission characteristics (energy versus wavelength) associated with the low-pass optical filter element disposed after the red-wavelength reflecting high-pass imaging window within the hand-supportable housing of the digital imaging-based bar code symbol reading device, but before its CMOS image sensing array, showing that optical wavelengths below 620 nanometers are transmitted and wavelengths above 620 nm are substantially blocked (e.g. absorbed or reflected);

FIG. 6A3 is a schematic representation of transmission characteristics (energy versus wavelength) associated with the red-wavelength reflecting high-pass imaging window integrated within the hand-supportable housing of the digital imaging-based bar code symbol reading device of the present invention, showing that optical wavelengths above 700 nanometers are transmitted and wavelengths below 700 nm are substantially blocked (e.g. absorbed or reflected);

FIG. 6A4 is a schematic representation of the transmission characteristics of the narrow-based spectral filter subsystem integrated within the hand-supportable imaging-based bar code symbol reading device of the present invention, plotted against the spectral characteristics of the LED-emissions produced from the Multi-Mode Illumination Subsystem of the illustrative embodiment of the present invention;

FIG. 7A is a schematic representation showing the geometrical layout of the spherical/parabolic light reflecting/collecting mirror and photodiode associated with the Automatic Light Exposure Measurement and Illumination Control Subsystem, and arranged within the hand-supportable digital imaging-based bar code symbol reading device of the illustrative embodiment, wherein incident illumination is collected from a selected portion of the center of the FOV of the system using a spherical light collecting mirror, and then focused upon a photodiode for detection of the intensity of reflected illumination and subsequent processing by the Automatic Light Exposure Measurement and Illumination Control Subsystem, so as to then control the illumination produced by the LED-based Multi-Mode Illumination Subsystem employed in the digital imaging-based bar code symbol reading device of the present invention;

FIG. 7B is a schematic diagram of the Automatic Light Exposure Measurement and Illumination Control Subsystem employed in the hand-supportable digital imaging-based bar code symbol reading device of the present invention, wherein illumination is collected from the center of the FOV of the system and automatically detected so as to generate a control signal for driving, at the proper intensity, the narrow-area illumination array as well as the far-field and narrow-field wide-area illumination arrays of the Multi-Mode Illumination Subsystem, so that the CMOS image sensing array produces digital images of illuminated objects of sufficient brightness;

FIGS. 7C1 and 7C2 is a schematic diagram of a hybrid analog/digital circuit designed to implement the Automatic Light Exposure Measurement and Illumination Control Subsystem of FIG. 7B employed in the hand-supportable digital imaging-based bar code symbol reading device of the present invention;

FIG. 7D is a schematic diagram showing that, in accordance with the principles of the present invention, the CMOS image sensing array employed in the digital imaging-based bar code symbol reading device of the illustrative embodiment, once activated by the System Control Subsystem (or directly by the trigger switch), and when all rows in the image sensing array are in a state of integration operation, automatically activates the Automatic Light Exposure Measurement and Illumination Control Subsystem which, in response thereto, automatically activates the LED illumination driver circuitry to automatically drive the appropriate LED illumination arrays associated with the Multi-Mode Illumination Subsystem in a precise manner and globally expose the entire CMOS image detection array with narrowly tuned LED-based illumination when all of its rows of pixels are in a state of integration, and thus have a common integration time, thereby capturing high quality images independent of the relative motion between the bar code reader and the object;

FIGS. 7E1 and 7E2, taken together, set forth a flow chart describing the steps involved in carrying out the global exposure control method of the present invention, within the digital imaging-based bar code symbol reading device of the illustrative embodiment;

FIG. 8 is a schematic block diagram of the IR-based automatic Object Presence and Range Detection Subsystem employed in the hand-supportable digital imaging-based bar code symbol reading device of the present invention, wherein a first range indication control signal is generated upon detection of an object within the near-field region of the Multi-Mode Illumination Subsystem, and wherein a second range indication control signal is generated upon detection of an object within the far-field region of the Multi-Mode Illumination Subsystem;

FIG. 9 is a schematic representation of the hand-supportable digital imaging-based bar code symbol reading device of the present invention, showing that its CMOS image sensing array is operably connected to its microprocessor through a FIFO (realized by way of a FPGA) and a system bus, and that its SDRAM is also operably connected to the microprocessor by way of the system bus, enabling the mapping of pixel data captured by the imaging array into the SDRAM under the control of the direct memory access (DMA) module within the microprocessor;

FIG. 10 is a schematic representation showing how the bytes of pixel data captured by the CMOS imaging array within the hand-supportable digital imaging-based bar code symbol reading device of the present invention, are mapped into the addressable memory storage locations of its SDRAM during each image capture cycle carried out within the device;

FIG. 11 is a schematic representation showing the software modules associated with the three-tier software architecture of the hand-supportable digital imaging-based bar code symbol reading device of the present invention, namely: the Main Task module, the CodeGate Task module, the Narrow-Area Illumination Task module, the Metroset Task module, the Application Events Manager module, the User Commands Table module, and the Command Handler module residing with the Application layer of the software architecture; the Tasks Manager module, the Events Dispatcher module, the Input/Output Manager module, the User Commands Manager module, the Timer Subsystem module, the Input/Output Subsystem module and the Memory Control Subsystem module residing with the System Core (SCORE) layer of the software architecture; and the Linux Kernal module, the Linux File System module, and Device Drivers modules residing within the Linux Operating System (OS) layer of the software architecture;

FIG. 12A is a schematic representation of the Events Dispatcher software module which provides a means of signaling and delivering events to the Application Events Manager, including the starting of a new task, stopping a currently running task, doing something, or doing nothing and ignoring the event;

FIG. 12B is a table listing examples of system-defined events which can occur and be dispatched within the hand-supportable digital imaging-based bar code symbol reading device of the present invention, namely: SCORE_EVENT_POWER_UP which signals the completion of system start-up and involves no parameters; SCORE_EVENT_TIMEOUT which signals the timeout of the logical timer, and involves the parameter "pointer to timer id"; SCORE_EVENT_UNEXPECTED_INPUT which signals that the unexpected input data is available and involves the parameter "pointer to connection id"; SCORE_EVENT_TRIG_ON which signals that the user pulled the trigger switch and involves no parameters; SCORE_EVENT_TRIG_OFF which signals that the user released the trigger switch and involves no parameters; SCORE_EVENT_OBJECT_DETECT_ON which signals that the object is positioned under the bar code reader and involves no parameters; SCORE_EVENT_OBJECT_DETECT_OFF which signals that the object is removed from the field of view of the bar code reader and involves no parameters; SCORE_EVENT_EXIT_TASK which signals the end of the task execution and involves the pointer UTID; and SCORE_EVENT_ABORT_TASK which signals the aborting of a task during execution;

FIG. 12C is a schematic representation of the Tasks Manager software module which provides a means for executing and stopping application specific tasks (i.e. threads);

FIG. 12D is a schematic representation of the Input/Output Manager software module (i.e Input/Output Subsystem), which runs in the background and monitors activities of external devices and user connections, and signals appropriate events to the Application Layer, when such activities are detected;

FIGS. 12E1 and 12E2 set forth a schematic representation of the Input/Output Subsystem software module which provides a means for creating and deleting input/output connections, and communicating with external systems and devices;

FIGS. 12F1 and 12F2 set forth a schematic representation of the Timer Subsystem which provides a means for creating, deleting, and utilizing logical timers;

FIGS. 12G1 and 12G2 set forth a schematic representation of the Memory Control Subsystem which provides an interface for managing the thread-level dynamic memory with the device, fully compatible with standard dynamic memory management functions, as well as a means for buffering collected data;

FIG. 12H is a schematic representation of the user commands manager which provides a standard way of entering user commands, and executing application modules responsible for handling the same;

FIG. 12I is a schematic representation of the device driver software modules, which includes trigger switch drivers for establishing a software connection with the hardware-based manually-actuated trigger switch employed on the digital imaging-based bar code symbol reading device, an image acquisition driver for implementing image acquisition functionality aboard the digital imaging-based bar code symbol reading device, and an IR driver for implementing object detection functionality aboard the imaging-based bar code symbol reading device;

FIG. 13A is an exemplary flow chart representation showing how when the user points the bar code reader towards a bar code symbol, the IR device drivers detect that object within the field, and then wakes up the Input/Output Manager software module at the System Core Layer;

FIG. 13B is an exemplary flow chart representation showing how upon detecting an object, the Input/Output Manager posts the SCORE_OBJECT_DETECT_ON event to the Events Dispatcher software module;

FIG. 13C is an exemplary flow chart representation showing how, in response to detecting an object, the Events Dispatcher software module passes the SCORE_OBJECT_DETECT_ON event to the Application Layer;

FIG. 13D is an exemplary flow chart representation showing how upon receiving the SCORE_OBJECT_DETECT_ON event at the Application Layer, the Application Events Manager executes an event handling routine which activates the narrow-area illumination array associated with the Multi-Mode Illumination Subsystem, and executes either the CodeGate Task described in FIG. 13E (when required by System Mode in which the Device is programmed) or the Narrow-Area Illumination Task described in FIG. 13M (when required by System Mode in which the Device is programmed);

FIG. 13E is an exemplary flow chart representation showing what operations are carried out when the CodeGate Task is (enabled and) executed within the Application Layer;

FIG. 13F is an exemplary flow chart representation showing how, when the user pulls the trigger switch on the bar code reader while the Code Task is executing, the trigger device driver wakes up the Input/Output Manager at the System Core Layer;

FIG. 13G is an exemplary flow chart representation showing how, in response to waking up, the Input/Output Manager posts the SCORE_TRIGGER_ON event to the Events Dispatcher;

FIG. 13H is an exemplary flow chart representation showing how the Events Dispatcher passes on the SCORE_TRIGGER_ON event to the Application Events Manager at the Application Layer;

FIGS. 13I1 and 13I2, taken together, set forth an exemplary flow chart representation showing how the Application Events Manager responds to the SCORE_TRIGGER_ON event by invoking a handling routine within the Task Manager at the System Core Layer which deactivates the narrow-area illumination array associated with the Multi-Mode Illumination Subsystem, cancels the CodeGate Task or the Narrow-Area Illumination Task (depending on which System Mode the Device is programmed), and executes the Main Task;

FIG. 13J is an exemplary flow chart representation showing what operations are carried out when the Main Task is (enabled and) executed within the Application Layer;

FIG. 13K is an exemplary flow chart representation showing what operations are carried out when the Data Output Procedure, called in the Main Task, is executed within the Input/Output Subsystem software module in the Application Layer;

FIG. 13L is an exemplary flow chart representation showing decoded symbol character data being sent from the Input/Output Subsystem to the Device Drivers within the Linux OS Layer of the system;

FIG. 13M is an exemplary flow chart representation showing what operations are carried out when the Narrow-Area Illumination Task is enabled and executed within the Application Layer;

FIGS. 13N1 through 13N3, taken together, set forth a flow chart describing a novel method of generating wide-area illumination, for use during the Main Task routine so as to illuminate objects with a wide-area illumination field in a manner, which substantially reduces specular-type reflection at the CMOS image sensing array in the digital imaging-based bar code reading device of the present invention;

FIG. 14 is a table listing various bar code symbologies supported by the Multi-Mode Bar Code Symbol Reading Subsystem module employed within the hand-supportable digital imaging-based bar code reading device of the present invention;

FIG. 15 is a table listing the four primary modes in which the Multi-Mode Bar Code Symbol Reading Subsystem module can be programmed to operate, namely: the Automatic Mode wherein the Multi-Mode Bar Code Symbol Reading Subsystem is configured to automatically process a captured frame of digital image data so as to search for one or more bar codes represented therein in an incremental manner, and to continue searching until the entire image is processed; the Manual Mode wherein the Multi-Mode Bar Code Symbol Reading Subsystem is configured to automatically process a captured frame of digital image data, starting from the center or sweep spot of the image at which the user would have aimed the bar code reader, so as to search for (i.e. find) one or more bar code symbols represented therein, by searching in a helical manner through frames or blocks of extracted image feature data and marking the same and processing the corresponding raw digital image data until a bar code symbol is recognized/read within the captured frame of image data; the ROI-Specific Mode wherein the Multi-Mode Bar Code Symbol Reading Subsystem is configured to automatically process a specified "region of interest" (ROI) in a captured frame of digital image data so as to search for one or more bar codes represented therein, in response to coordinate data specifying the location of the bar code within the field of view of the multi-mode image formation and detection system; the NoFinder Mode wherein the Multi-Mode Bar Code Symbol Reading Subsystem is configured to automatically process a captured narrow-area (linear) frame of digital image data, without feature extraction and marking operations used in the Automatic and Manual Modes, so as to read one or more bar code symbols represented therein; and the Omniscan Mode, wherein the Multi-Mode Bar Code Symbol Reading Subsystem is configured to automatically process a captured frame of digital image data along any one or more predetermined virtual scan line orientations, without feature extraction and marking operations used in the Automatic and Manual Modes, so as to read one or more bar code symbols represented therein;

FIG. 16 is an exemplary flow chart representation showing the steps involved in setting up and cleaning up the software sub-Application entitled "Multi-Mode Image-Processing Based Bar Code Symbol Reading Subsystem", once called from either (i) the CodeGate Task software module at the Block entitled "READ BAR CODE(S) IN CAPTURED NARROW-AREA IMAGE" indicated in FIG. 13E, or (ii) the Main Task software module at the Block entitled "READ BAR CODE(S) IN CAPTURED WIDE-AREA IMAGE" indicated in FIG. 13J;

FIG. 17A is a summary of the steps involved in the decode process carried out by the Multi-Mode Bar Code Symbol Reading Subsystem of the present invention during its Automatic Mode of operation, wherein (1) the first stage of processing involves searching for (i.e. finding) regions of interest (ROIs) by processing a low resolution image of a captured frame of high-resolution image data, partitioning the low-resolution image into N×N blocks, and creating a feature vector for each block using spatial-derivative based image processing techniques, (2) the second stage of processing involves marking ROIs by examining the feature vectors for regions of high-modulation, calculating bar code orientation and marking the four corners of a bar code as a ROI, and (3) the third stage of processing involves reading any bar code symbols represented within the ROI by traversing the bar code and updating the feature vectors, examining the zero-crossings of filtered images, creating bar and space patterns, and decoding the bar and space patterns using conventional decoding algorithms;

FIG. 17B is an exemplary flow chart representation of the steps involved in the image-processing method carried out by the Multi-Mode Bar Code Symbol Reading Subsystem during its Automatic Mode of operation;

FIG. 18A is a graphical representation illustrating the generation of a low-resolution image of a package label from an original high-resolution image thereof during the first finding stage of processing within the Multi-Mode Bar Code Symbol Reading Subsystem configured in its Automatic Mode of operation;

FIG. 18B is a graphical representation illustrating the partitioning of the low-resolution image of the package label, the calculation of feature vectors using the same, and the analysis of these feature vectors for parallel lines, during the first finding stage of processing within the Multi-Mode Bar Code Symbol Reading Subsystem during its Automatic Mode of operation;

FIG. 18C is a graphical representation showing that the calculation of feature vectors within each block of low-resolution image data, during the second marking stage of processing within the Multi-Mode Bar Code Symbol Reading Subsystem, can involve the use of gradient vectors, edge density measures, the number of parallel edge vectors, centroids of edgels, intensity variance, and the histogram of intensities captured from the low-resolution image;

FIG. 18D is a graphical representation of the examination of feature vectors looking for high edge density, large number of parallel edge vectors and large intensity variance, during the second marking stage of processing within the Multi-Mode Bar Code Symbol Reading Subsystem during its Automatic Mode of operation;

FIGS. 18E and 18F set forth graphical representations of calculating bar code orientation during the second marking stage of processing within the Multi-Mode Bar Code Symbol Reading Subsystem operating in its Automatic Mode, wherein at each feature vector block, the bar code is traversed (i.e. sliced) at different angles, the slices are matched with each other based on "least mean square error", and the correct orientation is determined to be that angle which matches the mean square error sense through every slice of the bar code symbol represented within the captured image;

FIG. 18F is a graphical representation of calculating bar code orientation, during the second marking stage of processing within the Multi-Mode Bar Code Symbol Reading Subsystem operating in its Automatic Mode;

FIG. 18G is a graphical representation of the marking of the four corners of the detected bar code symbol during the second marking stage of processing within the Multi-Mode Bar Code Symbol Reading Subsystem operating in its Automatic Mode, wherein such marking operations are performed on the full high-resolution image of the parcel, the bar code is traversed in either direction starting from the center of the block, the extent of modulation is detected using the intensity variance, and the x,y coordinates (pixels) of the four corners of the bar code are detected starting from 1 and 2 and moving perpendicular to the bar code orientation, and define the ROI by the detected four corners of the bar code symbol within the high-resolution image;

FIG. 18H is a graphical representation of updating the feature vectors during the third stage of processing within the Multi-Mode Bar Code Symbol Reading Subsystem operating in its Automatic Mode, wherein the histogram component of the feature vector Fv is updated while traversing the bar code symbol, the estimate of the black-to-white transition is calculated, and an estimate of narrow and wide elements of the bar code symbol are calculated;

FIG. 18I is a graphical representation of the search for zero crossings during the third stage of processing within the Multi-Mode Bar Code Symbol Reading Subsystem operating in its Automatic Mode, wherein the high-resolution bar code image is median filtered in a direction perpendicular to bar code orientation, the second derivative zero crossings define edge crossings, the zero-crossing data is used only for detecting edge transitions, and the black/white transition estimates are used to put upper and lower bounds on the grey levels of the bars and spaces of the bar code symbol represented within the captured image;

FIG. 18J is a graphical representation of creating bar and space pattern during the third stage of processing within the Multi-Mode Bar Code Symbol Reading Subsystem operating in its Automatic Mode, wherein the edge transition is modeled as a ramp function, the edge transition is assumed to be 1 pixel wide, the edge transition location is determined at the subpixel level, and the bar and space counts are gathered using edge transition data;

FIG. 18K is a graphical representation of the decode bar and space pattern during the third stage of processing within the Multi-Mode Bar Code Symbol Reading Subsystem operating in its Automatic Mode, wherein the bar and space data is framed with borders, and the bar and space data is decoded using existing laser scanning bar code decoding algorithms;

FIG. 19A is a summary of the steps involved in the image-processing method carried out by the Multi-Mode Bar Code Symbol Reading Subsystem during its Manual Mode of operation, wherein (1) the first stage of processing involves searching for (i.e. finding) regions of interest (ROIs) by processing a low resolution image of a captured frame of high-resolution image data, partitioning the low-resolution image into N×N blocks, and creating a feature vector for the middle block using spatial-derivative based image processing techniques, (2) the second stage of processing involves marking ROIs by examining the feature vectors for regions of high-modulation and returning to the first stage to create feature vectors for other blocks surrounding the middle block (in a helical manner), calculating bar code orientation and marking the four corners of a bar code as an ROI, and (3) the third stage of processing involves reading any bar code symbols represented within the ROI by traversing the bar code and updating the feature vectors, examining the zero-crossings of filtered images, creating bar and space patterns, and decoding the bar and space patterns using conventional decoding algorithms;

FIG. 19B is an exemplary flow chart representation of the steps involved in the image-processing method carried out by the Multi-Mode Bar Code Symbol Reading Subsystem during its Manual Mode of operation;

FIG. 20A is a summary of the steps involved in the image processing method carried out by the Multi-Mode Bar Code Symbol Reading Subsystem during its NoFinder Mode of operation, wherein the Decoder Module does not employ bar code element finding or marking techniques (i.e. Finder Module and Marker Module) and directly processes a narrow-area portion of a captured high-resolution image, starting from the middle thereof, examines the zero-crossings of the filtered image, creates bar and space patterns therefrom, and then decodes the bar and space patterns using conventional decoding algorithms;

FIG. 20B is an exemplary flow chart representation of the steps involved in the image-processing method carried out by the Multi-Mode Bar Code Symbol Reading Subsystem during its NoFinder Mode of operation;

FIG. 21A is a summary of the steps involved in the image-processing method carried out by the Multi-Mode Bar Code Symbol Reading Subsystem during its OmniScan Mode of operation, wherein the Decoder Module does not employ bar code element finding or marking techniques (i.e. Finder Module and Marker Module), assumes the imaged bar code symbol resides at the center of the captured wide-area high-resolution image with about a 1:1 aspect ratio, and directly processes the high-resolution image along a set of parallel spaced-apart (e.g. 50 pixels) virtual scan lines, examines the zero-crossings along the virtual scan lines, creates bar and space patterns therefrom, and then decodes the bar and space patterns, with the option of reprocessing the high-resolution image along a different set of parallel spaced-apart virtual scan lines oriented at a different angle from the previously processed set of virtual scan lines (e.g. 0, 30, 60, 90, 120 or 150 degrees);

FIG. 21B is an exemplary flow chart representation of the steps involved in the image-processing method carried out by the Multi-Mode Bar Code Symbol Reading Subsystem during its OmniScan Mode of operation;

FIG. 22A is a summary of the steps involved in the image-processing based bar code reading method carried out by the Multi-Mode Bar Code Symbol Reading Subsystem of the present invention during its "ROI-Specific" Mode of operation, designed for use in combination with the Omniscan Mode of operation, wherein (1) the first stage of processing involves receiving the region of interest (ROI) coordinates (x1, x2) obtained during the Omniscan Mode of operation (after the occurrence of a failure to decode), re-partitioning the captured low-resolution image (from the Omniscan Mode) into N×N blocks, and creating a feature vector for the ROI-specified block(s) using spatial-derivative based image processing techniques, (2) the second stage of processing involves marking additional ROIs by examining the feature vectors for regions of high-modulation and returning to the first stage to create feature vectors for other blocks surrounding the middle block (in a helical manner), calculating bar code orientation and marking the four corners of a bar code as an ROI, and (3) the third stage of processing involves reading any bar code symbols represented within the ROI by traversing the bar code symbol and updating the feature vectors, examining the zero-crossings of filtered images, creating bar and space patterns, and decoding the bar and space patterns using conventional decoding algorithms;

FIG. 22B is an exemplary flow chart representation of the steps involved in the image-processing method carried out by the Multi-Mode Bar Code Symbol Reading Subsystem of the present invention during its ROI-specific Mode of operation;

FIG. 23 is a specification of Multi-Mode Bar Code Symbol Reading Subsystem operated during its first multi-read (Omniscan/ROI-Specific) mode of operation;

FIG. 24 is a specification of Multi-Mode Bar Code Symbol Reading Subsystem operated during its second multi-read (No-Finder/ROI-Specific) mode of operation;

FIG. 25 is a specification of Multi-Mode Bar Code Symbol Reading Subsystem operated during its third multi-read (No-Finder/Omniscan/ROI-Specific) mode of operation; and FIGS. 26A and 26B, taken together, provide a table listing the primary Programmable Modes of Bar Code Reading Operation within the hand-supportable Digital Imaging-Based Bar Code Symbol Reading Device of the present invention, namely:

Programmed Mode of System Operation No.1—Manually-Triggered Single-Attempt 1D Single-Read Mode Employing the No-Finder Mode of the Multi-Mode Bar Code Reading Subsystem;

Programmed Mode Of System Operation No.2—Manually-Triggered Multiple-Attempt 1D Single-Read Mode Employing the No-Finder Mode of the Multi-Mode Bar Code Reading Subsystem;

Programmed Mode Of System Operation No.3—Manually-Triggered Single-Attempt 1D/2D Single-Read Mode Employing the No-Finder Mode And The Automatic Or Manual Modes of the Multi-Mode Bar Code Reading Subsystem;

Programmed Mode of System Operation No.4—Manually-Triggered Multiple-Attempt 1D/2D Single-Read Mode Employing the No-Finder Mode And The Automatic Or Manual Modes of the Multi-Mode Bar Code Reading Subsystem;

Programmed Mode of System Operation No.5—Manually-Triggered Multiple-Attempt 1D/2D Multiple-Read Mode Employing the No-Finder Mode And The Automatic Or Manual Modes of the Multi-Mode Bar Code Reading Subsystem;

Programmed Mode of System Operation No.6—Automatically-Triggered Single-Attempt 1D Single-Read Mode Employing The No-Finder Mode Of the Multi-Mode Bar Code Reading Subsystem:

Programmed Mode of System Operation No.7—Automatically-Triggered Multi-Attempt 1D Single-Read Mode Employing The No-Finder Mode Of the Multi-Mode Bar Code Reading Subsystem;

Programmed Mode of System Operation No.8—Automatically-Triggered Multi-Attempt 1D/2D Single-Read Mode Employing The No-Finder Mode and Manual and/or Automatic Modes Of the Multi-Mode Bar Code Reading Subsystem;

Programmed Mode of System Operation No.9—Automatically-Triggered Multi-Attempt 1D/2D Multiple-Read Mode Employing The No-Finder Mode and Manual and/or Automatic Modes Of the Multi-Mode Bar Code Reading Subsystem;

Programmable Mode of System Operation No.10—Automatically-Triggered Multiple-Attempt 1D/2D Single-Read Mode Employing The Manual, Automatic or Omniscan Modes Of the Multi-Mode Bar Code Reading Subsystem;

Programmed Mode of System Operation No.11—Semi-Automatic-Triggered Single-Attempt 1D/2D Single-Read Mode Employing The No-Finder Mode And The Automatic Or Manual Modes Of the Multi-Mode Bar Code Reading Subsystem;

Programmable Mode of System Operation No.12—Semi-Automatic-Triggered Multiple-Attempt 1D/2D Single-Read Mode Employing The No-Finder Mode And The Automatic Or Manual Modes Of the Multi-Mode Bar Code Reading Subsystem;

Programmable Mode of Operation No.13—Semi-Automatic-Triggered Multiple-Attempt 1D/2D Multiple-Read Mode Employing The No-Finder Mode And The Automatic Or Manual Modes Of the Multi-Mode Bar Code Reading Subsystem;

Programmable Mode of Operation No.14—Semi-Automatic-Triggered Multiple-Attempt 1D/2D Multiple-Read Mode Employing The No-Finder Mode And The Omniscan Modes Of the Multi-Mode Bar Code Reading Subsystem;

Programmable Mode of Operation No.15—Continuously-Automatically-Triggered Multiple-Attempt 1D/2D Multiple-Read Mode Employing The Automatic, Manual and/or Omniscan Modes Of the Multi-Mode Bar Code Reading Subsystem;

Programmable Mode of System Operation No.16—Diagnostic Mode Of Imaging-Based Bar Code Reader Operation; and Programmable Mode of System Operation No.17—Live Video Mode Of Imaging-Based Bar Code Reader Operation;

FIG. 27A is a schematic representation specifying the four modes of illumination produced from the Multi-Mode Illumination Subsystem employed in the second illustrative embodiment of the Digital Imaging-Based Bar Code Symbol Reader of the present invention, which supports both near and far fields of narrow-area illumination generated during the narrow-area image capture mode of its Multi-Mode Image Formation and Detection Subsystem;

FIG. 27B is a schematic representation specifying how the cylindrical beam shaping optics employed within near-field and far-field narrow-area illumination arrays can be easily tailored to generate near and far narrow-area illumination fields having geometrical characteristics that enables (i) simple reading of extended-length bar code symbols within the far-field region of the FOV of the system, and also (ii) simple reading of bar code menus with a great degree of control within the near-field region of the FOV, preferably during a "Semi-Automatic-Triggered" programmed mode of system operation;

FIG. 28 is a schematic representation illustrating the physical arrangement of LEDs and light focusing lenses associated with the near and far field narrow-area and wide-area illumination arrays employed in the digital imaging-based bar code reading device according to the second illustrative embodiment of the present invention;

FIG. 29A is a first perspective view of a second illustrative embodiment of the portable POS digital imaging-based bar code reading device of the present invention, shown having a hand-supportable housing of a different form factor than that of the first illustrative embodiment, and configured for use in its hands-free/presentation mode of operation, supporting primarily wide-area image capture;

FIG. 29B is a second perspective view of the second illustrative embodiment of the portable POS digital imaging-based bar code reading device of the present invention, shown configured and operated in its hands-free/presentation mode of operation, supporting primarily wide-area image capture;

FIG. 29C is a third perspective view of the second illustrative embodiment of the portable digital imaging-based bar code reading device of the present invention, shown configured and operated in a hands-on type mode, supporting both narrow and wide area modes of image capture;

FIG. 30 is a perspective view of a third illustrative embodiment of the digital imaging-based bar code reading device of the present invention, realized in the form of a Multi-Mode Image Capture And Processing Engine that can be readily integrated into various kinds of information collection and processing systems, including wireless portable data terminals (PDTs), reverse-vending machines, retail product information kiosks and the like;

FIG. 31 is a schematic representation of a wireless bar code-driven portable data terminal embodying the imaging-based bar code symbol reading engine of the present invention, shown configured and operated in a hands-on mode;

FIG. 32 is a perspective view of the wireless bar code-driven portable data terminal of FIG. 31 shown configured and operated in a hands-on mode, wherein the imaging-based bar code symbol reading engine embodied therein is used to read a bar code symbol on a package and the symbol character data representative of the read bar code is being automatically transmitted to its cradle-providing base station by way of an RF-enabled 2-way data communication link;

FIG. 33 is a side view of the wireless bar code-driven portable data terminal of FIGS. 31 and 32 shown configured and operated in a hands-free mode, wherein the imaging-based bar code symbol reading engine is configured in a wide-area image capture mode of operation, suitable for presentation-type bar code reading at point of sale (POS) environments;

FIG. 34 is a block schematic diagram showing the various subsystem blocks associated with a design model for the Wireless Hand-Supportable Bar Code Driven Portable Data Terminal System of FIGS. 31, 32 and 33, shown interfaced with possible host systems and/or networks;

FIG. 35 is a schematic block diagram representative of a system design for the hand-supportable digital imaging-based bar code symbol reading device according to an alternative embodiment of the present invention, wherein the system design is similar to that shown in FIG. 2A1, except that the Automatic Light Exposure Measurement and Illumination Control Subsystem is adapted to measure the light exposure on a central portion of the CMOS image sensing array and to control the operation of the LED-Based Multi-Mode Illumination Subsystem in cooperation with a software-based illumination metering program realized within the Multi-Mode Image Processing Based Bar Code Symbol Reading Subsystem, involving the real-time analysis of captured digital images for unacceptable spatial-intensity distributions;

FIG. 35A is a schematic representation of the system illustrated in FIG. 35, showing in greater detail how the current illumination duration determined by the Automatic Light Exposure Measurement and Illumination Control Subsystem is automatically over-ridden by the illumination duration computed by a software-implemented, image-processing based illumination metering program carried out within the Image-Processing Based Bar Code Symbol Reading Subsystem, and used to control the illumination produced during the next image frame captured by the system, in accordance with this enhanced auto-illumination control scheme of the present invention;

FIG. 36 is a flow chart setting forth the steps involved in carrying out the enhanced auto-illumination control scheme illustrated in FIG. 35A;

FIG. 37 is a perspective view of a hand-supportable image-processing based bar code symbol reader employing an image cropping zone (ICZ) targeting/marking pattern, and automatic post-image capture cropping methods to abstract the ICZ within which the targeted object to be imaged has been encompassed during illumination and imaging operations;

FIG. 38 is a schematic system diagram of the hand-supportable image-processing based bar code symbol reader shown in FIG. 37, shown employing an image cropping zone (ICZ) illumination targeting/marking source(s) operated under the control of the System Control Subsystem;

FIG. 39 is a flow chart setting forth the steps involved in carrying out the image cropping zone targeting/marking and post-image capture cropping process of the present invention embodied within the bar code symbol reader illustrated in FIGS. 37 and 38;

FIGS. 40A through 40E are graphical representations used in describing the method of designing the image formation (i.e. camera) optics within the image-based bar code reader of the present invention using the modulation transfer function (MTF).

DETAILED DESCRIPTION OF THE ILLUSTRATIVE EMBODIMENTS OF THE PRESENT INVENTION

Referring to the figures in the accompanying Drawings, the various illustrative embodiments of the hand-supportable imaging-based bar code symbol reading system of the present invention will be described in great detail, wherein like elements will be indicated using like reference numerals.

Hand-Supportable Digital Imaging-Based Bar Code Reading Device of the First Illustrative Embodiment of the Present Invention Referring to FIGS. 1A through 1K, the hand-supportable digital imaging-based bar code symbol reading device of the first illustrative embodiment of the present invention 1 is shown in detail comprising a hand-supportable housing 2 having a handle portion 2A and a head portion 2B that is provided with a light transmission window 3 with a high-pass (red-wavelength reflecting) optical filter element 4A having light transmission characteristics set forth in FIG. 6A2, in the illustrative embodiment. As will be described in greater detail hereinafter, high-pass optical filter element 4A cooperates within an interiorly mounted low-pass optical filter element 4B characterized in FIG. 6A1, which cooperates with the high-pass optical filter element 4A. These high and low pass filter elements 4A and 4B cooperate to provide a narrow-band optical filter system 4 that integrates with the head portion of the housing and permits only a narrow band of illumination (e.g. 633 nanometers) to exit and enter the housing during imaging operations.

Figure 1I:
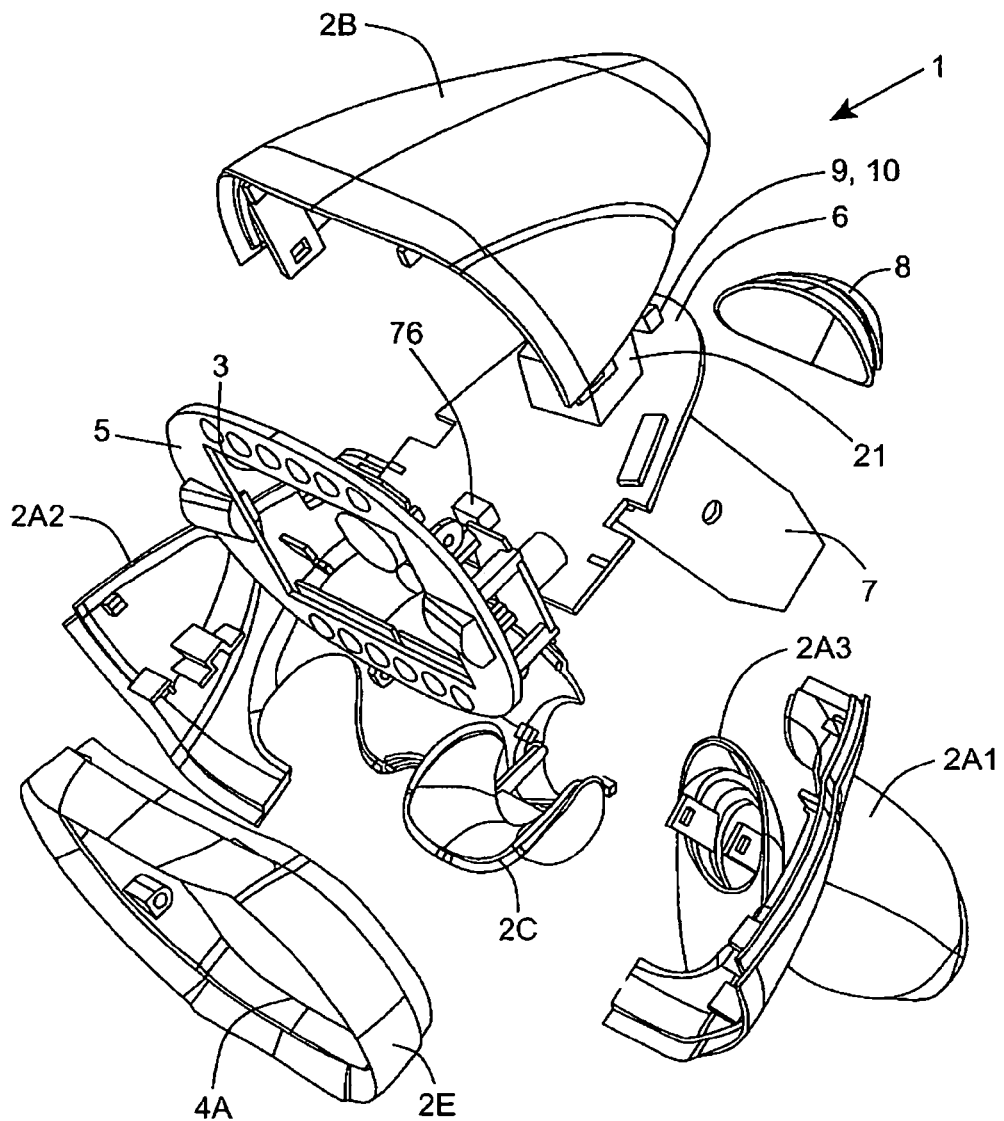
FIG. 1I is a first perspective exploded view of the hand-supportable digital imaging-based bar code symbol reading device of the first illustrative embodiment of the present invention.
Figure 1J:
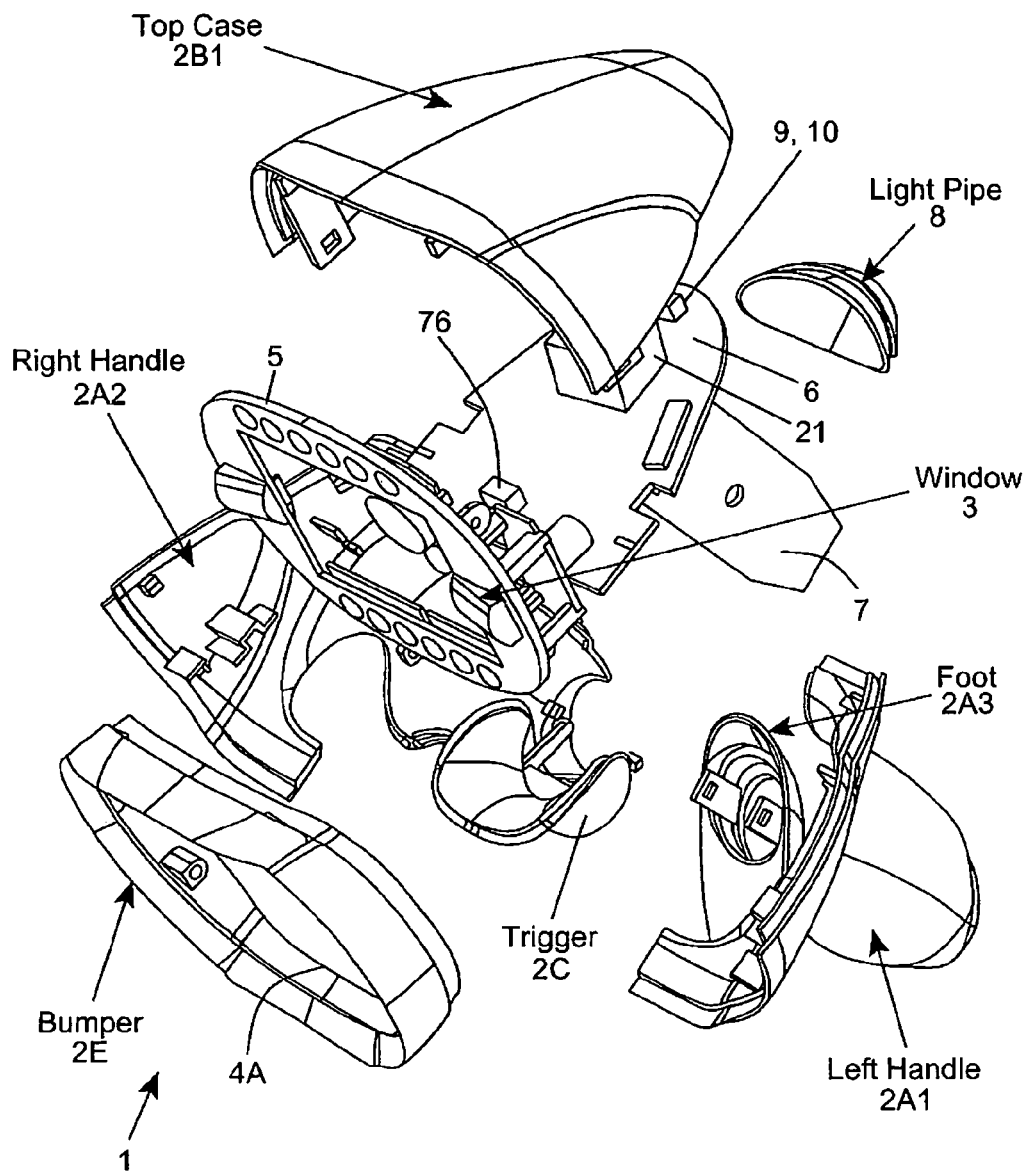
FIG. 1J is a second perspective exploded view of the hand-supportable digital imaging-based bar code symbol reading device of the first illustrative embodiment of the present invention.
Figure 1K:
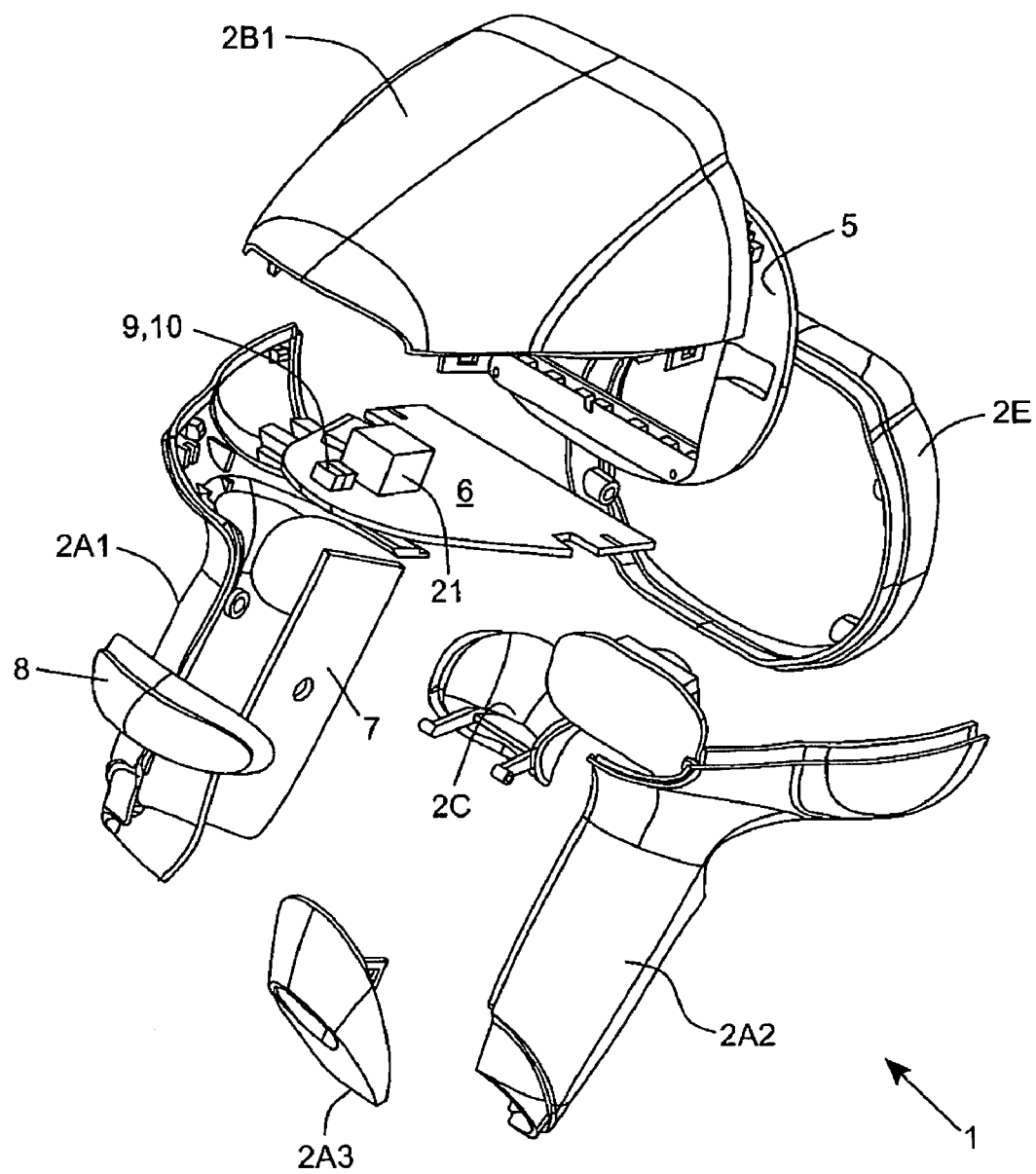
FIG. 1K is a third perspective exploded view of the hand-supportable digital imaging-based bar code symbol reading device of the first illustrative embodiment of the present invention.

As best shown in FIGS. 1I, 1J, and 1K, the hand-supportable housing 2 of the illustrative embodiment comprises: left and right housing handle halves 2A1 and 2A2; a foot-like structure 2A3 which is mounted between the handle halves 2A1 and 2A2; a trigger switch structure 2C which snap fits within and pivots within a pair of spaced apart apertures 2D1 and 2D2 provided in the housing halves; a light transmission window panel 5 through which light transmission window 3 is formed and supported within a recess formed by handle halves 2A1 and 2A2 when they are brought together, and which supports all LED illumination arrays provided by the system; an optical bench 6 for supporting electro-optical components and operably connected an orthogonally-mounted PC board 7 which is mounted within the handle housing halves; a top housing portion 2B1 for connection with the housing handle halves 2A1 and 2A2 and enclosing the head portion of the housing; light pipe lens element 8 for mounting over an array of light emitting diodes (LEDs) 9 and light pipe structures 10 mounted within the rear end of the head portion of the hand-supportable housing; and a front bumper structure 2E for holding together the top housing portion 2B1 and left and right handle halves 2A1 and 2A2 with the light transmission window panel 5 sandwiched therebetween, while providing a level of shock protection thereto.

In other embodiments of the present invention shown in FIGS. 27 through 33 the form factor of the hand-supportable housing might be different. In yet other applications, the housing need not even be hand-supportable, but rather might be designed for stationary support on a desktop or countertop surface, or for use in a commercial or industrial application.

Schematic Block Functional Diagram as System Design Model for the Hand-Supportable Digital Image-Based Bar Code Reading Device of the Present Invention As shown in the system design model of FIG. 2A1, the hand-supportable Digital Imaging-Based Bar Code Symbol Reading Device 1 of the illustrative embodiment comprises: an IR-based Object Presence and Range Detection Subsystem 12; a Multi-Mode Area-type Image Formation and Detection (i.e. camera) Subsystem 13 having narrow-area mode of image capture, near-field wide-area mode of image capture, and a far-field wide-area mode of image capture; a Multi-Mode LED-Based Illumination Subsystem 14 having narrow-area mode of illumination, near-field wide-area mode of illumination, and a far-field wide-area mode of illumination; an Automatic Light Exposure Measurement and Illumination Control Subsystem 15; an Image Capturing and Buffering Subsystem 16; a Multi-Mode Image-Processing Bar Code Symbol Reading Subsystem 17 having five modes of image-processing based bar code symbol reading indicated in FIG. 2A2 and to be described in detail hereinabove; an Input/

Output Subsystem 18; a manually-actuatable trigger switch 2C for sending user-originated control activation signals to the device; a System Mode Configuration Parameter Table 70; and a System Control Subsystem 18 integrated with each of the above-described subsystems, as shown.

The primary function of the IR-based Object Presence and Range Detection Subsystem 12 is to automatically produce an IR-based object detection field 20 within the FOV of the Multi-Mode Image Formation and Detection Subsystem 13, detect the presence of an object within predetermined regions of the object detection field (20A, 20B), and generate control activation signals A1 which are supplied to the System Control Subsystem 19 for indicating when and where an object is detected within the object detection field of the system.

In the first illustrative embodiment, the Multi-Mode Image Formation And Detection (I.E. Camera) Subsystem 13 has image formation (camera) optics 21 for producing a field of view (FOV) 23 upon an object to be imaged and a CMOS area-image sensing array 22 for detecting imaged light reflected off the object during illumination and image aquisition/capture operations.

In the first illustrative embodiment, the primary function of the Multi-Mode LED-Based Illumination Subsystem 14 is to produce a narrow-area illumination field 24, near-field wide-area illumination field 25, and a far-field wide-area illumination field 25, each having a narrow optical-bandwidth and confined within the FOV of the Multi-Mode Image Formation And Detection Subsystem 13 during narrow-area and wide-area modes of imaging, respectively. This arrangement is designed to ensure that only light transmitted from the Multi-Mode Illumination Subsystem 14 and reflected from the illuminated object is ultimately transmitted through a narrow-band transmission-type optical filter subsystem 4 realized by (1) high-pass (i.e. red-wavelength reflecting) filter element 4A mounted at the light transmission aperture 3 immediately in front of panel 5, and (2) low-pass filter element 4B mounted either before the image sensing array 22 or anywhere after panel 5 as shown in FIG. 3C. FIG. 6A4 sets forth the resulting composite transmission characteristics of the narrow-band transmission spectral filter subsystem 4, plotted against the spectral characteristics of the emission from the LED illumination arrays employed in the Multi-Mode Illumination Subsystem 14.

The primary function of the narrow-band integrated optical filter subsystem 4 is to ensure that the CMOS image sensing array 22 only receives the narrow-band visible illumination transmitted by the three sets of LED-based illumination arrays 27, 28 and 29 driven by LED driver circuitry 30 associated with the Multi-Mode Illumination Subsystem 14, whereas all other components of ambient light collected by the light collection optics are substantially rejected at the image sensing array 22, thereby providing improved SNR thereat, thus improving the performance of the system.

The primary function of the Automatic Light Exposure Measurement and Illumination Control Subsystem 15 is to twofold: (1) to measure, in real-time, the power density [joules/cm] of photonic energy (i.e. light) collected by the optics of the system at about its image sensing array 22, and generate Auto-Exposure Control Signals indicating the amount of exposure required for good image formation and detection; and (2) in combination with Illumination Array Selection Control Signal provided by the System Control Subsystem 19, automatically drive and control the output power of selected LED arrays 27, 28 and/or 29 in the Multi-Mode Illumination Subsystem, so that objects within the FOV of the system are optimally exposed to LED-based illumination and optimal images are formed and detected at the image sensing array 22.

The primary function of the Image Capturing and Buffering Subsystem 16 is to (1) detect the entire 2-D image focused onto the 2D image sensing array 22 by the image formation optics 21 of the system, (2) generate a frame of digital pixel data 31 for either a selected region of interest of the captured image frame, or for the entire detected image, and then (3) buffer each frame of image data as it is captured. Notably, in the illustrative embodiment, a single 2D image frame (31) is captured during each image capture and processing cycle, or during a particular stage of a processing cycle, so as to eliminate the problems associated with image frame overwriting, and synchronization of image capture and decoding processes, as addressed in U.S. Pat. Nos. 5,932,862 and 5,942,741 assigned to Welch Allyn, and incorporated herein by reference.

The primary function of the Multi-Mode Imaging-Based Bar Code Symbol Reading Subsystem 17 is to process images that have been captured and buffered by the Image Capturing and Buffering Subsystem 16, during both narrow-area and wide-area illumination modes of system operation. Such image processing operation includes image-based bar code decoding methods illustrated in FIGS. 14 through 25, and described in detail hereinafter.

The primary function of the Input/Output Subsystem 18 is to support standard and/or proprietary communication interfaces with external host systems and devices, and output processed image data and the like to such external host systems or devices by way of such interfaces. Examples of such interfaces, and technology for implementing the same, are given in U.S. Pat. No. 6,619,549, incorporated herein by reference in its entirety.

The primary function of the System Control Subsystem 19 is to provide some predetermined degree of control or management signaling services to each subsystem component integrated, as shown. While this subsystem can be implemented by a programmed microprocessor, in the illustrative embodiment, it is implemented by the three-tier software architecture supported on computing platform shown in FIG. 2B, and as represented in FIGS. 11A through 13L, and described in detail hereinafter.

The primary function of the manually-activatable Trigger Switch 2C integrated with the hand-supportable housing is to enable the user to generate a control activation signal upon manually depressing the Trigger Switch 2C, and to provide this control activation signal to the System Control Subsystem 19 for use in carrying out its complex system and subsystem control operations, described in detail herein.

The primary function of the System Mode Configuration Parameter Table 70 is to store (in non-volatile/persistent memory) a set of configuration parameters for each of the available Programmable Modes of System Operation specified in the Programmable Mode of Operation Table shown in FIGS. 26A and 26B, and which can be read and used by the System Control Subsystem 19 as required during its complex operations.

The detailed structure and function of each subsystem will now be described in detail above.

Schematic Diagram as System Implementation Model for the Hand-Supportable Digital Imaging-Based Bar Code Reading Device of the Present Invention FIG. 2B shows a schematic diagram of a system implementation for the hand-supportable Digital Imaging-Based Bar Code Symbol Reading Device 1 illustrated in FIGS. 1A through 1L. As shown in this system implementation, the bar code symbol reading device is realized using a number of hardware component comprising: an illumination board 33 carrying components realizing electronic functions performed by the LED-Based Multi-Mode Illumination Subsystem 14 and Automatic Light Exposure Measurement And Illumination Control Subsystem 15; a CMOS camera board 34 carrying high resolution (1280×1024 8-bit 6 micron pixel size) CMOS image sensing array 22 running at 25 Mhz master clock, at 7 frames/second at 1280*1024 resolution with randomly accessible region of interest (ROI) window capabilities, realizing electronic functions performed by the Multi-Mode Image Formation and Detection Subsystem 13; a CPU board 35 (i.e. computing platform) including (i) an Intel Sabinal 32-Bit Microprocessor PXA210 36 running at 200 mHz 1.0 core voltage with a 16 bit 100 Mhz external bus speed, (ii) an expandable (e.g. 8+ megabyte) Intel J3 Asynchronous 16-bit Flash memory 37, (iii) an 16 Megabytes of 100 MHz SDRAM 38, (iv) an Xilinx Spartan II FPGA FIFO 39 running at 50 Mhz clock frequency and 60 MB/Sec data rate, configured to control the camera timings and drive an image acquisition process, (v) a multimedia card socket 40, for realizing the other subsystems of the system, (vi) a power management module 41 for the MCU adjustable by the I2C bus, and (vii) a pair of UARTs 42A and 42B (one for an IRDA port and one for a JTAG port); an interface board 43 for realizing the functions performed by the I/O subsystem 18; and an IR-based object presence and range detection circuit 44 for realizing Subsystem 12.

In the illustrative embodiment, the image formation optics 21 supported by the bar code reader provides a field of view of 103 mm at the nominal focal distance to the target, of approximately 70 mm from the edge of the bar code reader. The minimal size of the field of view (FOV) is 62 mm at the nominal focal distance to the target of approximately 10 mm. Preliminary tests of the parameters of the optics are shown on FIG. 4B (the distance on FIG. 4B is given from the position of the image sensing array 22, which is located inside the bar code symbol reader approximately 80 mm from the edge). As indicated in FIG. 4C, the depth of field of the image formation optics varies from approximately 69 mm for the bar codes with resolution of 5 mils per narrow module, to 181 mm for the bar codes with resolution of 13 mils per narrow module.

The Multi-Mode Illumination Subsystem 14 is designed to cover the optical field of view (FOV) 23 of the bar code symbol reader with sufficient illumination to generate high-contrast images of bar codes located at both short and long distances from the imaging window. The illumination subsystem also provides a narrow-area (thin height) targeting beam 24 having dual purposes: (a) to indicate to the user where the optical view of the reader is; and (b) to allow a quick scan of just a few lines of the image and attempt a super-fast bar code decoding if the bar code is aligned properly. If the bar code is not aligned for a linearly illuminated image to decode, then the entire field of view is illuminated with a wide-area illumination field 25 or 26 and the image of the entire field of view is acquired by Image Capture and Buffering Subsystem 16 and processed by Multi-Mode Bar Code Symbol Reading Subsystem 17, to ensure reading of a bar code symbol presented therein regardless of its orientation.

The interface board 43 employed within the bar code symbol reader provides the hardware communication interfaces for the bar code symbol reader to communicate with the outside world. The interfaces implemented in system will typically include RS232, keyboard wedge, and/or USB, or some combination of the above, as well as others required or demanded by the particular application at hand.

Specification of the Area-Type Image Formation and Detection (i.e. Camera) Subsystem During its Narrow-Area (Linear) and Wide-Area Modes of Imaging, Supported by the Narrow and Wide Area Fields of Narrow-Band Illumination, Respectively As shown in FIGS. 3B through 3E, the Multi-Mode Image Formation And Detection (IFD) Subsystem 13 has a narrow-area image capture mode (i.e. where only a few central rows of pixels about the center of the image sensing array are enabled) and a wide-area image capture mode of operation (i.e. where all pixels in the image sensing array are enabled). The CMOS image sensing array 22 in the Image Formation and Detection Subsystem 13 has image formation optics 21 which provides the image sensing array with a field of view (FOV) 23 on objects to be illuminated and imaged. As shown, this FOV is illuminated by the Multi-Mode Illumination Subsystem 14 integrated within the bar code reader.

The Multi-Mode Illumination Subsystem 14 includes three different LED-based illumination arrays 27, 28 and 29 mounted on the light transmission window panel 5, and arranged about the light transmission window 4A. Each illumination array is designed to illuminate a different portion of the FOV of the bar code reader during different modes of operation. During the narrow-area (linear) illumination mode of the Multi-Mode Illumination Subsystem 14, the central narrow-wide portion of the FOV indicated by 23 is illuminated by the narrow-area illumination array 27, shown in FIG. 3A. During the near-field wide-area illumination mode of the Multi-Mode Illumination Subsystem 14, which is activated in response to the IR Object Presence and Range Detection Subsystem 12 detecting an object within the near-field portion of the FOV, the near-field wide-area portion of the FOV is illuminated by the near-field wide-area illumination array 28, shown in FIG. 3A. During the far-field wide-area illumination mode of the Multi-Mode Illumination Subsystem 14, which is activated in response to the IR Object Presence and Range Detection Subsystem 12 detecting an object within the far-field portion of the FOV, the far-field wide-area portion of the FOV is illuminated by the far-field wide-area illumination array 29, shown in FIG. 3A. In FIG. 3A, the spatial relationships are shown between these fields of narrow-band illumination and the far and near field portions the FOV of the Image Formation and Detection Subsystem 13.

In FIG. 3B, the Multi-Mode LED-Based Illumination Subsystem 14 is shown transmitting visible narrow-band illumination through its narrow-band transmission-type optical filter subsystem 4, shown in FIG. 3C and integrated within the hand-supportable Digital Imaging-Based Bar Code Symbol Reading Device. The narrow-band illumination from the Multi-Mode Illumination Subsystem 14 illuminates an object with the FOV of the image formation optics of the Image Formation and Detection Subsystem 13, and light rays reflected and scattered therefrom are transmitted through the high-pass and low-pass optical filters 4A and 4B and are ultimately focused onto image sensing array 22 to form of a focused detected image thereupon, while all other components of ambient light are substantially rejected before reaching image detection at the image sensing array 22. Notably, in the illustrative embodiment, the red-wavelength reflecting high-pass optical filter element 4A is positioned at the imaging window of the device before the image formation optics 21, whereas the low-pass optical filter element 4B is disposed before the image sensing array 22 between the focusing lens elements of the image formation optics 21. This forms narrow-band optical filter subsystem 4 which is integrated within the bar code reader to ensure that the object within the FOV is imaged at the image sensing array 22 using only spectral components within the narrow-band of illumination produced from Subsystem 14, while rejecting substantially all other components of ambient light outside this narrow range (e.g. 15 nm).

As shown in FIG. 3D, the Image Formation And Detection Subsystem 14 employed within the hand-supportable image-based bar code reading device comprising three lenses 21A, 21B and 21C, each made as small as possible (with a maximum diameter of 12 mm), having spherical surfaces, and made from common glass, e.g. LAK2 (~LaK9), ZF10(=SF8), LAF2 (~LaF3). Collectively, these lenses are held together within a lens holding assembly 45, as shown in FIG. 3E, and form an image formation subsystem arranged along the optical axis of the CMOS image sensing array 22 of the bar code reader.

As shown in FIG. 3E, the lens holding assembly 45 comprises: a barrel structure 45A1, 45A2 for holding lens elements 21A, 21B and 21C; and a base structure 45B for holding the image sensing array 22; wherein the assembly is configured so that the barrel structure 45A slides within the base structure 45B so as to focus the fixed-focus lens assembly during manufacture.

In FIGS. 3F1 and 3F2, the lens holding assembly 45 and imaging sensing array 22 are mounted along an optical path defined along the central axis of the system. In the illustrative embodiment, the image sensing array 22 has, for example, a 1280×1024 pixel resolution (½" format), 6 micron pixel size, with randomly accessible region of interest (ROI) window capabilities. It is understood, though, that many others kinds of imaging sensing devices (e.g. CCD) can be used to practice the principles of the present invention disclosed herein, without departing from the scope or spirit of the present invention.

Method of Designing the Image Formation (i.e. Camera) Optics within the Image-Based Bar Code Reader of the Present Invention Using the Modulation Transfer Function (MTF)

The function of the image formation (i.e. camera) optics in the Image Formation and Detection Subsystem 13 is to form and project, as accurately as possible, an image of the object being formed on the image sensing array 22. In practice, it is impossible to get an absolutely perfect image reproduction of the object with no loss of information, because the quality of the image is limited by various effects. These effects include: (i) diffraction, always present in even the very best lenses; (ii) aberrations which, if present, can generally only be minimized, not eliminated; (iii) variation of the distance to the object, especially if the lens cannot dynamically adjust its focus; and so on. Before spending time and money to produce a lens assembly, it is necessary to determine that a given lens design for the bar code symbol reader of the present invention will perform well enough to satisfy the requirements of the application. Thus, it will be extremely helpful to (i) establish one or more design criteria to quantify the lens performance, and (ii) optimize the design around these criteria until the desired performance is achieved.

Figure 40A:
Figure 40B:
Figure 40C:
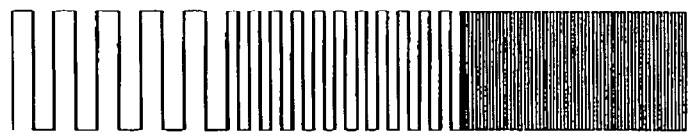
Figure 40D:
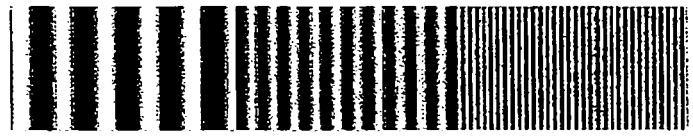
Figure 40E:
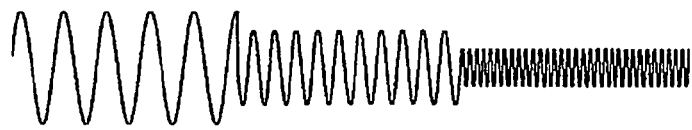

The preferred criterion for designing the image formation optics in the system hereof is the modulation transfer function, or MTF. The MTF provides a measure of the contrast present in an object or image. Qualitatively, contrast may be thought of as the difference between light and dark regions in the object or image. The greater the difference in "brightness" between two regions of the object or image, the greater the contrast, as illustrated in the figure below, where contrast increases from left to right, as shown in FIG. 40A. Considering the image, given the data from the image sensor, a quantitative treatment is possible. On the common 8 bit scale, a pixel that is totally black is assigned the value 0, while a pixel that is totally saturated white is assigned the value 255. Therefore, an image that appears as shown in FIG. 40B may also be represented by a plot of its pixel values, as shown in FIG. 40C. If this were a representation of a target object, then the resulting image would be different. Namely, due to the various effects described above, the contrast would not be exactly preserved. In other words, the closer the spacing of the object features, then the worse the reproduction of that contrast in the image of the object. Therefore, the image of the object might appear something like the graphical representation set forth in FIG. 40D and a plot of the values something like the following graphical representation shown in FIG. 40E.

A mathematical expression is required to quantify the amount of contrast present in an object or image, so that its variation after imaging through the optics may be assessed. A useful contrast measure can be defined as the modulation M of a given region in the object, given as follows:

$$M = \frac{\text{max value} - \text{min value}}{\text{max value} + \text{min value}}$$

The greater the contrast in the object or image, the greater the value of M, up to a maximum of 1. On the other hand, no contrast whatever in the object or image (i.e. no distinguishable features in the region of the object in question) yields a modulation of 0. To determine how well the image formation optics preserves the modulation of the target object in the image, it is only necessary to form a ratio of the image modulation to the object modulation, which is the MTF:

$$MTF = \frac{\text{image modulation}}{\text{object modulation}}$$

Perfect reproduction of the object contrast in the image (impossible in practice) results in an MTF of 1. A total loss of the object contrast in the image gives an MTF of 0.

The MTF is a useful concept in optical design because it simultaneously accounts for the impact of any effect that degrades the quality of the image, usually referred to as blurring. As described previously, these effects include diffraction, aberrations (spherical, chromatic, coma, astigmatism, field curvature) and deviation of the object distance from its nominal value. It should be mentioned for sake of completeness, however, that MTF is not a single perfect or all-encompassing measure of image quality. One potential drawback is that examining the MTF reveals only the total impact of all effects simultaneously, and cannot distinguish between blurring caused by one defect or another. If it is necessary to determine what effects are degrading the MTF, and to what extent for each, then other methods must be used, and other criteria examined. In addition, there are potentially negative image characteristics, such as distortion, that are not revealed at all by the MTF. If the optical designer is not careful, then it is possible that an image with an MTF close to the diffraction limit, which is as good as it is possible to get, may have distortion so bad that it is unusable in the application at hand.

In accordance with the design method of the present invention, after calculating the MTF for a given optical design, an additional criterion is necessary to specify what MTF is good enough for the application in question. For bar code decoding applications, a useful rule of thumb is that 0.3 MTF or better is needed for decoding software to work reliably well in an Imaging-Based Bar Code Symbol Reader. The design strategy employed on the Imaging-Based Bar Code Symbol Reader of the present invention is to determine, as a function of object distance, the code element size (in millimeters) at which the MTF of the resulting image falls to 0.3. In other words, at each object distance, the optical designer should determine what is the smallest size of code element (in millimeters) that can be imaged well enough to be read by the Multi-Mode Image-Processing Bar Code Reading Subsystem 17 of the present invention. At one stage of the design of the image formation optics employed in the illustrative embodiment, the plot of minimum code element size against object distance appeared. Given such a plot, the optical design team needs to determine whether or not the resulting bar code reader performance satisfies the requirements of the application at hand. To help make this determination, an advanced optical design method and tool described below can be used with excellent results.

Method of Theoretically Characterizing the DOF of the Image Formation Optics Employed in the Imaging-Based Bar Code Reader of the Present Invention Referring to FIGS. 4D through 4I3, a novel software-enabled design tool and method will now be described.

In general, the software-enabled optical design tool provides a novel way of and means for completely theoretically characterizing, and graphically viewing and interpreting the composite DOF of image formation optics (e.g. such as 21 employed in the Imaging-Based Bar Code Symbol Reader of the present invention) as well as other imaging-based optical readers, while simultaneously accounting for optical performance and image sensor limitations, over all desired object distances and for all desired code mil sizes.

Given an arrangement of lens elements for the design of the image formation optics 21, the optical design method of the present invention involves using a software-based optical design tool, as described in FIGS. 4I1 through 4I3, to generate the composite DOF chart in accordance with the present invention. The functions required by this optical design tool will be described below. The software-based optical design tool (i.e. computer program) of the illustrative embodiment, described in FIGS. 4I1 through 4I3, has been developed using Zemax® optical modeling software, programmed in ZPL (Zemax Programming Language) in accordance with the principles of the present invention described in detail below.

The first function required by the optical design tool of the present invention is that it must be able to calculate the modulation transfer function (MTF) of the image resulting from image formation optics 21, plotted as a function of object distance. The general industry rule of thumb is that a 0.3 MTF is the minimum acceptable for bar code decoding. Therefore, this software-based optical design tool must be able to determine, as a function of object distance, the object spatial-frequency at which the MTF of the image drops to 0.3.

The second function required by the optical design tool of the present invention is that it must be able to convert the object spatial-frequency to code mil size, and then this data should be plotted against object distance. A resulting plot is shown in FIG. 4D, where the dotted-line curve shows the optical performance of the image formation optics, in terms of the smallest mil size code that can be decoded, at a given object distance. FIG. 4E demonstrates how to read the DOF from this plot, by finding the intersections of the mil size in question with the optical performance curve.

However, optical performance of the image formation optics is not the only factor determining the capacity of an Imaging-Based Bar Code Symbol Reader to read bar code symbols having bar code elements of a given width. Image-processing based bar code symbol decoding software requires a certain minimum number of sensor pixel "fields of view" to be projected onto each minimum width code element, within the field of the view of the image formation optics. The general industry rule of thumb is that 1.6 pixels are required per narrow element for acceptable decoding. In accordance with the present invention, this rule has been expanded to the range of 1.4 to 1.6 pixels per narrow element, and can be considered a limit imposed by sampling theory that will restrict the ultimate performance of the bar code symbol reader 1 regardless of the individual performance of its image formation optics 21.

Therefore, the third function required by the optical design tool of the present invention is that it must be able to calculate, as a function of object distance, the size of the field of view of a single sensor pixel when projected through the image formation optics 21 and out into object space (that is, accounting for the optical magnification of the image formation optics 21). These linear functions, both for the 1.4 and 1.6 pixel rules, are preferably plotted on the same axes as the optical performance curve, as shown in FIG. 4F.

Having described the primary functionalities of the optical design tool of the present invention, and how to generate a composite DOF plot as shown in FIG. 4F for an imaging-based bar code symbol reader, it is now appropriate to describe, with reference to FIG. 4G, how to determine the actual composite DOF curve, accounting for both optical performance and sampling limit, for the 1.6 pixel case. Other system information, such as lens focal length, lens f-number, etc. may also be displayed on the composite DOF plot of FIG. 4G, for instance in a title block.

As shown in FIG. 4G, the method involves following the optical performance curve until it intersects the sampling limit line. Then, the sampling limit line is followed until it re-intersects the optical performance curve, at which point the optical performance curve is again followed. Thus, the sampling limit line of choice represents the lower limit of the decoding resolution of the system. Referring to FIG. 4H, a simple technique is shown for reading the DOF from the composite plot of FIG. 4G.

Preferably, the optical design tool of the present invention will be provide with a simple graphical user interface (GUI) may be useful, supporting pop-up windows to enable the user to easily type numbers into the program. Also, the optical design tool will preferably implement various methods to allow the user to specify some of the required numbers while the program is running, as oppose to having to change the numbers in the program file.

A less preferred alternative way of practicing the optical design method of the present invention would be to manually construct the composite DOF plot by examining MTF data and plotting the results in Excel, for example. However, this approach is labor intensive and does not offer any appreciable increase in accuracy, as does the use of the software-enabled optical design tool described in FIGS. 4I1 through 4I3.

Specification of Multi-Mode LED-Based Illumination Subsystem Employed in the Hand-Supportable Image-Based Bar Code Reading System of the Present Invention In the illustrative embodiment, the LED-Based Multi-Mode Illumination Subsystem 14 comprises: narrow-area illumination array 27; near-field wide-area illumination array 28; and far-field wide-area illumination array 29. The three fields of narrow-band illumination produced by the three illumination arrays of subsystem 14 are schematically depicted in FIG. 5A1. As will be described hereinafter, with reference to FIGS. 27 and 28, narrow-area illumination array 27 can be realized as two independently operable arrays, namely: a near-field narrow-area illumination array and a far-field narrow-area illumination array, which are activated when the target object is detected within the near and far fields, respectively, of the automatic IR-based Object Presence and Range Detection Subsystem 12 during wide-area imaging modes of operation. However, for purposes of illustration, the first illustrative embodiment of the present invention employs only a single field narrow-area (linear) illumination array which is designed to illuminate over substantially entire working range of the system, as shown in FIG. 5A1.

As shown in FIGS. 5B, 5C3 and 5C4, the narrow-area (linear) illumination array 27 includes two pairs of LED light sources 27A1 and 27A2 provided with cylindrical lenses 27B1 and 27B2, respectively, and mounted on left and right portions of the light transmission window panel 5. During the narrow-area image capture mode of the Image Formation and Detection Subsystem 13, the narrow-area (linear) illumination array 27 produces narrow-area illumination field 24 of narrow optical-bandwidth within the FOV of the system. In the illustrative embodiment, narrow-area illumination field 24 has a height less than 10 mm at far field, creating the appearance of substantially linear or rather planar illumination field.

The near-field wide-area illumination array 28 includes two sets of (flattop) LED light sources 28A1-28A6 and 28A7-28A13 without any lenses mounted on the top and bottom portions of the light transmission window panel 5, as shown in FIG. 5B. During the near-field wide-area image capture mode of the Image Formation and Detection Subsystem 13, the near-field wide-area illumination array 28 produces a near-field wide-area illumination field 25 of narrow optical-bandwidth within the FOV of the system.

As shown in FIGS. 5B, 5D3 and 5D4, the far-field wide-area illumination array 29 includes two sets of LED light sources 29A1-29A6 and 29A7-29A13 provided with spherical (i.e. plano-convex) lenses 29B1-29B6 and 29B7-29B13, respectively, and mounted on the top and bottom portions of the light transmission window panel 5. During the far-field wide-area image capture mode of the Image Formation and Detection Subsystem 13, the far-field wide-area illumination array 29 produces a far-field wide-area illumination beam of narrow optical-bandwidth within the FOV of the system.

Narrow-Area (Linear) Illumination Arrays Employed in the Multi-Mode Illumination Subsystem As shown in FIG. 5A1, the narrow-area (linear) illumination field 24 extends from about 30 mm to about 200 mm within the working range of the system, and covers both the near and far fields of the system. The near-field wide-area illumination field 25 extends from about 0 mm to about 100 mm within the working range of the system. The far-field wide-area illumination field 26 extends from about 100 mm to about 200 mm within the working range of the system. The Table shown in FIG. 5A2 specifies the geometrical properties and characteristics of each illumination mode supported by the Multi-Mode LED-based Illumination Subsystem 14 of the present invention.

The narrow-area illumination array 27 employed in the Multi-Mode LED-Based Illumination Subsystem 14 is optically designed to illuminate a thin area at the center of the field of view (FOV) of the imaging-based bar code symbol reader, measured from the boundary of the left side of the field of view to the boundary of its right side, as specified in FIG. 5A1. As will be described in greater detail hereinafter, the narrow-area illumination field 24 is automatically generated by the Multi-Mode LED-Based Illumination Subsystem 14 in response to the detection of an object within the object detection field of the automatic IR-based Object Presence and Range Detection Subsystem 12. In general, the object detection field of the IR-based Object Presence and Range Detection Subsystem 12 and the FOV of the Image Formation and Detection Subsystem 13 are spatially co-extensive and the object detection field spatially overlaps the FOV along the entire working distance of the imaging-based bar code symbol reader. The narrow-area illumination field 24, produced in response to the detection of an object, serves a dual purpose: it provides a visual indication to an operator about the location of the optical field of view of the bar code symbol reader, thus, serves as a field of view aiming instrument; and during its image acquisition mode, the narrow-area illumination beam is used to illuminated a thin area of the FOV within which an object resides, and a narrow 2-D image of the object can be rapidly captured (by a small number of rows of pixels in the image sensing array 22), buffered and processed in order to read any linear bar code symbols that may be represented therewithin.

FIG. 5C1 shows the Lambertian emittance versus wavelength characteristics of the LEDs used to implement the narrow-area illumination array 27 in the Multi-Mode Illumination Subsystem 14. FIG. 5C2 shows the Lambertian emittance versus polar angle characteristics of the same LEDs. FIG. 5C3 shows the cylindrical lenses used before the LEDs (633 nm InGaAlP) in the narrow-area (linear) illumination arrays in the illumination subsystem of the present invention. As shown, the first surface of the cylindrical lens is curved vertically to create a narrow-area (linear) illumination pattern, and the second surface of the cylindrical lens is curved horizontally to control the height of the of the linear illumination pattern to produce a narrow-area illumination pattern. FIG. 5C4 shows the layout of the pairs of LEDs and two cylindrical lenses used to implement the narrow-area illumination array of the illumination subsystem of the present invention. In the illustrative embodiment, each LED produces about a total output power of about 11.7 mW under typical conditions. FIG. 5C5 sets forth a set of six illumination profiles for the narrow-area illumination fields produced by the narrow-area illumination arrays of the illustrative embodiment, taken at 30, 40, 50, 80, 120, and 220 millimeters along the field away from the imaging window (i.e. working distance) of the bar code reader of the present invention, illustrating that the spatial intensity of the area-area illumination field begins to become substantially uniform at about 80 millimeters. As shown, the narrow-area illumination beam is usable beginning 40 mm from the light transmission/imaging window.

Near-Field Wide-Area Illumination Arrays Employed in the Multi-Mode Illumination Subsystem The near-field wide-area illumination array 28 employed in the LED-Based Multi-Mode Illumination Subsystem 14 is optically designed to illuminate a wide area over a near-field portion of the field of view (FOV) of the imaging-based bar code symbol reader, as defined in FIG. 5A1. As will be described in greater detail hereinafter, the near-field wide-area illumination field 28 is automatically generated by the LED-based Multi-Mode Illumination Subsystem 14 in response to: (1) the detection of any object within the near-field of the system by the IR-based Object Presence and Range Detection Subsystem 12; and (2) one or more of following events, including, for example: (i) failure of the image processor to successfully decode process a linear bar code symbol during the narrow-area illumination mode; (ii) detection of code elements such as control words associated with a 2-D bar code symbol; and/or (iii) detection of pixel data in the image which indicates that object was captured in a state of focus.

In general, the object detection field of the IR-based Object Presence and Range Detection Subsystem 12 and the FOV of the Image Formation And Detection Subsystem 13 are spatially co-extensive and the object detection field spatially overlaps the FOV along the entire working distance of the imaging-based bar code symbol reader. The near-field wide-area illumination field 23, produced in response to one or more of the events described above, illuminates a wide area over a near-field portion of the field of view (FOV) of the imaging-based bar code symbol reader, as defined in FIG. 5A, within which an object resides, and a 2-D image of the object can be rapidly captured by all rows of the image sensing array 22, buffered and decode-processed in order to read any 1D or 2-D bar code symbols that may be represented therewithin, at any orientation, and of virtually any bar code symbology. The intensity of the near-field wide-area illumination field during object illumination and image capture operations is determined by how the LEDs associated with the near-field wide array illumination arrays 28 are electrically driven by the Multi-Mode Illumination Subsystem 14. The degree to which the LEDs are driven is determined by the intensity of reflected light measured near the image formation plane by the automatic light exposure and control subsystem 15. If the intensity of reflected light at the photodetector of the Automatic Light Exposure Measurement and Illumination Control Subsystem 15 is weak, indicative that the object exhibits low light reflectivity characteristics and a more intense amount of illumination will need to be produced by the LEDs to ensure sufficient light exposure on the image sensing array 22, then the Automatic Light Exposure Measurement and Illumination Control Subsystem 15 will drive the LEDs more intensely (i.e. at higher operating currents).

FIG. 5D1 shows the Lambertian emittance versus wavelength characteristics of the LEDs used to implement the wide area illumination arrays in the illumination subsystem of the present invention. FIG. 5D2 shows the Lambertian emittance versus polar angle characteristics of the LEDs used to implement the near field wide-area illumination arrays in the Multi-Mode Illumination Subsystem 14. FIG. 5D4 is geometrical the layout of LEDs used to implement the narrow wide-area illumination array of the Multi-Mode Illumination Subsystem 14, wherein the illumination beam produced therefrom is aimed by angling the lenses before the LEDs in the near-field wide-area illumination arrays of the Multi-Mode Illumination Subsystem 14. FIG. 5D5 sets forth a set of six illumination profiles for the near-field wide-area illumination fields produced by the near-field wide-area illumination arrays of the illustrative embodiment, taken at 10, 20, 30, 40, 60, and 100 millimeters along the field away from the imaging window (i.e. working distance) of the imaging-based bar code symbol reader 1. These plots illustrate that the spatial intensity of the near-field wide-area illumination field begins to become substantially uniform at about 40 millimeters (i.e. center:edge=2:1 max).

Far-Field Wide-Area Illumination Arrays Employed in the Multi-Mode Illumination Subsystem The far-field wide-area illumination array 26 employed in the Multi-Mode LED-based Illumination Subsystem 14 is optically designed to illuminate a wide area over a far-field portion of the field of view (FOV) of the imaging-based bar code symbol reader, as defined in FIG. 5A1. As will be described in greater detail hereinafter, the far-field wide-area illumination field 26 is automatically generated by the LED-Based Multi-Mode Illumination Subsystem 14 in response to: (1) the detection of any object within the near-field of the system by the IR-based Object Presence and Range Detection Subsystem 12; and (2) one or more of following events, including, for example: (i) failure of the image processor to successfully decode process a linear bar code symbol during the narrow-area illumination mode; (ii) detection of code elements such as control words associated with a 2-D bar code symbol; and/or (iii) detection of pixel data in the image which indicates that object was captured in a state of focus. In general, the object detection field of the IR-based Object Presence and Range Detection Subsystem 12 and the FOV 23 of the image detection and formation subsystem 13 are spatially co-extensive and the object detection field 20 spatially overlaps the FOV 23 along the entire working distance of the imaging-based bar code symbol reader. The far-field wide-area illumination field 26, produced in response to one or more of the events described above, illuminates a wide area over a far-field portion of the field of view (FOV) of the imaging-based bar code symbol reader, as defined in FIG. 5A, within which an object resides, and a 2-D image of the object can be rapidly captured (by all rows of the image sensing array 22), buffered and processed in order to read any 1D or 2-D bar code symbols that may be represented therewithin, at any orientation, and of virtually any bar code symbology. The intensity of the far-field wide-area illumination field during object illumination and image capture operations is determined by how the LEDs associated with the far-field wide-area illumination array 29 are electrically driven by the Multi-Mode Illumination Subsystem 14. The degree to which the LEDs are driven (i.e. measured in terms of junction current) is determined by the intensity of reflected light measured near the image formation plane by the Automatic Light Exposure Measurement And Illumination Control Subsystem 15. If the intensity of reflected light at the photo-detector of the Automatic Light Exposure Measurement and Illumination Control Subsystem 15 is weak, indicative that the object exhibits low light reflectivity characteristics and a more intense amount of illumination will need to be produced b the LEDs to ensure sufficient light exposure on the image sensing array 22, then the Automatic Light Exposure Measurement and Illumination Control Subsystem 15 will drive the LEDs more intensely (i.e. at higher operating currents).

During both near and far field wide-area illumination modes of operation, the Automatic Light Exposure Measurement and Illumination Control Subsystem (i.e. module) 15 measures and controls the time duration which the Multi-Mode Illumination Subsystem 14 exposes the image sensing array 22 to narrow-band illumination (e.g. 633 nanometers, with approximately 15 nm bandwidth) during the image capturing/acquisition process, and automatically terminates the generation of such illumination when such computed time duration expires. In accordance with the principles of the present invention, this global exposure control process ensures that each and every acquired image has good contrast and is not saturated, two conditions essential for consistent and reliable bar code reading FIG. 5D1 shows the Lambertian emittance versus wavelength characteristics of the LEDs used to implement the far-field wide-area illumination arrays 29 in the Multi-Mode Illumination Subsystem 14. FIG. 5D2 shows the Lambertian emittance versus polar angle characteristics of the LEDs used to implement the same. FIG. 5D3 shows the plano-convex lenses used before the LEDs in the far-field wide-area illumination arrays in the Multi-Mode Illumination Subsystem 14.

FIG. 5D4 shows a layout of LEDs and plano-convex lenses used to implement the far wide-area illumination array 29 of the illumination subsystem, wherein the illumination beam produced therefrom is aimed by angling the lenses before the LEDs in the far-field wide-area illumination arrays of the Multi-Mode Illumination Subsystem 14. FIG. 5D6 sets forth a set of three illumination profiles for the far-field wide-area illumination fields produced by the far-field wide-area illumination arrays of the illustrative embodiment, taken at 100, 150 and 220 millimeters along the field away from the imaging window (i.e. working distance) of the imaging-based bar code symbol reader 1, illustrating that the spatial intensity of the far-field wide-area illumination field begins to become substantially uniform at about 100 millimeters. FIG. 5D7 shows a table illustrating a preferred method of calculating the pixel intensity value for the center of the far field wide-area illumination field produced from the Multi-Mode Illumination Subsystem 14, showing a significant signal strength (greater than 80 DN at the far center field).

Specification of the Narrow-Band Optical Filter Subsystem Integrated within the Hand-Supportable Housing of the Imager of the Present Invention As shown in FIG. 6A1, the hand-supportable housing of the bar code reader of the present invention has integrated within its housing, narrow-band optical filter subsystem 4 for transmitting substantially only the very narrow band of wavelengths (e.g. 620-700 nanometers) of visible illumination produced from the narrow-band Multi-Mode Illumination Subsystem 14, and rejecting all other optical wavelengths outside this narrow optical band however generated (i.e. ambient light sources). As shown, narrow-band optical filter subsystem 4 comprises: red-wavelength reflecting (high-pass) imaging window filter 4A integrated within its light transmission aperture 3 formed on the front face of the hand-supportable housing; and low pass optical filter 4B disposed before the CMOS image sensing array 22. These optical filters 4A and 4B cooperate to form the narrow-band optical filter subsystem 4 for the purpose described above. As shown in FIG. 6A2, the light transmission characteristics (energy versus wavelength) associated with the low-pass optical filter element 4B indicate that optical wavelengths below 620 nanometers are transmitted therethrough, whereas optical wavelengths above 620 nm are substantially blocked (e.g. absorbed or reflected). As shown in FIG. 6A3, the light transmission characteristics (energy versus wavelength) associated with the high-pass imaging window filter 4A indicate that optical wavelengths above 700 nanometers are transmitted therethrough, thereby producing a red-color appearance to the user, whereas optical wavelengths below 700 nm are substantially blocked (e.g. absorbed or reflected) by optical filter 4A.

During system operation, spectral band-pass filter subsystem 4 greatly reduces the influence of the ambient light, which falls upon the CMOS image sensing array 22 during the image capturing operations. By virtue of the optical filter of the present invention, a optical shutter mechanism is eliminated in the system. In practice, the optical filter can reject more than 85% of incident ambient light, and in typical environments, the intensity of LED illumination is significantly more than the ambient light on the CMOS image sensing array 22. Thus, while an optical shutter is required in nearly most conventional CMOS imaging systems, the imaging-based bar code reading system of the present invention effectively manages the exposure time of narrow-band illumination onto its CMOS image sensing array 22 by simply controlling the illumination time of its LED-based illumination arrays 27, 28 and 29 using control signals generated by Automatic Light Exposure Measurement and Illumination Control Subsystem 15 and the CMOS image sensing array 22 while controlling illumination thereto by way of the band-pass optical filter subsystem 4 described above. The result is a simple system design, without moving parts, and having a reduced manufacturing cost.

While the band-pass optical filter subsystem 4 is shown comprising a high-pass filter element 4A and low-pass filter element 4B, separated spatially from each other by other optical components along the optical path of the system, subsystem 4 may be realized as an integrated multi-layer filter structure installed in front of the image formation and detection (IFD) module 13, or before its image sensing array 22, without the use of the high-pass window filter 4A, or with the use thereof so as to obscure viewing within the imaging-based bar code symbol reader while creating an attractive red-colored protective window. Preferably, the red-color window filter 4A will have substantially planar surface characteristics to avoid focusing or defocusing of light transmitted therethrough during imaging operations.

Specification of the Automatic Light Exposure Measurement and Illumination Control Subsystem of the Present Invention The primary function of the Automatic Light Exposure Measurement and Illumination Control Subsystem 15 is to control the brightness and contrast of acquired images by (i) measuring light exposure at the image plane of the CMOS imaging sensing array 22 and (ii) controlling the time duration that the Multi-Mode Illumination Subsystem 14 illuminates the target object with narrow-band illumination generated from the activated LED illumination array. Thus, the Automatic Light Exposure Measurement and Illumination Control Subsystem 15 eliminates the need for a complex shuttering mechanism for CMOS-based image sensing array 22. This novel mechanism ensures that the imaging-based bar code symbol reader of the present invention generates non-saturated images with enough brightness and contrast to guarantee fast and reliable image-based bar code decoding in demanding end-user applications.

During object illumination, narrow-band LED-based light is reflected from the target object (at which the hand-supportable bar code reader is aimed) and is accumulated by the CMOS image sensing array 22. Notably, the object illumination process must be carried out for an optimal duration so that the acquired image frame has good contrast and is not saturated. Such conditions are required for the consistent and reliable bar code decoding operation and performance. The Automatic Light Exposure Measurement and Illumination Control Subsystem 15 measures the amount of light reflected from the target object, calculates the maximum time that the CMOS image sensing array 22 should be kept exposed to the actively-driven LED-based illumination array associated with the Multi-Mode Illumination Subsystem 14, and then automatically deactivates the illumination array when the calculated time to do so expires (i.e. lapses).

As shown in FIG. 7A of the illustrative embodiment, the Automatic Light Exposure Measurement and Illumination Control Subsystem 15 comprises: a parabolic light-collecting mirror 55 mounted within the head portion of the hand-supportable housing, for collecting narrow-band LED-based light reflected from a central portion of the FOV of the system, which is then transmitted through the narrow-band optical filter subsystem 4 eliminating wide band spectral interference; a light-sensing device (e.g. photo-diode) 56 mounted at the focal point of the light collection mirror 55, for detecting the filtered narrow-band optical signal focused therein by the light collecting mirror 55; and an electronic circuitry 57 for processing electrical signals produced by the photo-diode 56 indicative of the intensity of detected light exposure levels within the focal plane of the CMOS image sensing array 22. During light exposure measurement operations, incident narrow-band LED-based illumination is gathered from the center of the FOV of the system by the spherical light collecting mirror 55 and narrow-band filtered by the narrow-band optical filter subsystem 4 before being focused upon the photo-diode 56 for intensity detection. The photo-diode 56 converts the detected light signal into an electrical signal having an amplitude which directly corresponds to the intensity of the collected light signal.

As shown in FIG. 7B, the System Control Subsystem 19 generates an illumination array selection control signal which determines which LED illumination array (i.e. the narrow-area illumination array 27 or the far-field and narrow-field wide-area illumination arrays 28 or 29) will be selectively driven at any instant in time of system operation by LED Array Driver Circuitry 64 in the Automatic Light Exposure Measurement and Illumination Control Subsystem 15. As shown, electronic circuitry 57 processes the electrical signal from photo-detector 56 and generates an auto exposure control signal for the selected LED illumination array. In term, this auto exposure control signal is provided to the LED array driver circuitry 64, along with an illumination array selection control signal from the System Control Subsystem 19, for selecting and driving (i.e. energizing) one or more LED illumination array(s) so as to generate visible illumination at a suitable intensity level and for suitable time duration so that the CMOS image sensing array 22 automatically detects digital high-resolution images of illuminated objects, with sufficient contrast and brightness, while achieving global exposure control objectives of the present invention disclosed herein. As shown in FIGS. 7B and 7C1 and 7C2, the illumination array selection control signal is generated by the System Control Subsystem 19 in response to (i) reading the system mode configuration parameters from the system mode configuration parameter table 70, shown in FIG. 2A1, for the programmed mode of system operation at hand, and (ii) detecting the output from the automatic IR-based Object Presence and Range Detection Subsystem 12.

Notably, in the illustrative embodiment, there are three possible LED-based illumination arrays 27, 28 and 29 which can be selected for activation by the System Control Subsystem 19, and the upper and/or lower LED subarrays in illumination arrays 28 and 29 can be selectively activated or deactivated on a subarray-by-subarray basis, for various purposes taught herein, including automatic specular reflection noise reduction during wide-area image capture modes of operation.

Each one of these illumination arrays can be driven to different states depending on the auto-exposure control signal generated by electronic signal processing circuit 57, which will be generally a function of object distance, object surface reflectivity and the ambient light conditions sensed at photo-detector 56, and measured by signal processing circuit 57. The operation of signal processing circuitry 57 will now be detailed below.

As shown in FIG. 7B, the narrow-band filtered optical signal that is produced by the parabolic light focusing mirror 55 is focused onto the photo-detector D1 56 which generates an analog electrical signal whose amplitude corresponds to the intensity of the detected optical signal. This analog electrical signal is supplied to the signal processing circuit 57 for various stages of processing. The first step of processing involves converting the analog electrical signal from a current-based signal to a voltage-based signal which is achieved by passing it through a constant-current source buffer circuit 58, realized by one half of transistor Q1 (58). This inverted voltage signal is then buffered by the second half of the transistor Q1 (58) and is supplied as a first input to a summing junction 59. As shown in FIG. 7C1 and 7C2, the CMOS image sensing array 22 produces, as output, a digital electronic rolling shutter (ERS) pulse signal 60, wherein the duration of this ERS pulse signal 60 is fixed to a maximum exposure time allowed in the system. The ERS pulse signal 60 is buffered through transistor Q2 61 and forms the other side of the summing junction 59. The outputs from transistors Q1 and Q2 form an input to the summing junction 59. A capacitor C5 is provided on the output of the summing junction 59 and provides a minimum integration time sufficient to reduce any voltage overshoot in the signal processing circuit 57. The output signal across the capacitor C5 is further processed by a comparator U1 62. In the illustrative embodiment, the comparator reference voltage signal is set to 1.7 volts. This reference voltage signal sets the minimum threshold level for the light exposure measurement circuit 57. The output signal from the comparator 62 is inverted by inverter U3 63 to provide a positive logic pulse signal which is supplied, as auto exposure control signal, to the input of the LED array driver circuit 64 shown in FIG. 7C1 and 7C2.

As will be explained in greater detail below, the LED array driver circuit 64 shown in FIG. 7C1 and 7C2 automatically drives an activated LED illuminated array, and the operation of LED array driver circuit 64 depends on the mode of operation in which the Multi-Mode Illumination Subsystem 14 is configured. In turn, the mode of operation in which the Multi-Mode Illumination Subsystem 14 is configured at any moment in time will typically depend on (i) the state of operation of the Object Presence and Range Detection Subsystem 12 and (ii) the programmed mode of operation in which the entire Imaging-Based Bar Code Symbol Reading System is configured using system mode configuration parameters read from Table 70 shown in FIG. 2A1.

As shown in FIG. 7C1 and 7C2, the LED array driver circuit 64 comprises analog and digital circuitry which receives two input signals: (i) the auto exposure control signal from signal processing circuit 57; and (ii) the illumination array selection control signal. The LED array driver circuit 64 generates, as output, digital pulse-width modulated (PCM) drive signals provided to either the narrow-area illumination array 27, the upper and/or lower LED subarray employed in the near-field wide-area illumination array 28, and/or the upper and/or lower LED subarrays employed in the far-field wide-area illumination array 29. Depending on which mode of system operation the imaging-based bar code symbol reader has been configured, the LED array driver circuit 64 will drive one or more of the above-described LED illumination arrays during object illumination and imaging operations. As will be described in greater detail below, when all rows of pixels in the CMOS image sensing array 22 are in a state of integration (and thus have a common integration time), such LED illumination array(s) are automatically driven by the LED array driver circuit 64 at an intensity and for duration computed (in an analog manner) by the Automatic Light Exposure and Illumination Control Subsystem 15 so as to capture digital images having good contrast and brightness, independent of the light intensity of the ambient environment and the relative motion of target object with respect to the imaging-based bar code symbol reader.

Global Exposure Control Method of the Present Invention Carried Out Using the CMOS Image Sensing Array In the illustrative embodiment, the CMOS image sensing array 22 is operated in its Single Frame Shutter Mode (i.e. rather than its Continuous Frame Shutter Mode) as shown in FIG. 7D, and employs a novel exposure control method which ensure that all rows of pixels in the CMOS image sensing array 22 have a common integration time, thereby capturing high quality images even when the object is in a state of high speed motion. This novel exposure control technique shall be referred to as "the global exposure control method" of the present invention, and the flow chart of FIGS. 7E1 and 7E2 describes clearly and in great detail how this method is implemented in the imaging-based bar code symbol reader of the illustrative embodiment. The global exposure control method will now be described in detail below As indicated at Block A in FIG. 7E1, Step A in the global exposure control method involves selecting the single frame shutter mode of operation for the CMOS imaging sensing array provided within an imaging-based bar code symbol reading system employing an automatic light exposure measurement and illumination control subsystem, a multi-mode illumination subsystem, and a system control subsystem integrated therewith, and image formation optics providing the CMOS image sensing array with a field of view into a region of space where objects to be imaged are presented.

As indicated in Block B in FIG. 7E1, Step B in the global exposure control method involves using the automatic light exposure measurement and illumination control subsystem to continuously collect illumination from a portion of the field of view, detect the intensity of the collected illumination, and generate an electrical analog signal corresponding to the detected intensity, for processing.

As indicated in Block C in FIG. 7E1, Step C in the global exposure control method involves activating (e.g. by way of the system control subsystem 19 or directly by way of trigger switch 2C) the CMOS image sensing array so that its rows of pixels begin to integrate photonically generated electrical charge in response to the formation of an image onto the CMOS image sensing array by the image formation optics of the system.

As indicated in Block D in FIG. 7E1, Step D in the global exposure control method involves the CMOS image sensing array 22 automatically (i) generating an electronic rolling shutter (ERS) digital pulse signal when all rows of pixels in the image sensing array are operated in a state of integration, and providing this ERS pulse signal to the Automatic Light Exposure Measurement And Illumination Control Subsystem 15 so as to activate light exposure measurement and illumination control functions/operations therewithin.

As indicated in Block E in FIG. 7E2, Step E in the global exposure control method involves, upon activation of light exposure measurement and illumination control functions within Subsystem 15, (i) processing the electrical analog signal being continuously generated therewithin, (ii) measuring the light exposure level within a central portion of the field of view 23 (determined by light collecting optics 55 shown in FIG. 7A), and (iii) generating an auto-exposure control signal for controlling the generation of visible field of illumination from at least one LED-based illumination array (27, 28 and/or 29) in the Multi-Mode Illumination Subsystem 14 which is selected by an illumination array selection control signal produced by the System Control Subsystem 19.

Finally, as indicated at Block F in FIG. 7E2, Step F in the global exposure control method involves using (i) the auto exposure control signal and (ii) the illumination array selection control signal to drive the selected LED-based illumination array(s) and illuminate the field of view of the CMOS image sensing array 22 in whatever image capture mode it may be configured, precisely when all rows of pixels in the CMOS image sensing array are in a state of integration, as illustrated in FIG. 7D, thereby ensuring that all rows of pixels in the CMOS image sensing array have a common integration time. By enabling all rows of pixels in the CMOS image sensing array 22 to have a common integration time, high-speed "global exposure control" is effectively achieved within the imaging-based bar code symbol reader of the present invention, and consequently, high quality images are captured independent of the relative motion between the bar code symbol reader and the target object.

Specification of the IR-Based Automatic Object Presence and Range Detection Subsystem Employed in the Hand-Supportable Digital Image-Based Bar Code Reading Device of the Present Invention As shown in FIG. 8A, IR-wavelength based Automatic Object Presence and Range Detection Subsystem 12 is realized in the form of a compact optics module 76 mounted on the front portion of optics bench 6, as shown in FIG. 1J.

As shown in FIG. 8, the object presence and range detection module 12 of the illustrative embodiment comprises a number of subcomponents, namely: an optical bench 77 having an ultra-small footprint for supporting optical and electro-optical components used to implement the subsystem 12; at least one IR laser diode 78 mounted on the optical bench 77, for producing a low power IR laser beam 79; IR beam shaping optics 80, supported on the optical bench for shaping the IR laser beam (e.g. into a pencil-beam like geometry) and directing the same into the central portion of the object detection field 20 defined by the field of view (FOV) of IR light collection/focusing optics 81 supported on the optical bench 77; an amplitude modulation (AM) circuit 82 supported on the optical bench 77, for modulating the amplitude of the IR laser beam produced from the IR laser diode at a frequency $f_0$ (e.g. 75 Mhz) with up to 7.5 milliwatts of optical power; optical detector (e.g. an avalanche-type IR photodetector) 83, mounted at the focal point of the IR light collection/focusing optics 81, for receiving the IR optical signal reflected off an object within the object detection field, and converting the received optical signal 84 into an electrical signal 85; an amplifier and filter circuit 86, mounted on the optical bench 77, for isolating the $f_0$ signal component and amplifying it; a limiting amplifier 87, mounted on the optical bench, for maintaining a stable signal level; a phase detector 88, mounted on the optical bench 77, for mixing the reference signal component $f_0$ from the AM circuit 82 and the received signal component $f_0$ reflected from the packages and producing a resulting signal which is equal to a DC voltage proportional to the Cosine of the phase difference between the reference and the reflected $f_0$ signals; an amplifier circuit 89, mounted on the optical bench 77, for amplifying the phase difference signal; a received signal strength indicator (RSSI) 90, mounted on the optical bench 77, for producing a voltage proportional to a LOG of the signal reflected from the target object which can be used to provide additional information; a reflectance level threshold analog multiplexer 91 for rejecting information from the weak signals; and a 12 bit A/D converter 92, mounted on the optical bench 77, for converting the DC voltage signal from the RSSI circuit 90 into sequence of time-based range data elements $\{R_{n,i}\}$, taken along nT discrete instances in time, where each range data element $R_{n,i}$ provides a measure of the distance of the object referenced from (i) the IR laser diode 78 to (ii) a point on the surface of the object within the object detection field 20; and range analysis circuitry 93 described below.

In general, the function of range analysis circuitry 93 is to analyze the digital range data from the A/D converter 90 and generate two control activation signals, namely: (i) "an object presence detection" type of control activation signal $A_{1A}$ indicating simply whether an object is presence or absent from the object detection field, regardless of the mode of operation in which the Multi-Mode Illumination Subsystem 14 might be configured; and (ii) "a near-field/far-field" range indication type of control activation signal $A_{1B}$ indicating whether a detected object is located in either the predefined near-field or far-field portions of the object detection field, which correspond to the near-field and far-field portions of the FOV of the Multi-Mode Image Formation and Detection Subsystem 13.

Various kinds of analog and digital circuitry can be designed to implement the IR-based Automatic Object Presence and Range Detection Subsystem 12. Alternatively, this subsystem can be realized using various kinds of range detection techniques as taught in U.S. Pat. No. 6,637,659, incorporated herein by reference in its entirely.

In the illustrative embodiment, Automatic Object Presence and Range Detection Subsystem 12 operates as follows. In System Modes of Operation requiring automatic object presence and/or range detection, Automatic Object Presence and Range Detection Subsystem 12 will be activated at system start-up and operational at all times of system operation, typically continuously providing the System Control Subsystem 19 with information about the state of objects within both the far and near portions of the object detection field 20 of the imaging-based symbol reader. In general, this Subsystem detects two basic states of presence and range, and therefore has two basic states of operation. In its first state of operation, the IR-based automatic Object Presence and Range Detection Subsystem 12 automatically detects an object within the near-field region of the FOV 20, and in response thereto generates a first control activation signal which is supplied to the System Control Subsystem 19 to indicate the occurrence of this first fact. In its second state of operation, the IR-based automatic Object Presence and Range Detection Subsystem 12 automatically detects an object within the far-field region of the FOV 20, and in response thereto generates a second control activation signal which is supplied to the System Control Subsystem 19 to indicate the occurrence of this second fact. As will be described in greater detail and throughout this patent specification, these control activation signals are used by the System Control Subsystem 19 during particular stages of the system control process, such as determining (i) whether to activate either the near-field and/or far-field LED illumination arrays, and (ii) how strongly should these LED illumination arrays be driven to ensure quality image exposure at the CMOS image sensing array 22.

Specification of the Mapping of Pixel Data Captured by the Imaging Array into the SDRAM Under the Control of the Direct Memory Access (DMA) Module within the Microprocessor As shown in FIG. 9, the CMOS image sensing array 22 employed in the digital imaging-based bar code symbol reading device hereof is operably connected to its microprocessor 36 through FIFO 39 (realized by way of a FPGA) and system bus shown in FIG. 2B. As shown, SDRAM 38 is also operably connected to the microprocessor 36 by way of the system bus, thereby enabling the mapping of pixel data captured by the CMOS image sensing array 22 into the SDRAM 38 under the control of the direct memory access (DMA) module within the microprocessor 36.

Referring to FIG. 10, details will now be given on how the bytes of pixel data captured by CMOS image sensing array 22 are automatically mapped (i.e. captured and stored) into the addressable memory storage locations of its SDRAM 38 during each image capture cycle carried out within the hand-supportable imaging-based bar code reading device of the present invention.

In the implementation of the illustrative embodiment, the CMOS image sensing array 22 sends 8-bit gray-scale data bytes over a parallel data connection to FPGA 39 which implements a FIFO using its internal SRAM. The FIFO 39 stores the pixel data temporarily and the microprocessor 36 initiates a DMA transfer from the FIFO (which is mapped to address OXOCOOOOOO, chip select 3) to the SDRAM 38. In general, modern microprocessors have internal DMA modules, and a preferred microprocessor design, the DMA module will contain a 32-byte buffer. Without consuming any CPU cycles, the DMA module can be programmed to read data from the FIFO 39, store read data bytes in the DMA's buffer, and subsequently write the data to the SDRAM 38. Alternatively, a DMA module can reside in FPGA 39 to directly write the FIFO data into the SDRAM 38. This is done by sending a bus request signal to the microprocessor 36, so that the microprocessor 36 releases control of the bus to the FPGA 39 which then takes over the bus and writes data into the SDRAM 38.

Below, a brief description will be given on where pixel data output from the CMOS image sensing array 22 is stored in the SDRAM 38, and how the microprocessor (i.e. implementing a decode algorithm) 36 accesses such stored pixel data bytes. FIG. 10 represents the memory space of the SDRAM 38. A reserved memory space of 1.3 MB is used to store the output of the CMOS image sensing array 22. This memory space is a 1:1 mapping of the pixel data from the CMOS image sensing array 22. Each byte represents a pixel in the image sensing array 22. Memory space is a mirror image of the pixel data from the image sensing array 22. Thus, when the decode program (36) accesses the memory, it is as if it is accessing the raw pixel image of the image sensing array 22. No time code is needed to track the data since the modes of operation of the bar code reader guarantee that the microprocessor 36 is always accessing the up-to-date data, and the pixel data sets are a true representation of the last optical exposure. To prevent data corruption, i.e. new data coming in while old data are still being processed, the reserved space is protected by disabling further DMA access once a whole frame of pixel data is written into memory. The DMA module is re-enabled until either the microprocessor 36 has finished going through its memory, or a timeout has occurred.

During image acquisition operations, the image pixels are sequentially read out of the image sensing array 22. Although one may choose to read and column-wise or row-wise for some CMOS image sensors, without loss of generality, the row-by-row read out of the data is preferred. The pixel image data set is arranged in the SDRAM 38 sequentially, starting at address OXAOEC0000. To randomly access any pixel in the SDRAM 38 is a straightforward matter: the pixel at row y ¼ column x located is at address (OXAOEC0000+y x 1280+x).

As each image frame always has a frame start signal out of the image sensing array 22, that signal can be used to start the DMA process at address OXAOEC0000, and the address is continuously incremented for the rest of the frame. But the reading of each image frame is started at address OXAOEC0000 to avoid any misalignment of data. Notably, however, if the microprocessor 36 has programmed the CMOS image sensing array 22 to have a ROI window, then the starting address will be modified to (OXAOEC0000+ 1280×$R_1$), where $R_1$ is the row number of the top left corner of the ROI.

Specification of the Three-Tier Software Architecture of the Hand-Supportable Digital Image-Based Bar Code Reading Device of the Present Invention As shown in FIG. 11, the hand-supportable digital imaging-based bar code symbol reading device of the present invention 1 is provided with a three-tier software architecture comprising the following software modules: (1) the Main Task module, the CodeGate Task module, the Metroset Task module, the Application Events Manager module, the User Commands Table module, and the Command Handler module, each residing within the Application layer of the software architecture; (2) the Tasks Manager module, the Events Dispatcher module, the Input/Output Manager module, the User Commands Manager module, the Timer Subsystem module, the Input/Output Subsystem module and the Memory Control Subsystem module, each residing within the System Core (SCORE) layer of the software architecture; and (3) the Linux Kernal module, the Linux File System module, and Device Drivers modules, each residing within the Linux Operating System (OS) layer of the software architecture.

While the operating system layer of the imaging-based bar code symbol reader is based upon the Linux operating system, it is understood that other operating systems can be used (e.g. Microsoft Windows, Max OXS, Unix, etc), and that the design preferably provides for independence between the main Application Software Layer and the Operating System Layer, and therefore, enables of the Application Software Layer to be potentially transported to other platforms. Moreover, the system design principles of the present invention provides an extensibility of the system to other future products with extensive usage of the common software components, which should make the design of such products easier, decrease their development time, and ensure their robustness.

In the illustrative embodiment, the above features are achieved through the implementation of an event-driven multi-tasking, potentially multi-user, Application layer running on top of the System Core software layer, called SCORE. The SCORE layer is statically linked with the product Application software, and therefore, runs in the Application Level or layer of the system. The SCORE layer provides a set of services to the Application in such a way that the Application would not need to know the details of the underlying operating system, although all operating system APIs are, of course, available to the application as well. The SCORE software layer provides a real-time, event-driven, OS-independent framework for the product Application to operate. The event-driven architecture is achieved by creating a means for detecting events (usually, but not necessarily, when the hardware interrupts occur) and posting the events to the Application for processing in real-time manner. The event detection and posting is provided by the SCORE software layer. The SCORE layer also provides the product Application with a means for starting and canceling the software tasks, which can be running concurrently, hence, the multi-tasking nature of the software system of the present invention.

Specification of Software Modules within the SCORE Layer of the System Software Architecture Employed in Imaging-Based Bar Code Reader of the Present Invention The SCORE layer provides a number of services to the Application layer.

The Tasks Manager provides a means for executing and canceling specific application tasks (threads) at any time during the product Application run.

The Events Dispatcher provides a means for signaling and delivering all kinds of internal and external synchronous and asynchronous events When events occur, synchronously or asynchronously to the Application, the Events Dispatcher dispatches them to the Application Events Manager, which acts on the events accordingly as required by the Application based on its current state. For example, based on the particular event and current state of the application, the Application Events Manager can decide to start a new task, or stop currently running task, or do something else, or do nothing and completely ignore the event.

The Input/Output Manager provides a means for monitoring activities of input/output devices and signaling appropriate events to the Application when such activities are detected.

The Input/Output Manager software module runs in the background and monitors activities of external devices and user connections, and signals appropriate events to the Application Layer, which such activities are detected. The Input/Output Manager is a high-priority thread that runs in parallel with the Application and reacts to the input/output signals coming asynchronously from the hardware devices, such as serial port, user trigger switch 2C, bar code reader, network connections, etc. Based on these signals and optional input/output requests (or lack thereof) from the Application, it generates appropriate system events, which are delivered through the Events Dispatcher to the Application Events Manager as quickly as possible as described above.

The User Commands Manager provides a means for managing user commands, and utilizes the User Commands Table provided by the Application, and executes appropriate User Command Handler based on the data entered by the user.

The Input/Output Subsystem software module provides a means for creating and deleting input/output connections and communicating with external systems and devices The Timer Subsystem provides a means of creating, deleting, and utilizing all kinds of logical timers.

The Memory Control Subsystem provides an interface for managing the multi-level dynamic memory with the device, fully compatible with standard dynamic memory management functions, as well as a means for buffering collected data. The Memory Control Subsystem provides a means for thread-level management of dynamic memory. The interfaces of the Memory Control Subsystem are fully compatible with standard C memory management functions. The system software architecture is designed to provide connectivity of the device to potentially multiple users, which may have different levels of authority to operate with the device.

The User Commands Manager, which provides a standard way of entering user commands, and executing application modules responsible for handling the same. Each user command described in the User Commands Table is a task that can be launched by the User Commands Manager per user input, but only if the particular user's authority matches the command's level of security.

The Events Dispatcher software module provides a means of signaling and delivering events to the Application Events Manager, including the starting of a new task, stopping a currently running task, or doing something or nothing and simply ignoring the event.

FIG. 12B provides a Table listing examples of System-Defined Events which can occur and be dispatched within the hand-supportable digital imaging-based bar code symbol reading device of the present invention, namely: SCORE_EVENT_POWER_UP which signals the completion of system start-up and involves no parameters; _ SCORE_EVENT_TIMEOUT which signals the timeout of the logical timer, and involves the parameter "pointer to timer id"; SCORE_EVENT_UNEXPECTED_INPUT which signals that the unexpected input data is available and involves the parameter "pointer to connection id"; SCORE_EVENT_ TRIG_ON which signals that the user pulled the trigger and involves no parameters; SCORE_EVENT_TRIG_OFF which signals that the user released the trigger and involves no parameters; SCORE_EVENT_OBJECT_DETECT_ON which signals that the object is positioned under the bar code reader and involves no parameters; SCORE_EVENT_OBJECT_DETECT_OFF which signals that the object is removed from the field of view of the bar code reader and involves no parameters; SCORE_EVENT_EXIT_TASK which signals the end of the task execution and involves the pointer UTID; and SCORE_EVENT_ABORT_TASK which signals the aborting of a task during execution.

The imaging-based bar code symbol reading device of the present invention provides the user with a command-line interface (CLI), which can work over the standard communication lines, such as RS232, available in the bar code reader. The CLI is used mostly for diagnostic purposes, but can also be used for configuration purposes in addition to the MetroSet® and MetroSelect® programming functionalities. To send commands to the bar code reader utilizing the CLI, a user must first enter the User Command Manager by typing in a special character, which could actually be a combination of multiple and simultaneous keystrokes, such Ctrl and S for example. Any standard and widely available software communication tool, such as Windows HyperTerminal, can be used to communicate with the bar code reader. The bar code reader acknowledges the readiness to accept commands by sending the prompt, such as "MTLG>" back to the user. The user can now type in any valid Application command. To quit the User Command Manager and return the scanner back to its normal operation, a user must enter another special character, which could actually be a combination of multiple and simultaneous keystrokes, such Ctrl and R for example.

An example of the valid command could be the "Save Image" command, which is used to upload an image from the bar code reader's memory to the host PC. This command has the following CLI format:

save [filename [compr]]

where (1) save is the command name.

(2) filename is the name of the file the image gets saved in. If omitted, the default filename is "image.bmp".

(3) compr is the compression number, from 0 to 10. If omitted, the default compression number is 0, meaning no compression. The higher compression number, the higher image compression ratio, the faster image transmission, but more distorted the image gets.

The imaging-based bar code symbol reader of the present invention can have numerous commands. All commands are described in a single table (User Commands Table shown in FIG. 11) contained in the product Applications software layer. For each valid command, the appropriate record in the table contains the command name, a short description of the command, the command type, and the address of the function that implements the command.

When a user enters a command, the User Command Manager looks for the command in the table. If found, it executes the function the address of which is provided in the record for the entered command. Upon return from the function, the User Command Manager sends the prompt to the user indicating that the command has been completed and the User Command Manager is ready to accept a new command.

Specification of Software Modules within the Application Layer of the System Software Architecture Employed in Imaging-Based Bar Code Reader of the Present Invention The image processing software employed within the system hereof performs its bar code reading function by locating and recognizing the bar codes within the frame of a captured image comprising pixel data. The modular design of the image processing software provides a rich set of image processing functions, which could be utilized in the future for other potential applications, related or not related to bar code symbol reading, such as: optical character recognition (OCR) and verification (OCV); reading and verifying directly marked symbols on various surfaces; facial recognition and other biometrics identification; etc.

The CodeGate Task, in an infinite loop, performs the following task. It illuminates a "thin" narrow horizontal area at the center of the field-of-view (FOV) and acquires a digital image of that area. It then attempts to read bar code symbols represented in the captured frame of image data using the image processing software facilities supported by the Image-Processing Bar Code Symbol Reading Subsystem 17 of the present invention to be described in greater detail hereinafter. If a bar code symbol is successfully read, then Subsystem 17 saves the decoded data in the special Decode Data Buffer. Otherwise, it clears the Decode Data Buffer. Then, it continues the loop. The CodeGate Task routine never exits on its own. It can be canceled by other modules in the system when reacting to other events. For example, when a user pulls the trigger switch 2C, the event TRIGGER_ON is posted to the application. The Application software responsible for processing this event, checks if the CodeGate Task is running, and if so, it cancels it and then starts the Main Task. The CodeGate Task can also be canceled upon OBJECT_DETECT_OFF event, posted when the user moves the bar code reader away from the object, or when the user moves the object away from the bar code reader. The CodeGate Task routine is enabled (with Main Task) when "semi-automatic-triggered" system modes of programmed operation (Modes of System Operation Nos.11-14 in FIG. 26A) are to be implemented on the illumination and imaging platform of the present invention.

The Narrow-Area Illumination Task illustrated in FIG. 13M is a simple routine which is enabled (with Main Task) when "manually-triggered" system modes of programmed operation (Modes of System Operation Nos.1-5 in FIG. 26A) are to be implemented on the illumination and imaging platform of the present invention. However, this routine is never enabled simultaneously with CodeGate Task. As shown in the event flow chart of FIG. 13D, either CodeGate Task or Narrow-Area Illumination Task are enabled with the Main Task routine to realize the diverse kinds of system operation described herein.

Depending the System Mode in which the imaging-based bar code symbol reader is configured, Main Task will typically perform differently, but within the limits described in FIG. 13J. For example, when the imaging-based bar code symbol reader is configured in the Programmable Mode of System Operation No.12 (i.e. Semi-Automatic-Triggered Multiple-Attempt 1D/2D Single-Read Mode) to be described in greater detail hereinafter, the Main Task first checks if the Decode Data Buffer contains data decoded by the CodeGate Task. If so, then it immediately sends the data out to the user by executing the Data Output procedure and exits. Otherwise, in a loop, the Main Task does the following: it illuminates an entire area of the field-of-view and acquires a full-frame image of that area. It attempts to read a bar code symbol the captured image. If it successfully reads a bar code symbol, then it immediately sends the data out to the user by executing the Data Output procedure and exits. Otherwise, it continues the loop. Notably, upon successful read and prior to executing the Data Output procedure, the Main Task analyzes the decoded data for a "reader programming" command or a sequence of commands. If necessary, it executes the MetroSelect functionality. The Main Task can be canceled by other modules within the system when reacting to other events. For example, the bar code reader of the present invention can be re-configured using standard Metrologic configuration methods, such as MetroSelec® and MetroSet®. The MetroSelect functionality is executed during the Main Task.

The MetroSet functionality is executed by the special MetroSet Task. When the Focus RS232 software driver detects a special NULL-signal on its communication lines, it posts the METROSET_ON event to the Application. The Application software responsible for processing this event starts the MetroSet task. Once the MetroSet Task is completed, the scanner returns to its normal operation.

(Modes of System Operation Nos. 6-10 in FIG. 26A) can be readily implemented on the illumination and imaging platform of the present invention by making the following software system modifications: (1) an Auto-Read Task routine would be added to the system routine library (wherein Auto-Read Task could be an infinite loop routine where the primary operations of CodeGate Task and Main Task are sequenced together to attempt first automatic narrow-area illumination and image capture and processing, followed by automatic wide-area illumination and image capture and processing, and repeating the wide-area operation in an infinite loop, until the object is no longer detected within a particular predetermined time period; and (2) modifying the query block "Is CodeGate Task or Narrow-Area Illumination Task Enabled?" in the Object_Detect_On event handling routine shown in FIG. 13D, to further ask whether the "Auto-Read Task Routine is enabled", and on the "Yes" control path, providing a block which starts "Auto-Read Task" and then advancing control to Return.

Operating System Layer Software Modules within the Application Layer of the System Software Architecture Employed in Imaging-Based Bar Code Reader of the Present Invention The Devices Drivers software modules, which includes trigger drivers, provides a means for establishing a software connection with the hardware-based manually-actuated trigger switch 2C employed on the imaging-based device, an image acquisition driver for implementing image acquisition functionality aboard the imaging-based device, and an IR driver for implementing object detection functionality aboard the imaging-based device.

As shown in FIG. 12I, the Device Drive software modules include: trigger drivers for establishing a software connection with the hardware-based manually-actuated trigger switch 2C employed on the imaging-based bar code symbol reader of the present invention; an image acquisition driver for implementing image acquisition functionality aboard the imaging-based bar code symbol reader; and an IR driver for implementing object detection functionality aboard the imaging-based bar code symbol reader.

Basic System Operations Supported by the Three-Tier Software Architecture of the Hand-Supportable Digital Imaging-Based Bar Code Reading Device of the Present Invention In FIGS. 13A through 13L, the basic systems operations supported by the three-tier software architecture of the digital imaging-based bar code symbol reader of the present invention are schematically depicted. Notably, these basic operations represent functional modules (or building blocks) with the system architecture of the present invention, which can be combined in various combinations to implement the numerous Programmable Modes of System Operation listed in FIG. 23 and described in detail below, using the image acquisition and processing platform disclosed herein. For purposes of illustration, and the avoidance of obfuscation of the present invention, these basic system operations will be described below with reference to Programmable Mode of System Operation No.12: Semi-Automatic-Triggered Multiple-Attempt 1D/2D Single-Read Mode Employing The No-Finder Mode And The Manual Or Automatic Modes Of the Multi-Mode Bar Code Reading Subsystem 17.

FIG. 13A shows the basic operations carried out within the System Core Layer of the system when the user points the bar code reader towards a bar code symbol on an object. Such operations include the by IR device drivers enabling automatic detection of the object within the field, and waking up of the Input/Output Manager software module. As shown in FIG. 13B, the Input/Output Manager then posts the SCORE_OBJECT_DETECT_ON event to the Events Dispatcher software module in response to detecting an object. Then as shown in FIG. 13C, the Events Dispatcher software module passes the SCORE_OBJECT_DETECT_ON event to the Application Layer.

Upon receiving the SCORE_OBJECT_DETECT_ON event at the Application Layer, the Application Events Manager executes an event handling routine (shown in FIG. 13D) which activates the narrow-area (linear) illumination array 27 (i.e. during narrow-area illumination and image capture modes), and then depending on whether the presentation mode has been selected and whether CodeGate Task or Narrow-Area Illumination Mode has been enabled during system configuration, this even handling routine executes either Main Task described in FIG. 13J, CodeGate Task described in FIG. 13E, or Narrow-Area Illumination Task described in 13M. As shown in the flow chart of FIG. 13D, the system event handling routine first involves determining whether the Presentation Mode has been selected (i.e. enabled), then the event handling routine determines whether the CodeGate Task or Narrow-Area Illumination Routines have been enabled (with Main Task). If CodeGate Task has been enabled, then Application Layer starts CodeGate Task. If the Narrow-Area Illumination Task has been enabled, then the Application Layer starts the Narrow-Area Illumination Task, as shown.

As shown in FIG. 13E, the Application Layer executes the CodeGate Task by first activating the narrow-area image capture mode in the Multi-Mode Image Formation and Detection Subsystem 13 (i.e. by enabling a few middle rows of pixels in the CMOS sensor array 22), and then acquiring/capturing a narrow image at the center of the FOV of the Bar Code Reader. CodeGate Task then performs image processing operations on the captured narrow-area image using No-Finder Module which has been enabled by the selected Programmable Mode of System Operation No.12. If the image processing method results in a successful read of a bar code symbol, then the Codegate Task saves the decoded symbol character data in the Codegate Data Buffer; and if not, then the task clears the Codegate Data Buffer, and then returns to the main block of the Task where image acquisition reoccurs.

As shown in FIG. 13F, when the user pulls the trigger switch 2C on the bar code reader while the Code Task is executing, the trigger switch driver in the OS Layer automatically wakes up the Input/Output Manager at the System Core Layer. As shown in FIG. 13G, the Input/Output Manager, in response to being woken up by the trigger device driver, posts the SCORE_TRIGGER_ON event to the Events Dispatcher also in the System Core Layer. As shown in FIG. 13H, the Events Dispatcher then passes on the SCORE_TRIGGER_ON event to the Application Events Manager at the Application Layer. As shown in FIGS. 13I1 and 13I2, the Application Events Manager responds to the SCORE_TRIGGER_ON event by invoking a handling routine (Trigger On Event) within the Task Manager at the System Core Layer.

As shown the flow chart of FIGS. 13I1 and 13I2, the routine determines whether the Presentation Mode (i.e. Programmed Mode of System Operation No. 10) has been enabled, and if so, then the routine exits. If the routine determines that the Presentation Mode (i.e. Programmed Mode of System Operation No. 10) has not been enabled, then it determines whether the CodeGate Task is running, and if it is running, then it first cancels the CodeGate Task and then deactivates the narrow-area illumination array 27 associated with the Multi-Mode Illumination Subsystem 14, and thereafter executes the Main Task. If however the routine determines that the CodeGate Task is not running, then it determines whether Narrow-Area Illumination Task is running, and if it is not running, then Main Task is started. However, if Narrow-Area Illumination Task is running, then the routine increases the narrow-illumination beam to full power and acquires a narrow-area image at the center of the field of view of the system, then attempts to read the bar code in the captured narrow-area image. If the read attempt is successful, then the decoded (symbol character) data is saved in the Decode Data Buffer, the Narrow-Area Illumination Task is canceled, the narrow-area illumination beam is stopped, and the routine starts the Main Task, as shown. If the read attempt is unsuccessful, then the routine clears the Decode Data Buffer, the Narrow-Area Illumination Task is canceled, the narrow-area illumination beam is stopped, and the routine starts the Main Task, as shown.

As shown in FIG. 13M, the Narrow-Area Task routine is an infinite loop routine that simply keeps a narrow-area illumination beam produced and directed at the center of the field of view of the system in a recursive manner (e.g. typically at half or less power in comparison with the full-power narrow-area illumination beam produced during the running of CodeGate Task).

As shown in FIG. 13J, the first step performed in the Main Task by the Application Layer is to determine whether Code-Gate Data is currently available (i.e. stored in the Decode Data Buffer), and if such data is available, then the Main Task directly executes the Data Output Procedure described in FIG. 13K. However, if the Main Task determines that no such data is currently available, then it starts the Read TimeOut Timer, and then acquires a wide-area image of the detected object, within the time frame permitted by the Read Timeout Timer. Notably, this wide-area image acquisition process involves carrying out the following operations, namely: (i) first activating the wide-area illumination mode in the Multi-Mode Illumination Subsystem 14 and the wide-area capture mode in the CMOS image formation and detection module; (ii) determining whether the object resides in the near-field or far-field portion of the FOV (through object range measurement by the IR-based Object Presence and Range Detection Subsystem 12); and (iii) then activating either the near or far field wide-area illumination array to illuminate either the object in either the near or far field portions of the FOV using either the near-field illumination array 28 or the far-field illumination array 29 (or possibly both 28 and 29 in special programmed cases) at an intensity and duration determined by the automatic light exposure measurement and control subsystem 15; while (iv) sensing the spatial intensity of light imaged onto the CMOS image sensing array 22 in accordance with the Global Exposure Control Method of the present invention, described in detail hereinabove. Then the Main Task performs image processing operations on the captured image using either the Manual, ROI-Specific or Automatic Modes of operation (although it is understood that other image-processing based reading methods taught herein, such as Automatic or OmniScan (as well we other suitable alternative decoding algorithms/processes not disclosed herein), can be used depending on which Programmed Mode of System Operation has been selected by the end user for the imaging-based bar code symbol reader of the present invention. Notably, in the illustrative embodiment shown in FIG. 13J, the time duration of each image acquisition/processing frame is set by the Start Read Timeout Timer and Stop Read Timeout Timer blocks shown therein, and that within the Programmed Mode of System Operation No.12, the Main Task will support repeated (i.e. multiple) attempts to read a single bar code symbol so long as the trigger switch 2C is manually depressed by the operator and a single bar code has not yet been read. Then upon successfully reading a (single) bar code symbol, the Main Task will then execute the Data Output Procedure. Notably, in other Programmed Modes of System Operation, in which a single attempt at reading a bar code symbol is enabled, the Main Task will be modified accordingly to support such system behavior. In such a case, an alternatively named Main Task (e.g. Main Task No. 2) would be executed to enable the required system behavior during run-time.

It should also be pointed out at this juncture, that it is possible to enable and utilize several of different kinds of symbol reading methods during the Main Task, and to apply particular reading methods based on the computational results obtained while processing the narrow-area image during the CodeGate Task, and/or while preprocessing of the captured wide-area image during one of the image acquiring/processing frames or cycles running in the Main Task. The main point to be made here is that the selection and application of image-processing based bar code reading methods will preferably occur through the selective activation of the different modes available within the multi-mode image-processing based bar code symbol reading Subsystem 17, in response to information learned about the graphical intelligence represented within the structure of the captured image, and that such dynamic should occur in accordance with principles of dynamic adaptive learning commonly used in advanced image processing systems, speech understanding systems, and alike. This general approach is in marked contrast with the approaches used in prior art imaging-based bar code symbol readers, wherein permitted methods of bar code reading are pre-selected based on statically defined modes selected by the end user, and not in response to detected conditions discovered in captured images on a real-time basis.

As shown in FIG. 13K, the first step carried out by the Data Output Procedure, called in the Main Task, involves determining whether the symbol character data generated by the Main Task is for programming the bar code reader or not. If the data is not for programming the bar code symbol reader, then the Data Output Procedure sends the data out according to the bar code reader system configuration, and then generates the appropriate visual and audio indication to the operator, and then exits the procedure. If the data is for programming the bar code symbol reader, then the Data Output Procedure sets the appropriate elements of the bar code reader configuration (file) structure, and then saves the Bar Code Reader Configuration Parameters in non-volatile RAM (i.e. NOVRAM). The Data Output Procedure then reconfigures the bar code symbol reader and then generates the appropriate visual and audio indication to the operator, and then exits the procedure. As shown in FIG. 13L, decoded data is sent from the Input/Output Module at the System Core Layer to the Device Drivers within the Linux OS Layer of the system.

Wide-Area Illumination Control Method for Use During the Main Task System Control Routine so as to Illuminate Objects with Wide-Area Illumination in a Manner which Substantially Reduces Specular-Type Reflection at the CMOS Image Sensing Array of the Bar Code Symbol Reader Referring to FIGS. 13N1 through 13N3, the method of illuminating objects without specular reflection, according to the present invention, will now be described in detail. This control routine can be called during the acquisition of wide-area image step in the Main Task routine, shown in FIG. 13J.

As indicated at Step A in FIG. 13N1, the first step of the illumination control method involves using the Automatic Light Exposure Measurement And Illumination Control Subsystem 15 to measure the ambient light level to which the CMOS image sensing array 22 is exposed prior to commencing each illumination and imaging cycle within the Bar Code Symbol Reading System.

As indicated at Step B, the illumination control method involves using the Automatic IR-based Object Presence and Range Detection Subsystem 12 to measure the presence and range of the object in either the near or far field portion of the field of view (FOV) of the System.

As indicated at Step C, the illumination control method involves using the detected range and the measured light exposure level to drive both the upper and lower LED illumination subarrays associated with either the near-field wide-area illumination array 28 or far-field wide-area illumination array 29.

As indicated at Step D, the illumination control method involves capturing a wide-area image at the CMOS image sensing array 22 using the illumination field produced during Step C.

As indicated at Step E, the illumination control method involves rapidly processing the captured wide-area image during Step D to detect the occurrence of high spatial-intensity levels in the captured wide-area image, indicative of a specular reflection condition.

As indicated at Step F, the illumination control method involves determining if a specular reflection condition is detected in the processed wide-area image, and if so then driving only the upper LED illumination subarray associated with either the near-field or far-field wide-area illumination array. Also, if a specular reflection condition is not detected in the processed wide-area image, then the detected range and the measured light exposure level is used to drive both the upper and lower LED subarrays associated with either the near-field or far-field wide-area illumination array.

As indicated at Step G, the illumination control method involves capturing a wide-area image at the CMOS image sensing array 22 using the illumination field produced during Step F.

As indicated at Step H, the illumination control method involves rapidly processing the captured wide-area image during Step G to detect the occurrence of high spatial-intensity levels in the captured wide-area image, indicative of a specular reflection condition.

As indicated at Step I, the illumination control method involves determining if a specular reflection condition is still detected in the processed wide-area image, and if so, then drive the other LED subarray associated with either the near-field or far-field wide-area illumination array. If a specular reflection condition is not detected in the processed wide-area image, then the detected Range and the measured Light Exposure Level is used to drive the same LED illumination subarray (as in Step C) associated with either the near-field wide-area illumination array 28 or far field wide-area illumination array 29.

As indicated at Step J, the illumination control method involves capturing a wide-area image at the CMOS image sensing array using the illumination field produced during Step I.

As indicated at Step K, the illumination control method involves rapidly processing the captured wide-area image during Step J to detect the absence of high spatial-intensity levels in the captured wide-area image, confirming the elimination of the earlier detected specular reflection condition.

As indicated at Step L, the illumination control method involves determining if no specular reflection condition is detected in the processed wide-area image at Step K, and if not, then the wide-area image is processed using the mode(s) selected for the Multi-Mode Image-Processing Bar Code Reading Subsystem 17. If a specular reflection condition is still detected in the processed wide-area image, then the control process returns to Step A repeats Steps A through K, as described above.

Specification of Symbologies and Modes Supported by the Multi-Mode Bar Code Symbol Reading Subsystem Module Employed within the Hand-Supportable Digital Image-Based Bar Code Reading Device of the Present Invention FIG. 14 lists the various bar code symbologies supported by the Multi-Mode Bar Code Symbol Reading Subsystem 17 employed within the hand-supportable digital imaging-based bar code symbol reading device of the present invention. As shown therein, these bar code symbologies include: Code 128; Code 39; 12 of 5; Code93; Codabar; UPC/EAN; Telepen; UK-Plessey; Trioptic; Matrix 2 of 5; Ariline 2 of 5; Straight 2 of 5; MSI-Plessey; Code 11; and PDF417.

Specification of the Various Modes of Operation in the Multi-Mode Bar Code Symbol Reading Subsystem of the Present Invention As shown in FIG. 15, the Multi-Mode Image-Processing Based Bar Code Symbol Reading Subsystem 17 of the illustrative embodiment supports five primary modes of operation, namely: the Automatic Mode of Operation; the Manual Mode of Operation; the ROI-Specific Mode of Operation; the No-Finder Mode of Operation; and Omniscan Mode of Operation. As will be described in greater detail herein, various combinations of these modes of operation can be used during the lifecycle of the image-processing based bar code reading process of the present invention.

FIG. 16 is a exemplary flow chart representation showing the steps involved in setting up and cleaning up the software sub-Application entitled "Multi-Mode Image-Processing Based Bar Code Symbol Reading Subsystem 17", once called from either (i) the CodeGate Task software module at the Block entitled READ BAR CODE(S) IN CAPTURED NARROW-AREA IMAGE indicated in FIG. 13E, or (ii) the Main Task software module at the Block entitled "READ BAR CODE(S) IN CAPTURED WIDE-AREA IMAGE" indicated in FIG. 13J.

The Automatic Mode of Multi-Mode Bar Code Symbol Reading Subsystem

In its Automatic Mode of Operation, the Multi-Mode Bar Code Symbol Reading Subsystem 17 is configured to automatically start processing a captured frame of digital image data, prior to the complete buffering thereof, so as to search for one or more bar codes represented therein in an incremental manner, and to continue searching until the entire image is processed.

This mode of image-based processing enables bar code locating and reading when no prior knowledge about the location of, or the orientation of, or the number of bar codes that may be present within an image, is available. In this mode of operation, the Multi-Mode Bar Code Symbol Reading Subsystem 17 starts processing the image from the top-left corner and continues until it reaches the bottom-right corner, reading any potential bar codes as it encounters them.

The Manual Mode of the Multi-Mode Bar Code Symbol Reading Subsystem

In its Manual Mode of Operation, the Multi-Mode Bar Code Symbol Reading Subsystem 17 is configured to automatically process a captured frame of digital image data, starting from the center or sweep spot of the image at which the user would have aimed the bar code reader, so as to search for (i.e. find) a at least one bar code symbol represented therein. Unlike the Automatic Mode, this is done by searching in a helical manner through frames or blocks of extracted image feature data, and then marking the same and image-processing the corresponding raw digital image data until a bar code symbol is recognized/read within the captured frame of image data.

This mode of image processing enables bar code locating and reading when the maximum number of bar codes that could be present within the image is known a priori and when portions of the primary bar code have a high probability of spatial location close to the center of the image. The Multi-Mode Bar Code Symbol Reading Subsystem 17 starts processing the image from the center, along rectangular strips progressively further from the center and continues until either the entire image has been processed or the programmed maximum number of bar codes has been read.

The ROI-Specific Mode of the Multi-Mode Bar Code Symbol Reading Subsystem

In its ROI-Specific Mode of Operation, the Multi-Mode Bar Code Symbol Reading Subsystem 17 is configured to automatically process a captured frame of digital image data, starting from the region of interest (ROI) in the captured image, specified by coordinates acquired during a previous mode of operation within the Multi-Mode Bar Code Symbol Reading Subsystem 17. Unlike the Manual Mode, this is done by analyzing the received ROI-specified coordinates, derived during either a previous NoFinder Mode, Automatic Mode, or Omniscan Mode of operation, and then immediately begins processing image feature data, and image-processing the corresponding raw digital image data until a bar code symbol is recognized/read within the captured frame of image data. Thus, typically, the ROI-Specific Mode is used in conjunction with other modes of the Multi-Mode Bar Code Symbol Reading Subsystem 17.

This mode of image processing enables bar code locating and reading when the maximum number of bar codes that could be present within the image is known a priori and when portions of the primary bar code have a high probability of spatial location close to specified ROI in the image. The Multi-Mode Bar Code Symbol Reading Subsystem starts processing the image from these initially specified image coordinates, and then progressively further in a helical manner from the ROI-specified region, and continues until either the entire image has been processed or the programmed maximum number of bar codes have been read.

The No-Finder Mode of the Multi-Mode Bar Code Symbol Reading Subsystem

In its No-Finder Mode of Operation, the Multi-Mode Bar Code Symbol Reading Subsystem 17 is configured to automatically process a captured narrow-area (linear) frame of digital image data, without the feature extraction and marking operations used in the Automatic, Manual and ROI-Specific Modes, so as to read a one or more bar code symbols represented therein.

This mode enables bar code reading when it is known, a priori, that the image contains at most one (1-dimensional) bar code symbol, portions of which have a high likelihood of spatial location close to the center of the image and when the bar code is known to be oriented at zero degrees relative to the horizontal axis. Notably, this is typically the case when the bar code reader is used in a hand-held mode of operation, where the bar code symbol reader is manually pointed at the bar code symbol to be read. In this mode, the Multi-Mode Bar Code Symbol Reading Subsystem 17 starts at the center of the image, skips all bar code location steps, and filters the image at zero (0) degrees and 180 degrees relative to the horizontal axis. Using the "bar-and-space-count" data generated by the filtration step, it reads the potential bar code symbol.

The Omni-Scan Mode of the Multi-Mode Bar Code Reading Subsystem

In its Omniscan Mode of Operation, the Multi-Mode Bar Code Symbol Reading Subsystem 17 is configured to automatically process a captured frame of digital image data along any one or more predetermined virtual scan line orientations, without feature extraction and marking operations used in the Automatic, Manual and ROI-Specific Modes, so as to read a single bar code symbol represented in the processed image.

This mode enables bar code reading when it is known, a priori, that the image contains at most one (1-dimensional) bar code, portions of which have a high likelihood of spatial location close to the center of the image but which could be oriented in any direction. Multi-Mode Bar Code Symbol Reading Subsystem 17 starts at the center of the image, skips all bar code location steps, and filters the image at different start-pixel positions and at different scan-angles. Using the bar-and-space-count data generated by the filtration step, the Omniscan Mode reads the potential bar code symbol.

Specification of Multi-Mode Bar Code Symbol Reading Subsystem of the Present Invention Operated During its Automatic Mode of Operation As shown in FIG. 17A, the image-processing method carried out by the Multi-Mode Bar Code Symbol Reading Subsystem during its Automatic Mode of operation, comprises the following primary steps of operation, namely: (1) the first stage of processing involves searching for (i.e. finding) regions of interest (ROIs) by processing a low resolution image of a captured frame of high-resolution image data, partitioning the low-resolution image into N×N blocks, creating a feature vector (Fv) for each block using spatial-derivative based image processing techniques, marking ROIs by examining the feature vectors for regions of high-modulation, (2) the second stage of processing involves calculating bar code orientation, and marking the four corners of a bar code as a ROI, and (3) the third stage of processing involves reading any bar code symbols represented within the ROI by traversing the bar code image data, updating the feature vectors, examining the zero-crossings of filtered image data, creating bar and space patterns, and decoding the bar and space patterns using conventional decoding algorithms.

As will be described hereinbelow, these three (3) stages of image processing involved in the Automatic Mode of operation can be sub-divided into four major processing blocks (i.e. modules), namely: the Tracker Module 100, the Finder Module 101, the Marker Module 102, and the Decoder Module 103, which are shown in FIG. 2A2 and described in detail below. When the Automatic Mode of the Multi-Mode Bar Code Symbol Reading Subsystem 17 is invoked, these four processing blocks (i.e. modules) are executed, sequentially, and optionally incrementally so that a rectangular sub-region of the entire image can be processed per invocation.

First Stage of Image-Based Processing within the Multi-Mode Bar Code Symbol Reading Subsystem During its Automatic Mode of Operation During its Automatic Mode of operation, the first stage of processing in the Multi-Mode Bar Code Symbol Reading Subsystem 17 comprises: (i) searching for (i.e. finding) regions of interest (ROIs) by processing a low resolution image of a captured frame of high-resolution image data as shown in FIG. 18A; (ii) partitioning the low-resolution image of the package label into N×N blocks as shown in FIG. 18B; (iii) creating a feature vector for each block of low-resolution image data as shown in FIG. 18C using gradient vectors, edge density measures, the number of parallel edge vectors, centroids of edgels, intensity variance, and the histogram of intensities captured from the low-resolution image; (iv) examining the feature vectors for regions for parallel lines by detection of high modulation, high edge density, large number of parallel edge vectors and large intensity variance (using spatial-derivative based image processing techniques) as shown in FIG. 18D; and (v) marking ROIs. In general, this stage of processing is started before all lines of the full digital image data frame are buffered in memory, and typically only requires the number of rows in a given (first) feature block to be buffered in memory before the reading process can begin.

Detailed Specification of the Tracker Module

As indicated at Blocks A, B, C, C1 and XX in FIG. 17B, the first invocation of the Tracker Module 100 resets the Finder Module 101, Marker Module 102, and Decoder Module 103 sub-components to their initial state (as Block A); it resets the feature vector array Fv (at Block D) and the number of Regions of Interest (ROI). All subsequent invocations set the maximum processing line number of each of the three blocks to the current y-dimension of the image. The Tracker Module invokes an optional callback function (Pause Checker) to facilitate aborting or pausing Multi-Mode Bar Code Symbol Reading Subsystem 17 or to change parameters on the fly.

Detailed Specification of the Finder Module

As indicated at Blocks D through Y in FIG. 17B, the Finder Module 101 (processing block) sub-divides the image into N×N blocks, each of which has a feature vector array (Fv) element associated with it. An Fv element contains a set of numbers that identify the strong possibility of the presence of parallel lines within that image block. As indicated at Blocks D through Y, the Finder Module 101 processes the image at a lower spatial resolution; it processes every $n^{th}$ line and every $n^{th}$ pixel within each of the selected lines thereby performing calculations on the original image down-sampled-by-n. For each selected line it calculates:

$$\overline{T_y} = \frac{n \sum_{x=1}^{N_x} I(x, y)}{N_x} \quad (1)$$

where I(x,y)=gray value at pixel location (x,y) and $N_x$=x-dimension of the supplied (sub)image If $\overline{T_y}$ exceeds a programmable "background threshold", the image line y is declared a foreground line and is processed further by the Finder Module. A pixel is declared as a background pixel if its gray value is below a certain threshold. The Finder Module starts from the left-most pixel and traverses right on the foreground line, finds at Block G the first pixel whose intensity (gray value) exceeds the programmable background threshold and marks it as the left-edge ($x_l$) of the line. At Block H, the Finder Module then starts from the right-most pixel and traversing leftward on the foreground line determines the right-edge ($x_r$) using the same method. For foreground line y the Finder Module calculates at Block I:

$$I'_1(x,y)=|I(x+1,y)-I(x-1,y)|+|I(x,y+1)-I(x,y-1)|, \text{ where}$$
$$\chi_l \leq x \leq \chi_r. \quad (2)$$

If $I'_1(x,y)$ exceeds a threshold at Block J, the Finder Module marks pixel (x,y) as an edge element or edgel.

In order to find the direction and magnitude of the edge-vector corresponding to edgel (x,y), the Finder Module calculates at Block K:

$$I'_0(x, y) = \begin{vmatrix} w_1^0 I(x-1, y-1) + w_2^0 I(x, y-1) + w_3^0 I(x+1, y-1) + \\ w_4^0 I(x-1, y) + w_5^0 I(x, y) + w_6^0 I(x+1, y) + \\ w_7^0 I(x-1, y+1) + w_8^0 I(x, y+1) + w_9^0 I(x+1, y+1) \end{vmatrix} \quad (3)$$

$$I'_{45}(x, y) = \begin{vmatrix} w_1^{45} I(x-1, y-1) + w_2^{45} I(x, y-1) + w_3^{45} I(x+1, y-1) + \\ w_4^{45} I(x-1, y) + w_5^{45} I(x, y) + w_6^{45} I(x+1, y) + \\ w_7^{45} I(x-1, y+1) + w_8^{45} I(x, y+1) + w_9^{45} I(x+1, y+1) \end{vmatrix} \quad (4)$$

$$I'_{90}(x, y) = \begin{vmatrix} w_1^{90} I(x-1, y-1) + w_2^{90} I(x, y-1) + w_3^{90} I(x+1, y-1) + \\ w_4^{90} I(x-1, y) + w_5^{90} I(x, y) + w_6^{90} I(x+1, y) + \\ w_7^{90} I(x-1, y+1) + w_8^{90} I(x, y+1) + w_9^{90} I(x+1, y+1) \end{vmatrix} \quad (5)$$

$$I'_{135}(x, y) = \quad (6)$$
$$\begin{vmatrix} w_1^{135} I(x-1, y-1) + w_2^{135} I(x, y-1) + w_3^{135} I(x+1, y-1) + \\ w_4^{135} I(x-1, y) + w_5^{135} I(x, y) + w_6^{135} I(x+1, y) + \\ w_7^{135} I(x-1, y+1) + w_8^{135} I(x, y+1) + w_9^{135} I(x+1, y+1) \end{vmatrix}$$

where the coefficients $w_i^0$, $w_i^{45}$, $w_i^{90}$, $w_i^{135}$ are given by the operators:

$$w^0 = \begin{matrix} -1 & 0 & 1 \\ -2 & 0 & 2 \\ -1 & 0 & 1 \end{matrix}$$

-continued $$w^{45} = \begin{matrix} -2 & -1 & 0 \\ -1 & 0 & 1 \\ 0 & 1 & 2 \end{matrix}$$

$$w^{90} = \begin{matrix} -1 & -2 & -1 \\ 0 & 0 & 0 \\ 1 & 2 & 1 \end{matrix}$$

$$w^{135} = \begin{matrix} 0 & -1 & -2 \\ 1 & 0 & -1 \\ 2 & 1 & 0 \end{matrix}$$

At Block M, the Finder Module updates the Fv block that edgel (x,y) belongs to with:
Edge strength:

$$I'_{fv_i} = \sum_{j=1}^{n} I'_{ij} \quad (7)$$

where $I'_{ij}$=edge strength of edgel j, and
n=number of edgels inside Fv block i $$A_{fv_i}(z) = \sum_{j=1}^{n} A_j, \text{ where}$$

Edge direction:

$$A_j = \begin{cases} 1, & j = k, k \in [0, 3] \\ 0 \end{cases} \quad (8)$$

$$I'_{z_1} \geq I'_{z_2} \geq I'_{z_3} \geq I'_{z_4}, z_i = 45 * (k + i - 1)$$

Centroid of edgels:

$$\overline{x}_{fv_i} = \frac{\sum_{j=1}^{n} x_j}{n}, \quad (9)$$

$$\overline{y}_{fv_i} = \frac{\sum_{j=1}^{n} y_j}{n}$$

where $(x_j, y_j)$ are the coordinates of the edgels
Cumulative histogram:

$$H_{fv_i}(z) = \sum_{j=1}^{n} H_j, \text{ where} \quad (10)$$

$$H_j = \begin{cases} 1, & I(x, y) \leq z \\ 0 \end{cases}$$

At Block N, the Finder Module goes through all the lines of the current image section and populates the Fv array using the above-mentioned features. At Blocks O through U, the Finder Module checks to see if all lines have been processed.

At Block V, the Finder Module then examines each Fv array element for features that strongly point to the presence of parallel lines within the Fv block. At Block W, an interesting Fv is declared as part of a Region of Interest (ROI) when the number of edgels exceeds a threshold, at least one of the edgel direction array elements exceeds a threshold value, and $$m - n > C, \text{ where } Hfv_i(m) > \alpha N, Hfv_i(n) > (1-\alpha)N, \quad (11)$$

C=Contrast-threshold $\alpha \in (0,1)$
N=total number of pixels in image block corresponding to feature vector array Fv Notably, at Blocks C, E, and T, the Finder Module invokes the Pause Checker callback function to let the scanning application take control.

Second Stage of Image-Based Processing within the Multi-Mode Bar Code Symbol Reading Subsystem During its Automatic Mode of Operation During its Automatic Mode of Operation, the second stage of processing in the Multi-Mode Bar Code Symbol Reading Subsystem 17 involves (ii) calculating bar code orientation by analyzing the feature vectors for parallel lines, and (ii) marking the four corners of a bar code as a ROI, in terms of x,y coordinates.

FIGS. 18E and 18F illustrate calculating bar code orientation, during the second marking stage of processing within the Multi-Mode Bar Code Symbol Reading Subsystem 17 during its Automatic Mode of operation, wherein within each feature vector block, the scan line data representing the bar code is traversed (i.e. sliced) at different angles, the slices are matched with each other based on "least mean square error", and the correct orientation is determined to be that angle which matches the mean square error sense through every slice of the bar code.

FIG. 18G illustrates the marking of the four corners of the detected bar code symbol, during the second marking stage of processing within the Multi-Mode Bar Code Symbol Reading Subsystem 17 during its Automatic Mode of operation. During this stage of processing, such marking operations are performed on the full high-resolution image of the parcel, the bar code is traversed in either direction starting from the center of the block, the extent of modulation is detected using the intensity variance, and the x,y coordinates (pixels) of the four corners of the bar code are detected starting from 1 and 2 and moving perpendicular to the bar code orientation, so as to ultimately define the ROI by the detected four corners of the bar code symbol within the high-resolution image.

Detailed Specification of the Marker Module

Within the Multi-Mode Bar Code Symbol Reading Subsystem 17 shown in FIG. 2A2, the Marker Module as indicated at Blocks Z through KK, in FIG. 17B, takes over from the Finder Module and examines each ROI to determine the complete extent of the ROI. The Finder Module then checks the location of the centroid of the ROI and compares it to the line number of the accumulated images in memory.

$$y_{roi_i} + L > N_y \quad (12)$$

where $y_{roi_i}$=y coordinate of the centroid of $ROI_i$
L=Maximum length (in pixels) of any bar code presented to Multi-Mode Bar Code Symbol Reading Subsystem
$N_y$=y-dimension of cumulative image If inequality (12) holds, then the Marker Module postpones calculations for this ROI until the y-dimension of the image is such that inequality does not hold. When the Marker Module continues to process the ROI, it first determines the orientation of the parallel lines that could potentially be part of a bar code, by calculating:

$$\theta = \left(225 - \tan^{-1}\left(\frac{I'_{135}}{I'_{45}}\right)\right) \bmod(180), \ I'_0 \geq I'_{45}, \ I'_0 \geq I'_{45}, \ I'_0 \geq I'_{135} \quad (13)$$

$$\theta = \left(\tan^{-1}\left(\frac{I'_{90}}{I'_0}\right)\right) \bmod(180), \ I'_{45} \geq I'_0, \ I'_{45} \geq I'_{90}, \ I'_{45} \geq I'_{135}$$

$$\theta = \left(45 + \tan^{-1}\left(\frac{I'_{135}}{I'_{45}}\right)\right) \bmod(180), \ I'_{90} \geq I'_{45}, \ I'_{90} \geq I'_0, \ I'_{90} \geq I'_{135}$$

$$\theta = \left(180 - \tan^{-1}\left(\frac{I'_{90}}{I'_0}\right)\right) \bmod(180), \ I'_{135} \geq I'_0, \ I'_{135} \geq I'_{90}, \ I'_{135} \geq I'_{45}$$

$$\begin{bmatrix} x_{j+1} \\ y_{j+1} \end{bmatrix} = \begin{bmatrix} x_j \\ y_j \end{bmatrix} - \begin{bmatrix} \cos\beta \\ \sin\beta \end{bmatrix} \quad (14)$$

$$\begin{bmatrix} x'_j \\ y'_j \end{bmatrix} = \begin{bmatrix} x_j \\ y_j \end{bmatrix} - n_i \begin{bmatrix} -\sin\beta \\ \cos\beta \end{bmatrix} \quad (15)$$

The angle $\theta$ that yields the minimum $E(\beta)$, is assumed to be a close approximation of the actual orientation angle of the parallel lines.

Having calculated the correct orientation of the parallel lines, the Marker Module calculates the narrowest and the widest width of the parallel lines in the neighborhood of the ROI by traversing (i.e. scanning) the image in the direction of orientation of the lines as well as at 180 degrees to it (e.g. using a spot size window of say N×N pixels (e.g. where 1<N<10). It should be noted that all angle measurements are clockwise relative to the horizontal axis. Equation (14) specifies the traversal equation with $\beta=\theta,\theta+180$. Details of the method used to calculate the widths of the lines are explained at length in the Decoder Module section.

The Marker Module uses the widths of the narrowest and widest elements to determine a pixel count (n) that closely approximates the minimum quiet-zone allowable for any bar code symbology. It then traverses the image again using equation (14) and calculates:

$$m_i = \frac{\sum_{j=i}^{i+n} I(x_j, y_j)}{n}$$

$$v_i = \frac{\sum_{j=i}^{i+n} \|I(x_j, y_j) - m_i\|}{n-1} \quad (16)$$

$$IV_i = \frac{v_i}{m_i^2}$$

where $m_i$=mean of the set of n pixels starting at pixel i $v_i$=variance of the set of n pixels starting at pixel I If $IV_i$ is less than a threshold, then the Marker Module makes the assumption that the group of parallel lines end at pixel i (similarly for the $\theta+180$ direction). Starting from pixel i and traversing the image using (15) and a spot size window of say N×N pixels (e.g. where 1<N<10), and performing similar calculations as in equation (16) the four corners that approximate the quadrilateral bound of the potential bar code are determined. A pictorial representation of the above-mentioned method can be found in the figure entitled "Step 6: Mark ROIs: Mark four corners of bar code.

The Marker Module then marks all the Fv blocks that encompass the quadrilateral bound of the potential bar code, with the current ROI identifier; if there already exists one or more ROIs with different identifiers, the Marker Module picks that ROI that completely encompasses the others. The old ROIs are kept only if they are not completely enclosed within the current ROI.

The Marker Module also frequently invokes the Pause Checker to let the bar code reading Application (running) take over control.

Third Stage of Image-Based Processing within the Multi-Mode Bar Code Symbol Reading Subsystem During its Automatic Mode of Operation The third stage of processing involves reading any bar code symbols represented within the ROI by traversing the bar code and updating the feature vectors, examining the zero-crossings of filtered images, creating bar and space patterns, and decoding the bar and space patterns FIG. 18H shows updating the feature vectors during the third stage of processing within the Multi-Mode Bar Code Symbol Reading Subsystem during its Automatic Mode of operation. During this stage of processing, the histogram component of the feature vector Fv is updated while traversing the bar code (using a spot size window of say N×N pixels (e.g. where 1<N<10), the estimate of the black-to-white transition is calculated, and an estimate of narrow and wide elements of the bar code are also calculated.

FIG. 18I illustrates the search for zero crossings during the third stage of processing within the Multi-Mode Bar Code Symbol Reading Subsystem 17 during its Automatic Mode of operation. During this stage of processing, the high-resolution bar code image is median filtered in a direction perpendicular to bar code orientation, the second derivative zero crossings define edge crossings, the zero-crossing data is used only for detecting edge transitions, and the Black/White transition estimates are used to put upper and lower bounds to bar and space grey levels, as graphically illustrated.

FIG. 18J illustrates creating a bar and space pattern during the third stage of processing within the Multi-Mode Bar Code Symbol Reading Subsystem during its Automatic Mode of operation. During this stage of processing, the edge transition is modeled as a ramp function, the edge transition is assumed to be 1 pixel wide, the edge transition location is determined at the subpixel level, and the bar and space counts are gathered using edge transition data;

FIG. 18K illustrates generating the decode bar and space pattern during the third stage of processing within the Multi-Mode Bar Code Symbol Reading Subsystem during its Automatic Mode of operation. During this stage of operation, the bar and space data is framed with borders, and the bar and space data is decoded using existing laser scanning bar code decoding algorithms.

Detailed Specification of the Decoder Module

As indicated in at Blocks LL through AAA in 17B, the Decoder Module takes over from the Marker Module and examines each ROI previously defined by the Marker Module. For each ROI, the Decoder Module uses the quadrilateral bound coordinates {x,y} to calculate the longer (higher) extremity of the potential bar code (towards the possible quiet-zones). The Decoder Module then computes the maximum number of possible scan-lines as:

$$T = \frac{D}{n} \quad (17)$$

where D=length of the longer extremity, and n=pixel-offset per scan-line.

Notably, the parameter n (i.e. pixel-offset per scan line) represents how far the Decoder Module moves up its virtual scan direction (parallel to the previous virtual scan direction) and processes the image during each image processing cycle. As any captured image will be corrupted by some degree of noise (and certainly greater levels when a bar code symbol cannot be decoded), the Decoder Module needs to perform its next processing cycle on a line of scan data that is located as far away as possible from the previous line of scan data which did not result in a successful decode, but at the same time, the Decoder Module should exploit the inherent noise-immunity features provided in many bar code symbologies. Thus, in accordance with the present invention, the pixel-offset per scan line variable n is not arbitrarily selected, as in most prior art systems, but rather is determined by carefully (i) determining the maximum pixel height (length) of the ROI under consideration, and (ii) dividing this maximum pixel height of the ROI into a number of pixel-offset distances proportional to the maximum pixel height of the ROI. In the preferred embodiment, the number or sequence of scan lines into which the ROI can be divided for subsequent cycles of image processing, thus defining the pixel off-set per scan-line, is described by the formula: $f(m, n)=(2m-1)/2^{n-1}$, - where n=1, 2 . . . N. and $1 < m < 2^{n-1}$.

The Decoder Module traverses the potential bar code using equation (14) and calculates approximations for the first and second order derivatives:

$$I'_i = \sum_{j=-1}^{1} \begin{bmatrix} w_1 I(x_j-1, y_j-1) + w_2 I(x_j, y_j-1) + \\ w_3 I(x_j+1, y_j-1) + w_4 I(x_j-1, y_j) + \\ w_5 I(x_j, y_j) + w_6 I(x_j+1, y_j) + \\ w_7 I(x_j-1, y_j+1) + w_8 I(x_j, y_j+1) + \\ w_9 I(x_j+1, y_j+1) \end{bmatrix} \quad (18)$$

$$I''_i = I'_{i+1} - I'_{i-1}$$

where $$w_i = \begin{matrix} 0.776 & 0.000 & -0.776 \\ 1.000 & 0.000 & -1.000 \\ 0.776 & 0.000 & -0.776 \end{matrix} \quad \ldots \quad 0 < \theta \leq 22$$

$$w_i = \begin{matrix} 1.000 & 0.776 & 0.000 \\ 0.776 & 0.000 & -0.776 \\ 0.000 & -0.776 & -1.000 \end{matrix} \quad \ldots \quad 0 < \theta \leq 68$$

$$w_i = \begin{matrix} 0.776 & 1.000 & 0.776 \\ 0.000 & 0.000 & 0.000 \\ -0.776 & -1.000 & -0.776 \end{matrix} \quad \ldots \quad 0 < \theta \leq 113$$

$$w_i = \begin{matrix} 0.000 & 0.776 & 1.000 \\ -0.776 & 0.000 & 0.776 \\ -1.000 & -0.776 & 0.000 \end{matrix} \quad \ldots \quad 0 < \theta \leq 158$$

-continued $$w_i = \begin{matrix} -0.776 & 0.000 & 0.776 \\ -1.000 & 0.000 & 1.000 \\ -0.776 & 0.000 & 0.776 \end{matrix} \quad \ldots \quad 158 < \theta < 180 \quad (19)$$

and $(x_j, y_j)$ are related by equation (15).

The Decoder Module examines the zero crossings of $I''_i$ and if $I''_i \cdot I''_{i+1} < 0$, and $I''_{i+1} > 0$, and $$I'_i < -T \quad (20)$$

where T=minimum derivative magnitude threshold, then the Decoder Module concludes that a "space to bar transition" has occurred.

If:

$I''_i \cdot I''_{i+l} < 0$, and $I''_{i+l} < 0$, and $$I'_i > T \quad (21)$$

then, the Decoder Module concludes that a "bar to space transition" has occurred.

The Decoder Module takes the difference in pixel position of adjacent bar/space transitions and adds it to the interpolated mid-point of the bar-space/space-bar transition (found using $r'_i$) to determine the width of each element of the potential bar code. This is the same method used by the Marker Module to calculate the widths of the narrowest and widest parallel lines.

Having calculated the "bar-and-space-count" data for each scan-line, the Decoder Module invokes the different (and separately enabled) symbology-decoders supported within the imaging-based bar code symbol reader, as indicated at FIG. 18K. Each symbology decoder, whether 1-dimensional or certain 2-dimensional symbologies (like PDF417), detects the presence of the correct number of bars and spaces and also the correct start/stop pattern before attempting to decode the potential bar code symbol.

If the Decoder Module decodes using the current "scan-line data", then it skips all other scan-lines. If the Decoder Module detects a stacked symbology, then it continues to gather more scan-line-data. If decoding fails, then the Decoder Module adjusts the scan-line angles (bar code-orientation angle) progressively and repeats the process. The Decoder Module, in the process of collecting scan-line-data, also correlates the bar-and-space-data from one scan-line with that of the adjacent scan-lines in order to read through damaged or poorly presented bar codes. For every bar code that is decoded by the Decoder Module, a callback function is invoked to save the decoded result. The Decoder Module calls the Pause Checker callback function frequently to let the scanning application take control.

In its Automatic Mode, the Multi-Mode Bar Code Symbol Reading Subsystem 17 repeats this entire process for the entire image, and optionally for progressively acquired images.

Specification of Multi-Mode Bar Code Symbol Reading Subsystem of the Present Invention Operated During its Manual Mode of Operation FIG. 19A illustrates the steps involved in the process carried out by the Multi-Mode Bar Code Symbol Reading Subsystem during its Manual Mode of operation. During this manual mode of operation, the first stage of processing involves searching for and finding regions of interest (ROIs) by processing a low resolution image of a captured frame of high-resolution image data, partitioning the low-resolution image into N×N blocks, and creating a feature vector for the middle block using spatial-derivative based image processing techniques. Then, the second stage of processing involves marking ROIs by examining the feature vectors for regions of high-modulation and returning to the first stage to create feature vectors for other blocks surrounding the middle block (in a helical manner), calculating bar code orientation and eventually marking the four corners of a bar code as a ROI, and (3) the third stage of processing involves reading any bar code symbols represented within the ROI by traversing the bar code and updating the feature vectors, examining the zero-crossings of filtered images, creating bar and space patterns, and decoding the bar and space patterns.

Like in the Automatic Mode, these three (3) stages of image processing in the manual mode of operation can be sub-divided into four major processing blocks (i.e. modules), namely: the Tracker Module, the Finder Module, the Marker Module, and the Decoder Module, which have been described in great detail above. When the Manual Mode of the Multi-Mode Bar Code Symbol Reading Subsystem 17 is invoked, these four processing blocks (i.e. modules) are executed sequentially, and optionally incrementally so that a rectangular sub-region of the entire image can be processed per invocation.

FIG. 19B illustrates the steps involved in the decode process carried out by the Multi-Mode Bar Code Symbol Reading Subsystem 17 during its Manual Mode of operation. As indicated at Block A, the Main Task or CodeGate Task in Application Layer invokes the Tracker Module to find the center coordinates of the center block of captured image data, to which the center feature vector will be associated. This central block of image data will be associated with image pixels located along the central portion of the image frame captured by the imaging-based bar code symbol reader. This step involves the Tracker Module resetting the Finder Module, Marker Module, and Decoder Module sub-components to their initial state; it resets the feature vector array and the number of Regions of Interest (ROI). While not indicated in the flow chart of FIG. 19B, the Tracker Module invokes an optional callback function (Pause Checker) at various location within the control flow to facilitate aborting or pausing Multi-Mode Bar Code Symbol Reading Subsystem 17 or to change parameters on the fly.

As indicated at Block B in FIG. 19B, the Finder Module is invoked and the captured image is subdivided into N×N blocks, each of which has a feature vector (Fv) array element associated with it. An Fv element contains a set of numbers that identify the strong possibility of the presence of parallel lines within that image block. As described hereinabove, the Finder Module processes the image at a lower spatial resolution; namely, it processes every $n^{th}$ line and every $n^{th}$ pixel within each of the selected lines thereby performing calculations on the original image down-sampled-by-n. For each selected line it calculates. At Block C, the Subsystem 17 determines if an ROI (bounding a complete bar code symbol) is found, and if so, then invokes the Marker Module. Then at Block E, the Subsystem 17 determines whether an ROI has been marked by the Market Module, and if so, then the Decoder Module is invoked and then the ROI processed. If a bar code symbol is read within the ROI at Block G, then at Block H the Subsystem 17 determines if the actual number of decode cycles equals the required number of decode cycles. If so, then the Manual Mode of operation of the Subsystem 17 is stopped, and the flow returns to the Application Layer.

If at Block C in FIG. 19B the Subsystem 17 determines that the ROI is not found, then the subsystem proceeds to Block I. If the Subsystem determines that all feature vectors have not yet been examined, then the Subsystem proceeds to Block J which advances the analysis to the next feature vector closet to the center feature vector, along the locus of a helical path through the image pixel data set. Then, at Block B, the Subsystem reinvokes the Finder Module to operate on this next feature vector.

If at Block G, the Subsystem determines that the Decoder Module does not successfully decode a bar code symbol in the ROI, then it advances to Block I and determines whether all feature vectors have not been examined.

The Subsystem 17 operated in the mode of operation specified by the flow chart of FIG. 19B until a single bar code symbol is read within an ROI. Each instance of the Finder Module involves the analysis of another block of pixel data (corresponding to another feature vector) in effort to find an ROI containing a bar code symbol which can be found at Block C and successfully decoded at Block G. The sequential analysis of blocks of pixel data follows a helical pattern about the center starting point, determined at Block A of FIG. 19B. Notably, during the Manual Mode of Operation, the Subsystem utilizes the image processing techniques described in connection with the Automatic Mode of operation, above.

The primary advantage of the Manual Mode of operation over the Automatic Mode of operation is that the Manual Mode is that, when the user points the bar code reader at a bar code symbol to be read, the bar code reader in the manual mode is more likely to acquire an image and process the pixel data within a ROI containing a bar code symbol is a very quick manner, in comparison with the Automatic Mode which essentially scans and processes the entire captured image starting to from upper left most block of captured image data, ensuring a faster response time in hand-held bar code reading applications, in particular.

Specification of the Multi-Mode Bar Code Symbol Reading Subsystem of the Present Invention Operated During its NoFinder Mode of Operation FIG. 20A illustrates that the image processing carried out by the Multi-Mode Bar Code Symbol Reading Subsystem 17 during its NoFinder Mode of operation involves essentially a single stage of image processing, unlike the Automatic, Manual and ROI-Specific Modes of operation. During this No-Finder Mode, Subsystem 17 does not employ the Tracker Module, the Finder Module or the Marker Module and instead only invokes the Decoder Module to (i) directly process the narrow-area high-resolution image captured by the bar code reader, one line of scan data at a time, starting from the middle thereof, (ii) examine the zero-crossings of the filtered image, (iii) create bar and space patterns therefrom, and then (iv) decode the bar and space patterns using conventional decoding algorithms. If the reading process is not successful, then the Subsystem 17 traverses another line of scan data within the captured narrow-area image, starting from a pixel offset n which is computed assuming a constant maximum height of the ROI which is deemed to be the pixel height of the captured narrow-area image.

FIG. 20B illustrates the steps involved in the image processing method carried out by the Multi-Mode Bar Code Symbol Reading Subsystem 17 during its NoFinder Mode of operation. As indicated at Block A in FIG. 20B, the Subsystem 17 first finds (i.e. calculates) the center pixel in the captured narrow-area image. Then at Block B, the Subsystem 17 invokes the Decode Module and configures the same using the calculated center pixel. Within the Decode Module, sub-Blocks B1 through B8 are then carried out as shown in FIG. 20A. As indicated in Block B1, the Decoder Module, starting from the calculated center point, scans the image horizontally and westward (using a spot-size window of say N×N pixels (e.g. where 1<N<10), and then processes the scanned image data to determine if a first border in a bar code symbol is found. Notably, this virtual scanning process is realized as a mathematical convolution of the spot-size window and the pixel data in the image buffer. If a first border is found at Block B2, then, once again starting from the calculated center point, the Decoder Module at Block B3 scans the image horizontally and eastward (using a spot size window of say N×N pixels (e.g. where 1<N<10), and then at Block B4 processes the scanned image data to determine if a second border in a bar code symbol is found. If a second border is found at Block B4, then the Decoder Module processes the captured image at Block B5. If, at Block B6, the Decoder Module successfully reads a bar code symbol within the scanned line of image data, then the Subsystem terminates the Decoder Module and stops the NoFinder Mode of operation.

If at Block B2 in FIG. 20A the Decoder Module does not find a first border of a bar code symbol, then it proceeds to Block B7 and determines if it has tried all possible scan lines within the captured narrow-area image. If the Decoder Module has tried processing all possible scan lines through the narrow-area image, then it proceeds to the stop block and terminates the NoFinder Mode of operation. If the Decoder Module has not tried processing all scan lines through the captured narrow-area image, then it proceeds to Block B8, where it advances to the next line of scan data in the captured narrow-area image (i.e. by the offset pixel amount n), and then returns to Block B1 where scanning and processing is resumed along the new scan line (using a spot size window of say N×N pixels (e.g. where 1<N<10).

If at Block B4, the second bar code border is not found, then the Decoder Module proceeds to Block B7 and determines whether all scan lines through the captured image have been tried. If so, then the Subsystem 17 terminates the Decoder Module and exits its NoFinder Mode of operation. If all scan lines have not been tried at this stage of the process, then the Decoder Module proceeds to Block B8 and advances to the next line of scan data for processing, as described hereinabove.

If at Block B6 in FIG. 20A the Decoder Module does not read a bar code within the current line of scan data being processed, then it proceeds to Block B7, where it determines if all lines of scan data have been tried. If all lines of scan data have not been tried, then at Block B8 the Decoder Module advances to the next line of scan data in the captured narrow-area image (i.e. by the offset pixel amount n), and then returns to Block B1 where scanning and processing is resumed along the new scan line (using a spot size window of say N×N pixels (e.g. where 1<N<10). If at Block B7, the Decoder Module determines that all lines of scan data have been tried, then the Decoder Module stops and terminates its process. For every bar code that is decoded by the Decoder Module, a callback function is invoked to save the decoded result. The Decoder Module calls the Pause Checker callback function frequently to let the car code symbol reading Application take control.

Specification of Multi-Mode Bar Code Symbol Reading Subsystem of the Present Invention Operated During its OmniScan Mode of Operation FIG. 21A illustrates that the image processing method carried out by the Multi-Mode Bar Code Symbol Reading Subsystem during its Omniscan Mode of operation involves essentially a single stage of image processing, unlike the Automatic, Manual and ROI-Specific Modes of operation. During this Omniscan Mode, the Decoder Module does not employ the Tracker Module, the Finder Mode or the Marker Module and instead directly processes the narrow-area high-resolution image captured by the bar code reader, along a plurality of spaced apart (e.g. 50 pixels) virtual scanning lines traversing through the entire 2D frame of image data captured by the Subsystem 17. During the OmniScan Mode of operation, the Decoder Module assumes the imaged bar code symbol resides at the center of the captured wide-area high-resolution image with about a 1:1 aspect ratio (e.g. 1" tall×1" wide). Based on these assumptions, the Subsystem 17 starts at first predetermined angular orientation (e.g. 0, 30, 60, 90, 120 or 150 degrees), and then: (i) directly processes the high-resolution image along a set of parallel spaced-apart (e.g. 50 pixels) virtual scan lines line (using a spot size window of say N×N pixels (e.g. where 1<N<10); (ii) examines the zero-crossings along these virtual scan lines; (iii) creates bar and space patterns therefrom; and then (iv) decode processes the bar and space patterns. If image processing along the selected angular orientation fails to read a bar code symbol, then the Subsystem 17 automatically reprocesses the high-resolution image along a different set of parallel spaced-apart virtual scan lines oriented at a different angle from the previously processed set of virtual scan lines (e.g. 0, 30, 60, 90, 120 or 150 degrees). This processing cycle continues until a single bar code symbol is read within the processed image.

FIG. 21B illustrates the steps involved in the image processing method carried out by the Multi-Mode Bar Code Symbol Subsystem 17 during its OmniScan Mode of operation. As indicated at Block A in FIG. 21B, the Subsystem 17 first finds (i.e. calculates) the start pixel and scan angle in the captured narrow-area image. Then at Block B, the Subsystem 17 invokes the Decode Module and configures the same using the calculated (i) start pixel and (ii) start scan angle. Within the Decode Module, sub-Blocks B1 through B8 are then carried out as shown in FIG. 21B. As indicated at Block B1, the Decoder Module, starting from the calculated start point and start angle, scans the image at the start angle and north-westwardly using a spot-size window of say N×N pixels (e.g. where 1<N<10), and then at Block B2 processes the scanned image data to determine if a first border in a bar code symbol is found. Notably, this virtual scanning process is realized as a mathematical convolution of the spot-size window and the pixel data in the image buffer. If a first border is found at Block B2, then, once again starting from the calculated start point and start angle, the Decoder Module at Block B3 scans the image at the start angle and southwestwardly using a spot size window of say N×N pixels (e.g. where 1<N<10), and then at Block B4 processes the scanned image data to determine if a second border in a bar code symbol is found. If a second border is found at Block B4, then the Decoder Module invokes the Decoder Module described above at Block B5 and decode processes the scanned image. If, at Block B6, the Decoder Module successfully reads a bar code symbol within the scanned line of image data, then the Subsystem 17 terminates the Decoder Module and stops the Omniscan Mode of operation.

If at Block B2 in FIG. 21A the Decoder Module does not find a first border of a bar code symbol, then it proceeds to Block B7 and determines if it has tried all possible scan lines at combinations of start pixels and start angles within the captured narrow-area image. If at Block B7 the Decoder Module has tried processing all possible scan lines at start pixel and angle combinations through the narrow-area image, then it proceeds to the "stop" Block and terminates the Omniscan Mode of decoder operation. If the Decoder Module has not tried processing all scan lines at all start pixel and angle orientations through the captured narrow-area image, then it proceeds to Block B8, where it advances to the next line of scan data in the captured narrow-area image (i.e. by the offset pixel amount n), and then returns to Block B1 where scanning and processing is resumed along the new scan line (using a spot size window of say N×N pixels (e.g. where 1<N<10).

If at Block B4, the second bar code border is not found, then the Decoder Module proceeds to Block B7 and determines whether all scan lines at all possible start pixels and angles (through the captured image) have been tried. If so, then the Decode Module terminates its process and exits the Omnsican Mode of operation. If the scan lines at all start pixel and angle combinations have not been tried at this stage of the process, then the Decoder Module proceeds to Block B8 and advances the next start pixel and angle for scan data image processing, and returns to Block B1 as described hereinabove.

If at Block G in FIG. 21A the Decoder Module does not decode a bar code within the current set of parallel lines of scan data being processed, then it proceeds to Block I, where it advances to the next set of parallel scan lines (at a different set of start pixels and angle), and then returns to Block B where scanning and processing is resumed along the new set of parallel scan lines (using a spot size window of say N×N pixels (e.g. where 1<N<10). For every bar code that is decoded by the Decoder Module, a callback function is invoked to save the decoded result. The Decoder Module calls the Pause Checker callback function frequently to let the bar code reading Application take control.

Specification of Multi-Mode Bar Code Symbol Reading Subsystem of the Present Invention Operated During its ROI-Specific Mode of Operation FIG. 22A illustrates the steps involved in the image processing method carried out by the Multi-Mode Bar Code Symbol Reading Subsystem during its ROI-Specific Mode of operation. Notably, the ROI-Specific Mode of operation is similar to the Manual Mode of operation, except that it is used to automatically process a specified "region of interest" (ROI) previously identified during the processing of a captured image frame during a different mode of operation, e.g. the NoFinder Mode of Operation or Omniscan Mode of Operation As reflected in FIG. 22A, during this ROI-Specific Mode of operation, the first stage of processing involves receiving region of interest (ROI) coordinates {x,y} obtained during other modes of operation (e.g. Omniscan Mode, Automatic Mode or NoFinder Mode—after the occurrence of a failure to read), and re-partitioning the captured low-resolution image (from the Omniscan Mode) into N×N blocks, and instantiating a feature vector for the ROI-specified block(s) using features imported from and collected during the Omniscan, Automatic or No-Finder Module (and possibly utilizing additional spatial-derivative based image processing techniques). The second stage of processing involves marking additional ROIs by examining the feature vectors for regions of high-modulation (about the originally specified ROI) and returning to the first stage to create feature vectors for other blocks surrounding the specified block (in a helical manner), calculating bar code orientation and marking the four corners of a bar code contained within a ROI to be decode processed. The third stage of processing involves reading any bar code symbols represented within the ROI by traversing the pixel data associated with the bar code and updating the feature vectors, examining the zero-crossings of filtered images, creating bar and space patterns, and decoding the bar and space patterns using conventional bar code decoding algorithms.

FIG. 22B illustrates the steps involved in the image processing method carried out by the Multi-Mode Bar Code Symbol Reading Subsystem during its ROI-Specific Mode of operation. As indicated at Block A, the Decoder Module associated with either the Omniscan or NoFinder Mode receives {x.y} coordinates for a specific ROI (in which at least a portion of a bar code symbol is likely to exist) to which an initial feature vector will be instantiated. Then at Block B, the Finder Mode is invoked, and at Block C, the Finder Module determines whether or not an ROI (containing a complete bar code symbol)) has been found. If the Finder Module determines that a ROI-contained bar code has been found, then the Finder Module invokes the Marker Module, whereupon at Block E, the Marker Module determines whether the ROI-contained bar code symbol has been marked by the Marker Module. If so, then the Decoder Module is invoked and then the high-resolution pixel data associated with the ROI is processed. If a bar code symbol is read within the ROI at Block G, then at Block H the Decoder Module determines if the actual number of decodes equals the required number of decode cycles (i.e. set by the end user). If so, then the Manual Mode of Operation is stopped, and the flow returns to the Application Layer.

If at Block C in FIG. 22B the Finder Module determines that an ROI (containing a complete bar code) is not found, then the Finder Module proceeds to Block I. If the Finder Mode determines that all feature vectors have not yet been examined, then the Finder Mode proceeds to Block J which advances the analysis to the next feature vector closet to the ROI-specified feature vector, along the locus of a helical path through the image pixel data set. Then, at Block B, the Finder Module reinvokes itself to operate on this next feature vector.

If at Block G, the Decoder Module does not successfully read a bar code symbol in the ROI, then it advances to Block I and determines whether all feature vectors have not been examined. If so, then the Decoder Module terminates the ROI-specific Mode of operation. Typically, the Subsystem 17 continues in this mode of operation until, for example, a single bar code symbol is read within an ROI marked as containing a complete bar code symbol. Each instance of the Finder Module involves the analysis of another block of pixel data (corresponding to another feature vector) in effort to find an ROI containing a complete bar code symbol, which can be found at Block C and successfully read at Block G. The sequential analysis of blocks of pixel data follows a helical pattern about the center starting point, determined at Block A of FIG. 22B. Notably, during the Manual Mode of Operation, the Subsystem utilizes the image processing techniques described in connection with the Automatic Mode of Operation, above.

Specification of Multi-Mode Bar Code Symbol Reading Subsystem of the Present Invention Operated During its First Multi-Read (OmniScan/ROI-Specific) Mode of Operation FIG. 23 describes the operation of the Multi-Mode Bar Code Symbol Reading Subsystem 17 when it is driven into its first multi-read (e.g. Omniscan/ROI-Specific) mode of operation. In this first multi-read mode of operation, the Subsystem 17 adaptively processes and reads a captured high-resolution image in a high-speed manner, applying adaptive learning techniques, taught herein.

For example, assume the multi-mode image-processing symbol decoding subsystem is configured to operate in its first multi-read (OmniScan/ROI-Specific) mode of operation, as shown in FIG. 23. In this case, if during the Omniscan Mode of operation, code fragments associated with a PDF417 bar code symbol are detected within a ROI in a captured (narrow or wide) area image, but processing thereof is unsuccessful, then the Multi-Mode Bar Code Symbol Reading Subsystem 17 will automatically (i) enter its ROI-Specific Mode of operation described above, and then (ii) immediately commences processing of the captured image at the ROI specified by ROI coordinates acquired by feature vector analysis during the Omniscan Mode of operation. In the illustrative embodiment, this switching of modes in the Subsystem 17 occurs within a single bar code symbol reading cycle, and involves processing a captured image frame using at least two different modes (i.e. methods) of image-processing based bar code reading, within which potentially dozens of different bar code symbol decoding algorithms are typically applied each decoding cycle.

One potential advantage of the Multi-Read (Omniscan/ROI-Specific) Mode of operation, over the Manual Mode of operation, is that the Multi-Read Mode offers an OmniScan Mode of operation to initially and rapidly read 1D bar code symbologies, and various kinds of 2D bar code symbologies whenever present in the captured image, and whenever a PDF417 symbology is detected (through its code fragments), the Multi-Mode Bar Code Symbol Reading Subsystem 17 can automatically switch (on-the-fly) to its ROI-specific Mode of operation to immediately process high-resolution image data at a specific ROI (at which there is a high likelihood of a bar code symbol present).

Specification of Multi-Mode Bar Code Symbol Reading Subsystem of the Present Invention Operated During its Second Multi-Read (No-Finder/ROI-Specific) Mode of Operation FIG. 24 illustrates the Multi-Mode Bar Code Symbol Reading Subsystem 17 when it is driven into its second multi-read (No-Finder/ROI-Specific) mode of operation so as to adaptively process and read a captured high-resolution image, in a high-speed manner, by applying adaptive learning techniques.

For example, assume the Multi-Mode Bar Code Symbol Reading Subsystem 17 is configured to operate in its second multi-read (No-Finder/ROI-Specific) mode when processing a wide-area image captured by the system, as shown in FIG. 24. In this case, if during the NoFinder Mode of operation, code fragments associated with a PDF417 bar code symbol are detected within the captured wide-area image, but processing thereof is unsuccessful, then the Subsystem 17 will automatically (i) enter its ROI-specific mode of operation described above, and then (ii) immediately commence processing of the captured wide-area image at a ROI specified by y coordinates corresponding to the wide-area image processed during the NoFinder Mode of operation. In the illustrative embodiment, this switching of modes in the Image-Processing Bar Code Symbol Reading Subsystem 17 occurs within a single bar code symbol reading cycle, and involves processing a single captured image frame using at least two different modes (i.e. methods) of image-processing based bar code reading (i.e. NoFinder Mode and ROI-Specific), within each of which potentially dozens of different bar code symbol decoding algorithms are typically applied during each decoding cycle.

Alternatively, assume the subsystem 17 is configured to operate in its "multi-read mode" when processing first a narrow-area image and then a wide-area image captured by the system. In this case, if during the NoFinder Mode of operation, code fragments associated with a PDF417 bar code symbol are detected within the captured narrow-area image, but decode processing thereof is unsuccessful, then the Subsystem 17 will automatically (i) enter its ROI-specific mode of operation described above, as a wide-area image is automatically captured by the system, and then (ii) immediately commence processing the captured wide-area image at a ROI specified by y coordinates corresponding to the narrow-area image processed during the NoFinder Mode of operation. In the illustrative embodiment, this switching of modes in the Subsystem 17 occurs within a single bar code symbol reading cycle, and involves processing two captured image frames using at least two different modes (i.e. methods) of image-processing based bar code reading (i.e. NoFinder Mode and ROI-Specific), within each of which potentially dozens of different bar code symbol decoding algorithms are typically applied during each decoding cycle.

One potential advantage of the "No-Finder/ROI-Specific" Multi-Mode operation over the Manual Mode of operation, regardless of its method of implementation, is that the No-Finder Mode can rapidly read 1D bar code symbologies whenever they are presented to the bar code symbol reader, and then whenever a 2D (e.g. PDF417) symbology is encountered, the bar code symbol reader can automatically switch its method of reading to the ROI-specific Mode use features collected from a narrow (or wide) area image processed during the No-Finder Mode, so as to immediately process a specific ROI in a captured wide-area image frame, at which there is a high likelihood of a bar code symbol present, and to do so in a highly targeted manner.

Specification of Multi-Mode Bar Code Symbol Reading Subsystem of the Present Invention Operated During its Third Multi-Read (No-Finder/OmniScan/ROI-Specific) Mode of Operation FIG. 25 illustrates the Multi-Mode Bar Code Symbol Reading Subsystem 17 when it is driven into its third multi-read (No-Finder/OmniScan/ROI-Specific) mode of operation so as to adaptively process and read a captured high-resolution image, in a high-speed manner, by applying adaptive learning techniques.

For example, assume the Subsystem 17 is configured to operate in its "multi-read mode" when processing a wide-area image captured by the system, as shown in FIG. 25. In this case, if during the NoFinder Mode of operation, code fragments associated with a PDF417 bar code symbol are detected within the captured narrow-area image, but decode processing thereof is unsuccessful, then the Image Formation and Detection Subsystem (i) automatically captures a wide-area image, while the Subsystem 17 (ii) automatically enters its Omniscan Mode of operation described above, and then (iii) immediately commences processing of the captured wide-area image at a plurality of parallel spatially-separated (e.g. by 50 pixels) virtual scan lines, beginning at a start pixel and start angle specified by x and/or y coordinates of code fragments detected in the narrow-area image processed during the NoFinder Mode of operation. Then, if the Omniscan Mode does not successfully read a bar code symbol within the ROI, then the Subsystem 17 (ii) automatically enters its ROI-specific mode of operation described above, and then (iii) immediately commences processing of the captured wide-area image at a ROI specified by the x,y coordinates corresponding to code fragments detected in the wide-area image processed during the Omniscan Mode of operation. In the illustrative embodiment, this switching of modes in the Subsystem 17 occurs within a single bar code symbol reading cycle, and involves processing two captured image frames using at least three different modes (i.e. methods) of image-processing based bar code reading (i.e. NoFinder Mode, Omniscan Mode, and ROI-Specific Mode), within each of which potentially dozens of different bar code symbol decoding algorithms are typically applied during each decoding cycle.

One potential advantage of the "No-Finder/OmniScan/ROI-Specific" Multi-Read Mode operation over the Manual Mode of operation, regardless of its method of implementation, is that the No-Finder Mode can rapidly acquire 1D bar code symbologies whenever they are presented to the bar code symbol reader, and then whenever a 2D symbology is encountered, the bar code symbol reader can automatically switch its method of reading to the OmniScan Mode, collected features on processed image data, and if this decoding method is not successful, then the bar code reader can automatically switch its method of reading to the ROI-Specific Mode and use features collected during the Omniscan Mode to immediately process a specific ROI in a captured image frame, at which there is a high likelihood of a bar code symbol present, and to do so in a highly targeted manner.

Programmable Modes of Bar Code Reading Operation within the Hand-Supportable Digital Image-Based Bar Code Reading Device of the Present Invention As indicated in FIG. 26, the imaging-based bar code symbol reader of the present invention has at least seventeen (17) Programmable System Modes of Operation, namely: Programmed Mode of System Operation No.1—Manually-Triggered Single-Attempt 1D Single-Read Mode Employing the No-Finder Mode of the Multi-Mode Bar Code Reading Subsystem; Programmed Mode Of System Operation No.2—Manually-Triggered Multiple-Attempt 1D Single-Read Mode Employing the No-Finder Mode of the Multi-Mode Bar Code Reading Subsystem; Programmed Mode Of System Operation No.3—Manually-Triggered Single-Attempt 1D/2D Single-Read Mode Employing the No-Finder Mode And The Automatic Or Manual Modes of the Multi-Mode Bar Code Reading Subsystem; Programmed Mode of System Operation No.4—Manually-Triggered Multiple-Attempt 1D/2D Single-Read Mode Employing the No-Finder Mode And The Automatic Or Manual Modes of the Multi-Mode Bar Code Reading Subsystem; Programmed Mode of System Operation No.5—Manually-Triggered Multiple-Attempt 1D/2D Multiple-Read Mode Employing the No-Finder Mode And The Automatic Or Manual Modes of the Multi-Mode Bar Code Reading Subsystem; Programmed Mode of System Operation No.6—Automatically-Triggered Single-Attempt 1D Single-Read Mode Employing The No-Finder Mode Of the Multi-Mode Bar Code Reading Subsystem; Programmed Mode of System Operation No.7—Automatically-Triggered Multi-Attempt 1D Single-Read Mode Employing The No-Finder Mode Of the Multi-Mode Bar Code Reading Subsystem; Programmed Mode of System Operation No.8—Automatically-Triggered Multi-Attempt 1D/2D Single-Read Mode Employing The No-Finder Mode and Manual and/or Automatic Modes Of the Multi-Mode Bar Code Reading Subsystem; Programmed Mode of System Operation No.9—Automatically-Triggered Multi-Attempt 1D/2D Multiple-Read Mode Employing The No-Finder Mode and Manual and/or Automatic Modes Of the Multi-Mode Bar Code Reading Subsystem; Programmable Mode of System Operation No.10—Automatically-Triggered Multiple-Attempt 1D/2D Single-Read Mode Employing The Manual, Automatic or Omniscan Modes Of the Multi-Mode Bar Code Reading Subsystem; Programmed Mode of System Operation No.11—Semi-Automatic-Triggered Single-Attempt 1D/2D Single-Read Mode Employing The No-Finder Mode And The Automatic Or Manual Modes Of the Multi-Mode Bar Code Reading Subsystem; Programmable Mode of System Operation No.12—Semi-Automatic-Triggered Multiple-Attempt 1D/2D Single-Read Mode Employing The No-Finder Mode And The Automatic Or Manual Modes Of the Multi-Mode Bar Code Reading Subsystem; Programmable Mode of Operation No.13—Semi-Automatic-Triggered Multiple-Attempt 1D/2D Multiple-Read Mode Employing The No-Finder Mode And The Automatic Or Manual Modes Of the Multi-Mode Bar Code Reading Subsystem; Programmable Mode of Operation No.14—Semi-Automatic-Triggered Multiple-Attempt 1D/2D Multiple-Read Mode Employing The No-Finder Mode And The Omniscan Modes Of the Multi-Mode Bar Code Reading Subsystem; Programmable Mode of Operation No.15—Continuously-Automatically-Triggered Multiple-Attempt 1D/2D Multiple-Read Mode Employing The Automatic, Manual Or Omniscan Modes Of the Multi-Mode Bar Code Reading Subsystem; Programmable Mode of System Operation No.16—Diagnostic Mode Of Imaging-Based Bar Code Reader Operation; and Programmable Mode of System Operation No.17—Live Video Mode Of Imaging-Based Bar Code Reader Operation.

Preferably, these Modes Of System Operation can programmed by reading a sequence of bar code symbols from a programming menu as taught, for example, in U.S. Pat. No.6,565,005, which describes a bar code scanner programming technology developed by Metrologic Instruments, Inc., and marketed under the name MetroSelect® Single Line Configuration Programming Method.

These Programmable System Modes of Operation will be described in detail hereinbelow. Alternatively, the MetroSet® Graphical User Interface (GUI) can be used to view and change configuration parameters in the bar code symbol reader using a PC. Alternatively, a Command Line Interface (CLI) may also be used to view and change configuration parameters in the bar code symbol reader, Each of these programmable modes of bar code reader operation shall be now described in greater detail with reference to other components of the system that are configured together to implement the same in accordance with the principles of the present invention.

Overview of the Imaging-Based Bar Code Reader Start-Up Operations

When the bar code reader hereof boots up, its FPGA is programmed automatically with 12.5/50/25 MHz clock firmware and all required device drivers are also installed automatically. The login to the Operating System is also done automatically for the user "root", and the user is automatically directed to the /root/ directory. For nearly all programmable modes of system operation employing automatic object detection, the IR object detection software driver is installed automatically. Also, for all Programmable System Modes of operation employing the narrow-area illumination mode, the narrow-area illumination software drivers are automatically installed, so that a Pulse Width Modulator (PWM) is used to drive the narrow-area LED-based illumination array 27. To start the bar code reader operation, the operating system calls the /tmp/ directory first ("cd/tmp"), and then the focusapp program, located in /root/ directory is run, because the /root/ directory is located in Flash ROM, and to save captured images, the directory /tmp/ should be the current directory where the image is stored in transition to the host), which is located in RAM.

Operating the Hand-Supportable Image-Processing Bar Code Symbol Reader of the Present Invention in a Manually-Triggered Mode of Operation The hand-supportable image-processing bar code symbol reader of the present invention can be programmed to operate in any one of a number of different "manually-triggered" modes of system operation, as identified in Nos. 1 through 5 in FIG. 26A. However, during each of these manually-triggered modes of operation, the image-processing bar code symbol reader controls and coordinates its subsystem components in accordance with a generalized method of manually-triggered operation.

In particular, upon automatic detection of an object within its IR-based object detection field, the IR-based object presence detection subsystem automatically generates an object detection event, and in response thereto, the multi-mode LED-based illumination subsystem automatically produces a narrow-area field of narrow-band illumination within the FOV of said image formation and detection subsystem.

Then, upon the generation of the trigger event by the user depressing the manually-actuatable trigger, the following operations are automatically carried out:

(i) the image capturing and buffering subsystem automatically captures and buffers a narrow-area digital image of the object using the narrow-area field of narrow-band illumination within the FOV, during the narrow-area image capture mode of said multi-mode image formation and detection subsystem; and (ii) the image processing bar code symbol reading subsystem automatically processes said 1D digital image attempts processes the narrow-area digital image in effort to read a 1D bar code symbol represented therein, and upon successfully decoding a 1D bar code symbol therein, automatically produces symbol character data representative thereof.

Then, upon said multi-mode image processing bar code symbol reading subsystem failing to successfully read the 1D bar code symbol represented in the narrow-area digital image, the following operations are automatically carried out:

(i) the multi-mode LED-based illumination subsystem automatically produces a wide-area field of narrow-band illumination within the FOV of the multi-mode image formation and detection subsystem, (ii) the image capturing and buffering subsystem captures and buffers a wide-area digital image during the wide-area image capture mode of the image capturing and buffering subsystem, and (iii) the image processing bar code symbol reading subsystem processes the wide-area digital image in effort to read a 1D or 2D bar code symbol represented therein, and upon successfully decoding a 1D or 2D bar code symbol therein, automatically produces symbol character data representative thereof.

Programmed Mode of System Operation No. 1: Manually-Triggered Single-Attempt 1D Single-Read Mode Employing the No-Finder Mode of the Multi-Mode Bar Code Symbol Reading Subsystem Programmed Mode of System Operation No. 1 involves configuration of the system as follows: disabling the IR-based Object Presence and Range Detection Subsystem 12; and enabling the use of manual-trigger activation, the narrow-area illumination mode within the Multi-Mode Illumination Subsystem 14, the narrow-area image capture mode in the Image Formation and Detection Subsystem 13, and the No-Finder Mode of the Multi-Mode Bar Code Reading Subsystem 17.

During this mode of system operation, when a user pulls the trigger switch 2C, the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Symbol Reading Subsystem 17. Then, the bar code reader illuminates the target object using narrow-area illumination, captures a narrow-area image of the target object, and launches the No-Finder Mode of the Multi-Mode Bar Code Symbol Reading Subsystem 17. The captured image is then processed using the No-Finder Mode. If a single cycle of programmed image processing results in the successful reading of a 1D bar code symbol, then the resulting symbol character data is sent to the Input/Output Subsystem 18 for use by the host system. If single cycle of programmed image processing is not result in a successful reading of a 1D bar code symbol, then the cycle is terminated, all subsystems are deactivated, and the bar code reader returns to its sleep mode of operation, and wait for the next event (e.g. manually pulling trigger switch 2C) which will trigger the system into active operation.

Programmed Mode of System Operation No. 2: Manually-Triggered Multiple-Attempt 1D Single-Read Mode Employing the No-Finder Mode of the Multi-Mode Bar Code Symbol Reading Subsystem Programmed Mode of System Operation No. 2 involves configuration of the system as follows: disabling the IR-based Object Presence and Range Detection Subsystem 12; and enabling the use of manual-trigger activation, the narrow-area illumination mode within the Multi-Mode Illumination Subsystem 14, the narrow-area image capture mode in the Image Formation and Detection Subsystem 13, and the No-Finder Mode of the Multi-Mode Bar Code Symbol Reading Subsystem 17.

During this mode of system operation, when a user pulls the trigger switch 2C, the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. Then, the bar code reader illuminates the target object using narrow-area illumination, captures a narrow-area image of the target object, and launches the No-Finder Mode of the Multi-Mode Bar Code Reading Subsystem 17. The captured narrow-area image is then processed using the No-Finder Mode. If the single cycle of programmed image processing results in the successful reading of a 1D bar code symbol, then the resulting symbol character data is sent to the Input/Output Subsystem for use by the host system. If the cycle of programmed image processing does not produce a successful read, then the system automatically enables successive cycles of illumination/capture/processing so long as the trigger switch 2C is being pulled, and then until the system reads a bar code symbol within a captured image of the target object; only thereafter, or when the user releases the trigger switch 2C, will the bar code symbol reader return to its sleep mode of operation, and wait for the next event that will trigger the system into active operation. In the illustrative embodiment, the default decode timeout is set to 500 ms which can be simply changed by programming. This default decode timeout setting ensures that while the trigger switch 2C is being pulled by the user, the imaging-based bar code symbol reader will re-attempt reading every 500 ms (at most) until it either succeeds or the trigger switch 2C is manually released.

Programmed Mode of System Operation No. 3: Manually-Triggered Single-Attempt 1D/2D Single-Read Mode Employing the No-Finder Mode and the Automatic Manual or ROI-Specific Modes of the Multi-Mode Bar Code Symbol Reading Subsystem Programmed Mode of System Operation No. 3 involves configuration of the system as follows: disabling the IR-based Object Presence and Range Detection Subsystem 12; and enabling the use of manual-trigger activation, the narrow-area and wide-area illumination modes within the Multi-Mode Illumination Subsystem 14, the narrow-area and wide-area image capture modes in the Image Formation and Detection Subsystem 13, and the No-Finder Mode and Manual, ROI-Specific and/or Automatic Modes of the Multi-Mode Bar Code Reading Subsystem 17.

During this programmable mode of system operation, the bar code reader is idle (in its sleep mode) until a user points the bar code reader towards an object with a bar code label, and then pulls the trigger switch 2C. When this event occurs, the system activates the narrow-area illumination mode within the Multi-Mode Illumination Subsystem 14 (i.e. drives the narrow-area illumination array 27), the narrow-area image capture mode of the Image Formation and Detection Subsystem 13, and the No-Finder Mode of the Multi-Mode Bar Code Reading Subsystem 17. Then, the bar code reader illuminates the target object using narrow-area illumination, captures a narrow-area image of the target object, and launches the No-Finder Mode of the Multi-Mode Bar Code Reading Subsystem 17. The captured narrow-area image is then processed using the No-Finder Mode. If this single cycle of programmed image processing results in the successful reading of a 1D bar code symbol, then the resulting symbol character data is sent to the Input/Output Subsystem 18 for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem 14, the wide-area image capture mode of the Image Formation and Detection Subsystem 13, and the Manual, ROI-Specific and/or Automatic Modes of the Multi-Mode Bar Code Reading Subsystem 17. Then the bar code reader illuminates the target object using both near-field and far-field wide-area illumination, captures a wide-area image of the target object, and launches the Manual, ROI-Specific or Automatic Mode of the Multi-Mode Bar Code Reading Subsystem 17. The captured wide-area image is then processed using the Manual, ROI-Specific or Automatic Mode. If this single cycle of programmed image processing results in the successful reading of a 1D or 2D bar code symbol, then the resulting symbol character data is sent to the Input/Output Subsystem 18 for use by the host system. If this cycle of programmed image processing does not produce a successful read, then the subsystem 19 deactivates all subsystems and then returns to its sleep mode, and waits for an event, which will cause it to re-enter its active mode of operation.

Programmed Mode of System Operation No.4: Manually-Triggered Multiple-Attempt 1D/2D Single-Read Mode Employing the No-Finder Mode and the Automatic Manual or ROI-Specific Modes of the Multi-Mode Bar Code Symbol Reading Subsystem Programmed Mode of System Operation No.4 involves configuration of the system as follows: disabling the IR-based object detection subsystem 12; and enabling the use of manual-trigger activation, the narrow-area and wide-area illumination modes within the Multi-Mode Illumination Subsystem 14, the narrow-area and wide-area image capture modes of the Image Formation and Detection Subsystem 13, and the No-Finder Mode and Manual, ROI-Specific and/or Automatic Modes of the Multi-Mode Bar Code Reading Subsystem 17.

During this programmed mode of system operation, when a user pulls the trigger switch 2C, the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. Then, the bar code reader illuminates the target object using narrow-area illumination, captures a narrow-area image of the target object, and launches the No-Finder Mode of the Multi-Mode Bar Code Reading Subsystem 17. The captured narrow-area image is then processed using the No-Finder Mode. If this single cycle of programmed image processing results in the successful reading of a 1D bar code symbol, then the resulting symbol character data is sent to the Input/Output Subsystem for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem 14, the wide-area image capture mode of the Image Formation and Detection Subsystem 13, and the Manual and/or Automatic Mode of the Multi-Mode Bar Code Reading Subsystem 17. Then, the bar code reader illuminates the target object using both near-field and far-field wide-area illumination, captures a wide-area image of the target object, and launches the Manual (or Automatic) Mode of the Multi-Mode Bar Code Reading Subsystem. The captured wide-area image is then processed using the Manual Mode of bar code symbol reading. If this single cycle of programmed processing results in the successful reading of a 1D or 2D bar code symbol, then the resulting symbol character data is sent to the Input/Output Subsystem 18 for use by the host system. If this cycle of programmed image processing does not produce a successful read of a single 1D or 2D bar code symbol, then the Subsystem 19 automatically enables successive cycles of wide-area illumination/wide-area image capture and processing so long as the trigger switch 2C is being pulled, and then until the system reads a single 1D or 2D bar code symbol within a captured image of the target object; only thereafter, or when the user releases the trigger switch 2C, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the trigger switch is being pulled by the user, the imaging-based bar code symbol reader will re-attempt reading every 500 ms (at most) until it either succeeds or the trigger switch 2C is manually released.

Programmed Mode of System Operation No.5: Manually-Triggered Multiple-Attempt 1D/2D Multiple-Read Mode Employing the No-Finder Mode and the Automatic Manual or ROI-Specific Modes of the Multi-Mode Bar Code Reading Symbol Subsystem Programmed Mode of System Operation No.5 involves configuration of the system as follows: disabling the IR-based Object Presence and Range Detection Subsystem 12; and enabling the use of manual-trigger activation, the narrow-area and wide-area illumination modes within the Multi-Mode Illumination Subsystem 14, the narrow-area and wide-area image capture modes of the Image Formation and Detection Subsystem 13, and the No-Finder Mode and Manual, ROI-Specific and/or Automatic Modes of the Multi-Mode Bar Code Reading Subsystem 17.

During this mode of system operation, when a user pulls the trigger switch 2C, the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem. Then, the bar code reader illuminates the target object using narrow-area illumination, captures a narrow-area image of the target object, and launches the No-Finder Mode of the Multi-Mode Bar Code Reading Subsystem. The captured narrow-area image is then processed using the No-Finder Mode. If this single cycle of programmed processing results in the successful decoding of a 1D bar code symbol, then the resulting symbol character data is sent to the Input/Output Subsystem 18 for use by the host system. If this cycle of programmed decode image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem, the wide-area image capture mode of the Image Formation and Detection Subsystem 13, and the Manual and/or Automatic Mode of the Multi-Mode Bar Code Reading Subsystem 17. Then, the bar code reader illuminates the target object using both near-field and far-field wide-area illumination, captures a wide-area image of the target object, and launches the Manual (ROI-Specific and/or Automatic) Mode of the Multi-Mode Bar Code Reading Subsystem 17. The captured wide-area image is then processed using the Manual Mode of reading. If this single cycle of programmed processing results in the successful reading of a 1D or 2D bar code symbol, then the resulting symbol character data is sent to the Input/Output Subsystem 18 for use by the host system. If this cycle of programmed image processing does not produce a successful reading of one or more 1D and/or 2D bar code symbols, then the system automatically enables successive cycles of wide-area illumination/wide-area image capture/image processing so long as the trigger switch is being pulled, and then until the system reads one or more 1D and/or 2D bar code symbols within a captured image of the target object; only thereafter, or when the user releases the trigger switch 2C, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the trigger switch 2C is being pulled by the user, the imaging-based bar code symbol reader will re-attempt reading every 500 ms (at most) until it either succeeds or the trigger switch 2C is manually released.

Programmed Mode of System Operation No.6: Automatically-Triggered Single-Attempt 1D Single-Read Mode Employing the No-Finder Mode of the Multi-Mode Bar Code Symbol Reading Subsystem Programmed Mode of System Operation No.6 involves configuration of the system as follows: disabling the use of manual-trigger activation; and enabling IR-based Object Presence and Range Detection Subsystem 12, the narrow-area illumination mode only within the Multi-Mode Illumination Subsystem 14, the narrow-area image capture mode only in the Image Formation and Detection Subsystem 13, and the No-Finder Mode of the Multi-Mode Bar Code Reading Subsystem 17.

During this programmed mode of system operation, the bar code reader is idle until a user points the reader towards an object with a bar code label. Once the object is under the field-of-view of the bar code reader, and the object is automatically detected, the bar code reader "wakes up" and the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image, which is then processed using the Bar Code Symbol Reading Subsystem 17 configured in its No-Finder Mode of operation. If this single cycle of programmed decode processing results in the successful reading of a 1D bar code symbol, then the resulting symbol character data is sent to the Input/Output Subsystem 18 for use by the host system. If this cycle of programmed image processing does not produce a successful read, then the system deactivates all subsystems, causing the bar code reader return to its sleep mode of operation, and wait for the next event that will trigger the system into active operation.

Programmed Mode of System Operation No.7: Automatically-Triggered Multi-Attempt 1D Single-Read Mode Employing the No-Finder Mode of the Multi-Mode Bar Code Symbol Reading Subsystem Programmed Mode of System Operation No.7 involves configuration of the system as follows: disabling the use of manual-trigger activation; and enabling IR-based Object Presence And Range Detection Subsystem 12, the narrow-area illumination mode within the Multi-Mode Illumination Subsystem 14, the narrow-area image capture mode in the Image Formation and Detection Subsystem 13, and the No-Finder Mode of the Multi-Mode Bar Code Reading Subsystem 17.

During this programmed mode of system operation, the bar code reader is idle until a user points the bar code reader towards an object with a bar code label. Once the object is under the field-of-view of the bar code reader, and the object is automatically detected, the bar code reader "wakes up" and the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image, which is then processed using the No-Finder Mode. If this single cycle of programmed image processing results in the successful reading of a 1D bar code symbol, then the resulting symbol character data is sent to the Input/Output Subsystem 18 for use by the host system. If this cycle of programmed image processing does not produce a successful decode, then the system automatically enables successive cycles of narrow-area illumination/narrow-area image capture/processing so long as the trigger switch 2C is being pulled, and then until the system reads a single 1D bar code symbol within a captured image of the target object; only thereafter, or when the user releases the trigger switch 2C, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the trigger switch is being pulled by the user, the imaging-based bar code symbol reader will re-attempt reading every 500 ms (at most) until it either succeeds or the trigger switch 2C is manually released.

Programmed Mode of System Operation No.8: Automatically-Triggered Multi-Attempt 1D/2D Single-Read Mode Employing the No-Finder Mode and Manual ROI-Specific and/or Automatic Modes of the Multi-Mode Bar Code Symbol Reading Subsystem Programmed Mode of System Operation No.8 involves configuration of the system as follows: disabling the use of manual-trigger activation during all phase of system operation; and enabling IR-based Object Presence and Range Detection Subsystem 12, the narrow-area illumination mode within the Multi-Mode Illumination Subsystem 14, the narrow-area image capture mode in the Image Formation and Detection Subsystem 13, and the No-Finder Mode and Manual, ROI-Specific and/or Automatic Modes of the Multi-Mode Bar Code Reading Subsystem 17.

During this programmed mode of system operation, the bar code reader is idle until a user points the reader towards an object with a bar code label. Once the object is under the field-of-view of the scanner, and the object is automatically detected, the bar code reader "wakes up" and the system activates the narrow-area illumination mode within the Multi-Mode Illumination Subsystem, 14 the narrow-area image capture mode of the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image, which is then processed using the No-Finder Mode of operation. If this single cycle of programmed image processing results in the successful reading of a 1D bar code symbol, then the resulting symbol character data is sent to the Input/Output Subsystem 18 for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem 14, the wide-area image capture mode in the Image Formation and Detection Subsystem 13, and the Manual, ROI-Specific and/or Automatic Modes of the Multi-Mode Bar Code Reading Subsystem 17. Then, the bar code symbol reader illuminates the target object using either near-field or far-field wide-area illumination (depending on the detected range of the target object), captures a wide-area image of the target object, and launches the Manual, ROI-Specific or Automatic Mode of the Multi-Mode Bar Code Reading Subsystem 17. The captured wide-area image is then processed using the Manual Mode of reading. If this cycle of programmed image processing results in the successful reading of a single 1D or 2D bar code symbol, then the resulting symbol character data is sent to the Input/Output Subsystem 18 for use by the host system. If this cycle of programmed image processing does not produce a successful reading of a single 1D or 2D bar code symbol, then the system automatically enables successive cycles of wide-area illumination/wide-area image capture/processing so long as the target object is being detected, and then until the system reads one or more 1D and/or 2D bar code symbols within a captured image of the target object; only thereafter, or when the user moves the object out of the FOV of the bar code reader, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the object is being detected by the bar code reader, the bar code symbol reader_will re-attempt reading every 500 ms (at most) until it either succeeds or the object is moved away from the FOV of the bar code reader.

Programmed Mode of System Operation No.9: Automatically-Triggered Multi-Attempt 1D/2D Multiple-Read Mode Employing the No-Finder Mode and Manual, ROI-Specific and/or Automatic Modes of the Multi-Mode Bar Code Symbol Reading Subsystem Programmed Mode of System Operation No.9 involves configuration of the system as follows: disabling the use of manual-trigger activation during all phases of system operation; and enabling IR-based Object Presence and Range Detection Subsystem 12, the narrow-area illumination mode within the Multi-Mode Illumination Subsystem 14, the narrow-area image capture mode in the Image Formation and Detection Subsystem 13, and the No Finder Mode and Manual or Automatic Modes of the Multi-Mode Bar Code Symbol Reading Subsystem 17.

During this programmed mode of system operation, the bar code reader is idle until a user points the reader towards an object with a bar code label. Once the object is under the field-of-view of the bar code reader, and the object is automatically detected, the bar code reader "wakes up" and the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image, which is then processed using the No-Finder Mode. If this single cycle of programmed processing results in the successful reading of a 1D bar code symbol, then the resulting symbol character data is sent to the Input/Output Subsystem 18 for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem 14, the wide-area image capture mode in the Image Formation and Detection Subsystem 13, and the Manual and/or Automatic Modes of the Multi-Mode Bar Code Reading Subsystem 17. Then, the bar code reader illuminates the target object using either near-field or far-field wide-area illumination (depending on the detected range of the target object), captures a wide-area image of the target object, and launches the Manual (ROI-Specific or Automatic) Mode of the Multi-Mode Bar Code Reading Subsystem 17. The captured wide-area image is then processed using the Manual Method of decoding. If this cycle of programmed image processing results in the successful reading of a single 1D or 2D bar code symbol, then the resulting symbol character data is sent to the Input/Output Subsystem 18 for use by the host system. If this cycle of programmed image processing does not produce a successful read of a single 1D or 2D bar code symbol, then the system automatically enables successive cycles of wide-area-illumination/wide-area image-capture/processing so long as the target object is being detected, and then until the system reads one or more 1D and/or 2D bar code symbols within a captured image of the target object; only thereafter, or when the user moves the object out of the FOV of the bar code symbol reader, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the object is being detected by the bar code reader, the bar code reader will re-attempt reading every 500 ms (at most) until it either succeeds or the object is moved away from the FOV of the bar code reader.

Programmable Mode of System Operation No.10: Automatically-Triggered Multiple-Attempt 1D/2D Single-Read Mode Employing the Manual, ROI-Specific. Automatic or Omniscan Modes of the Multi-Mode Bar Code Symbol Reading Subsystem Programmed Mode of System Operation No.10 involves configuration of the system as follows: disabling the use of manual-trigger activation during all phase of system operation; and enabling IR-based Object Presence and Range Detection Subsystem 12, the narrow-area illumination mode within the Multi-Mode Illumination Subsystem 14, the narrow-area image capture mode in the Image Formation and Detection Subsystem 13, and the Manual, ROI-Specific, Automatic or OmniScan Modes of the Multi-Mode Bar Code Reading Subsystem 17.

During this programmed mode of system operation, the bar code reader is idle until a user present an object with a bar code symbol under the field-of-view of the bar code reader, and the object is automatically detected, the bar code reader "wakes up" and the system activates the wide-area illumination mode within the Multi-Mode Illumination Subsystem 14, the wide-area image capture mode in the Image Formation and Detection Subsystem 13, and either Manual, ROI-Specific, Automatic or Omniscan Mode of the Multi-Mode Bar Code Reading Subsystem 17. This causes the system to illuminate a wide area of the target object within the field-of-view (FOV) of the bar code reader with far-field or near-field wide area illumination (depending on the detected range of the target object), and capture/acquire a wide-area image which is then processed using either the Manual, ROI-Specific, Automatic or Omniscan Method of reading. If this single cycle of programmed processing results in the successful reading of a 1D or 2D bar code symbol (when the Manual, ROI-Specific and Automatic Methods are used), then the resulting symbol character data is sent to the Input/Output Subsystem for use by the host system. If this cycle of programmed image processing does not produce a successful read, then the system automatically enables successive cycles of wide-area illumination/wide-area-image-capture/processing so long as the target object is being detected, and then until the system reads a single 1D and/or 2D bar code symbol within a captured image of the target object; only thereafter, or when the user moves the object out of the FOV of the bar code reader, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the object is being detected by the bar code reader, the bar code reader will re-attempt reading every 500 ms (at most) until it either succeeds or the object is moved away from the FOV of the bar code reader.

Programmed Mode of System Operation No.11: Semi-Automatic-Triggered Single-Attempt 1D/2D Single-Read Mode Employing the No-Finder Mode and the Automatic, ROI-Specific or Manual Modes of the Multi-Mode Bar Code Symbol Reading Subsystem Programmed Mode of System Operation No.11 involves configuration of the system as follows: disabling the use of the manual-trigger activation during the system activation phase of operation; and enabling the IR-based Object Presence and Range Detection Subsystem 12, the narrow-area and wide-area illumination modes within the Multi-Mode Illumination Subsystem 14, the narrow-area and wide-area image capture modes in the Image Formation and Detection Subsystem 13, and the No-Finder Mode and Manual, ROI-Specific and/or Automatic Modes of the Multi-Mode Bar Code Reading Subsystem 17.

During this programmed mode of system operation, the bar code reader is idle until a user points the reader towards an object with a bar code label. Once the object is under the field-of-view of the bar code reader, and the object is automatically detected, the bar code reader "wakes up" and the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image, which is then processed using the No-Finder Mode. If this single cycle of programmed image processing results in the successful reading of a 1D bar code symbol, then the resulting symbol character data is sent to the Input/Output Subsystem 18 for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem 14, the wide-area image capture mode of the Image Formation and Detection Subsystem 13, and the Manual, ROI-Specific and/or Automatic Mode of the Multi-Mode Bar Code Reading Subsystem 17. Then, if the user pulls the trigger switch 2C during narrow-area illumination and image capture and continues to do so, the bar code reader will automatically illuminate the target object using widearea illumination, capture a wide-area image of the target object, and launch the Manual, ROI-Specific or Automatic Mode of the Multi-Mode Bar Code Symbol Reading Subsystem 17. The captured wide-area image is then processed using the Manual, ROI-Specific or Automatic Mode/Method of bar code reading. If this single cycle of programmed image processing results in the successful reading of a single 1D or 2D bar code symbol, then the resulting symbol character data is sent to the Input/Output Subsystem 18 for use by the host system. If this cycle of programmed image processing does not produce a successful reading of a single 1D or 2D bar code symbol, then the subsystem 19 automatically deactivates all subsystems, causing the bar code reader return to its sleep mode of operation, and wait for the next event that will trigger the system into active operation Programmable Mode of System Operation No.12: Semi-Automatic-Triggered Multiple-Attempt 1D/2D Single-Read Mode Employing the No-Finder Mode and the Automatic, ROI-Specific or Manual Modes of the Multi-Mode Bar Code Symbol Reading Subsystem:

Programmed Mode of System Operation No.12 involves configuration of the system as follows: disabling the use of manual-trigger activation during the system activation phase of operation; and enabling the IR-based Object Presence and Range Detection Subsystem 12, the narrow-area and wide-area illumination modes within the Multi-Mode Illumination Subsystem 14, the narrow-area and wide-area image capture modes in the Image Formation and Detection Subsystem 13, and the No-Finder Mode and Manual, ROI-Specific and/or Automatic Modes of the Multi-Mode Bar Code Reading Subsystem 17.

During this programmed mode of system operation, the bar code reader is idle until a user points the reader towards an object with a bar code label. Once the object is under the field-of-view of the bar code reader, and the object is automatically detected, the bar code reader "wakes up" and the system activates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image, which is then processed using the No-Finder Mode. If this single cycle of programmed image processing results in the successful reading of a 1D bar code symbol, then the resulting symbol character data is sent to the Input/Output Subsystem 18 for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem, the wide-area image capture mode of the Image Formation and Detection Subsystem 13, and the Manual, ROI-Specific and/or Automatic Mode of the Multi-Mode Bar Code Reading Subsystem 17. Then, if the user pulls the trigger switch 2C during narrow-area illumination and image capture and continues to do so, the bar code reader will automatically illuminate the target object using wide-area illumination, capture a wide-area image of the target object, and launches the Manual, ROI-Specific or Automatic Mode of the Multi-Mode Bar Code Reading Subsystem 17. The captured wide-area image is then processed using the Manual Mode of reading. If this single cycle of programmed image processing results in the successful reading of a single 1D or 2D bar code symbol, then the resulting symbol character data is sent to the Input/Output Subsystem 18 for use by the host system. If this cycle of programmed image processing does not produce a successful decode of a single 1D or 2D bar code symbol, then the system automatically enables successive cycles of wide-area illumination/wide-area-image-capture/processing so long as the trigger switch 2C is being pulled, and then until the system reads one or more 1D and/or 2D bar code symbols within a captured image of the target object; only thereafter, or when the user releases the trigger switch 2C, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the trigger switch 2C is being pulled by the user, the imaging-based bar code symbol reader will re-attempt reading every 500 ms (at most) until it either succeeds or the trigger switch 2C is manually released.

Implementation of Programmable Mode of System Operation No.12

When the Focus IR module detects an object in front of object detection field 20, it posts the OBJECT_DETECT_ON event to the Application Layer. The Application Layer software responsible for processing this event starts the Code-Gate Task. When the user pulls the trigger switch 2C, the TRIGGER_ON event is posted to the Application. The Application Layer software responsible for processing this event checks if the CodeGate Task is running, and if so, it cancels it and then starts the Main Task. When the user releases the trigger switch 2C, the TRIGGER_OFF event is posted to the Application. The Application Layer software responsible for processing this event, checks if the Main Task is running, and if so, it cancels it. If the object is still within the object detection field 20, the Application Layer starts the CodeGate Task again.

When the user moves the bar code reader away from the object (or the object away from the bar code reader), the OBJECT_DETECT_OFF event is posted to the Application Layer. The Application Layer software responsible for processing this event checks if the CodeGate Task is running, and if so, it cancels it. The CodeGate Task, in an infinite loop, does the following. It activates the narrow-area illumination array 27 which illuminates a "narrow" horizontal area at the center of the field-of-view and then the Image Formation and Detection Subsystem 13 acquires an image of that narrow-area (i.e. few rows of pixels on the CMOS image sensing array 22), and then attempts to read a bar code symbol represented in the image. If the read is successful, it saves the decoded data in the special CodeGate data buffer. Otherwise, it clears the CodeGate data buffer. Then, it continues the loop. The CodeGate Task never exits on its own; it can be canceled by other modules of the Focus software when reacting to other events.

When a user pulls the trigger switch 2C, the event TRIGGER_ON is posted to the Application Layer. The Application Layer software responsible for processing this event, checks if the CodeGate Task is running, and if so, it cancels it and then starts the Main Task. The CodeGate Task can also be canceled upon OBJECT_DETECT_OFF event, posted when the user moves the bar code reader away from the object, or the object away from the bar code reader.

Programmable Mode of Operation No.13: Semi-Automatic-Triggered Multiple-Attempt 1D/2D Multiple-Read Mode Employing the No-Finder Mode and the Automatic, ROI-Specific or Manual Modes of the Multi-Mode Bar Code Reading Subsystem Programmed Mode of System Operation No.13 involves configuration of the system as follows: disabling the use of manual-trigger activation during the system activation phase of operation; and enabling the IR-based Object Presence and Range Detection Subsystem 12, the narrow-area and wide-area illumination modes within the Multi-Mode Illumination Subsystem 14, the narrow-area and wide-area image capture modes in the Image Formation and Detection Subsystem 13, and the No-Finder Mode and Manual, ROI-Specific and/or Automatic Modes of the Multi-Mode Bar Code Reading Subsystem 17.

During this programmed mode of system operation, the bar code reader is idle until a user points the reader towards an object with a bar code label. Once the object is under the field-of-view of the bar code reader, and the object is automatically detected by the Object Presence and Range Detection Subsystem 12, the bar code reader "wakes up" and the system activates the narrow-area illumination mode in the Multi-Mode Illumination Subsystem 14, the narrow-area image capture mode in the Image Formation and Detection Subsystem 13, and the No-Finder Mode of the Multi-Mode Bar Code Reading Subsystem 17. This causes the system to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, the system captures/acquires a narrow-area image which is then processed using the No-Finder Mode. If this single cycle of programmed image processing results in the successful reading of a 1D bar code symbol, then the resulting symbol character data is sent to the Input/Output Subsystem 18 for use by the host system. If this cycle of programmed image processing does not produce a successful read, then the system deactivates the narrow-area illumination mode within the Multi-Mode Illumination Subsystem 14, the narrow-area image capture mode of the Image Formation and Detection Subsystem 13, and the No-Finder Mode of the Multi-Mode Bar Code Reading Subsystem 17, and then activates the wide-area illumination mode within the Multi-Mode Illumination Subsystem 14, the wide-area image capture mode of the Image Formation and Detection Subsystem 13, and the Manual and/or Automatic Mode of the Multi-Mode Bar Code Reading Subsystem 17. Then, if the user pulls the trigger switch 2C during narrow-area illumination and image capture and continues to do so, the bar code reader will automatically illuminate the target object using wide-area illumination, capture a wide-area image of the target object, and invoke the Manual, ROI-Specific and/or Automatic Mode of the Multi-Mode Bar Code Reading Subsystem 17. The captured wide-area image is then processed using the Manual, ROI-Specific or Automatic Mode of reading. If this single cycle of programmed image processing results in the successful reading of one or more 1D and/or 2D bar code symbols, then the resulting symbol character data is sent to the Input/Output Subsystem 18 for use by the host system. If this cycle of programmed decode image processing does not produce a successful reading of one or more 1D and/or 2D bar code symbols then the system automatically enables successive cycles of wide-area illumination/wide-area-image-capture/image-processing so long as the trigger switch 2C is being pulled, and then until the system reads one or more 1D and/or 2D bar code symbols within a captured image of the target object; only thereafter, or when the user releases the trigger switch 2C, will the bar code reader return to its sleep mode of operation, and wait for the next event that will trigger the system into active operation. In the illustrative embodiment, the default decode timeout is set to 500 ms which can be simply changed by programming. This default decode timeout setting ensures that while the trigger switch 2C is being pulled by the user, the Imaging-Based Bar Code Symbol Reader will re-attempt reading every 500 ms (at most) until it either succeeds or the trigger switch 2C is manually released.

Programmable Mode of Operation No.14: Semi-Automatic-Triggered Multiple-Attempt 1D/2D Multiple-Read Mode Employing the No-Finder Mode and the Omniscan Modes of the Multi-Mode Bar Code Symbol Reading Subsystem Programmed Mode of System Operation No.14 involves configuration of the system as follows: disabling the use of manual-trigger activation during the system activation phase of operation; and enabling the IR-based Object Presence and Range Detection Subsystem 12, the narrow-area and wide-area illumination modes within the Multi-Mode Illumination Subsystem 14, the narrow-area and wide-area image capture modes in the Image Formation and Detection Subsystem 13, and the No-Finder Mode and OmniScan Mode of the Multi-Mode Bar Code Reading Subsystem 17.

During this programmed mode of system operation, the bar code reader is idle until a user points the reader towards an object with a bar code label. Once the object is under the field-of-view of the bar code reader, and the object is automatically detected by the Object Presence and Range Detection Subsystem 12, the bar code reader "wakes up" and the system activates the narrow-area illumination mode in the Multi-Mode Illumination Subsystem 14, the narrow-area image capture mode in the Image Formation and Detection Subsystem 13, and the No-Finder Mode of the Multi-Mode Bar Code Reading Subsystem 17. This causes the narrow-area illumination array 27 to illuminate a "narrow" horizontal area of the target object at the center of the field-of-view (FOV) of the bar code reader, indicating to the user where the area targeted by the bar code reader is, and thus, enabling the user to position and align the narrow-area illumination beam on the target bar code. Then, Subsystem 13 captures/acquires a narrow-area image which is then processed by Subsystem 17 using its No-Finder Mode. If this single cycle of programmed image processing results in the successful reading of a 1D bar code symbol, then the resulting symbol character data is sent to the Input/Output Subsystem 18 for use by the host system, and then the system deactivates all subsystems and resumes its sleep state of operation. If this cycle of programmed image processing does not produce a successful read, it may nevertheless produce one or more code fragments indicative of the symbology represented in the image, (e.g. PDF 417). In this case, the system deactivates the narrow-area illumination mode within the Multi-Mode Illumination Subsystem 14, the narrow-area image capture mode of the Image Formation and Detection Subsystem 13 13, and thre No-Finder Mode of the Multi-Mode Bar Code Reading Subsystem 17; and then, if the user is pulling the trigger switch 2C at about this time, the system activates the wide-area illumination mode within the Multi-Mode Illumination Subsystem 14, the wide-area image capture mode of the Image Formation and Detection Subsystem, and either the Omniscan Mode of the Multi-Mode Bar Code Reading Subsystem 17 if code fragments have been found indicating a 2D code format (e.g. PDF format code) within the image at perhaps a particular orientation. Then, the bar code reader proceeds to automatically illuminate the target object using wide-area illumination, capture a wide-area image of the target object, and invoke the Omniscan Mode of the Multi-Mode Bar Code Reading Subsystem 17. The captured wide-area image is then first processed using the Omniscan Mode, using a first processing direction (e.g. at 0 degrees), and sequentially advances the Omniscan Mode of reading at an different angular orientation (e.g. 6 possible directions/orientations) until a single bar code symbol is successfully read. If this single cycle of programmed decode processing (using the Omniscan Mode) results in the successful decoding of a single 1D and/or 2D bar code symbol, then the resulting symbol character data is sent to the Input/Output Subsystem 18 for use by the host system. If this cycle of programmed image processing does not produce a successful reading of a single 1D and/or 2D bar code symbol, then the system automatically enables successive cycles of wide-area illumination/wide-area image capture/processing so long as the trigger switch 2C is being pulled, and then until the system reads a single 1D and/or 2D bar code symbol within a captured image of the target object. Only thereafter, or when the user releases the trigger switch 2C, the system will return to its sleep mode of operation, and wait for the next event that will trigger the system into active operation. In the illustrative embodiment, the default decode timeout is set to 500 ms which can be simply changed by programming. This default decode timeout setting ensures that while the trigger switch 2C is being pulled by the user, the Imaging-Based Bar Code Symbol Reader will re-attempt reading every 500 ms (at most) until it either succeeds or the trigger switch is manually released.

Programmable Mode of Operation No.15: Continuously-Automatically-Triggered Multiple-Attempt 1D/2D Multiple-Read Mode Employing the Automatic. Manual, ROI-Specific or Omniscan Modes of the Multi-Mode Bar Code Reading Subsystem Programmed Mode of System Operation No. 15, typically used for testing purposes, involves configuration of the system as follows: disabling the use of manual-trigger activation during all phase of system operation; and enabling IR-based Object Presence and Range Detection Subsystem 12, the wide-area illumination mode in the Multi-Mode Illumination Subsystem, 14 the wide-area image capture mode in the Image Formation and Detection Subsystem 13, and the Manual, ROI-Specific, Automatic or OmniScan Modes of the Multi-Mode Bar Code Reading Subsystem 17.

During this programmed mode of system operation, the bar code reader continuously and sequentially illuminates a wide area of the target object within the field-of-view (FOV) of the bar code reader with both far-field and near-field wide-area illumination, captures a wide-area image thereof, and then processes the same using either the Manual, ROI-Specific, Automatic or Omniscan Modes of operation. If any cycle of programmed image processing results in the successful reading of a 1D or 2D bar code symbol (when the Manual, ROI-Specific and Automatic Modes are used), then the resulting symbol character data is sent to the Input/Output Subsystem 18 for use by the host system (i.e. typically a test measurement system). If when any cycle of programmed image processing does not produce a successful read, the system automatically enables successive cycles of wide-area illumination/wide-area image-capture/processing. In the illustrative embodiment, the default decode timeout is set to 500 ms which can be simply changed by programming. This default decode timeout setting ensures that while the object is being detected by the bar code reader, the bar code reader will re-attempt reading every 500 ms (at most) until it either succeeds or the object is moved away from the FOV of the bar code reader.

Diagnostic Mode of Imaging-Based Bar Code Reader Operation: Programmable Mode of System Operation No.16

Programmed Mode of System Operation No.16 is a Diagnostic Mode. An authorized user can send a special command to the bar code reader to launch a Command Line Interface (CLI) with the bar code reader. When the bar code reader receives such request from the user, it sends a prompt "MTLG>" back to the user as a handshaking indication that the scanner is ready to accept the user commands. The user then can enter any valid command to the bar code reader and view the results of its execution. To communicate with the reader in diagnostic mode over such communication line as RS232, the user can use any standard communication program, such as Windows HyperTerminal for example. This mode of operation can be used to test/debug the newly introduced features or view/change the bar code reader configuration parameters. It can also be used to download images and/or a backlog of the previously decoded bar code data from the reader memory to the host computer.

Live Video Mode of Imaging-Based Bar Code Reader Operation: Programmable Mode of System Operation No.17

Program Mode of System Operation No.17 can be used in combination with any other supported imaging modes. In this mode, the images acquired by the bar code reader are transmitted to the host computer in real-time along with the results of image-processing based bar code symbol reading by Subsystem 17 (if such results are available).

Second Illustrative Embodiment of Digital Imaging-Based Bar Code Symbol Reading Device of the Present Invention, wherein Four Distinct Modes of Illumination are Provided In the first illustrative embodiment described above, the Multi-mode Illumination Subsystem 14 had three primary modes of illumination: (1) narrow-area illumination mode; (2) near-field wide-area illumination mode; and (3) far-field wide-area illumination mode.

In a second alternative embodiment of the digital imaging-based bar code symbol reading device of the present invention shown in FIGS. 27A, 27B and 28, the Multi-Mode Illumination Subsystem 14 is modified to support four primary modes of illumination: (1) near-field narrow-area illumination mode; (2) far-field narrow-area illumination mode; (3) near-field wide-area illumination mode; and (4) far-field wide-area illumination mode. In general, these near-field and far-field narrow-area illumination modes of operation are conducted during the narrow-area image capture mode of the Multi-Mode Image Formation and Detection Subsystem 13, and are supported by a near-field narrow-illumination array 27A and a far field narrow-area illumination array 27B illustrated in FIG. 28, and as shown in FIGS. 2A1. In the second illustrative embodiment, each of these illumination arrays 27A, 27B are realized using at least a pair of LEDs, each having a cylindrical lens of appropriate focal length to focus the resulting narrow-area (i.e. linear) illumination beam into the near-field portion 24A and far-field portion 24B of the field of view of the system, respectively.

One of advantages of using a pair of independent illumination arrays to produce narrow-area illumination fields over near and far field portions of the FOV is that it is possible to more tightly control the production of a relatively "narrow" or "narrowly-tapered" narrow-area illumination field along its widthwise dimension. For example, as shown in FIG. 27B, during bar code menu reading applications, the near-field narrow area illumination array 27A can be used to generate (over the near-field portion of the FOV) an illumination field 24A that is narrow along both its widthwise and height-wise dimensions, to enable the user to easily align the illumination field (beam) with a single bar code symbol to be read from a bar code menu of one type or another, thereby avoiding inadvertent reads of two or more bar code symbols or simply the wrong bar code symbol. At the same time, the far-field narrow area illumination array 27B can be used to generate (over the far-field portion of the FOV) an illumination field 24B that is sufficient wide along its widthwise dimension, to enable the user to easily read elongated bar code symbols in the far-field portion of the field of view of the bar code reader, by simply moving the object towards the far portion of the field.

Third Illustrative Embodiment of Digital Imaging-Based Bar Code Symbol Reading Device of the Present Invention Alternatively, the imaging-based bar code symbol reading device of the present invention can have virtually any type of form factor that would support the reading of bar code symbols at diverse application environments. One alternative form factor for the bar code symbol reading device of the present invention is shown in FIGS. 29A through 29C, wherein a portable digital imaging-based bar code symbol reading device of the present invention 1" is shown from various perspective views, while arranged in a Presentation Mode (i.e. configured in Programmed System Mode No. 12).

The Digital Imaging-Based Bar Code Reading Device of the Present Invention

As shown in FIG. 30, the digital imaging-based bar code symbol reading device of the present invention 1', 1" can also be realized in the form of a Digital Imaging-Based Bar Code Reading Engine 100 that can be readily integrated into various kinds of information collection and processing systems. Notably, trigger switch 2C shown in FIG. 30 is symbolically represented on the housing of the engine design, and it is understood that this trigger switch 2C or functionally equivalent device will be typically integrated with the housing of the resultant system into which the engine is embedded so that the user can interact with and actuate the same. Such Engines according to the present invention can be realized in various shapes and sizes and be embedded within various kinds of systems and devices requiring diverse image capture and processing functions as taught herein.

Illustrative Embodiment of a Wireless Bar Code-Driven Portable Data Terminal (PDT) System of the Present Invention FIGS. 31, 32 and 33 show a Wireless Bar Code-Driven Portable Data Terminal (PDT) System 140 according to the present invention which comprises: a Bar Code Driven PDT 150 embodying the Digital Imaging-Based Bar Code Symbol Reading Engine of the present invention 100, described herein; and a cradle-providing Base Station 155.

As shown in FIGS. 31 and 32, the Digital Imaging-Based Bar Code Symbol Reading Engine 100 can be used to read bar code symbols on packages and the symbol character data representative of the read bar code can be automatically transmitted to the cradle-providing Base Station 155 by way of an RF-enabled 2-way data communication link 170. At the same time, robust data entry and display capabilities are provided on the PDT 150 to support various information based transactions that can be carried out using System 140 in diverse retail, industrial, educational and other environments.

As shown in FIG. 32, the Wireless Bar Code Driven Portable Data Terminal System 140 comprises: a hand-supportable housing 151; Digital Imaging-Based Bar Code Symbol Reading Engine 100 as shown in FIG. 30, and described herein above, mounted within the head portion of the hand-supportable housing 151; a user control console 151A; a high-resolution color LCD display panel 152 and drivers mounted below the user control console 151A and integrated with the hand-supportable housing, for displaying, in a real-time manner, captured images, data being entered into the system, and graphical user interfaces (GUIs) generated by the end-user application running on the virtual machine of the wireless PDT; and PDT computing subsystem 180 contained within the PDT housing, for carrying out system control operations according to the requirements of the end-user application to be implemented upon the hardware and software platforms of the wireless PDT 2B of this illustrative embodiment.

As shown in block schematic diagram of FIG. 34, a design model for the Wireless Hand-Supportable Bar Code Driven Portable Data Terminal System 140 shown in FIGS. 31 and 32, and its cradle-supporting Base Station 155 interfaced with possible host systems 173 and/or networks 174, comprises a number of subsystems integrated about a system bus, namely: a data transmission circuit 156 for realizing the PDT side of the electromagnetic-based wireless 2-way data communication link 170; program memory (e.g. DRAM) 158; non-volatile memory (e.g. SRAM) 159; Digital Imaging-Based Bar Code Symbol Reading Engine 100 for optically capturing narrow and wide area images and reading bar code symbols recognized therein; a manual data entry device such as a membrane-switching type keypad 160; LCD panel 152; an LCD controller 161; LCD backlight brightness control circuit 162; and a system processor 163 integrated with a systems bus (e.g. data, address and control buses). Also, a battery power supply circuit 164 is provided for supplying regulated power supplies to the various subsystems, at particular voltages determined by the technology used to implement the PDT device.

As shown in FIG. 34, the Base Station 155 also comprises a number of integrated subsystems, namely: a data receiver circuit 165 for realizing the base side of the electromagnetic-based wireless 2-way data communication link 170; a data transmission subsystem 171 including a communication control module; a base station controller 172 (e.g. programmed microcontroller) for controlling the operations of the Base Station 155. As shown, the data transmission subsystem 171 interfaces with the host system 173 or network 174 by way of the USB or RS232 communication interfaces, TCP/IP, Apple-Talk or the like, well known in the art. Taken together, data transmission and reception circuits 156 and 165 realize the wireless electromagnetic 2-way digital data communication link 170 employed by the wireless PDT of the present invention.

Notably, Wireless Hand-Supportable Bar Code Driven Portable Data Terminal System 140, as well as the POS Digital Imaging-Based Bar Code Symbol Reader 1" shown in FIGS. 29A through 29C, each have two primary modes of operation: (1) a hands-on mode of operation, in which the PDT 150 or POS Reader 1" is removed from its cradle and used as a bar code driven transaction terminal or simply bar code symbol reader; and (2) a hands-free mode of operation, in which the PDT 150 or POS Reader 1" remains in its cradle-providing Base Station 155, and is used a presentation type bar code symbol reader, as required in most retail point-of-sale (POS) environments. Such hands-on and hands-free modes of system operation are described in greater detail in copending U.S. patent application Ser. No.10/684,273 filed on Oct. 11, 2003, and incorporated herein by reference in its entirety.

In such hands-on and hands-free kinds of applications, the trigger switch 2C employed in the digital imaging-based bar code symbol reading device of the present invention can be readily modified, and augmented with a suitable stand-detection mechanism, which is designed to automatically configure and invoke the PDT 150 and its Engine 100 into its Presentation Mode (i.e. System Mode of Operation No.12) or other suitable system mode when the PDT is placed in its Base Station 155 as shown in FIG. 33. Then when the PDT 150 is picked up and removed from its cradling supporting Base Station 155 as shown in FIGS. 31 and 32, the trigger switch 2C and stand-detection mechanism, arrangement can be arranged so as to automatically configure and invoke the PDT 150 and its Engine 100 into a suitable hands-on supporting mode of system operation (selected from the Table set forth in FIGS. 26A and 26B), to enable hands-on mode of operation.

Similarly, the trigger switch 2C employed in the POS Digital Imaging Bar Code Symbol Reading Device 1" can be readily modified, and augmented with stand-detection mechanism, which is designed to automatically configure and invoke the POS Reader 1" into its Presentation Mode (i.e. System Mode of Operation No.12) or other suitable system mode, when the Reader 1" is resting on a countertop surface, as shown in FIGS. 29A and 29B. Then when the POS Reader 1" is picked up off the countertop surface, for use in its hands-on mode of operation, the trigger switch 2C and stand-detection mechanism, arrangement will automatically configure and invoke Reader 1" into a suitable hands-on supporting mode of system operation, as shown in FIG. 29C. In such embodiments, the stand-detection mechanism can employ a physical contact switch, or IR object sensing switch, which is actuated then the device is picked up off the countertop surface. Such mechanisms will become apparent in view of the teachings disclosed herein.

Hand-Supportable Digital Imaging-Based Bar Code Symbol Reading Device Employing Automatic Light Exposure Measurement and Illumination Control Subsystem and a Software-Based Illumination Metering Program In the system shown in FIGS. 1 through 34, automatic illumination control is provided by precise controlling the duration of LED illumination during exposure, thereby capturing well-illuminated images. However, in some circumstances, greater degrees of illumination control may be required and the method shown in FIGS. 35 through 36 may be helpful.

In FIGS. 35 through 36, an enhanced auto-illumination control scheme is embodied within the hand-held image-processing bar code reader of the present invention. According to this alternative illumination control scheme, the illumination level of a captured image is first (i.e. initially) determined by measuring the actual light illumination level at a central portion of the image detection array, and then computing an appropriate illumination duration level based on this measurement. Then, after an image is captured using this initial illumination level, a software illumination metering program is used to analyze the spatial intensity distribution of the captured image and determine if a new illumination duration should be calculated for use in subsequent image illumination and capture operations, to provide more fine-tuned images. If the light/illumination level represented in a captured digital image is determined to be acceptable by the software-based illumination metering program, then the program automatically (i) calculates a corrected illumination duration (count) for use by the Automatic Light Exposure Measurement and Illumination Control Subsystem, and (ii) provides the corrected illumination duration thereto. Then the Automatic Light Exposure Measurement and Illumination Control Subsystem uses this corrected illumination duration to control the illumination delivered to the field of view (FOV) during the next object illumination and image capturing operation supported by the system. By using this enhanced auto-illumination control method, the image-processing based bar code symbol reader of the present invention is provided additional flexibility in its ability to capture fine-tuned images in real-time having the optimal illumination levels.

FIG. 35 schematically illustrates the hand-supportable digital imaging-based bar code symbol reading device of the present invention, wherein a Software-Based Illumination Metering Program is used to help the Automatic Light Exposure Measurement and Illumination Control Subsystem control the operation of the LED-Based Multi-Mode Illumination Subsystem. FIG. 35A illustrates in greater detail this enhanced method of automatic illumination control, namely how the current illumination duration (determined by the Automatic Light Exposure Measurement and Illumination Control Subsystem) is automatically over-written by the illumination duration computed by a software-implemented, image-processing-based Illumination Metering Program carried out within the Image-Processing Based Bar Code Symbol Reading Subsystem. This over-written illumination duration is then used by the Automatic Light Exposure Measurement and Illumination Control Subsystem to control the amount of LED illumination produced and delivered to the CMOS image detection array during the next image frame captured by the system, in accordance with this Enhanced Auto-Illumination Control Scheme of the present invention.

FIG. 36 is a flow chart setting forth the steps involved in carrying out the enhanced auto-illumination control scheme/method illustrated in FIG. 35A. As indicated at Block in FIG. 36, the first step of the method involves using the Automatic Light Exposure Measurement and Illumination Control Subsystem to automatically (i) measure the illumination level at a particular (e.g. central) portion of field of view of the CMOS image sensing array and (ii) determine the illumination duration (i.e. time count) necessary to achieve a desired spatial intensity in the captured image.

As indicated at Block B in FIG. 36, the Automatic Light Exposure Measurement and Illumination Control Subsystem uses this computed/determined illumination duration to drive the LED-based illumination subsystem and capture a digital image of the object within the field of view of the Image Formation and Detection Subsystem.

As indicated at Block C in FIG. 36, the Image-Processing Bar Code Reading Subsystem (e.g. image processor) analyzes and measures in real-time the spatial intensity distribution of the captured image and determines whether or not a corrected illumination duration is required or desired when capturing the next or subsequent frames of image data, during the current or subsequent image capture cycle.

As indicated at Block D in FIG. 36, within the Automatic Light Exposure Measurement and Illumination Control Subsystem, the previously determined illumination duration (used to captured the analyzed image) is automatically over-written with the corrected illumination duration (count) determined at Block C above.

As indicated at Block E in FIG. 36, the Automatic Light Exposure Measurement and Illumination Control Subsystem then uses the corrected illumination duration (computed by the software-based Illumination Metering Program) to drive the LED-based Illumination Subsystem and capture a subsequent digital image of the illuminated object within the field of view of the system.

As indicated in FIG. 36, the steps indicated at Blocks C through E can be repeated a number of times in a recursive manner, each image capture cycle, to finally produce a digital image having an optimized spatial intensity level with excellent image contrast.

Hand-Supportable Image-Processing Based Bar Code Symbol Reader Employing an Image Cropping Zone (ICZ) Framing Pattern, and an Automatic Post-Image Capture Cropping Method The hand-held image-processing bar code symbol readers described hereinabove employs a narrow-area illumination beam which provides a visual indication to the user on the vicinity of the narrow-area field of view of the system. However, while operating the system during its wide-area image capture modes of operation, it may be desirable in particular applications to provide a visual indication of the wide-area field of view of the system. While various techniques are known in the art to provide such targeting/marking functions, a novel method will be described below with reference to FIGS. 37 through 39.

FIG. 37 shows a hand-supportable image-processing based bar code symbol reader employing an image cropping zone (ICZ) framing pattern, and an automatic post-image capture cropping methods to abstract an ICZ within which a targeted object to be imaged can be visually encompassed during object illumination and imaging operations. As shown in FIG. 38, this hand-supportable image-processing based bar code symbol reader is similar to those designs described above, except that it includes one or more image cropping zone (ICZ) illumination framing source(s) operated under the control of the System Control Subsystem. Preferably, these ICZ framing sources are realized using four relative bright LEDs indicating the corners of the ICZ, which will be cropped during post-image capture operations. Alternatively, the ICZ framing source could be a VLD that produces a visible laser diode transmitted through a light diffractive element (e.g. volume transmission hologram) to produce four beamlets indicating the corners of the ICZ, or bright lines that appear in the captured image. The ICZ frame created by such corner points or border lines (formed thereby) can be located using edge-tracing algorithms, and then the corners of the ROI can be identified from the traced border lines.

Referring to FIG. 39, the ICZ Framing and Post-Image Capture Cropping Process of the present invention will now be described.

As indicated at Block A in FIG. 39, the first step of the method involves projecting an ICZ framing pattern within the FOV of the system during wide-area illumination and image capturing operations.

As indicated at Block B in FIG. 39, the second step of the method involves the user visually aligning the object to be imaged within the ICZ framing pattern (however it might be realized).

As indicated at Block C in FIG. 39, the third step of the method involves the Image Formation and Detection Subsystem and the Image Capture and Buffering Subsystem forming and capturing the wide-area image of the entire FOV of the system, which embraces (i.e. spatially encompasses) the ICZ framing pattern aligned about the object to be imaged.

As indicated at Block D in FIG. 39, the fourth step of the method involves using an automatic software-based image cropping algorithm, implemented within the Image-Processing Bar Code Reading Subsystem, to automatically crop the pixels within the spatial boundaries defined by the ICZ, from those pixels contained in the entire wide-area image frame captured at Block B. Due to the fact that image distortion may exist in the captured image of the ICZ framing pattern, the cropped rectangular image may partially contain the ICZ framing pattern itself and some neighboring pixels that may fall outside the ICZ framing pattern.

As indicated at Block E in FIG. 39, the fifth step of the method involves the Image-Processing Bar Code Reading Subsystem automatically decode processing the image represented by the cropped image pixels in the ICZ so as to read a 1D or 2D bar code symbol graphically represented therein.

As indicated at Block F in FIG. 39, the sixth step of the method involves the Image-Processing Bar Code Reading Subsystem outputting (to the host system) the symbol character data representative of the decoded bar code symbol.

Notably, in prior art FOV targeting methods, the user captures an image that is somewhat coinciding with what he intended to capture. This situation is analogous to a low-cost point-and-shoot camera, wherein the field of view of the viewfinder and camera lens only substantially coincide with each other. In the proposed scheme employing the above-described ICZ framing and post-processing pixel cropping method, the user captures an image that is exactly what s/he framed with the ICZ framing pattern. The advantage of this system to prior art FOV methods is analogous to the advantage of a SLR camera over a point-and-shoot camera, namely: accuracy and reliability.

Another advantage of using the ICZ framing and post-processing pixel cropping method is that the ICZ framing pattern (however realized) does not have to coincide with the field of view of the Image Formation And Detection Subsystem. The ICZ framing pattern also does not have to have parallel optical axes. The only basic requirement of this method is that the ICZ framing pattern fall within the field of view (FOV) of the Image Formation And Detection Subsystem, along the working distance of the system.

However, one may design the ICZ framing pattern and the optical axis angle of the system such that when the ICZ framing pattern does not fall completely inside the camera's field of view (i.e. the ICZ framing pattern does not fall within the complete acquired image), this visually implies to the user that the captured and cropped image is outside the depth of focus of the imaging system. Thus, the imager can provide a visual or audio feedback to the user so that he may repeat the image acquisition process at a more appropriate distance.

Some Modifications which Readily Come to Mind

In alternative embodiments of the present invention, illumination arrays 27, 28 and 29 employed within the Multi-Mode Illumination Subsystem 14 may be realized using solid-state light sources other than LEDs, such as, for example, visible laser diode (VLDs) taught in great detail in WIPO Publication No. WO 02/43195 A2, published on May 30, 2002, assigned to Metrologic Instruments, Inc., and incorporated herein by reference in its entirety as if set forth fully herein. However, when using VLD-based illumination techniques in the imaging-based bar code symbol reader of the present invention, great care must be taken to eliminate or otherwise substantially reduce speckle-noise generated at the image detection array 22 when using coherent illumination source during object illumination and imaging operations. WIPO Publication No. WO 02/43195 A2, supra, provides diverse methods of and apparatus for eliminating or substantially reducing speckle-noise during image formation and detection when using VLD-based illumination arrays.

While CMOS image sensing array technology was described as being used in the preferred embodiments of the present invention, it is understood that in alternative embodiments, CCD-type image sensing array technology, as well as other kinds of image detection technology, can be used.

The bar code reader design described in great detail hereinabove can be readily adapted for use as an industrial or commercial fixed-position bar code reader/imager, having the interfaces commonly used in the industrial world, such as Ethernet TCP/IP for instance. By providing the system with an Ethernet TCP/IP port, a number of useful features will be enabled, such as, for example: multi-user access to such bar code reading systems over the Internet; control of multiple bar code reading system on the network from a single user application; efficient use of such bar code reading systems in live video operations; web-servicing of such bar code reading systems, i.e. controlling the system or a network of systems from an Internet Browser; and the like.

While the illustrative embodiments of the present invention have been described in connection with various types of bar code symbol reading applications involving 1-D and 2-D bar code structures, it is understood that the present invention can be use to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

Also, imaging-based bar code symbol readers of the present invention can also be used to capture and process various kinds of graphical images including photos and marks printed on driver licenses, permits, credit cards, debit cards, or the like, in diverse user applications.

It is understood that the image capture and processing technology employed in bar code symbol reading systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A digital image capture and processing system comprising:
   a housing having a light transmission window;
   an image formation and detection subsystem having an image sensing array and image formation optics having a field of view (FOV) defined relative to said light transmission window, for forming and detecting a digital image of an object within said FOV;
   a trigger event generation mechanism, disposed in said housing, for automatically detecting the presence of the object within said FOV, and generating a trigger event in response to detecting the presence of said object;
   an illumination subsystem, disposed in said housing, and having an LED-based illumination array for producing a field of illumination within said FOV during object illumination and imaging operations;
   an illumination measurement subsystem, disposed in said housing, and including a photodetector, operating independently from said image sensing array, for measuring the level of illumination at a particular region of said FOV during object illumination and imaging operations, and determining and storing an illumination duration necessary to achieve a desired spatial intensity in said digital image formed and detected by said information and detection subsystem;
   an illumination control subsystem, disposed in said housing, and using said illumination duration determined by said illumination measurement subsystem so as to control the time duration that said LED-based illumination array is driven during object illumination and imaging operations;
   a programmed image processor, disposed in said housing, for supporting an image-processing based illumination metering program, as well as processing digital images formed and detected by said image formation and detection subsystem so as to read or acquire information graphically represented in said digital images; and
   a system control subsystem, disposed in said housing, for controlling and/or coordinating the operations of one or more of said subsystems and components identified above.

2. The digital image capture and processing system of claim 1, wherein said trigger event generation mechanism comprises an automatic object presence detector, wherein when an object is moved into said FOV, said trigger event generation mechanism automatically generates said trigger event within said digital image capture and processing system; and
   wherein, in response to the generation of said trigger event, the following sequence of operations are carried out under the control and or coordination of said system control subsystem:
   (1) said illumination subsystem produces and projects said field of illumination within said FOV and onto said detected object;
   (2) said photo detector employed in said illumination measurement subsystem automatically measures the level of illumination at a particular region of said FOV, and determines and stores the illumination duration necessary to achieve the desired spatial intensity in the digital image formed and detected by said information and detection subsystem;
   (3) said illumination control subsystem uses said determined illumination duration to control the time duration that said LED-based illumination array is driven during object illumination and imaging operations;
   (4) said image formation and detection subsystem forms and detects one or more digital images of the illuminated object within said FOV;
   (5) said programmed image processor uses said image-processing based illumination metering program to analyze and measure, in real-time, the spatial intensity distribution of the detected digital image, and determines whether or not a corrected illumination duration is required when forming and detecting a next or subsequent digital image during the current or subsequent object illumination and imaging cycle;
   (6) in the event that said programmed image processor determines that a corrected illumination duration is required, then said programmed image processor overwrites the previously determined and stored illumination duration, with the corrected illumination duration; and
   (7) said illumination control subsystem uses the corrected illumination duration to control the time duration that said LED-based illumination array is driven during the subsequent object illumination and imaging operations, so that said image formation and detection subsystem can form and detect one or more digital images of the illuminated object.

3. The digital image capture and processing system of claim 2, wherein said system control subsystem coordinates system operations so that operations (1) through (7) are repeated one or more additional times during each object illumination and imaging cycle, so as to produce one or more digital images having a spatial intensity level with high image contrast.

4. The digital image capture and processing system of claim 1, wherein said particular region is a central region of said FOV.

5. The digital image capture and processing system of claim 1, wherein said housing is hand-supportable, and said trigger event generation mechanism comprises a trigger switch that is manually actuated by an operator, and wherein in response to an object being moved into said FOV, the operator generates said trigger event by manually actuating said trigger switch;

wherein, in response to the generation of said trigger event, the following sequence of operations are carried out under the control and/or coordination of said system control subsystem:

(1) said illumination subsystem produces and projects said field of illumination within said FOV and onto said detected object;

(2) said photodetector employed in said illumination measurement subsystem automatically measures the level of illumination at the particular region of said FOV, and determines and stores the illumination duration necessary to achieve the desired spatial intensity in the digital image formed and detected by said information and detection subsystem;

(3) said illumination control subsystem uses said determined illumination duration to control the time duration that said LED-based illumination array is driven during object illumination and imaging operations;

(4) said image formation and detection subsystem forms and detects a digital image of the illuminated object within said FOV;

(5) said programmed image processor uses said image-processing based illumination metering program to analyze and measure, in real-time, the spatial intensity distribution of the detected digital image, and determines whether or not a corrected illumination duration is required when forming and detecting a next or subsequent digital image during the current or subsequent object illumination and imaging cycle;

(6) in the event that said programmed image processor determines that a corrected illumination duration is required, then said programmed image processor overwrites the previously determined and stored illumination duration, with the corrected illumination duration; and (7) said illumination control subsystem uses the corrected illumination duration to control the time duration that said LED-based illumination array is driven during the subsequent object illumination and imaging operations, so that said image formation and detection subsystem can form and detect one or more digital images of the illuminated object.

6. The digital image capture and processing system of claim 5, wherein said system control subsystem coordinates system operations so that operations (1) through (7) are repeated one or more additional times during each object illumination and imaging cycle, so as to produce one or more digital images having an optimized spatial intensity level with high image contrast.

7. The digital image capture and processing system of claim 1, wherein said particular region is a central region of the field of view of said image sensing array.

8. The digital image capture and processing system of claim 1, wherein said image sensing array is an area-type image sensing array.

9. The digital image capture and processing system of claim 1, wherein said illumination duration is a time count stored in memory within said digital image capture and processing system.

10. The digital image capture and processing system of claim 1, wherein said programmed image processor is programmed so as to support decode processing of digital images formed and detected by said image formation and detection subsystem so as to read one or more 1D and/or 2D code symbols represented in said digital images.

11. The digital image capture and processing system of claim 10, wherein said housing is a hand-supportable housing.

12. The digital image capture and processing system of claim 10, wherein said code symbol is a bar code symbol.

13. The digital image capture and processing system of claim 12, wherein said bar code symbol is selected from the group consisting of 1D bar code symbols, 2D bar code symbols and data matrix symbols.

14. The digital image capture and processing system of claim 8, wherein said area-type image sensing array is a CMOS-type area image sensor.

15. The digital image capture and processing system of claim 1, wherein said housing is supportable upon the countertop surface of a point of sale (POS) station.

* * * * *